US012559274B2

(12) United States Patent
Almogy et al.

(10) Patent No.: US 12,559,274 B2
(45) **Date of Patent: *Feb. 24, 2026**

(54) PRODUCT HANDLING AND PACKAGING SYSTEM

(71) Applicant: Fulfil Solutions, Inc., Mountain View, CA (US)

(72) Inventors: Gilad Almogy, Mountain View, CA (US); Jason Kalus, Mountain View, CA (US); John Hosken, Menlo Park, CA (US); Nathan Beckett, Mountain View, CA (US); David Cameron Hosken, Mountain View, CA (US); Eric Yehl, Mountain View, CA (US)

(73) Assignee: Fulfil Solutions, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,106

(22) Filed: Jul. 31, 2024

(65) Prior Publication Data
US 2025/0128842 A1      Apr. 24, 2025

Related U.S. Application Data

(63) Continuation of application No. 16/879,192, filed on May 20, 2020, now Pat. No. 12,084,214, which is a
(Continued)

(51) Int. Cl.
| | |
|---|---|
| B65B 25/04 | (2006.01) |
| B65B 5/10 | (2006.01) |

(Continued)

(52) U.S. Cl.
CPC .............. B65B 25/04 (2013.01); B65B 5/101 (2013.01); B65B 25/046 (2013.01); B65B 43/52 (2013.01);
(Continued)

(58) Field of Classification Search
CPC . B65G 65/365; B65G 65/425; B65G 2207/46
See application file for complete search history.

(56) References Cited

U.S. PATENT DOCUMENTS

| | | | | |
|---|---|---|---|---|
| 3,675,801 A | * | 7/1972 | Larson ............... | B65G 47/8815 |
| | | | | 414/416.03 |
| 5,599,154 A | * | 2/1997 | Holscher .............. | B65G 1/0485 |
| | | | | 414/268 |

(Continued)

FOREIGN PATENT DOCUMENTS

| | | | | |
|---|---|---|---|---|
| DE | 2063304 A1 | * | 7/1972 | ............. B65G 47/74 |
| EP | 601828 A2 | * | 6/1994 | ............. B65G 47/57 |
| WO | WO-0127002 A1 | * | 4/2001 | ........... B65G 1/0485 |

*Primary Examiner* — Joshua G Kotis
(74) *Attorney, Agent, or Firm* — Run Patent Group, LLC; Peter Miller; Marissia Kohrman

(57) ABSTRACT

Embodiments of product handling systems facilitate transfer of individual product items from incoming bulk form into dedicated trays for inspection, sorting, selection, and packaging. Inspection may comprise interrogation of product items within a tray by electromagnetic (e.g., optical, hyperspectral) or other (e.g., physical, acoustic, gas sensing, etc.) techniques. Prior to packaging, product items disposed within the tray may be stored in a moveable carousel responsible for controlling environmental factors such as temperature, humidity, illumination, ambient gases, product-to-product interactions, and/or others. Movement of product items from a carousel's transfer station to an outside staging position may be accomplished using robots and/or conveyor belts. Embodiments may allow rapid, low-cost consumer selection of specific individual product items based upon their accompanying metadata (e.g., source, identifier), in combination with the results of inspection (e.g., visual appearance). Embodiments may receive product items pre-packaged in tray format to expedite inspection, sorting, selection, and packaging.

20 Claims, 144 Drawing Sheets

Related U.S. Application Data continuation of application No. 16/418,901, filed on May 21, 2019, now Pat. No. 10,703,521, which is a continuation-in-part of application No. 16/189,673, filed on Nov. 13, 2018, now Pat. No. 10,543,942.

(60) Provisional application No. 62/675,656, filed on May 23, 2018, provisional application No. 62/589,409, filed on Nov. 21, 2017.

(51) Int. Cl.

| | |
|---|---|
| *B65B 43/52* | (2006.01) |
| *B65B 43/54* | (2006.01) |
| *B65B 43/58* | (2006.01) |
| *B65B 43/59* | (2006.01) |
| *B65G 1/137* | (2006.01) |
| *B65G 65/36* | (2006.01) |
| *B65G 65/42* | (2006.01) |
| *B07C 5/34* | (2006.01) |
| *B65B 11/02* | (2006.01) |
| *B65B 35/02* | (2006.01) |
| *B65B 43/56* | (2006.01) |
| *B65B 57/12* | (2006.01) |
| *B65G 1/00* | (2006.01) |
| *B65G 1/04* | (2006.01) |
| *B65G 1/06* | (2006.01) |
| *B65G 1/12* | (2006.01) |
| *B65G 1/127* | (2006.01) |
| *B65G 47/51* | (2006.01) |
| *G06Q 30/0601* | (2023.01) |

(52) U.S. Cl.
CPC .............. *B65B 43/54* (2013.01); *B65B 43/58* (2013.01); *B65B 43/59* (2013.01); *B65G 1/1373* (2013.01); *B65G 1/1376* (2013.01); *B65G 65/365* (2013.01); *B65G 65/425* (2013.01); *B07C 5/34* (2013.01); *B07C 2501/009* (2013.01); *B65B 5/105* (2013.01); *B65B 11/025* (2013.01); *B65B 35/02* (2013.01); *B65B 43/56* (2013.01); *B65B 57/12* (2013.01); *B65B 2210/18* (2013.01); *B65G 1/00* (2013.01); *B65G 1/045* (2013.01); *B65G 1/06* (2013.01); *B65G 1/12* (2013.01); *B65G 1/127* (2013.01); *B65G 1/1371* (2013.01); *B65G 47/5104* (2013.01); *B65G 2201/0202* (2013.01); *B65G 2201/0211* (2013.01); *B65G 2201/0258* (2013.01); *B65G 2203/041* (2013.01); *B65G 2207/46* (2013.01); *G06Q 30/0627* (2013.01)

(56) References Cited

U.S. PATENT DOCUMENTS

| | | | | |
|---|---|---|---|---|
| 5,833,427 | A * | 11/1998 | Siegler ................. | B65G 1/0435 414/277 |
| 5,988,858 | A * | 11/1999 | Yuyama .................. | G07F 7/025 700/229 |
| 7,735,625 | B2 * | 6/2010 | Schafer ................ | B65G 1/1378 198/782 |
| 10,543,942 | B2 * | 1/2020 | Almogy ............... | B65G 65/365 |
| 10,703,521 | B2 * | 7/2020 | Almogy ................... | B07C 5/34 |
| 12,162,683 | B2 * | 12/2024 | Almogy .................. | B65G 1/02 |
| 2001/0025765 | A1 * | 10/2001 | Ikegami ............ | B65G 47/5181 198/347.1 |
| 2004/0191049 | A1 * | 9/2004 | Winkler ................. | B65G 57/03 414/416.11 |
| 2014/0372258 | A1 * | 12/2014 | Elberbaum .......... | G06Q 10/083 705/26.81 |
| 2015/0073589 | A1 * | 3/2015 | Khodl ................... | G06Q 50/40 700/218 |
| 2015/0291357 | A1 * | 10/2015 | Razumov ............. | B65G 1/1373 414/807 |
| 2015/0332213 | A1 * | 11/2015 | Galluzzo ............. | B25J 15/0085 700/218 |
| 2016/0207710 | A1 * | 7/2016 | Conrad ................ | B65G 1/0485 |
| 2018/0141754 | A1 * | 5/2018 | Garrett .................. | B65G 47/52 |

* cited by examiner

300

800

1000

Bulk Material Received ~1002

Product Items Sorted ~1004

Product Items Inspected ~1005

Product Items Loaded to Trays ~1006

Tray Location Information Maintained ~ 1008

Tray Loaded into Carousel ~1010

Product Item Selected ~1012

Product Item Dispensed to Packaging ~1014

1232

1236

2800

2802

2900

2902

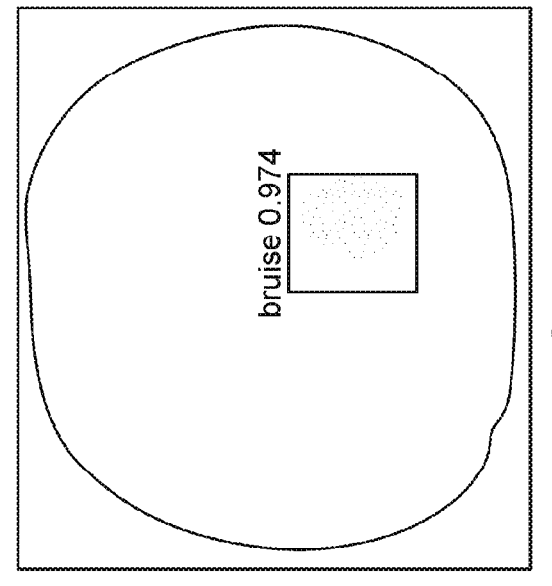
FIG. 34B
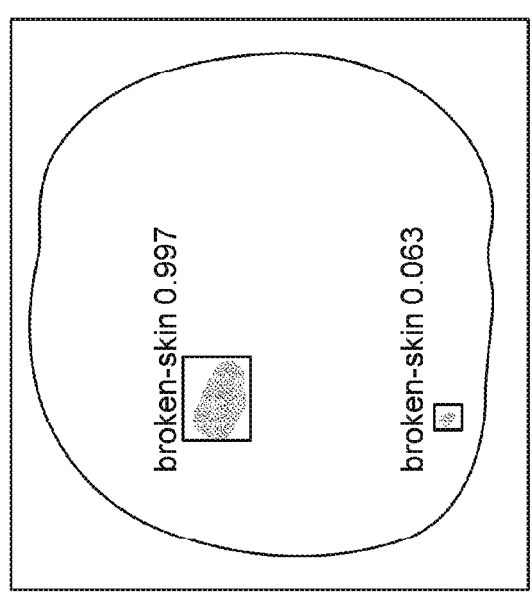
FIG. 34A
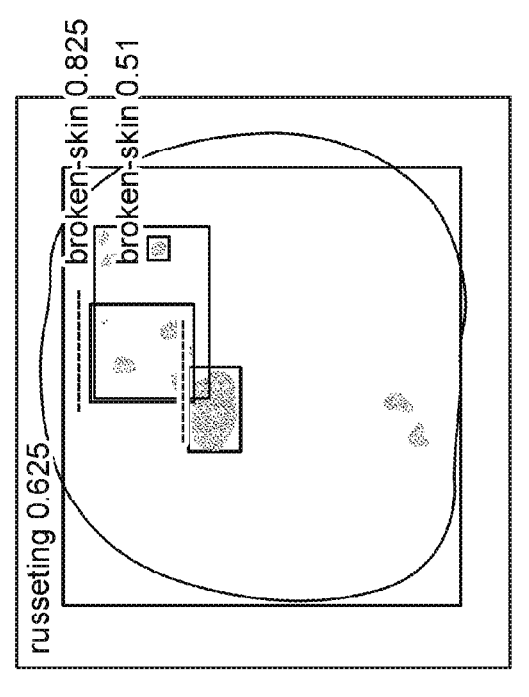
FIG. 34D
FIG. 34C

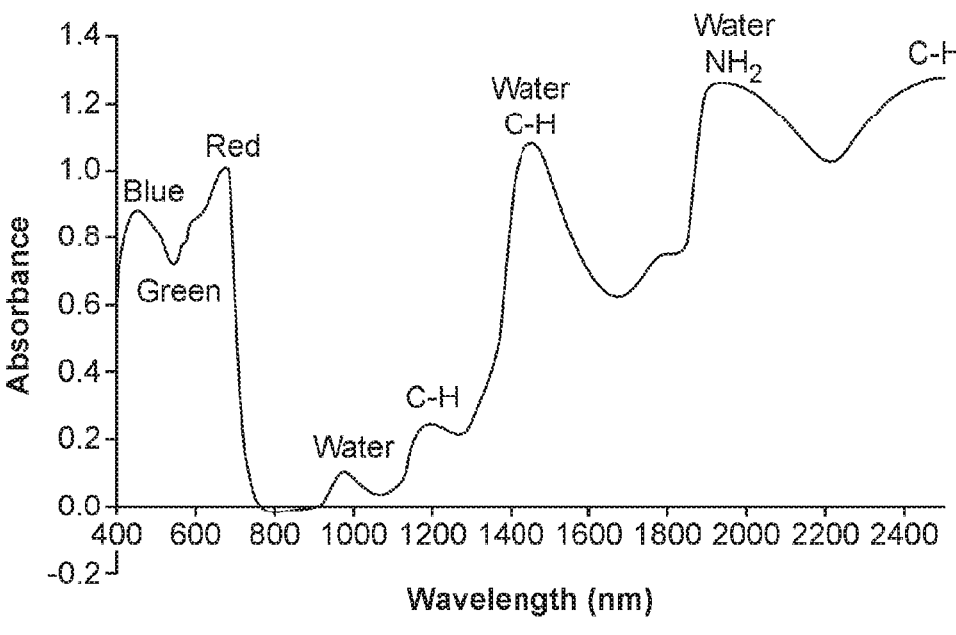
FIG. 35
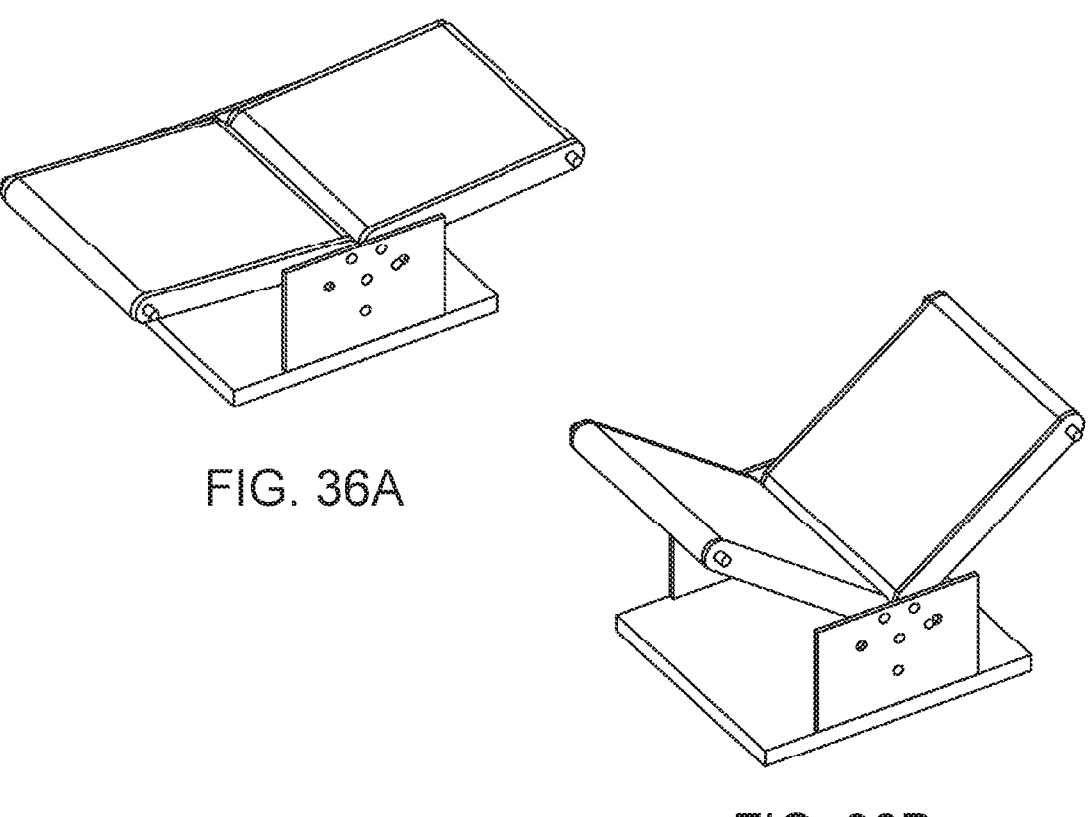
FIG. 36A
FIG. 36B

Side View

Top View

Front View

Side View

Top View

Side View

Top View

Side View

Side View

Top View

1. Under the mounting rails for the entire mobile platform

3. Under a single roller or set of rollers

2. Between the slide and the moving rail

7110

7130

7120

7140

7180

7170

7150

7110

7171        7172        7173        7174

| I/O CONTROLLER | SYSTEM MEMORY | CENTRAL PROCESSOR | PRINTER |

7130

7175

DISPLAY ADAPTER   7182

7177        7178        7179        7181

7176

| MONITOR | SERIAL PORT | KEYBD | FIXED DISK | ENTERNAL INTERFACE |

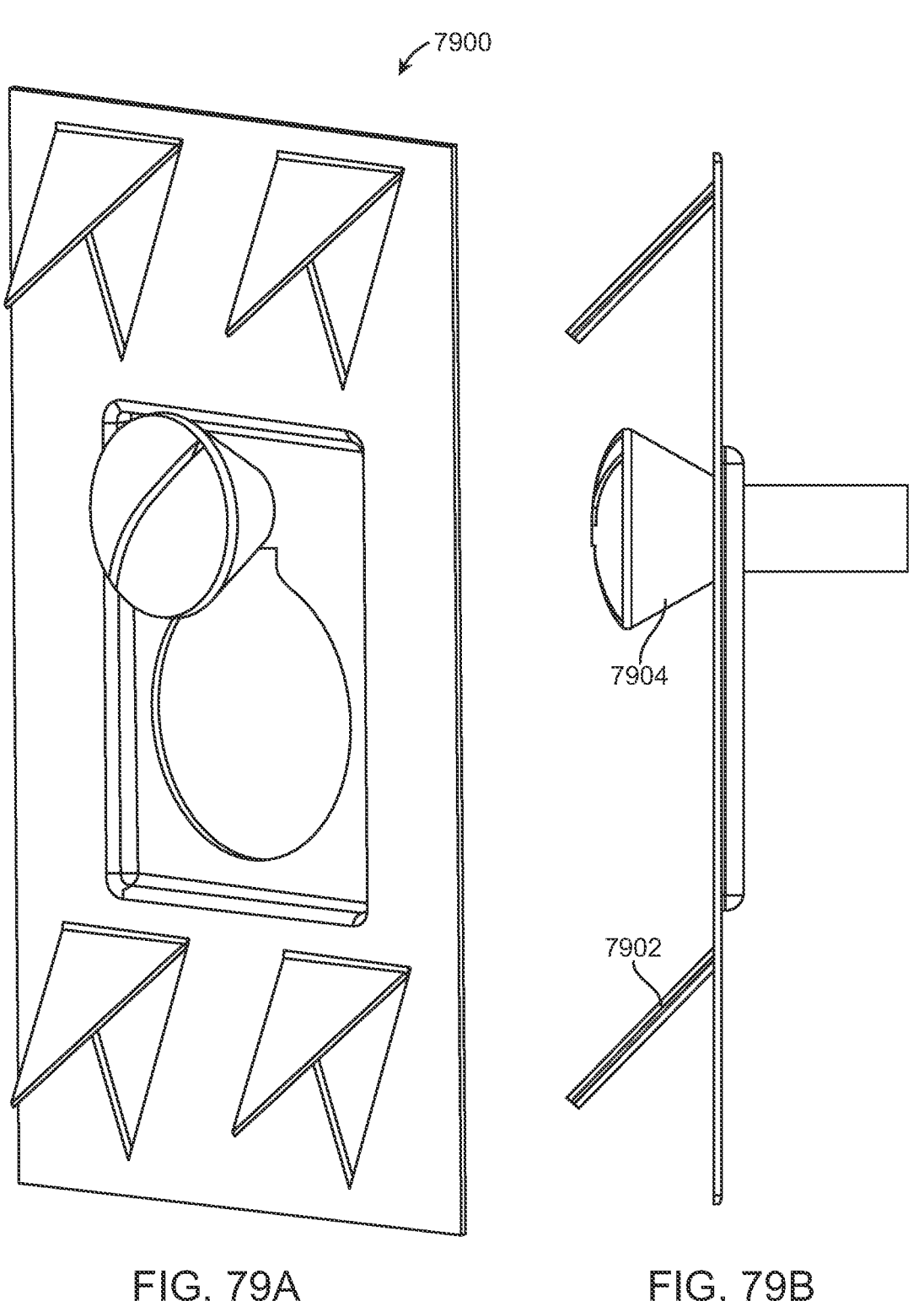
FIG. 79A                    FIG. 79B

TRAVELER
PLATFORM

8200

8300

8504    8508    8506

9102 Tray

9105 Pop through conveyor

9101 Infeed Conveyor

9104 Shuttle Conveyor

9100 Product

9706
Outbound
Conveyor

9704
Shelving

9702
Gantry Conveyor

9700
Infeed Conveyor

Shelving
unit

Gantry Conveyor

Geared connection between the motorized gantry conveyor and
non-motorized shelving unit allows transfer of cases between the two units Pulling feature X (along shaft)

Inside of Carrier

Theta
(Rotation Around Shaft)

10000

10004

10004

Pulling feature

Extended chain pin engages pulling feature as it comes around the sprocket

TRAY ROVER

TRAY LOADER

SHUTTLE   10400

INFEED

Ground

Front View

Robot Base

Cup Cone Features with
Locking mechanism

PRODUCT HANDLING AND PACKAGING SYSTEM

CROSS-REFERENCE TO RELATED APPLICATIONS

This application is a continuation of U.S. Nonprovisional patent application Ser. No. 16/879,192, filed on May 20, 2020, which is a continuation application of U.S. Nonprovisional patent application Ser. No. 16/418,901, filed on May 21, 2019 (issued as U.S. Pat. No. 10,703,521 on Jul. 7, 2020), which application is a Continuation-in-Part (CIP) of U.S. Nonprovisional patent application Ser. No. 16/189,673, filed on Nov. 13, 2018 (issued as U.S. Pat. No. 10,543,942 on Jan. 28, 2020), which claims priority to U.S. Provisional Patent Application No. 62/589,409 filed on Nov. 21, 2017, and also to U.S. Provisional Patent Application No. 62/675, 656 filed on May 23, 2018, all of which are incorporated herein by reference in their entireties for all purposes.

BACKGROUND

Efficient handling of many different types of items that exhibit a variety of shapes and/or sizes, can pose an increasingly complex technological challenge. For example, produce items alone offered by a conventional grocery store, may exhibit sizes ranging from that of a raisin to that of a watermelon. Moreover, the quality of such produce items can degrade over time, affecting their monetary value.

SUMMARY

Product handling systems according to embodiments facilitate transfer of individual product items from incoming bulk form into dedicated trays for subsequent inspection, sorting, selection, and packaging for consumption. Inspection may comprise interrogation of product items within a tray by electromagnetic (e.g., optical, hyperspectral) or other (e.g., physical, acoustic, gas sensing, etc.) techniques. Prior to packaging, product items disposed within the tray may be stored in a moveable carousel that is responsible for controlling environmental factors such as temperature, humidity, illumination, ambient gases, product-to-product interactions, and/or others. Movement of product items from a carousel's transfer station to an outside staging position may be accomplished using robots and/or conveyor belts. Embodiments may allow rapid, low-cost consumer selection of specific individual product items based upon their accompanying metadata (e.g., source, identifier), in combination with the results of inspection (e.g., visual appearance). Some embodiments may receive product items that are already pre-packaged in tray format in order to expedite inspection, sorting, selection, and packaging.

An embodiment of an apparatus comprises a frame translatable to a staging position in front of a carousel, and a fork supported by the frame and configured to extend in a direction toward the carousel to engage a tray holding an item. The apparatus further comprises a moveable member configured to project vertically into a first opening of the tray, contact the item at a first point, and to dispense the item from the tray in a direction away from the carousel, into packaging.

BRIEF DESCRIPTION OF THE DRAWINGS

FIGS. 34A-B show NIR images, and FIGS. 34C-D show RGB images, resulting from camera inspection.

FIG. 35 shows a simplified spectrograph.

FIGS. 36A-B show perspective views of a single conveyor having a linkage that can be angled from flat over a range of angles.

FIGS. 79A-B show various views of a foam attachment approach.

Figure 103A:
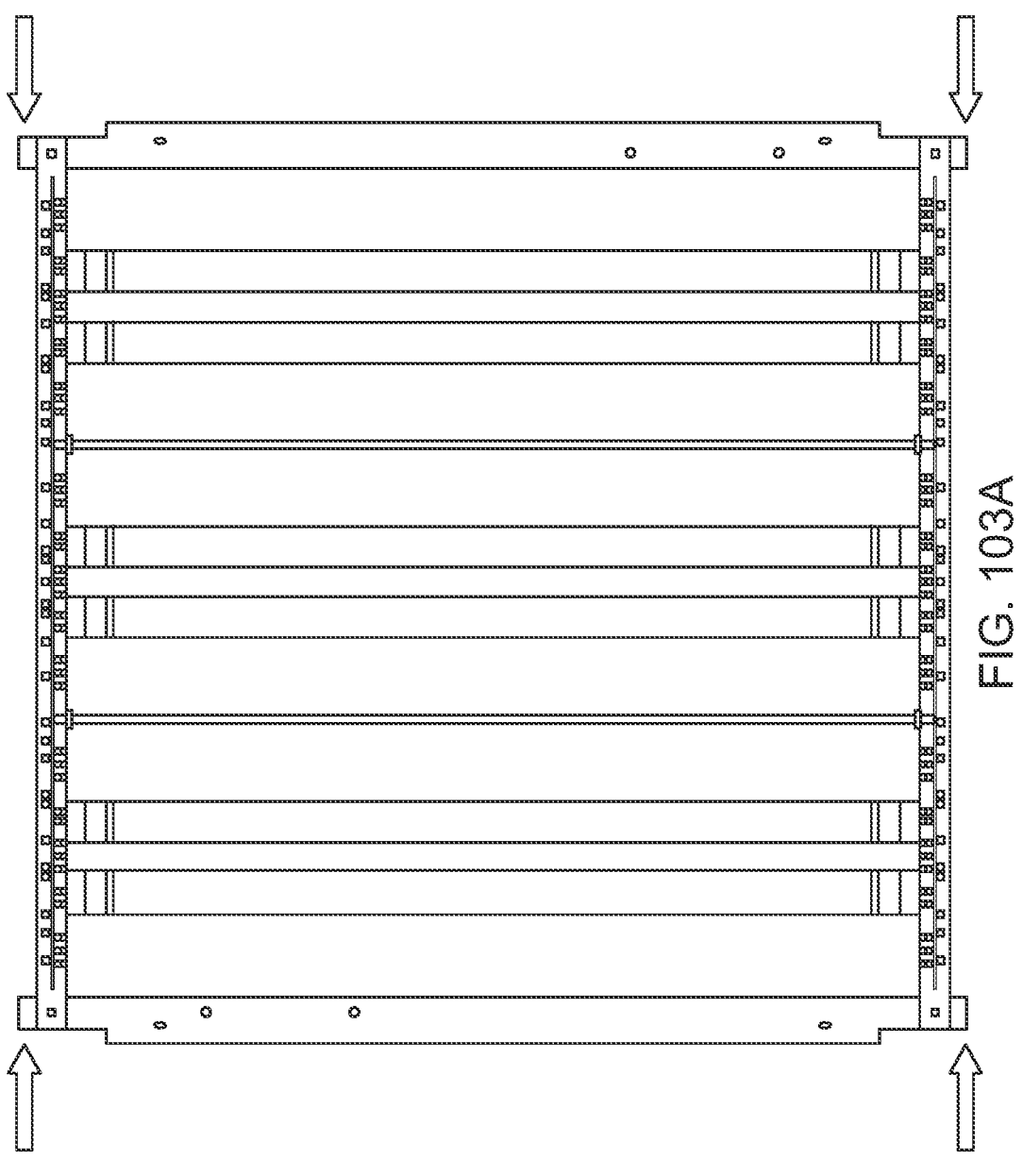
Figure 103B:
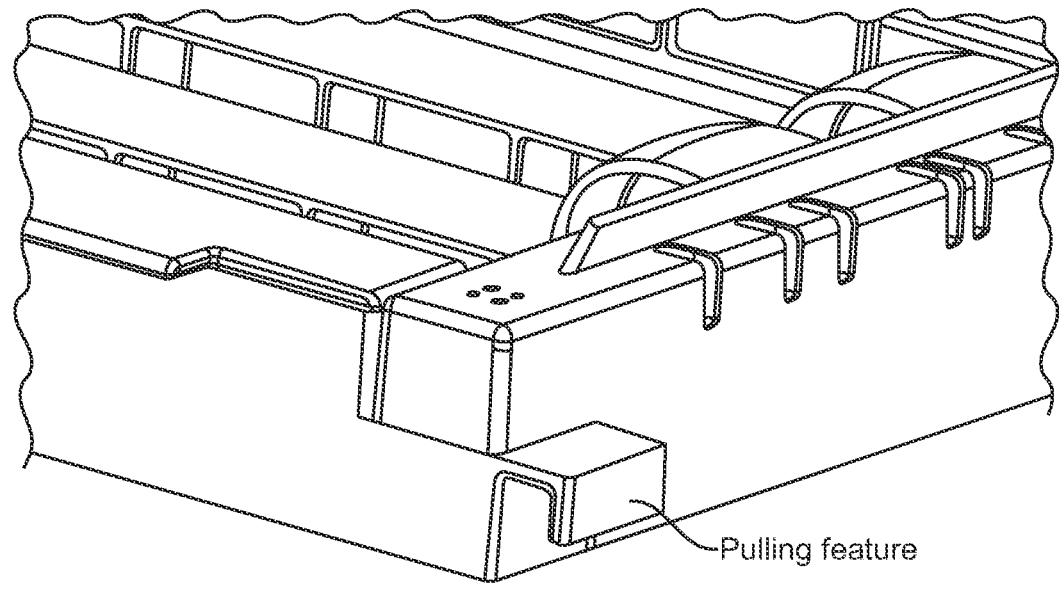
Figure 103C:
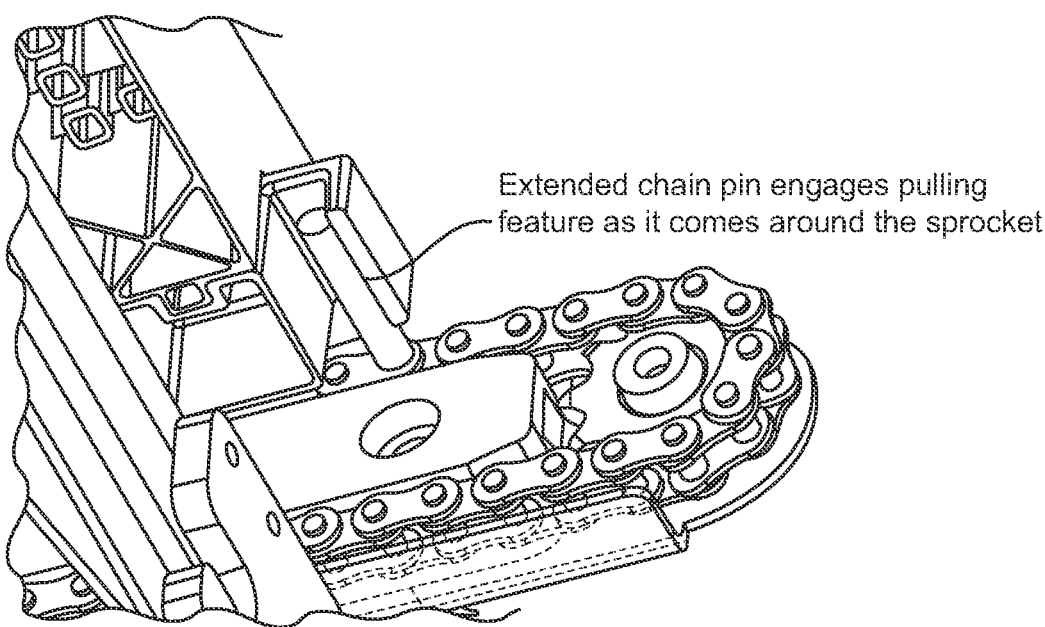

FIG. 103A shows a top view of an alternative embodiment of a tray design. FIG. 103 shows an enlarged perspective view of the tray design of FIG. 103B. FIG. 103C shows an enlarged underside perspective view of the tray of FIG. 103A being engaged.

Figure 104A:
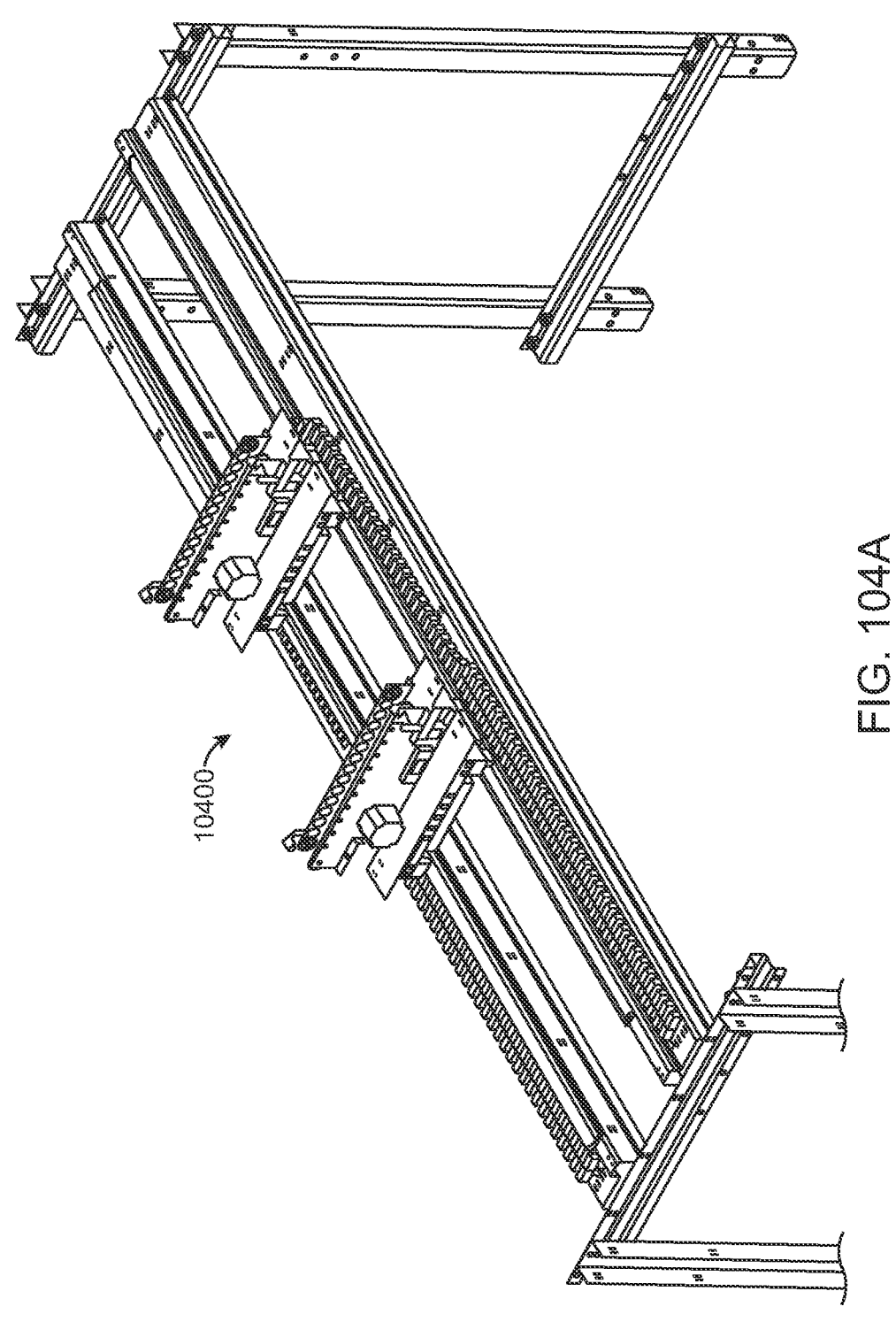

FIG. 104A shows a perspective view of an embodiment of tray loading shuttle conveyors.

Figure 104B:
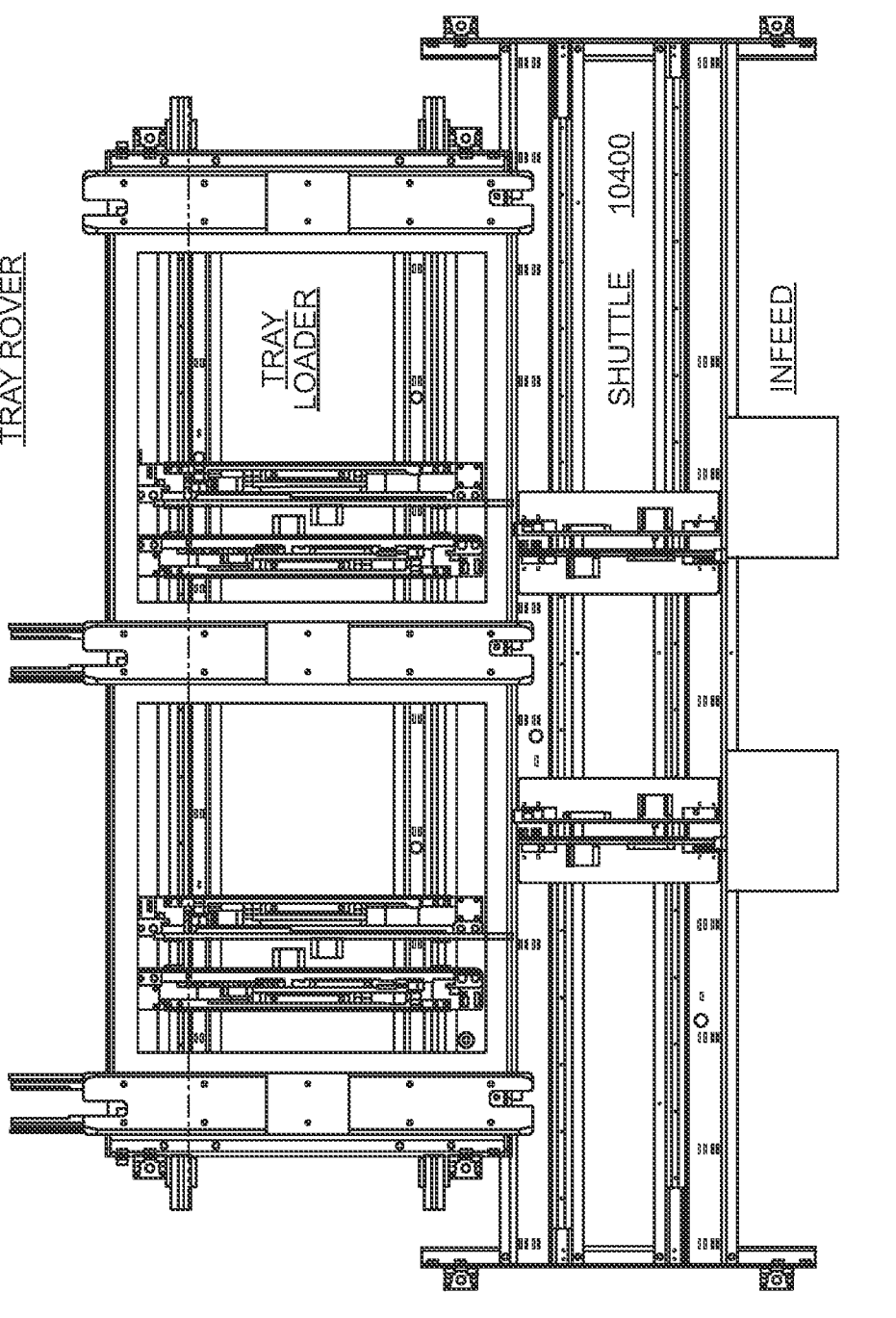

FIG. 104B shows an overhead view of the tray loading shuttle conveyors of FIG. 104A.

Figure 105A:
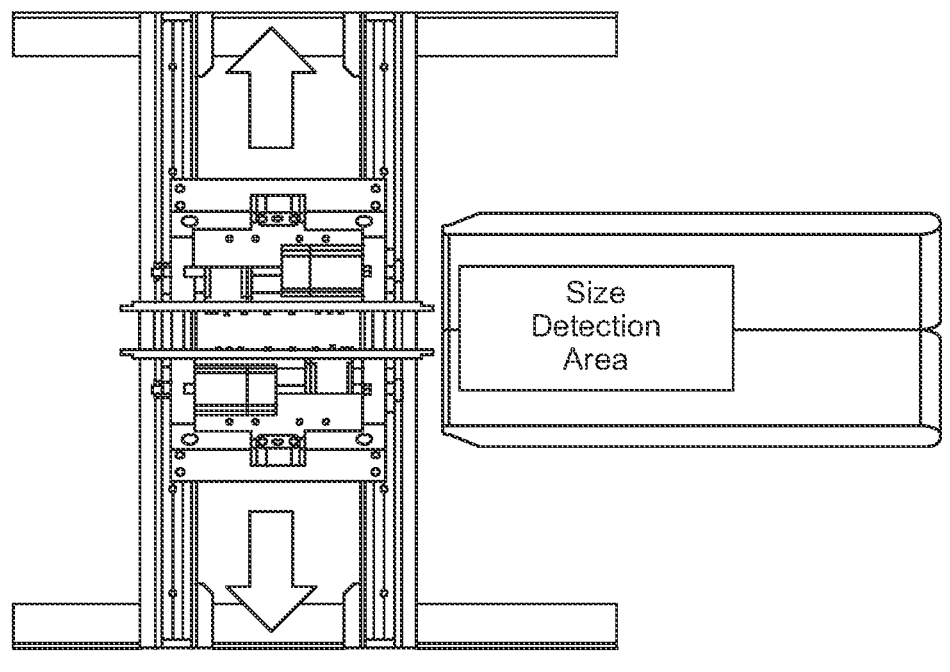
Figure 105B:
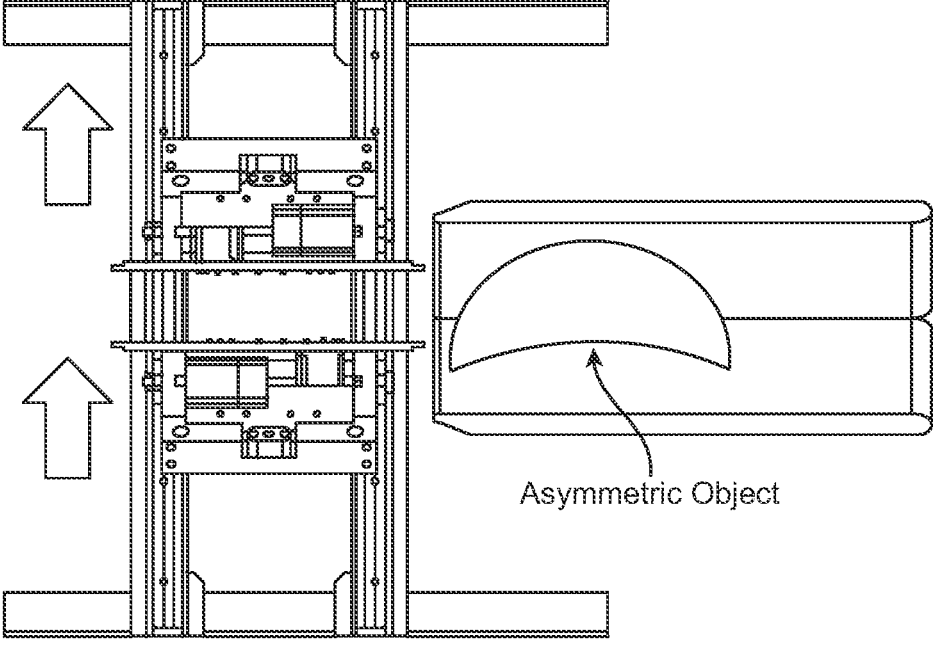

FIGS. 105A-B show overhead views of inspection size detection adjustment.

Figure 106:
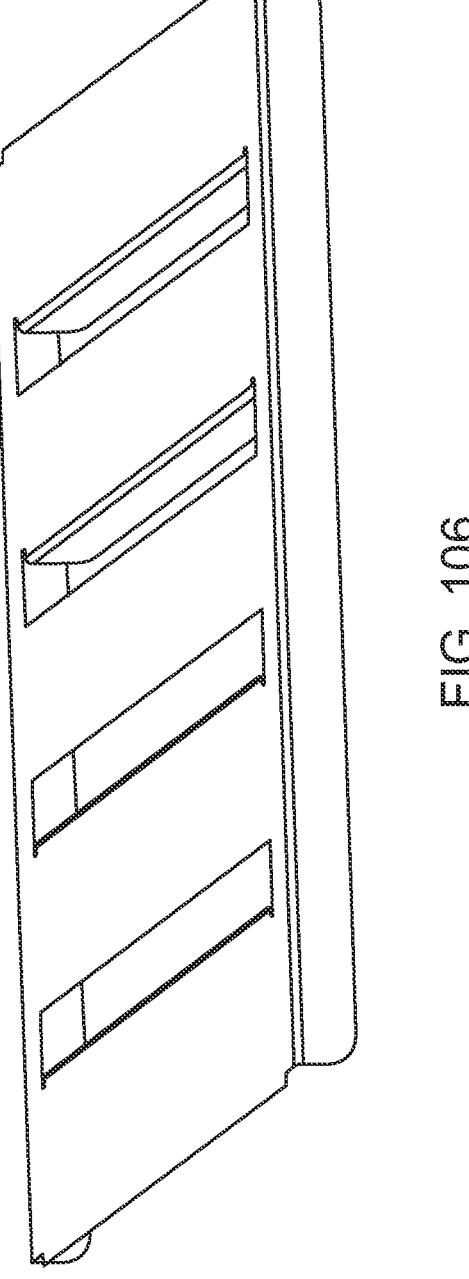

FIG. 106 shows a perspective view of an alternative tray embodiment.

Figure 107A:
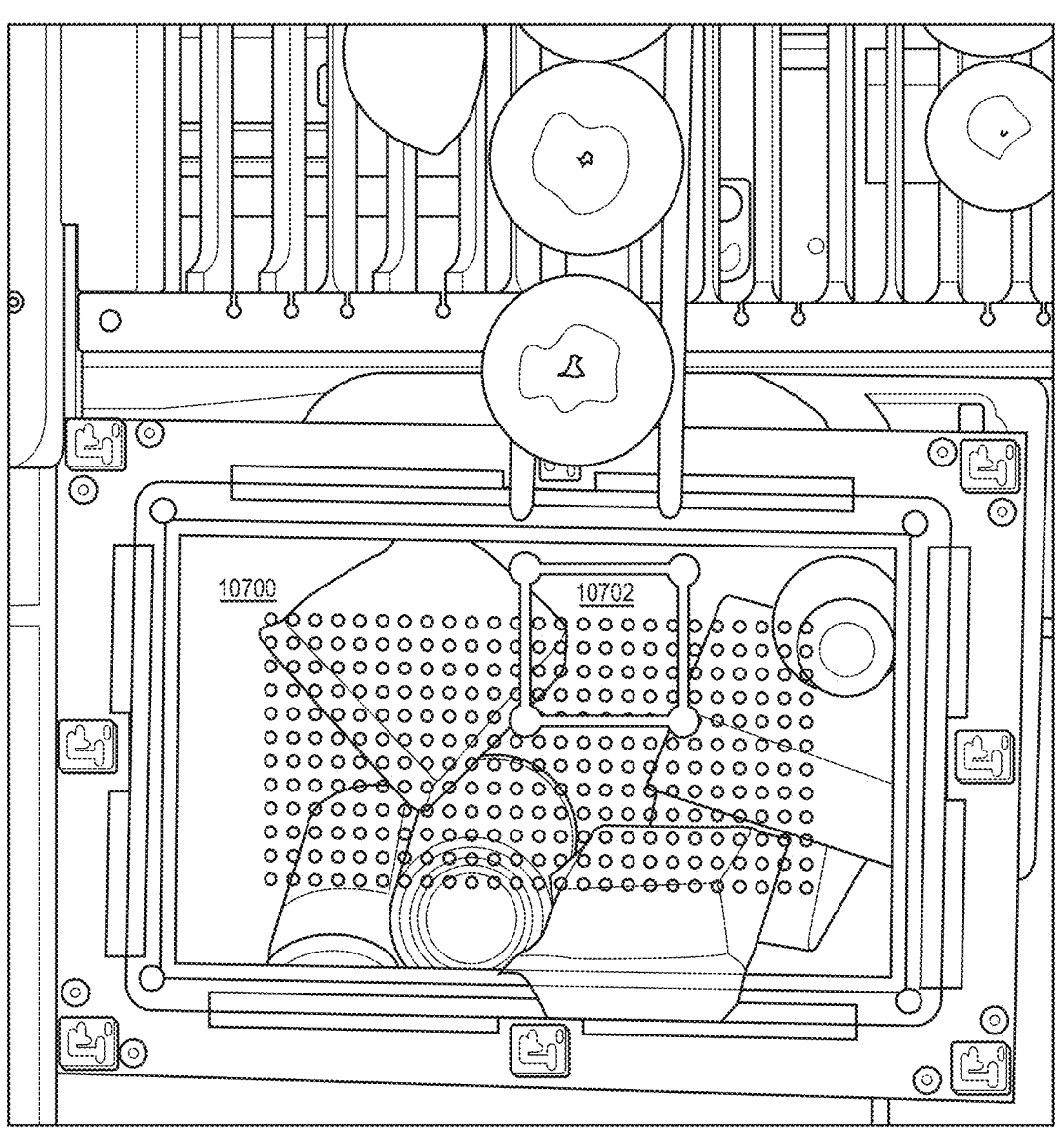
Figure 107B:
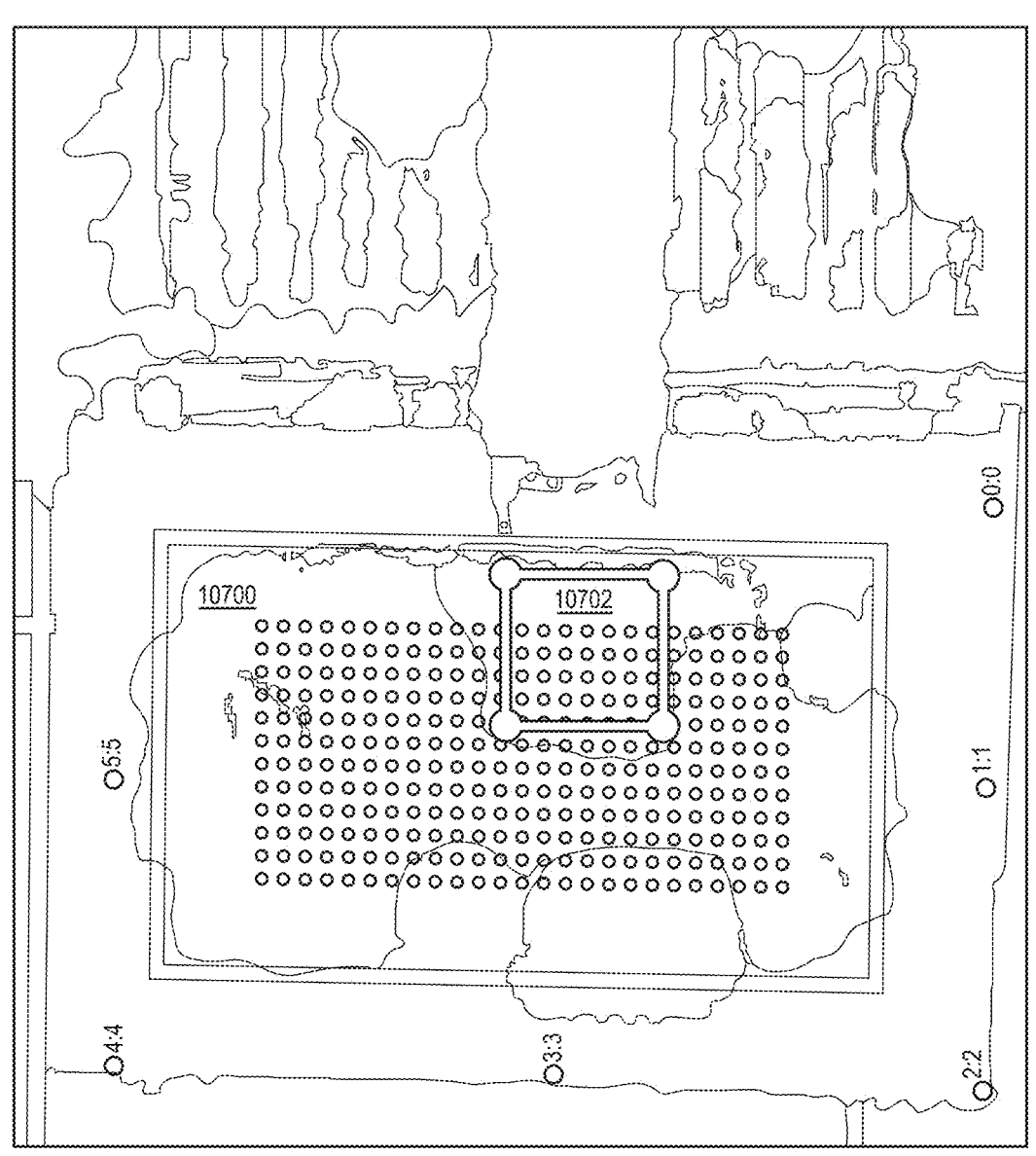

FIGS. 107A-B show overhead images of customer carrier packing with stereo depth vision.

Figure 108:
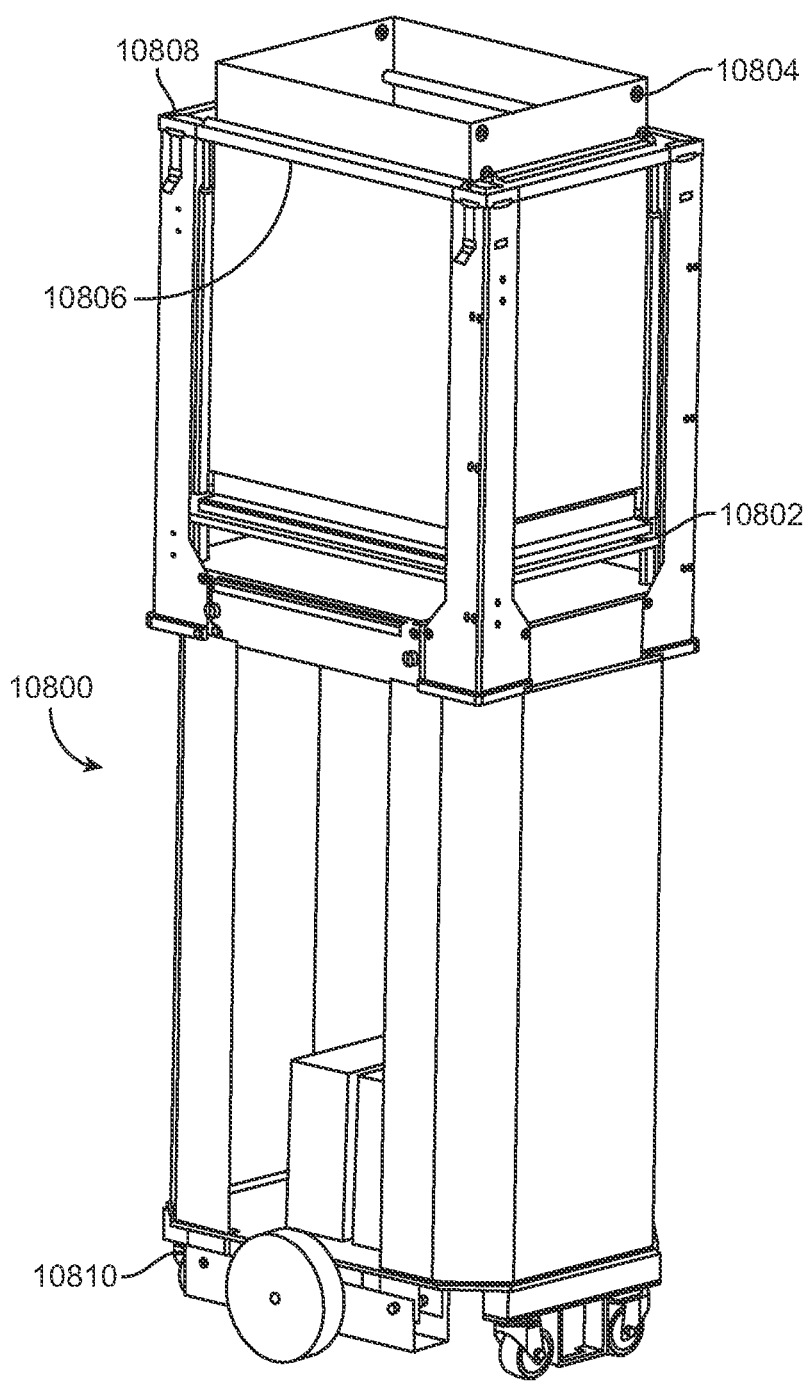

FIG. 108 shows a side perspective view of a bag holder apparatus according to an embodiment.

Figures 109, 110:
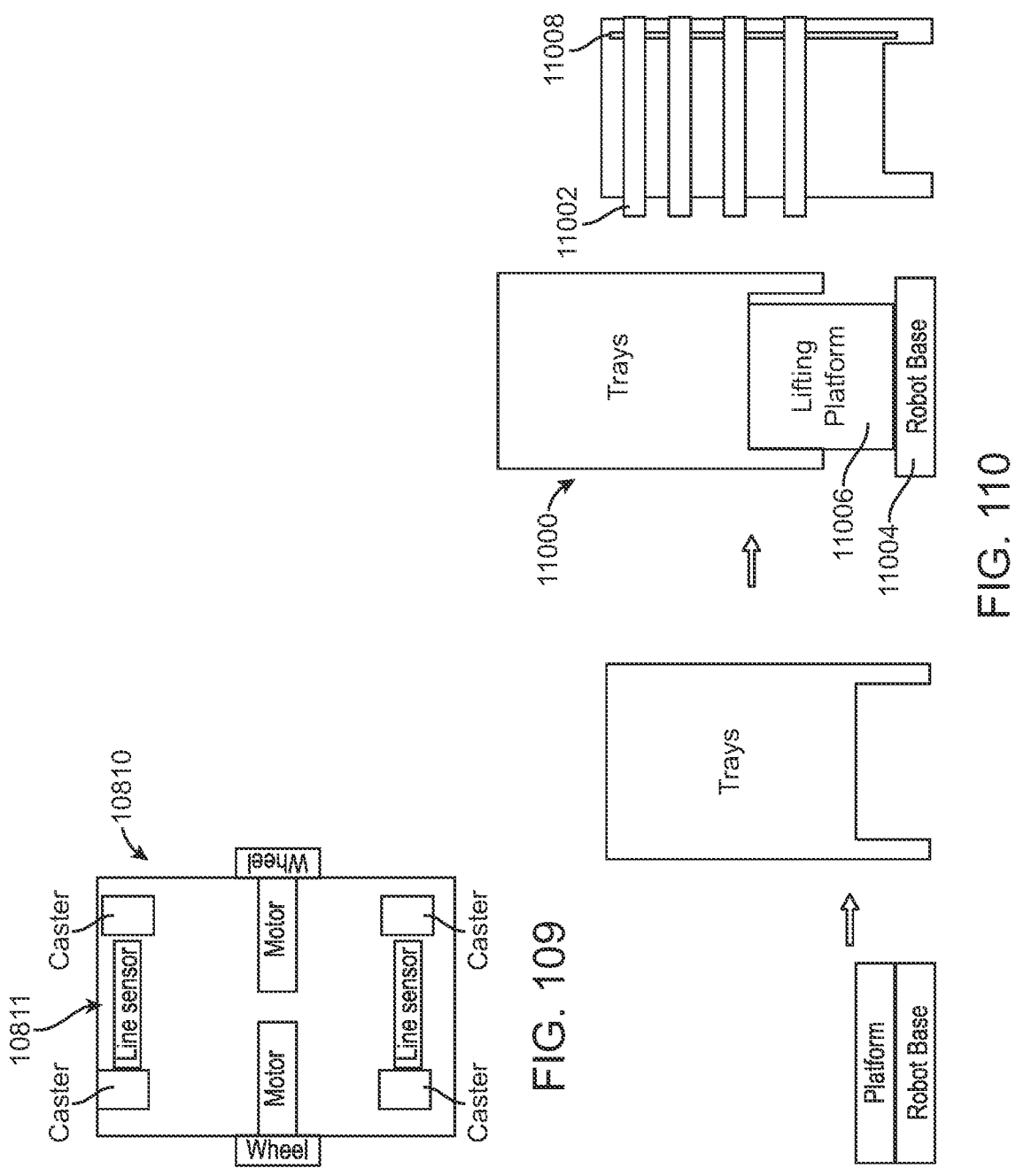

FIG. 109 shows a simplified overhead perspective of the mechanism for a moving base of a bag holder apparatus.

FIG. 110 shows a tray stack.

Figure 111:
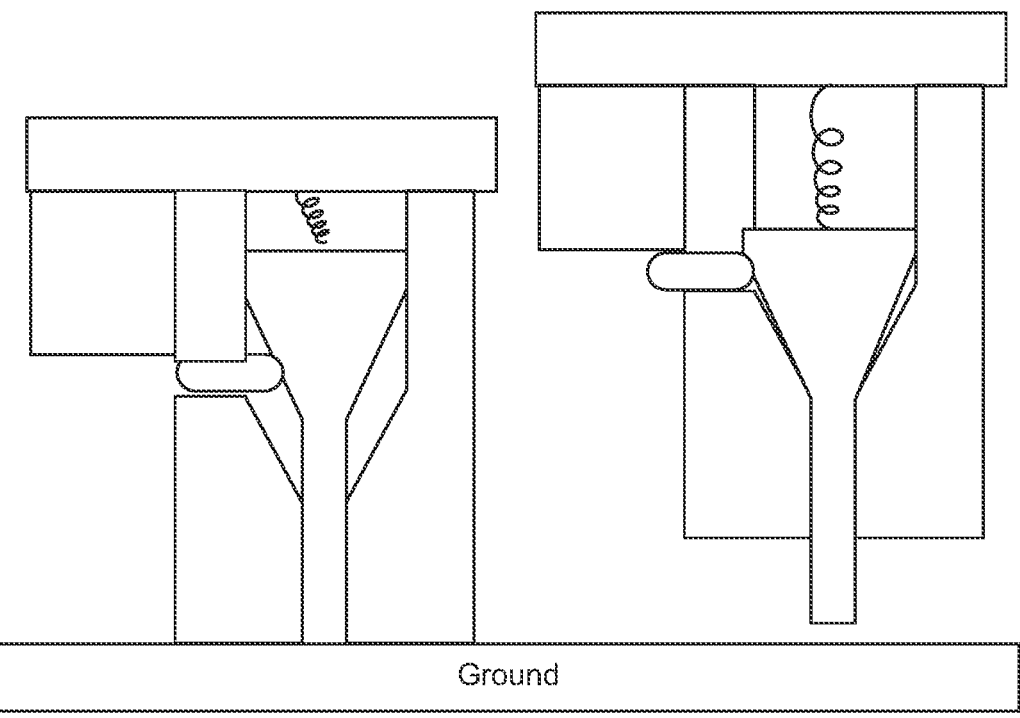

FIG. 111 shows a simplified view of a locking feature.

Figure 112:
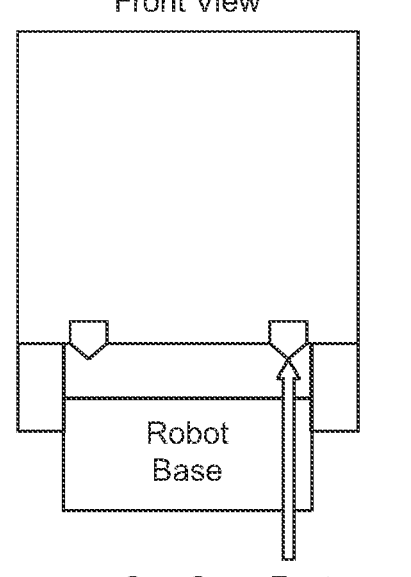

FIG. 112 shows a simplified front view of an alignment feature.

Figure 113A:
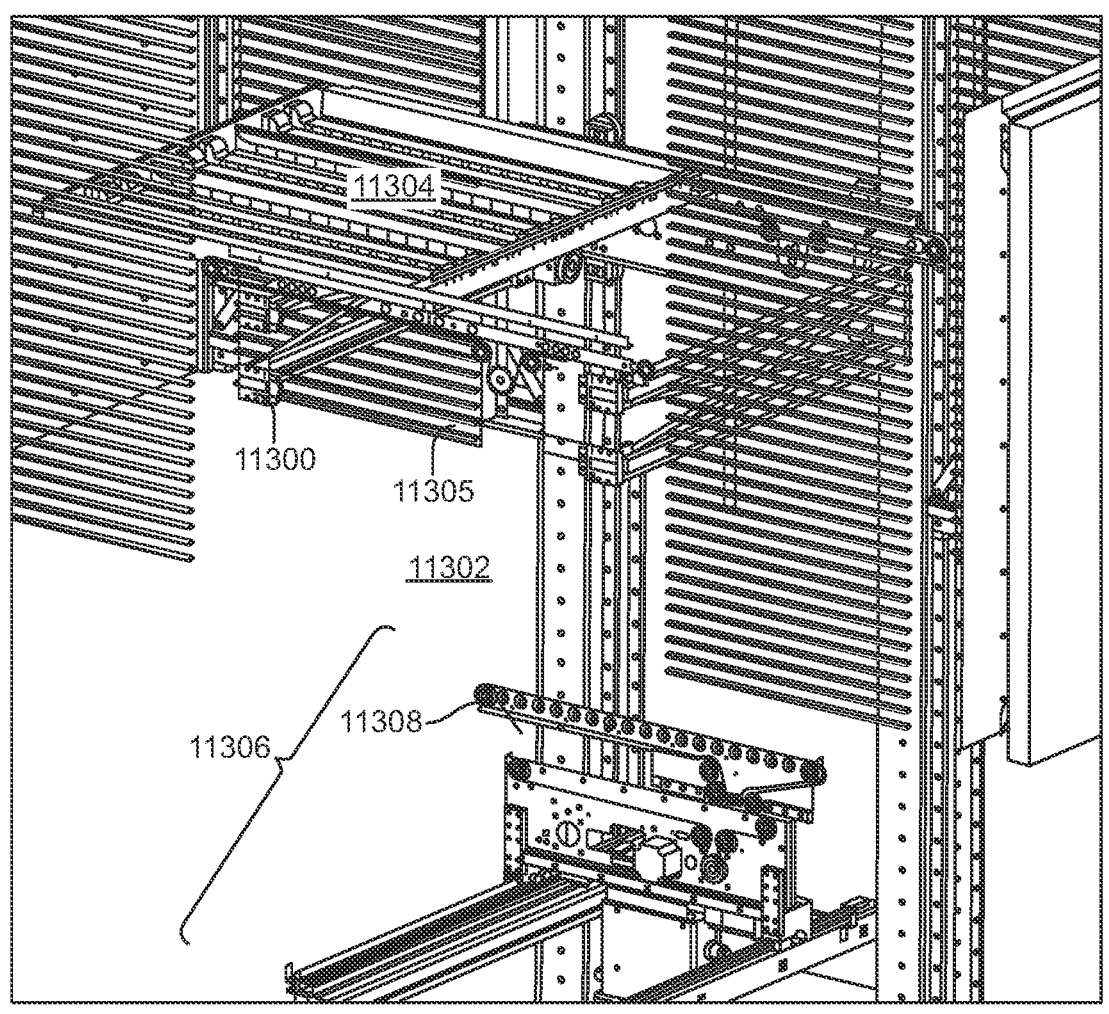

FIG. 113A shows a side perspective view of a lift located within a shaft and in the process of retrieving a tray from fixed shelving.

Figure 113B:
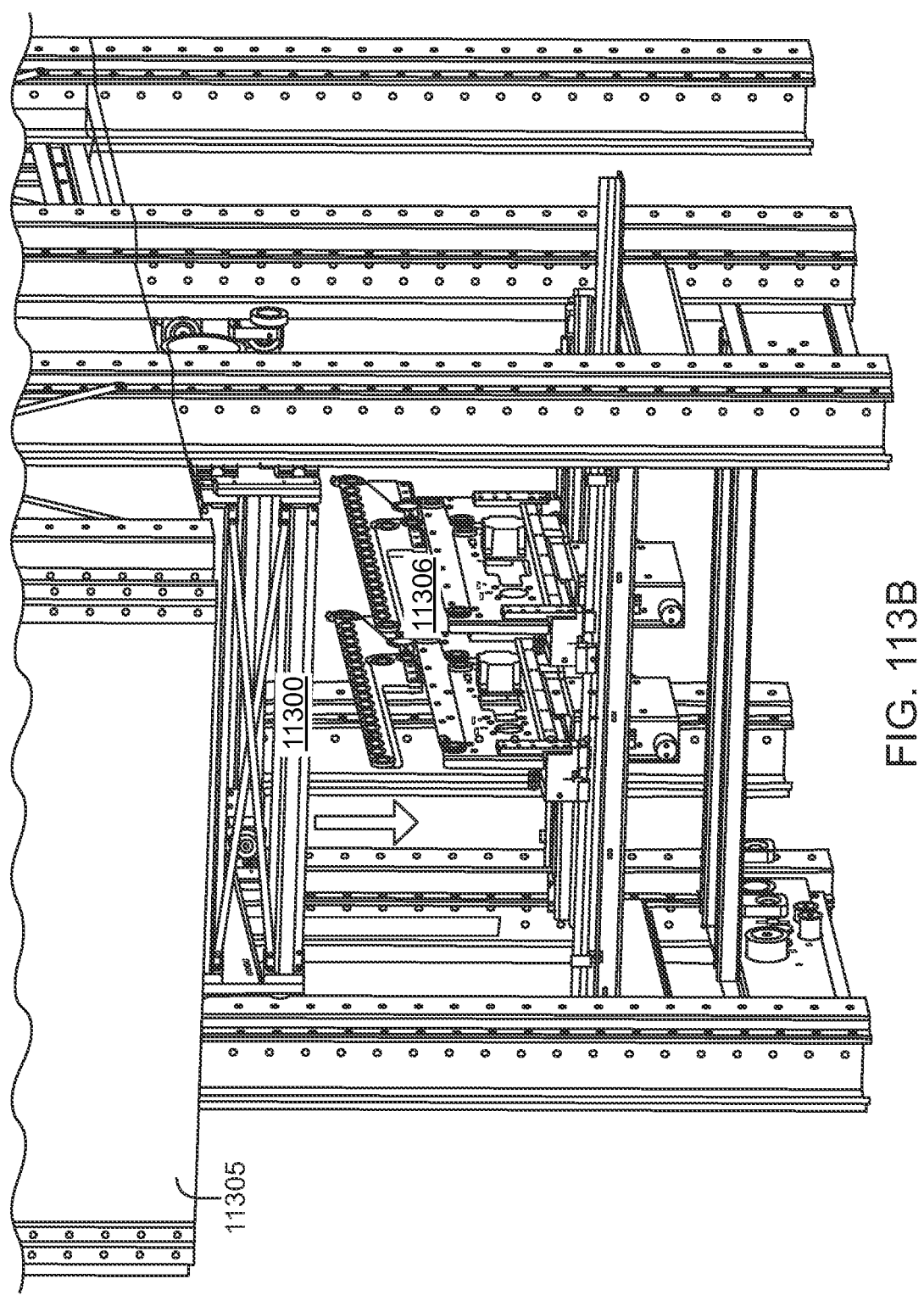
Figure 113C:
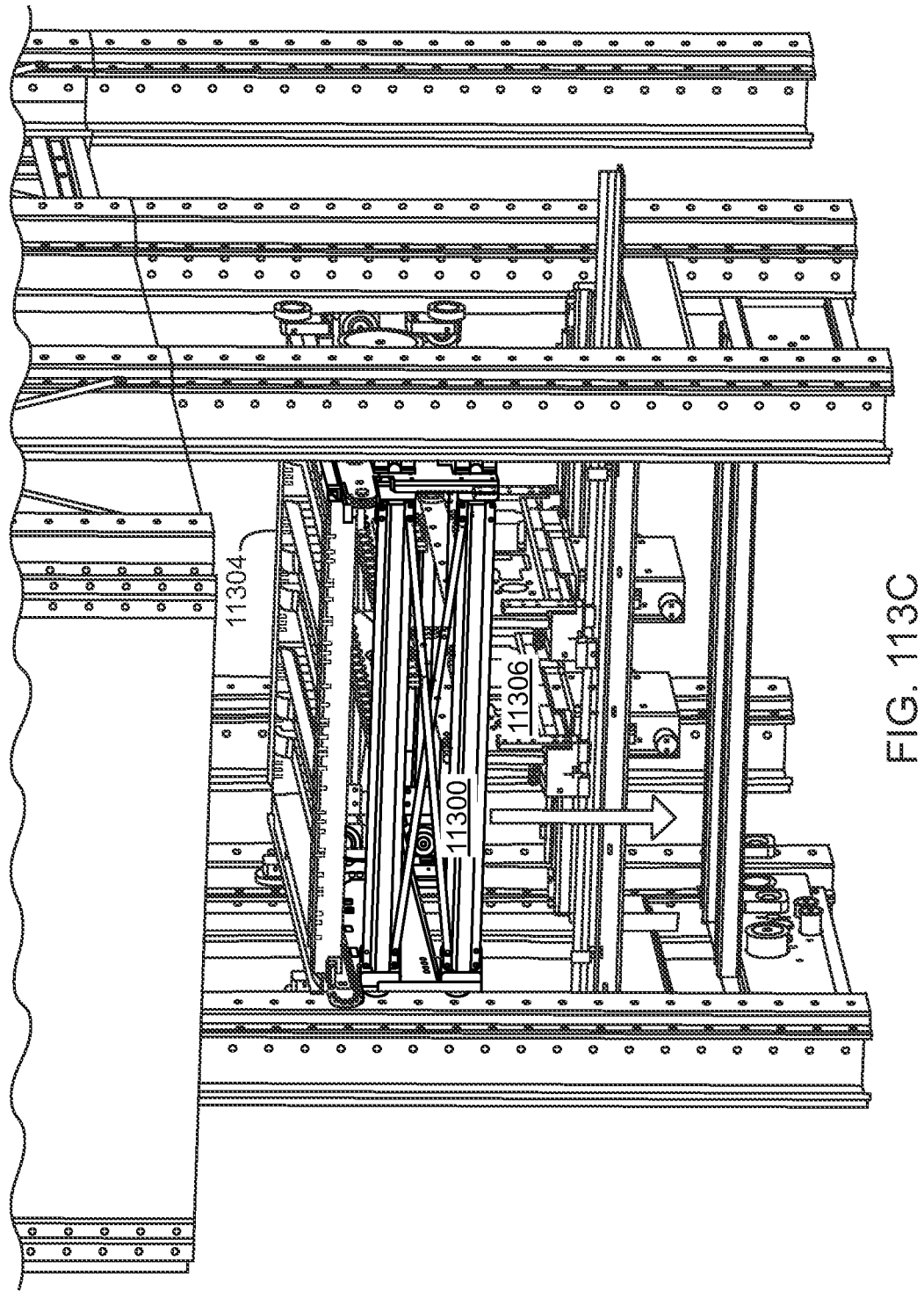
Figure 113D:
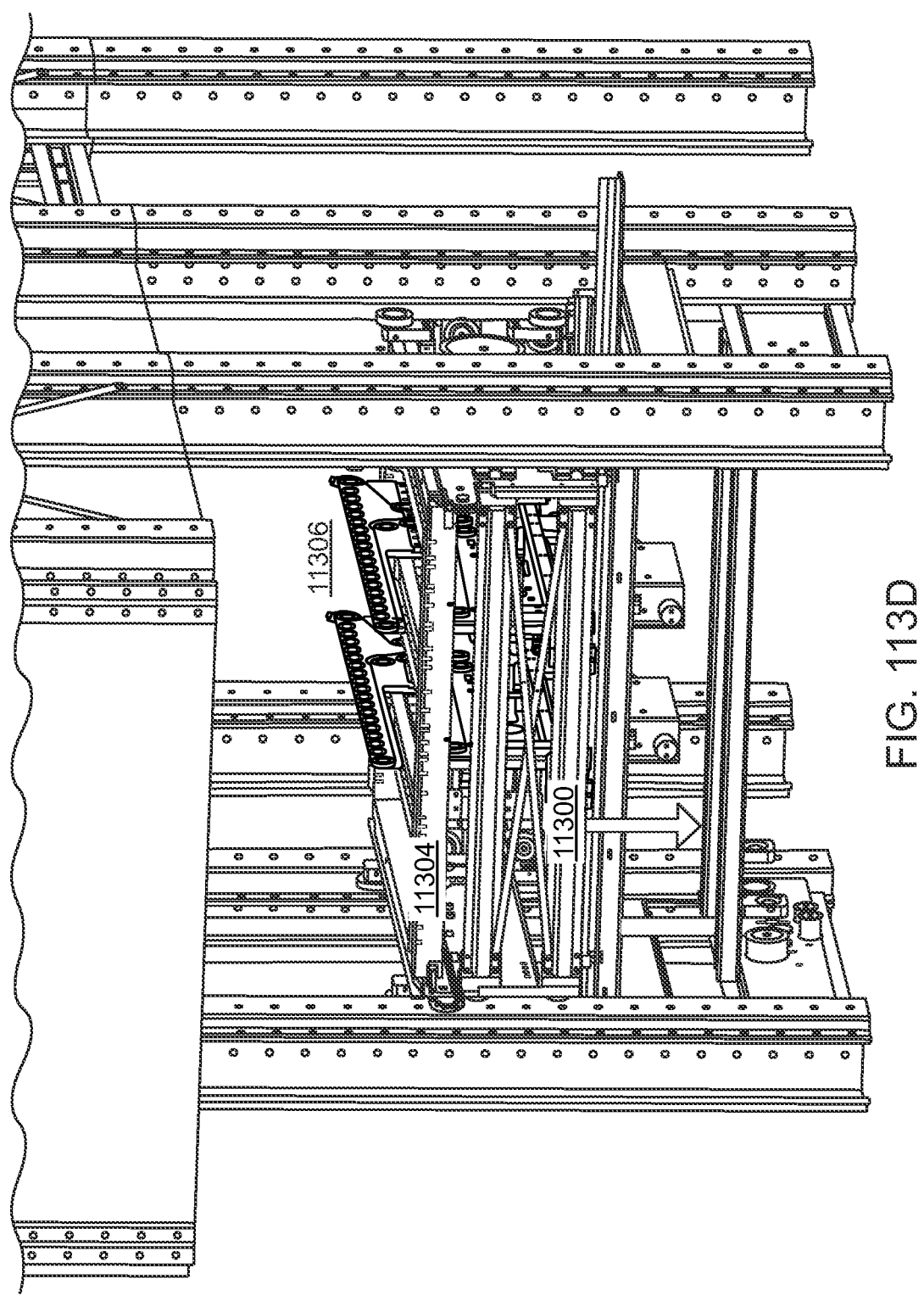

FIG. 113B shows the lift holding the tray descending over the conveyors of the dispense station. FIG. 113C shows the conveyors independently moving to align to the width of the slots in the tray. FIG. 113D shows the elevator continuing to descend.

Figure 114:
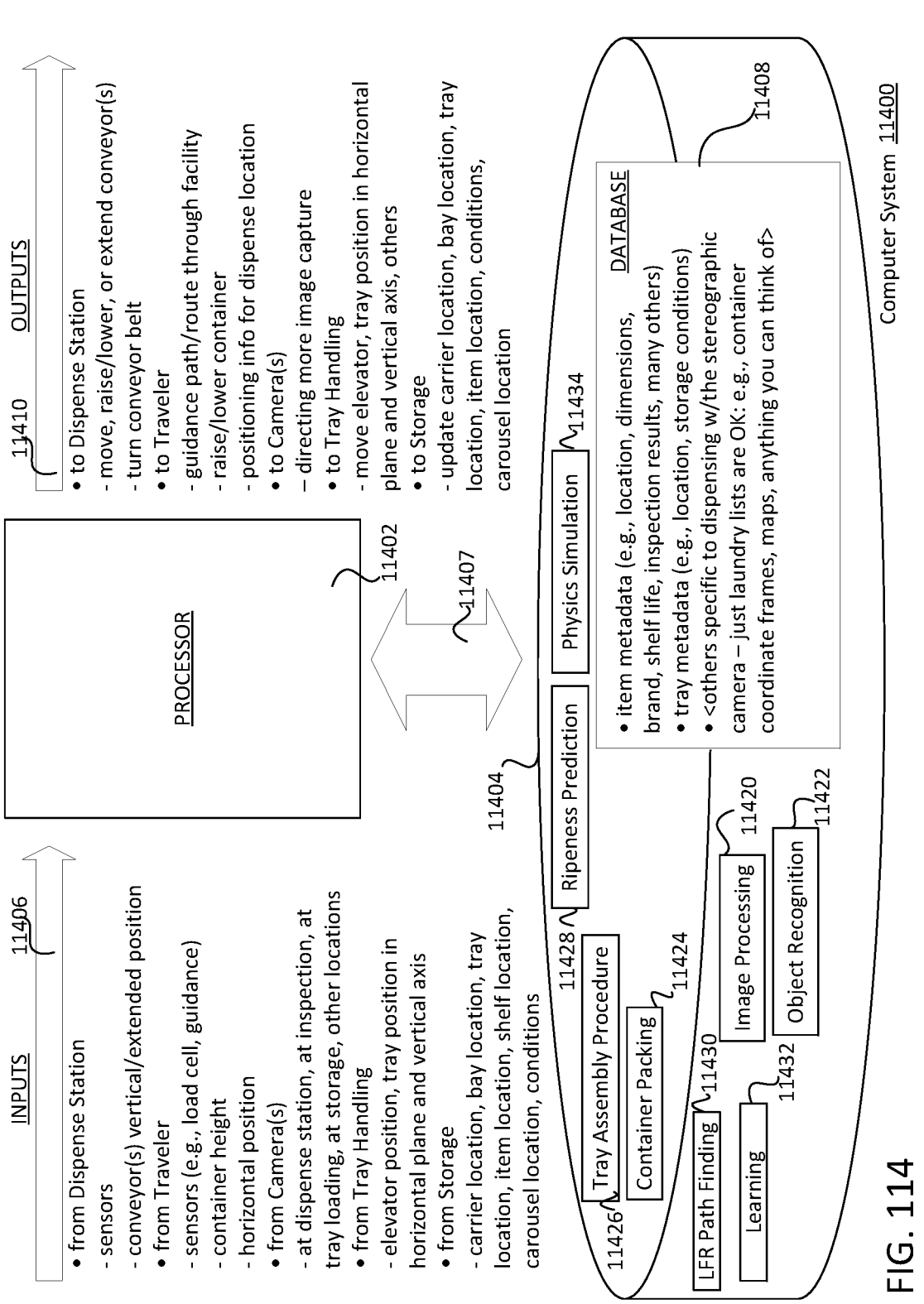

FIG. 114 is a simplified block diagram showing inputs to a computer system comprising a processor and a database, and corresponding outputs.

DETAILED DESCRIPTION

Figures 1, 1A:
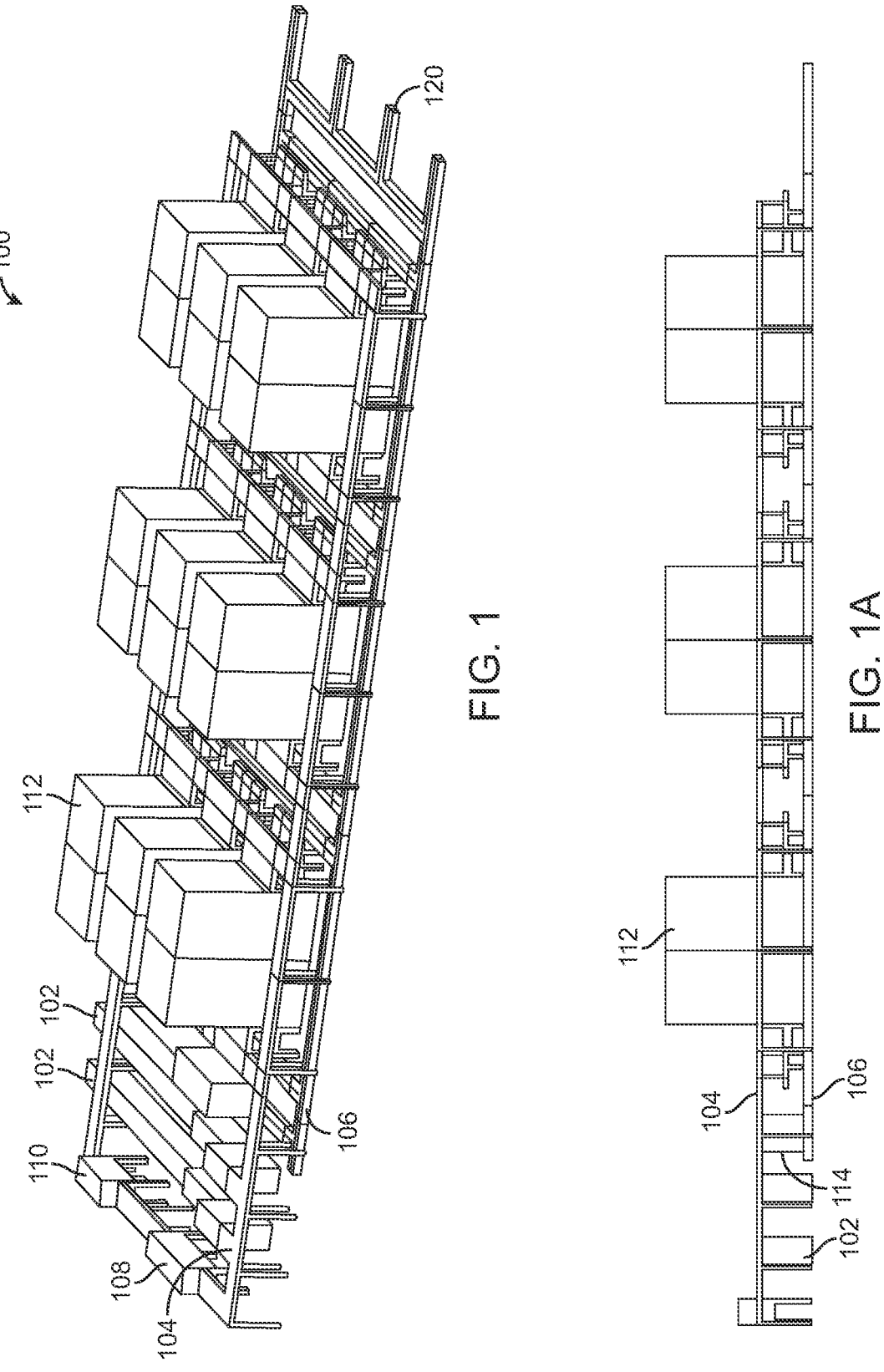
FIG. 1 is a simplified isometric view of a product handling system according to an embodiment.
FIG. 1A is simplified side view of the embodiment of FIG. 1.

FIG. 1 is a simplified isometric view of a product handling system according to an embodiment. FIG. 1A is simplified side view of the embodiment of FIG. 1.

In particular, product handling system 100 comprises an initial sorting, inspecting and tray loading areas 102 that are configured to receive bulk items. This input region 102 is in turn in communication with tray conveyor network 104.

In this particular embodiment, the tray conveyor network is located above a second customer conveyor network 106. However, this is not required and the relative vertical locations of the first and second conveyor networks could be reversed, or in accordance with still further alternative embodiments, the two (tray, customer) conveyor networks could be positioned at a same vertical level. According to yet other embodiments, the separate customer conveyor network that delivers packages for output, can be located on an opposing side as the incoming tray conveyor network.

Trays are fed along the tray conveyor to the input area from a tray buffer 108. The tray buffer in turn receives the trays from a tray washer station 110 that functions to sanitize the trays once they have completed their previous product handling activities.

As further shown in FIG. 1, once product items are disposed onto the trays, the trays move along the tray conveyor belt from the input region to the carousels 112.

There, the trays are loaded (e.g., by a robot and/or conveyor 113) into the carousels for storage under controlled conditions.

As previously mentioned, the product handling system of FIG. 1 further comprises a second, customer conveyor network 106 that is located at a lower level relative to the upper, tray conveyor network. This particular embodiment shows the customer conveyor network 106 as a double lane configuration.

For particular embodiments utilizing conveyor belts, those conveyor belts may cause fixed separation between transported trays and/or packaged product items. The belts may be imaged to determine cleaning needs. A conveyor belt may be configured to lift layer-by-layer, and may feature grooves and or duster-like lifters. Certain embodiments may provide a human-assisted station sharing a conveyor with robot lifters.

Via the customer conveyor network, the customer packaging deployment tool 114 provides empty product packaging (e.g., a bag or box) to the customer packaging loading station 118 that is proximate to the carousel. There, individual product items are loaded from the tray into the product packaging, and transported via the customer conveyor network to a shipping dock 120 and thence to the customer in packaged form.

Figure 1B:
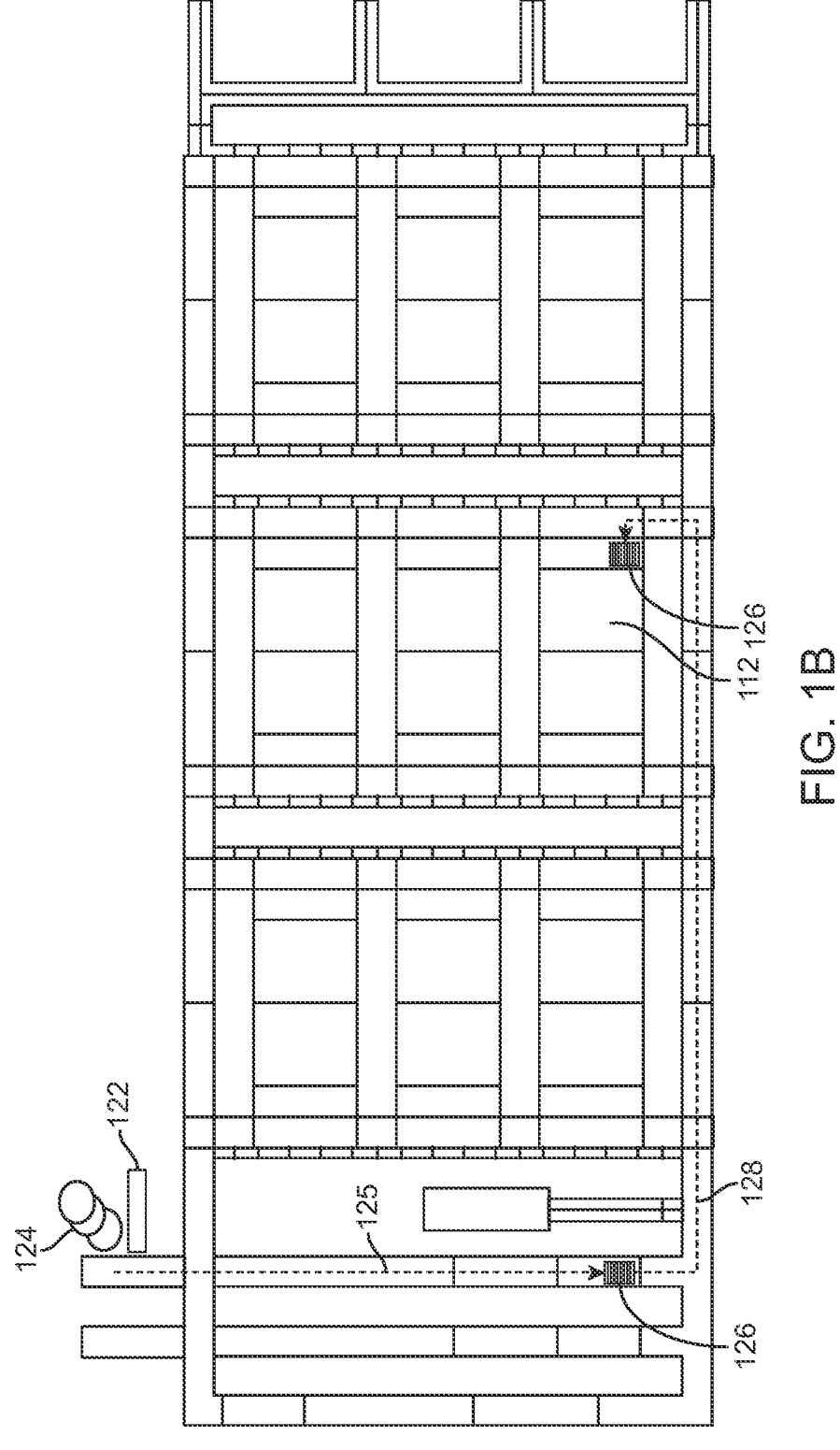
FIG. 1B is a simplified plan view of the embodiment of FIG. 1.

FIG. 1B is a simplified plan view of the embodiment of FIG. 1. FIG. 1B shows an incoming pallet 122 of individual product items 124 (e.g., apples) in bulk form. Each individual product item is inspected 125 and then disposed in a known location on a tray 126. As shown at 128, the tray will be moved by the tray conveyor network to the appropriate carousel and be placed into storage with the product items disposed thereon.

Figure 1C:
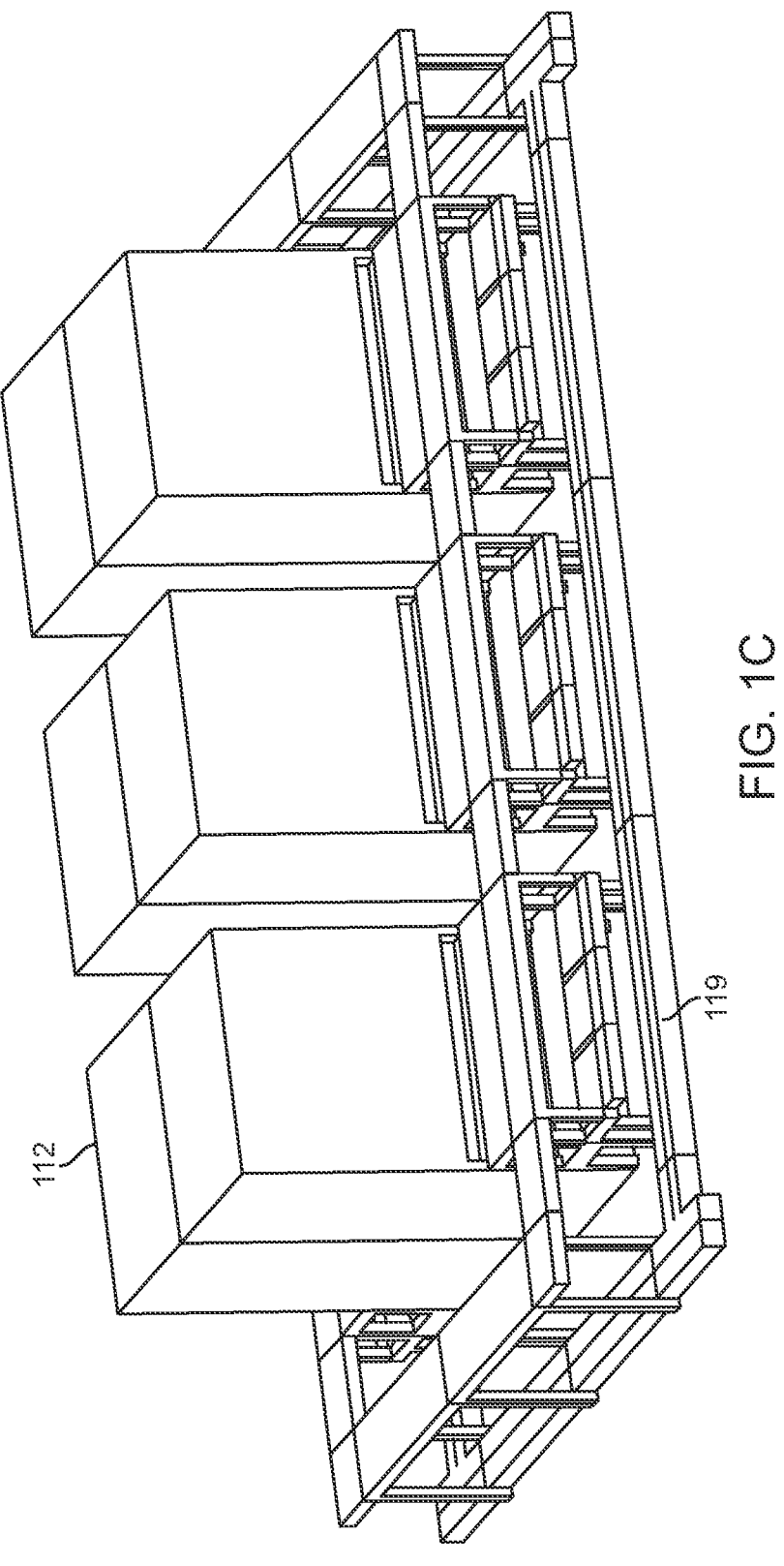
FIG. 1C is a simplified enlarged isometric view of the embodiment of FIG. 1 illustrating six carousels.

FIG. 1C is a simplified enlarged isometric view of the embodiment of FIG. 1 illustrating six carousels 112. The enlarged view of FIG. 1C also shows an aisle conveyor 119 linking successive carousels, as is discussed further below.

Figure 1D:
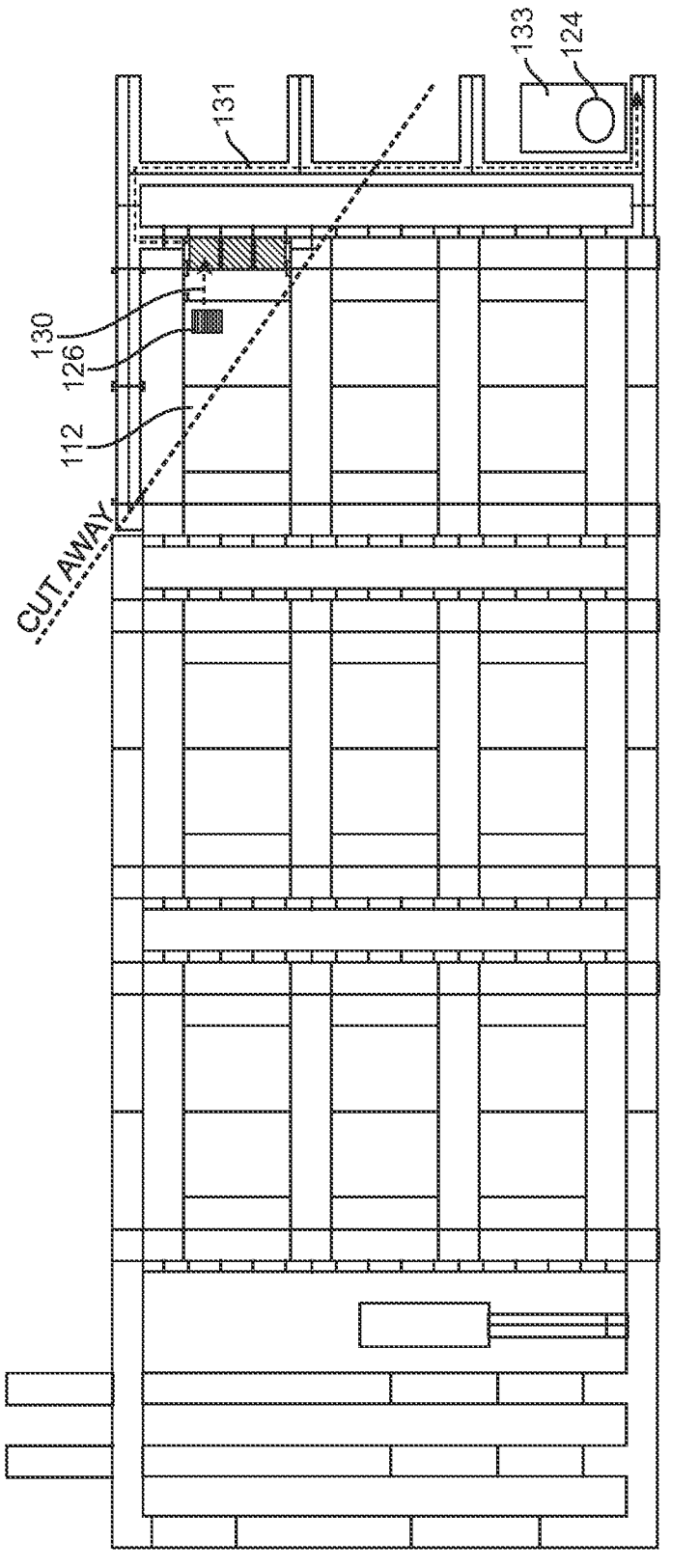
FIG. 1D is another simplified plan view including a cut-away, of the embodiment of FIG. 1.

FIG. 1D is another simplified plan view including a cut-away, of the embodiment of FIG. 1B. When an item from the tray is selected by a customer, the tray will exit the carousel. In this particular view the tray of FIG. 1D is shown exiting a different carousel than in FIG. 1B, to which it may have been transported during an intermediate stage via the tray conveyor network.

The unloading equipment 130 will remove from the tray, the particular item that has been requested by the customer. The tray will return back into the carousel until called again or empty.

Once the order is fulfilled, the customer conveyor network will transport 131 the selected product item 124 together with the customer packaging 131 to the shipping or distribution area.

It is noted that is some embodiments, the conveyor belts transporting the customer package, may also move a passive or active device adjacent to some or all of the packages. That device may assist the placement of the items into the bag or box.

An example of a passive device could have spring loaded 'landing pads' or an active height controlled 'scoop'. With the latter, the items land into the scoop (which can change height, and then drop into a package). Another example of an active device could be a robot. The devices (which may also have cameras) can be powered through the conveyor belt (wired or induction) or be battery powered.

While the above description has indicated the loading of incoming product items onto trays, this is not required by all embodiments. According to alternative embodiments, items incoming to the product handling system may arrive already disposed onto a tray.

An example could arise for standard items (e.g., boxes of cereal). There, each cereal box product item could be associated with data such as an expiration date (and potentially an individual serial number).

Trays could arrive pre-loaded with non-standard items (e.g., produce, individually cut deli/cheese/meat, others), and already be associated with individual product item data such as images or other sensor data. The incoming tray may also include a mechanism for measuring and storing environmental conditions since packing into the tray took place.

Such post-tray packing environmental conditions can include temperature and vibrations/impact (e.g., via a G meter). Thus a system according to an embodiment would receive the pre-packed tray for handling, as well as data associated with that particular tray.

According to certain embodiments, product handling systems may also be used to break down packages comprising one product each, into other packages having specific mixtures of product items. In such a 'break pack' implementation, a distribution center breaks incoming packages of one item type (e.g., typically from the factory) into mixed packages intended for the neighborhood grocery store to replenish what has been consumed (e.g., 3 boxes of cereal A, 6 tuna cans, 3 salt shakers, etc.)

It is further noted that temporal factors (e.g., delivery urgency) may impact the manner in which individual product items are dispensed from the carousel into packaging. Thus where necessitated by a delivery deadline, under a 'split bag' mode of operation a product handling system could utilize more than one customer package to fulfill a customer order. There, the more urgently needed item(s) would dispensed into packaging first, followed by less urgent items being dispensed and shipped in a different package.

Product handling systems according to embodiments could also pre-calculate and store estimates regarding time of order fulfillment. Such expected fulfillment data could be referenced by the system in deciding whether or not to resort to the split-bag mode in order to meet an urgent order.

Figure 10:
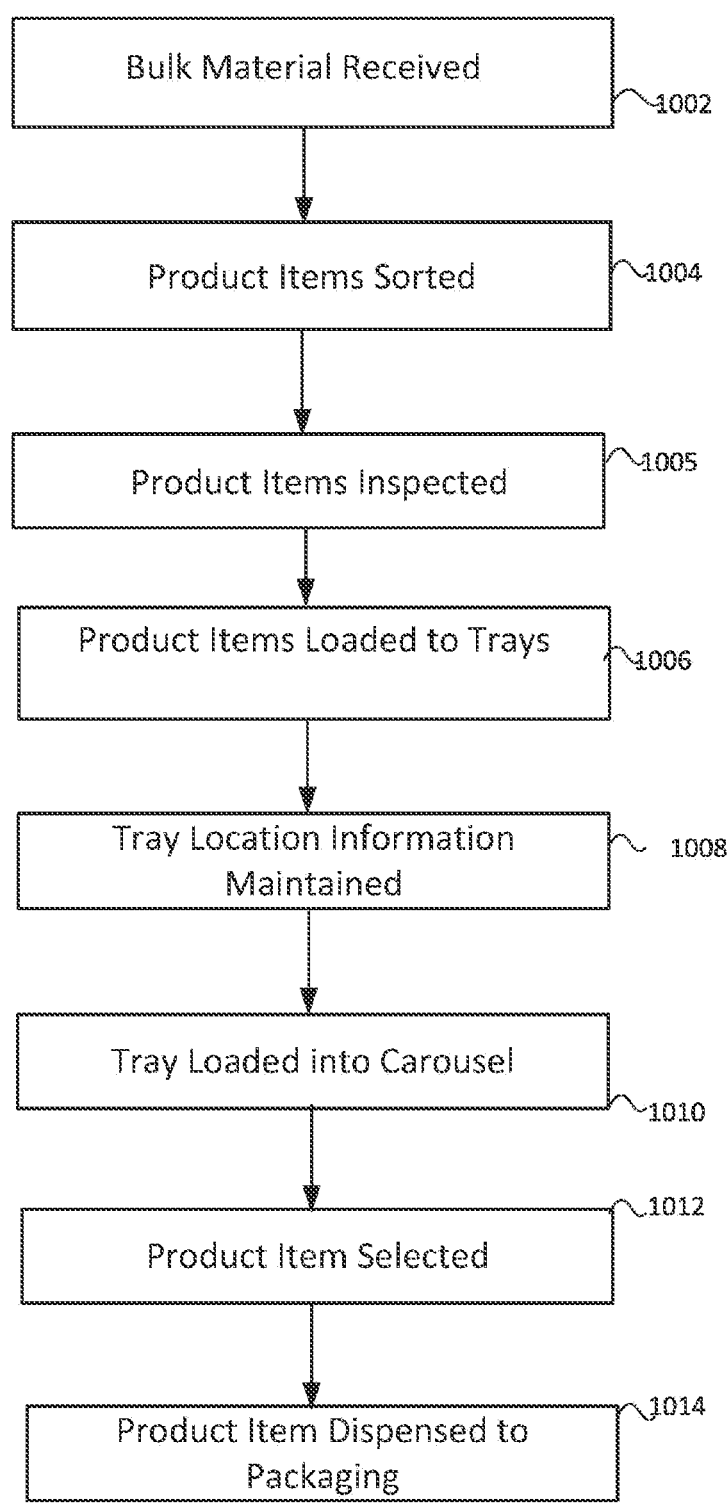
FIG. 10 shows a simplified flow diagram of a method according to an embodiment.

An exemplary sequence of actions that may be performed by a product handling system according to an embodiment, is now described in connection with the flow diagram 1000 of FIG. 10. First, at 1002 the incoming material in bulk form is received for transfer into the trays if necessary.

The transfer of product material into the trays can be automatic or performed manually. In the case of automatic transfer into dedicated trays, products are placed or dumped by a human or mechanical tool, or picked by a robot onto a conveyor.

At 1004, the conveyor will sort the individual product items in an ordered fashion for inspection. During an inspection process 1005, the individual product items are imaged/inspected, and the images/data are associated with each item (e.g., as metadata).

After inspection, the system will load 1006 each product onto trays and transport the trays to the storage area (e.g., carousel). In some cases, the items are sorted in the Trays based on certain criteria (e.g. different size, quality or ripeness in different Columns)

Once transferred to a known location on the tray, at 1008 that information will be maintained at least until the item has been placed in packaging for delivery. All or some of the data and metadata may be stored for longer to permit learning once feedback from a customer or other entity is obtained on the items.

At 1010, the Trays are loaded into carousels. The trays may be loaded manually or automatically. The trays may be loaded through the same door from the product items are later dispensed, or (as in the illustrated examples) through a separate door or level. In one possible alternative, the trays remain within the carousels and the items are loaded individually.

Alternatively, the trays are loaded onto other trays next to a carousel and placed in the carousel manually.

At 1012, when an item is selected by a customer and needs to be dispensed into packaging, the carousel may bring the tray to the dispensing door. There, the tray may be moved to the staging position from which individual items will be dispensed. The tray may be moved by a conveying element within the carousel, or by an external lifting mechanism (e.g., belt or robot). Alternatively, the individual product items could be dispensed from the tray while the tray remains within the Carousel.

From the staging position, at 1014 items are dispensed from the trays into packages (e.g., delivery, inner, or transient) which are moving along an aisle conveyor. Alternatively, the packages may be moved by an independent motion vehicle/robot.

The aisle conveyor is positioned to support one or more parallel rows of carousels along its direction of travel. The aisle conveyor carries the various packages and potentially the inbound trays (e.g., with product items) and outbound trays (empty, expired, or otherwise pulled out of the system).

The packages may be moving continuously or indexing and stopping near the staging positions. The packages may stop at every staging position along their aisle or as needed. The packages may step at fixed intervals or as needed.

Packages may be placed into an aisle conveyor in coordination with placed orders and the expected availability of items for conveying from staging positions along the aisle. Alternatively, transient packages are places at fixed intervals.

Specific packages (e.g., including specific inserts if needed) may be placed in the aisle conveyor for specific orders. If the exact number of packages needed per order is not accurately known in advance (e.g. a certain order may not fit in one package) than extra 'buffer' packages can be placed in the aisle conveyor every several packages.

A package may travel on more than one aisle conveyor to collect the needed items for a particular order. Alternatively, the delivery package may travel on one or more aisles and either/or transient packages or internal packages will travel down one or more other aisles.

In this case the items may be merged into one or more delivery packages manually or automatically. Additional items deemed too large or fragile for automation could also be manually added to the shipment at the end of the aisle conveyor.

As described herein, robots may be used in one or more stages of the product handling sequence. Examples of product handling activities that can be performed by a robot can include but are not limited to:

manipulating individual product items for inspection/imaging;

loading individual product items from bulk form onto known locations on trays;

moving trays into/out of carousels;

dispensing individual product items from known tray locations into packaging.

There can be one or more robots per location in the product handling system. Robots could be optimized in terms of weight and grip to the specific product items and/or system components (e.g., trays). One robot can have several grippers, switch grippers, or each of the robots can have a different gripper.

The robots may reference various pieces of information to grab a product item. Examples of such information may pertain to tray layout, images taken on the main or side-conveyor before, and/or dedicated images taken proximate to the robot (or on the robot's arm).

Robots can be of various types, including but not limited to cartesian, Selective Compliance Assembly Robot Arm (SCARA), cylindrical, delta, polar or a 4- or 6-axis articulated robot. Robot grippers can use pressure by rigid or flexible fingers, vacuum/suction, magnetic, electrostatic lifting, leaky vacuum (e.g., Bernoulli lifters), or a combination thereof.

A robot may use features within the trays in order to allow the lifting of product items, especially delicate/damageable items. In certain embodiments these can be rake/dustbin like, grabbing items which have been pin-lifted (e.g., from below with a potential balancing/locking 'thumb from above).

Packaging can pause adjacent to carousels or can have a parking area for one or more (e.g., three) customer packages. Multiple packages outside of a carousel may all be reached by the robot, or they may need to move to a specific parking position for the robot to reach.

Owing to its intimate relationship with the product being handled, the tray component forms one component of a product handling system. According to certain embodiments a tray may be wider than it is tall.

In some embodiments, a tray may comprise a formed sheet of plastic or metal, that holds individual items or containers of items, in a controlled order while the tray moves through the system.

Product items may be disposed on the tray loose (e.g., an individual apple). Alternatively, product items may be contained within a box (e.g., a box of tomatoes).

A tray may receive one type of item as a standard, but may also receive more than one variety. This may occur for a low consumption items. A tray may receive a subcategory of an item (e.g., oranges between 3 and 4 Ounce Vs oranges 4 and above.)

Some product items may be partially packaged. Examples include parsley tied with a rubber band, bunches of bananas, etc.

Product items may be individually labeled, for example with bar codes and/or RFID tags. The tray itself could have a bar code, RFID tag, or some other marking to permit tracking if needed.

Product items within the trays may be arranged in rows and columns. Rows may be oriented parallel to the edge of the tray from which they are unloaded. Columns may be separated by barriers to allow product items to arrange within the columns utilizing grooves or other shaped features.

Specific embodiments may sort the items such that each bin is within a different Column. Here, bin may represent the quality, size, appearance, or a different product type.

Trays may be open, or have an opening wall at one or two of the edges parallel to the rows. Alternatively, trays may be closed on all sides.

Figure 2:
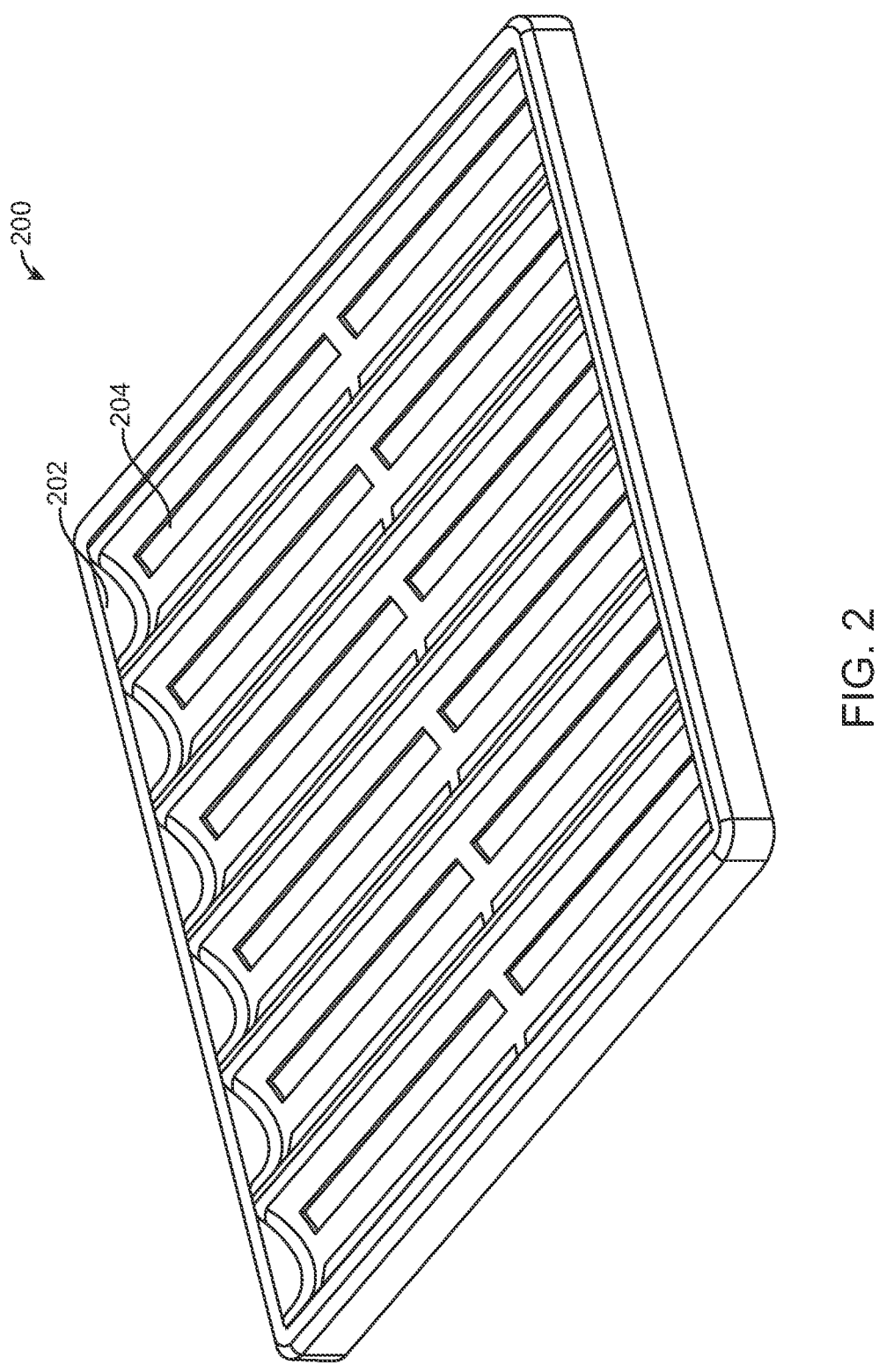
FIG. 2 is simplified perspective view illustrating a tray according to an embodiment.
Figures 2A, 2B:
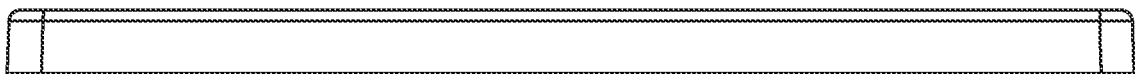
FIGS. 2A-2B show edge and plan views, respectively.

Trays may have openings, grooves, holes, or other features to allow lifting and/or movement of the product items from below. FIG. 2 shows a perspective view of a tray according to an embodiment. FIGS. 2A-2B show edge and plan views, respectively, of a tray embodiment. The tray 200 includes grooves 202 and slots 204.

Figure 3:
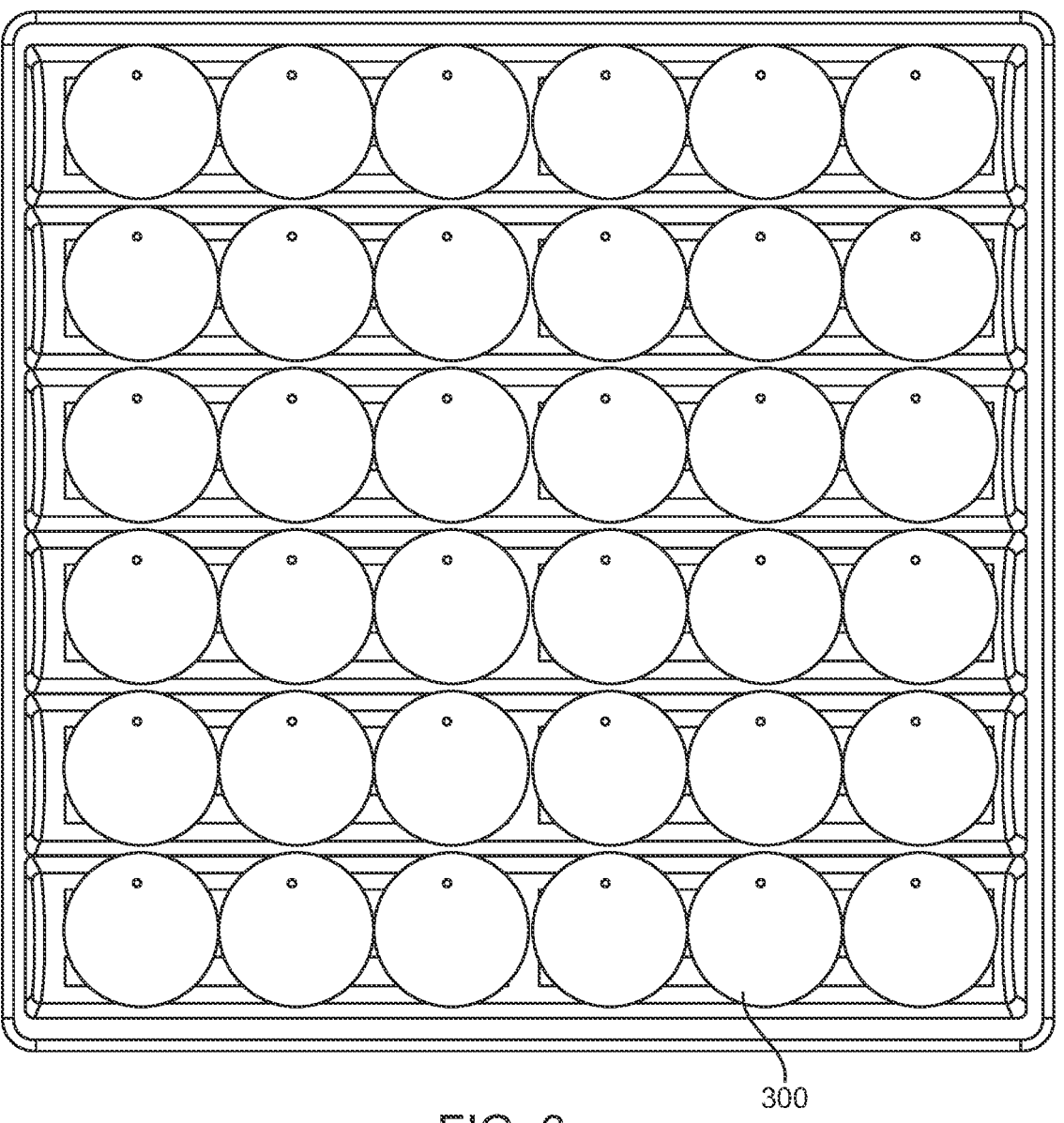
FIG. 3 is simplified plan view illustrating an embodiment of a tray having groove features configured to hold items.

Certain tray features may hold a particular type of product or a certain variety (e.g., stone-fruit of a given size range, oval shape, loose-leaf, etc.) FIG. 3 is a plan view of an embodiment of a tray having groove features configured to hold stone-fruit 300 items.

Trays exhibiting different features may be employed to effectively handle various product types. Trays may maintain product items at a known location that will not change during transportation.

Trays may be designed with sufficient spacing and other features to permit tasks such as imaging, scanning, sensing, and/or lifting. Trays may exhibit features to allow removing the tray for packaging, or removing the tray from the product handing system.

Embodiments of product handling systems may inspect the trays for cleanliness and integrity. Trays can be single or multi-use.

Some tray embodiments may feature a multi-use part covered by a single-use layer. Such a single-use layer may comprise paper, plastic, cardboard, or other materials.

Embodiments of product handling system may include mechanisms for cleaning the trays after some or all the product items have been removed. Cleaning can include washing, brushing, electrostatic discharge, UV, steaming, or other disinfecting techniques.

For purposes of imaging, product items that are to be transferred to trays, may be loaded into transfer conveyor belts. Such conveyor belts may have imaging and/or other sensing stations. Examples of imaging techniques that may be employed can include but are not limited to:

multispectral imaging
hyperspectral imaging
acoustic or acousto-optic sensing
optical spectrometers
3-dimensional imaging
UV imaging
visible imaging
infra-red (IR) imaging
mass spectrometry
x-ray imaging.

Examples of sensing technology that involve other than electro-magnetic imaging can include but are not limited to:

chemical sensing (e.g., smell sensing technology); and
physical sensing (e.g., spring loaded firmness gauges or weighing—of either individual items or trays).

All items, or a sampling thereof may be imaged and/or sensed. The product items can be imaged or sensed individually, or collectively or in sub-groups.

Weight can be estimated from produce size and/or from produce size relative to other produce in the tray when the total weight of the items in the tray is known.

Weight can be determined if the item is lifted by a robot. That weight can be used to improve the estimation.

The imaging and/or sensing may occur while the product items are located on a transfer conveyor belt, are grabbed by a robotic arm, or as the product items are rolling or dropping before being disposed on a tray.

A transfer conveyor may be optically transparent to permit imaging of product items from multiple sides and/or accessible angles. However, items can also be grabbed and lifted for inspection, imaging, or sensing, or simply raised such as via cushioned pins projecting though holes in the conveyor belt and/or tray.

Additionally, secondary imaging/inspection can occur during storage, or prior to dispensing a product into a package. Such imaging/inspection can be used as a final go-no go verification step after the attributes of the product item have been determined from previous imaging.

Other sensors and/or imagers may be used to confirm the successful transfer of trays, items, and packages.

As described below in detail below, the product handing system may comprise the trays utilized in conjunction with carousel elements. One or more sensors or cameras may be installed within the carousel.

Such carousel sensors/cameras could image some or all of the items as the carousel rotates (e.g., a part of regular motion or to specifically allow imaging). Several images could be taken during the motion to permit viewing from different perspectives, and even optionally 3-D reconstruction of the product.

Some embodiments could install cameras at the top of the carousel to afford a view of the top tray. The cameras can be positioned on top in the front and in the rear in order to 'triangulate' an image.

Items can be imaged once upon entering, periodically (such as every day, using the off-hours for example) or based upon other rules. Items can be imaged from the top while supported in the trays, and then flipped over individually or as a whole tray to be imaged from the other side, or otherwise manipulated to rotate so they can be imaged from the other side.

The imaging can take place on the main conveyor belt, and/or on the side conveyors, and/or at the storage cabinets, and/or at the parking spots before a robot manipulates the item.

A block may represent a plurality of trays. A given block may contain a set of items (e.g., all fruit and vegetables, all dairy, etc.) and is expected to hold many (e.g., tens, hundreds, or even thousands) of unique items.

A block may contain all or some of the items for sale. The block may hold several trays of frequently accessed product items in order to ensure rapid supply. Conversely, a block may have partial trays or even none of rarely-accessed items that will instead be loaded upon demand.

The conveyor belt may lead to a set of modules that may be situated orthogonally on one or both sides of the conveyor belt. The modules may be dedicated for a specific variety of items (like fruit versus vegetables, packaged product items versus loose product items, etc.). Specific trays can be moved to side conveyors of individual modules as they pass by on the conveyor.

According to embodiments, a loading mechanism may be employed to move product items to and/or from the trays. In particular, once product items have been inspected (e.g., by imaging and/or sensing), they are sorted onto trays.

One method to accomplish this sorting is to move the items along conveyor belts. The trays (e.g., with slots) can be positioned above a lifting conveyor. The lifting conveyor will lift through the tray and thereby allow the product items to be conveyed over the tray.

Figure 4:
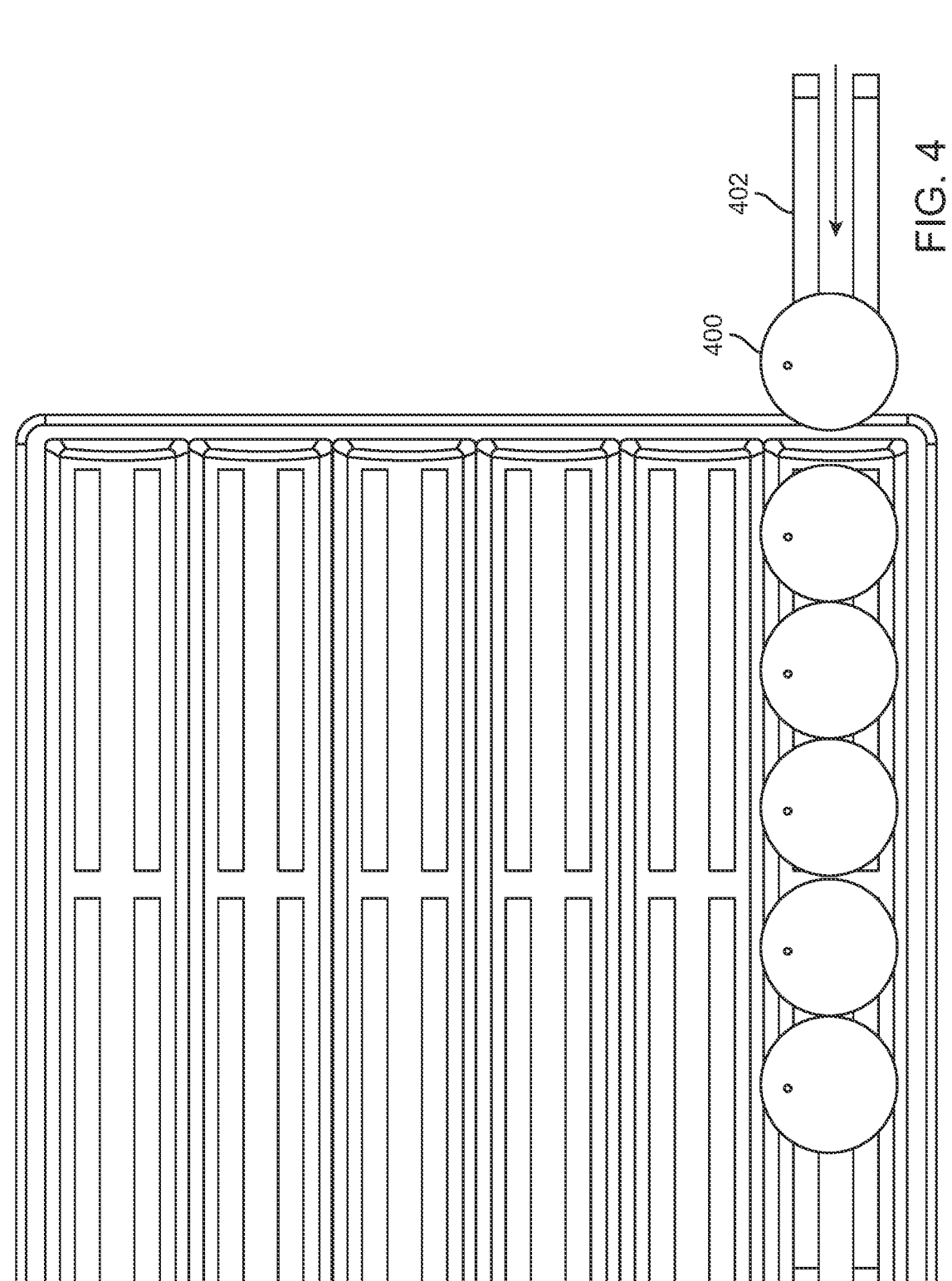
FIG. 4 is simplified plan view graphically illustrating a product item disposed on a tray by a conveyor.

Once in place, the conveyors will move down and the items will rest on the tray. This is depicted graphically in the plan view of FIG. 4, where the product item 400 is disposed on the tray by the conveyor 402. The tray can then move on to storage (e.g., in a carousel).

Various stations could be used to match the variety of the items. Alternatively, an automatically adjustable conveyor could accommodate all or many of the possible varieties of product items.

In certain embodiments, trays having product items already disposed therein, will be loaded into carousel elements. According to an alternative approach, product items may be loaded into the trays that are already in the carousel.

FIGS. 5A-D show different views of one example of a carousel 500 according to an embodiment.

Figure 5A:
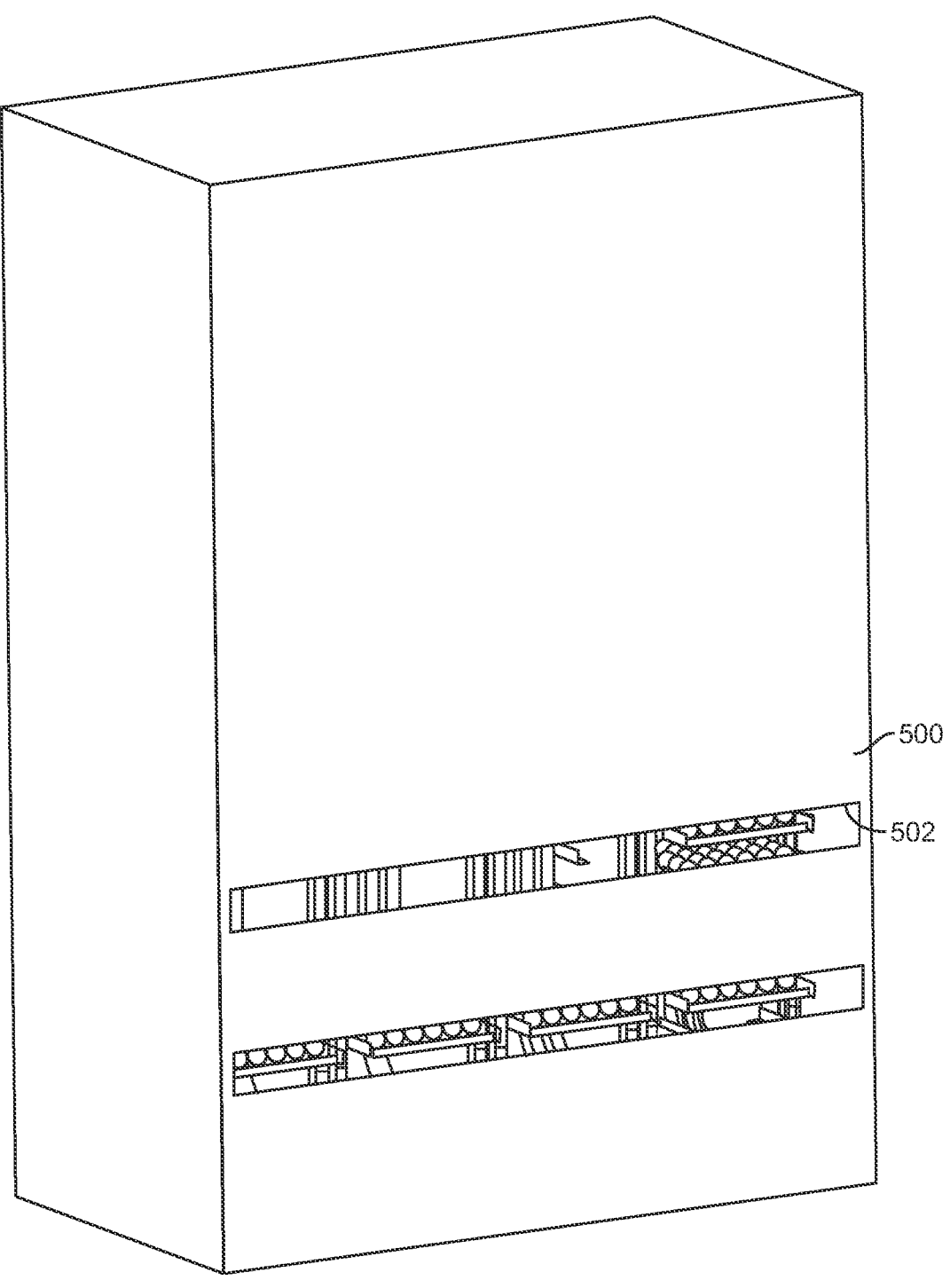
FIGS. 5A-D are various simplified views illustrating a carousel according to an embodiment.
Figure 5B:
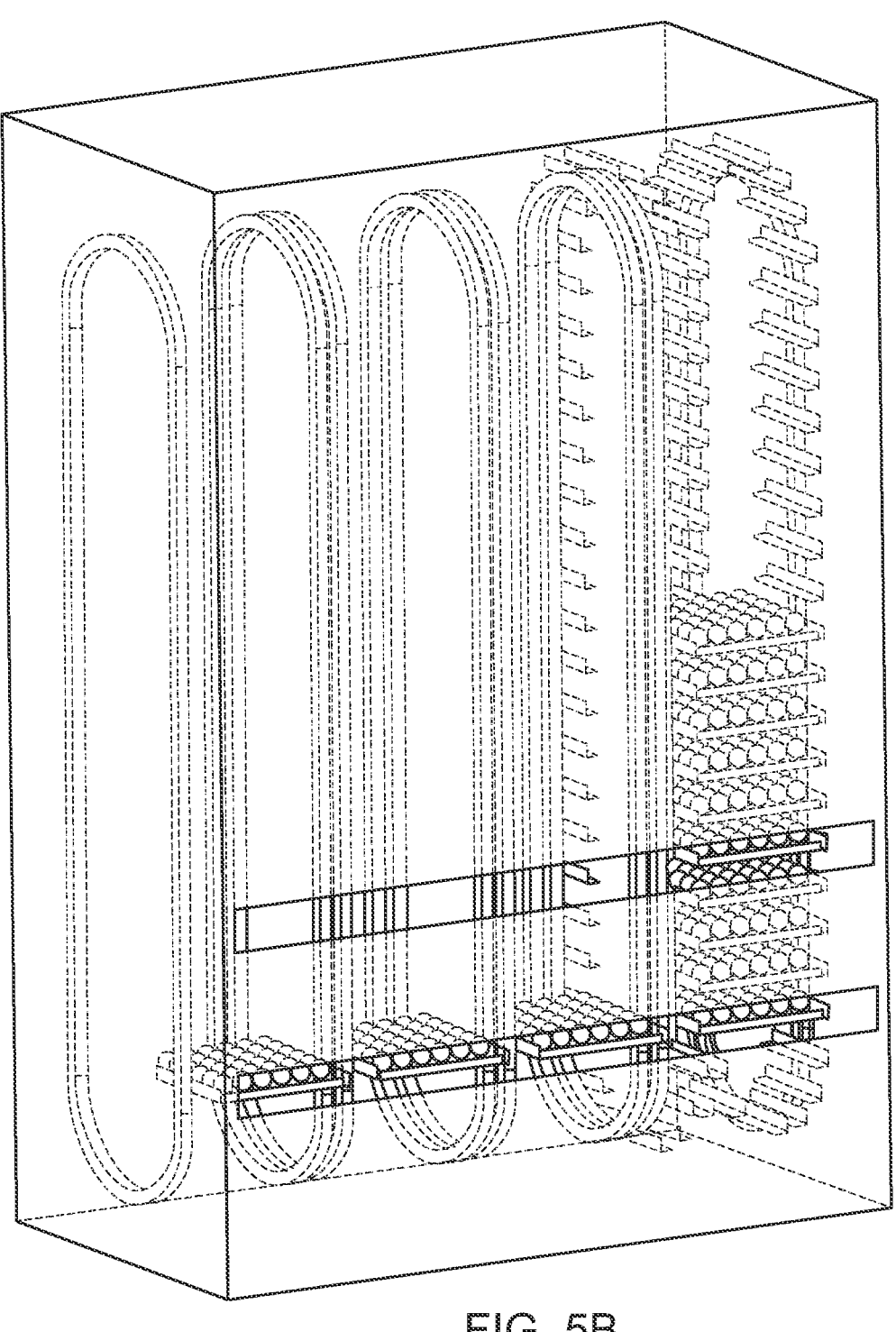
Figure 5C:
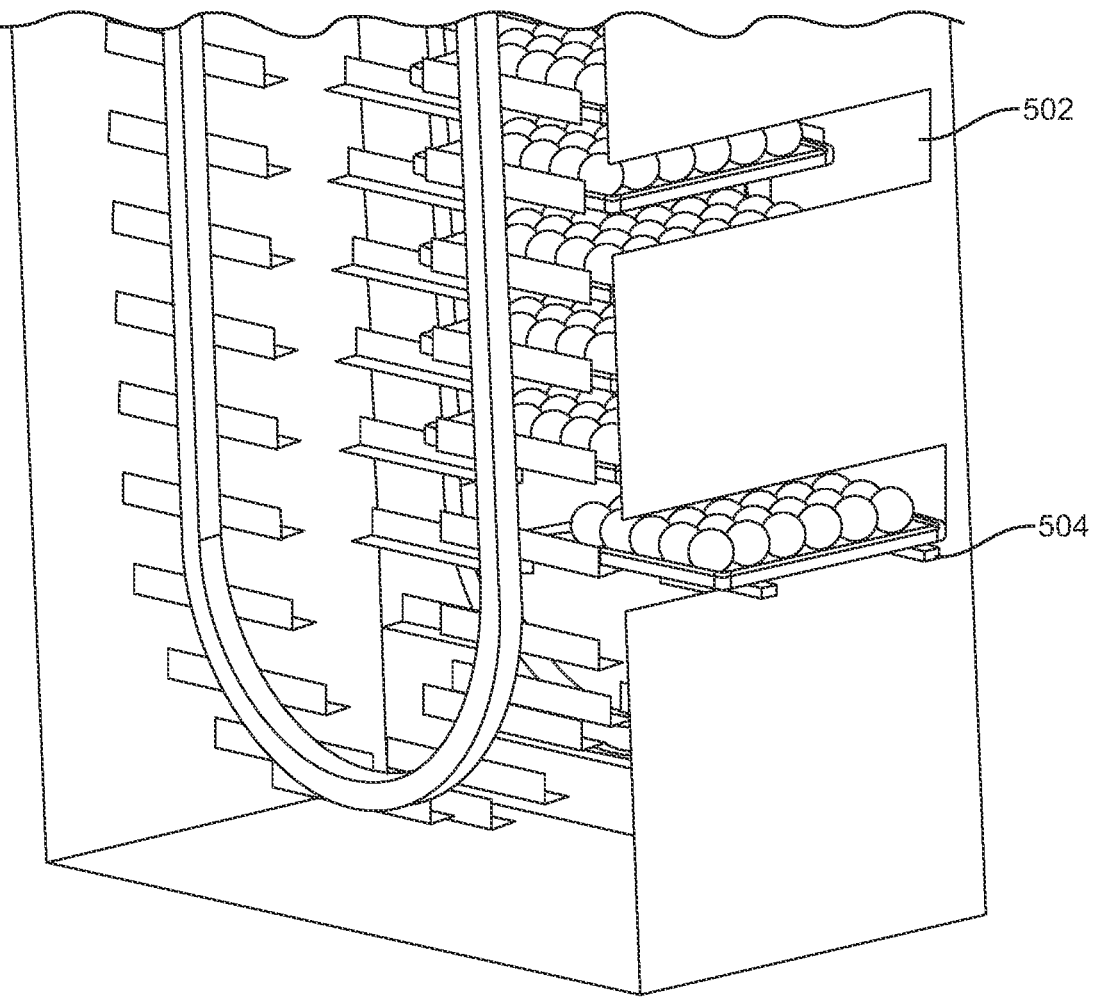
Figure 5D:
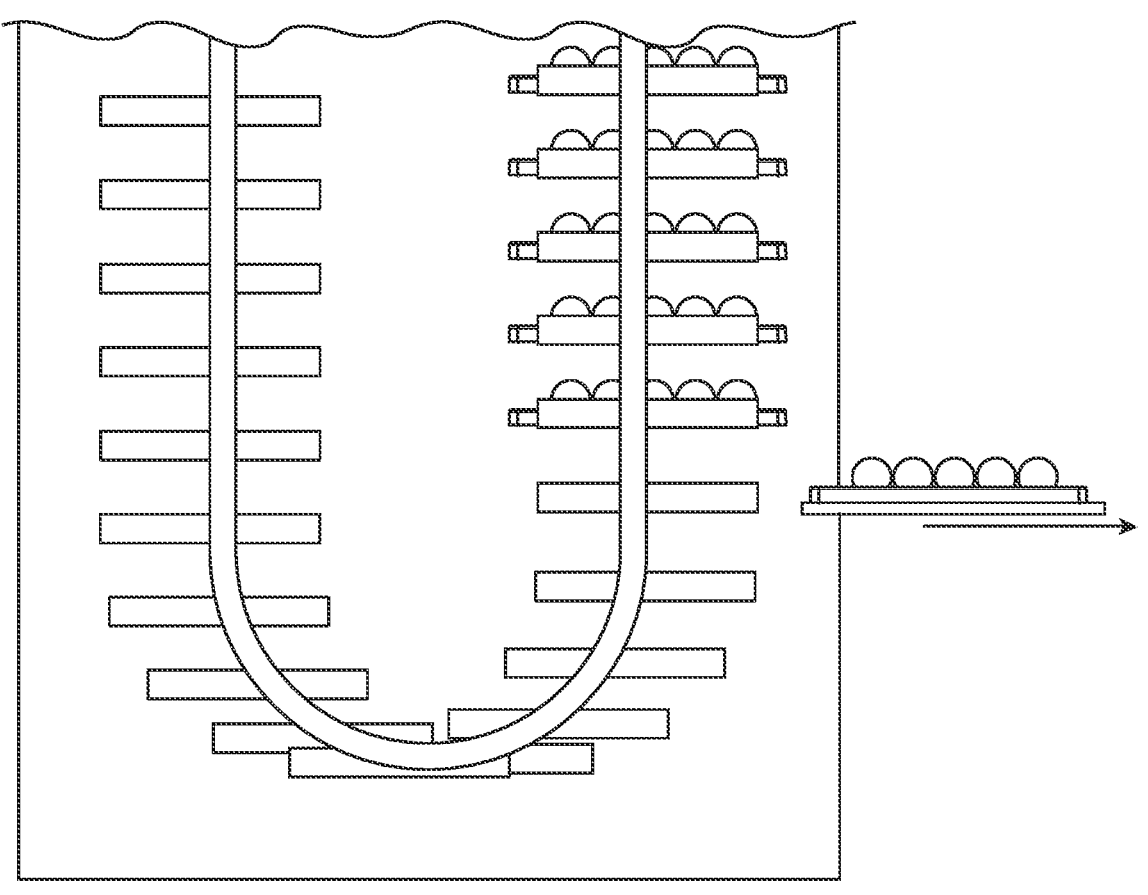

The carousels may be oriented in a horizontal direction, containing several tens of trays. The carousels may exhibit the ability to bring individual trays to the transfer station 502, from which they can be moved onto the staging position 504 (FIG. 5C).

The carousels may operate in a continuously indexing manner, bringing following trays to an offload station. Alternatively, the carousel may call trays in turn as needed.

Each carousel may operate with its own specific controlled environmental conditions. Examples of such conditions can include but are not limited to:

temperature,
humidity,
specific gases (e.g., ozone)
illumination
product-to-product proximity and interactions
mold growth.

According to embodiments, a carousel may have an opening (e.g., slit) for loading and unloading. The opening could be parentally open, an actively actuated gate, opened/closed by the motion of the tray, or closed with a material permitting tray motion (e.g., a plastic sheet).

Carousels may be designed to allow placement of trays with different spacings. This can permit handling of product items exhibiting different sizes (e.g., heights).

Alternatively, trays may be designed with fixed spacing. A control program may dictate which slot is appropriate for each tray height. A single carousel (one motor) could turn one or more columns of Trays.

Carousels may be designed with belt in cameras and sensors to continue to monitor the products as they age. One specific design could have the cameras or other sensors located at the top of the carousel path, inspecting the products in the tray passes past the top.

Additionally, there could be reject mechanisms built into the carousels to allow items to be automatically removed from the system. One design could employ lifting conveyors at the bottom of the carousel path. These conveyors are able to lift up and remove an item from the tray as needed.

Trays can be removed from the carousel manually or automatically. In automatic embodiments, the tray can be transported out by a walking beam, a walking beam conveyor, or a conveyor or rollers built into the carousel itself.

For walking beam embodiments, the carousel could stop with the appropriate tray in front of the dispense door. One or more beams would move into the carousel, lift the tray up and pull it out of the door and down onto a conveyor belt or rollers.

For the case where the conveyor is built into the carousel, each row of the carousel could have its own set of belts or rollers actuated to remove the tray. Each row could have its own motor, or a single motor may engage with the conveyors at the dispensing door.

Once located at a staging position, the tray will be in proximity to the aisle conveyor. This will allow items to be transferred from the tray at the staging position to the packages.

Figure 6:
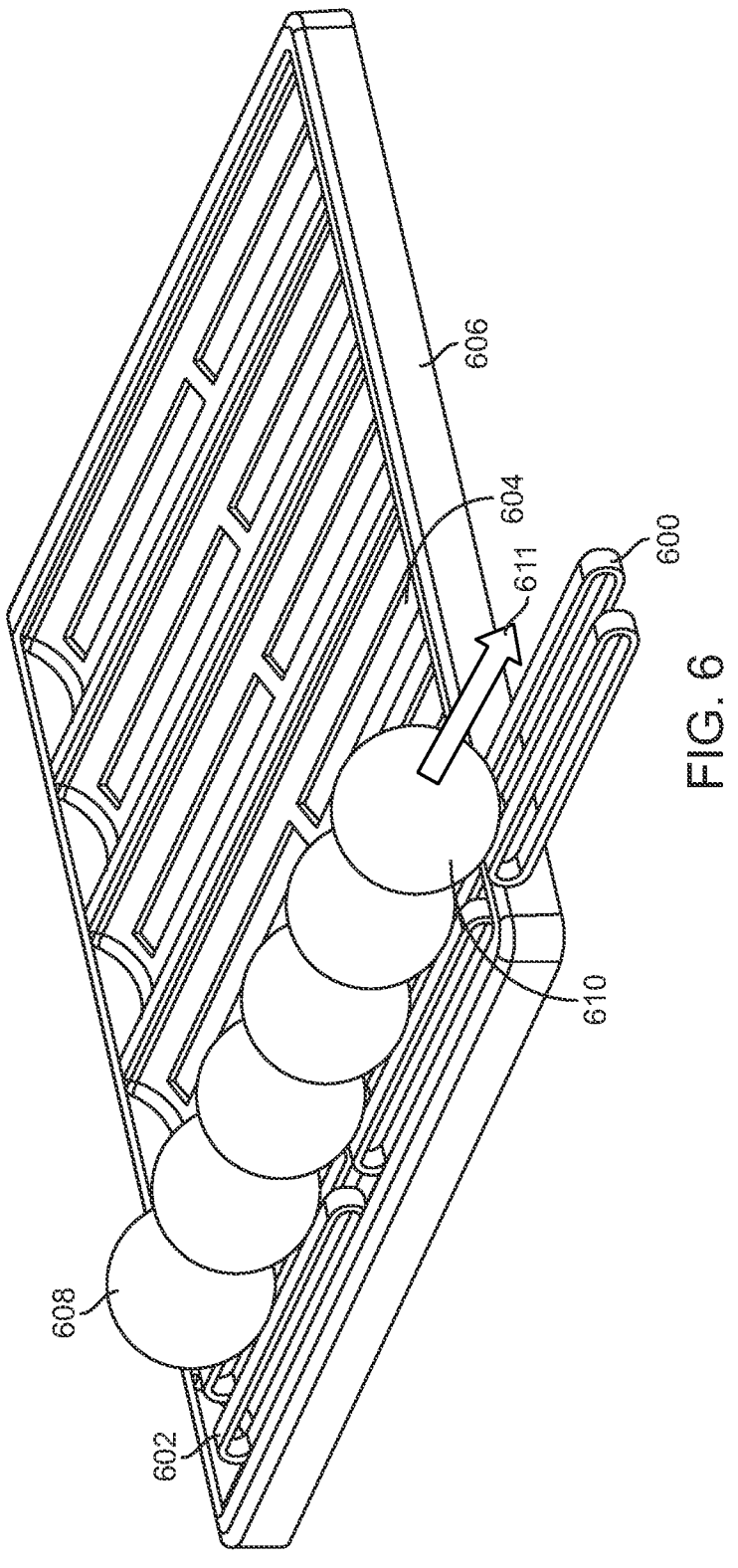
FIG. 6 shows a perspective view of a tray with product items disposed therein, interacting with a transfer mechanism.

Referring now to FIG. 6, conveyor belts 602 can rise up through openings 604 in the tray 606. Product items 608 may be moved along a conveyor into a position 610 from which they will be transferred 611 to the package, or into a separate transfer mechanism that will move the product items to the package.

Figures 6A, 6B:
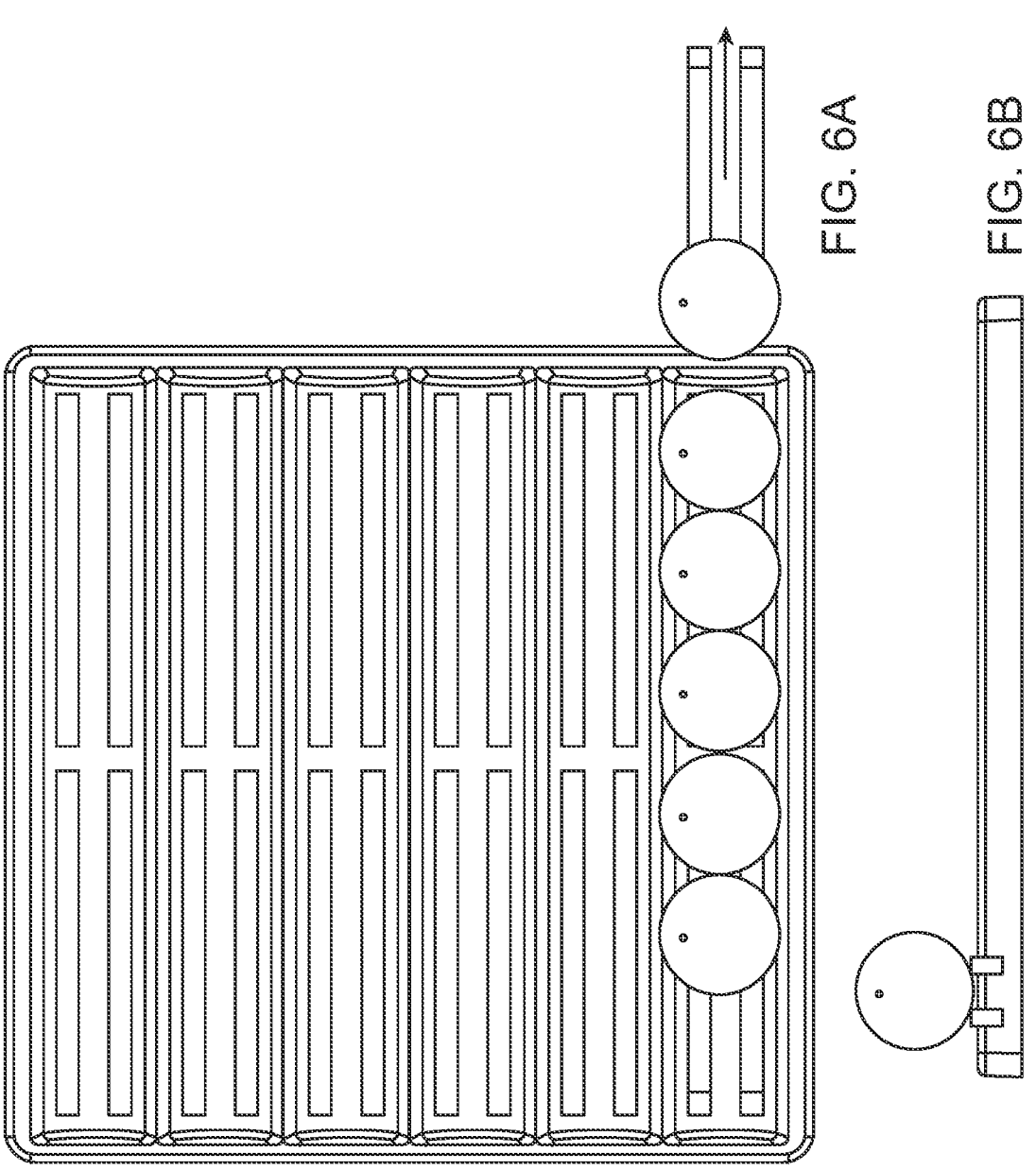
FIGS. 6A-B show plan and edge views, respectively.

FIG. 6 shows a perspective view of a tray with product items disposed therein, interacting with a transfer mechanism 600. FIGS. 6A-B show plan and edge views, respectively.

The product items may also be pushed, lifted, or dragged from the tray to that position for packaging. Product items could also be individually picked by a robot and an End of Arm Attachment (EOAT) specially designed for secure engagement.

Once the product item or items have been removed from the tray, the tray will be conveyed back into the Carousel to store the remaining items.

Details regarding a transfer mechanism for moving the product items apart from the tray according to embodiments, are now discussed. Specifically, once an item is out of a tray, it can be moved to the packaging by multiple methods.

One method is to have a robot pick up the item and place it into the packaging. Here, there may be specific EOATs for various classes and sizes of products. Some EOATs may have suction cups, others may have grippers, still others may shovel items up.

Figure 9:
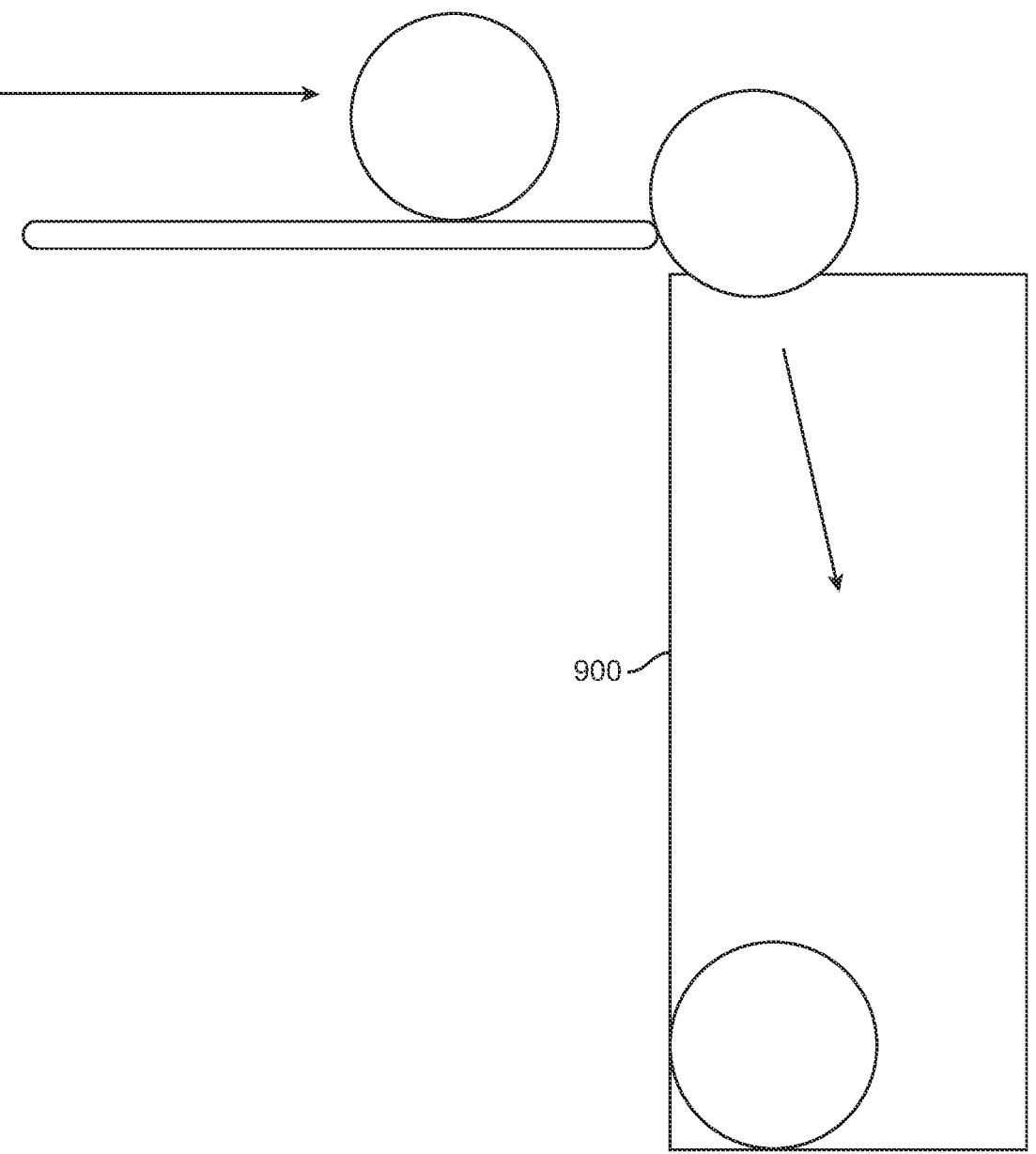
FIG. 9 shows a simplified side view illustrating operation of a transfer mechanism according to another embodiment.

An alternative method is to have the product items fall off of the end of a conveyor into a receptacle such as a rigid box or flexible bag, which may or may not have padding to break the fall. FIG. 9 shows an example of such an embodiment featuring receptacle 900.

The item could fall onto a spring-loaded slide or flap that drops down into the bag or box to soften the landing. The bag or box could be actuated to lift the box up to the edge of the conveyor. The box could also be constructed in a manner that the one more sides of the bag or box temporarily collapse to allow items to be brought into them.

Figure 8:
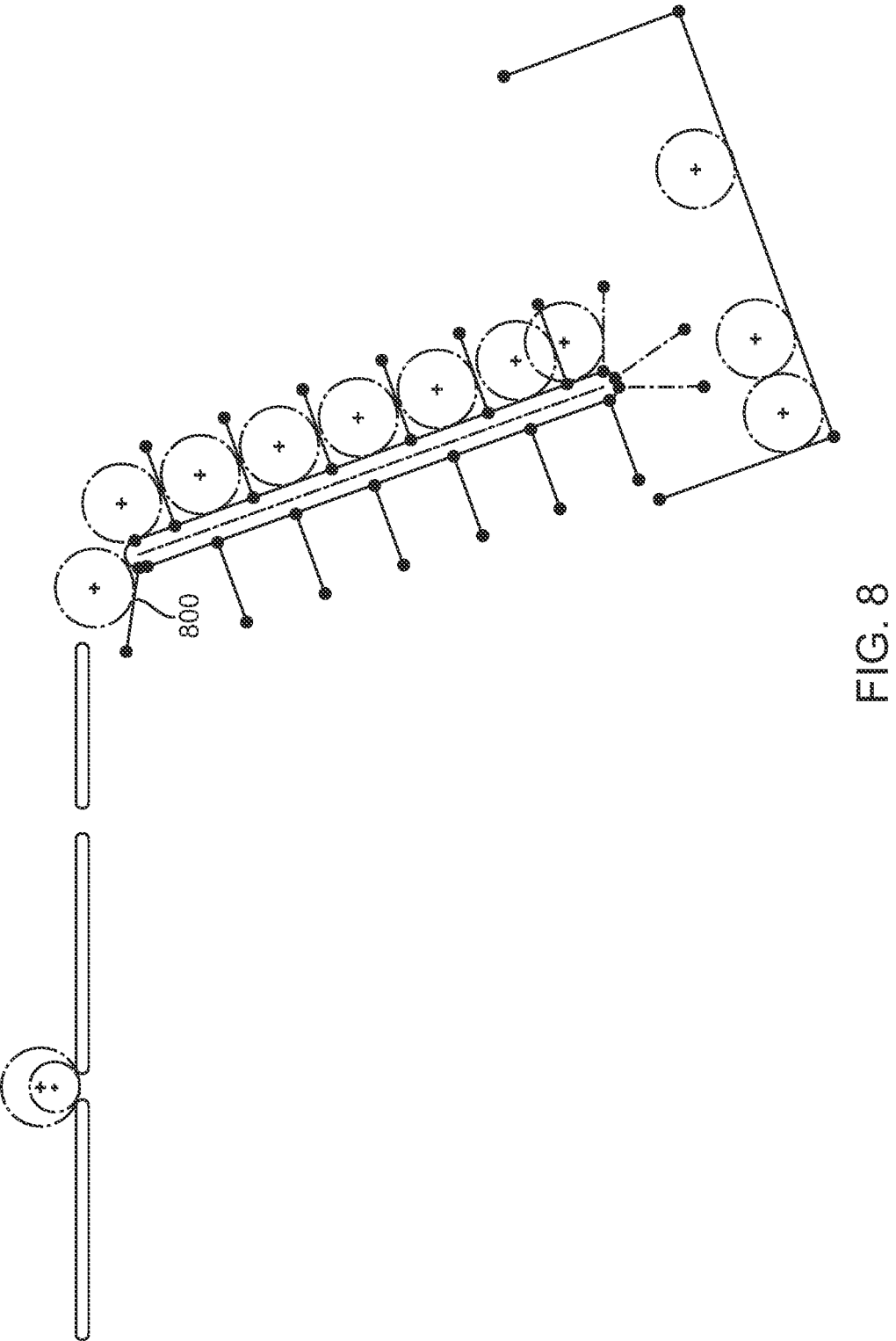
FIG. 8 shows a simplified side view illustrating operation of a transfer mechanism featuring flaps according to an embodiment.

A third possible approach is to employ a vertical conveyor whose belt has large flaps to hold the product item. FIG. 8 shows a side view of such an embodiment which includes flaps 800.

The conveyor would lower into the bag or box, or the bag or box could rise up around the conveyor. The conveyor could be actuated in a manner to select the location to drop the item in the box or bag.

Figures 7A, 7B, 7C:
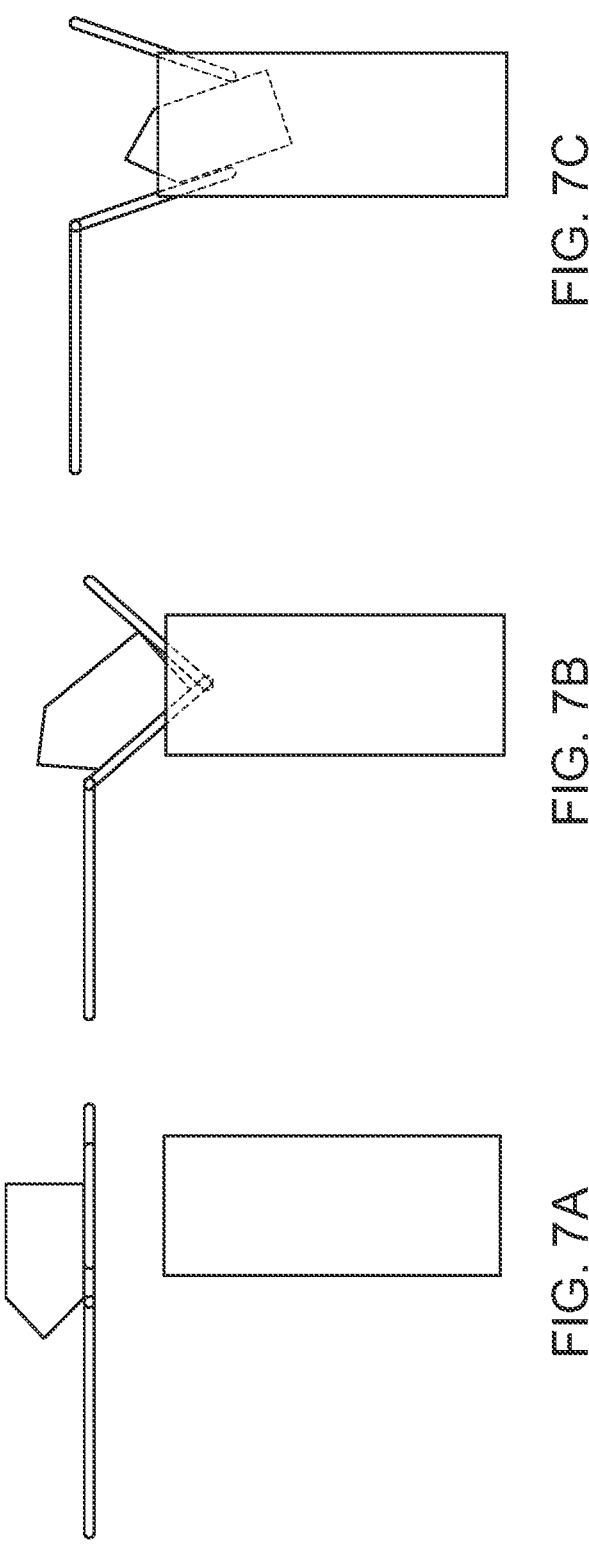
FIGS. 7A-C are simplified side views illustrating operation of a transfer mechanism according to one embodiment.

A fourth approach is to have the item move above the package on a conveyor. Once in position, the conveyor pivots down like a trap door. FIGS. 7A-C are side views showing the operation of one such embodiment.

The conveyors could lower down into the bag, controlling the decent of the item until it is beyond the reach of the conveyor. The belts could be made of a thick foam that helps capture the items on the way down. There could be two or more belts on each side with various spacing that can process various sized items. Each station could be designed for a certain shape, weight or volume. Or, one design could be actuated in a way that the location of each belt is movable to handle item variety.

A fifth method is to push or pull the product items from the back of the column or row of the tray. This could be accomplished from above via a mechanical gantry system, from below via an actuator through a slot, or utilizing a robotic arm.

A sixth possible method is to convey the product items through a hole with a stack of mesh or plastic rolled onto it. As the items are pushed through, the bag will roll forward until full and then be terminated and closed.

Certain embodiments could feature one transfer mechanism per tray. Other embodiments could feature one transfer mechanism per column or row of the tray.

There could be one or more transfer mechanisms per carousel. The transfer mechanism may be actuated in such a manner as to move between positions. Alternatively, the individual product items could be lifted onto conveyors at the staging position and then conveyed to one or more fixed transfer mechanisms.

Embodiments of product handling systems may permit customer selection of specific items. In some cases, e.g., produce or other non-uniform products (meat, deli cheese, etc.,) the consumer may be offered the ability to choose from a number of specific items.

According to such embodiments, images or other (e.g., sensing) data provided to customer, may allow him or her to successfully execute the product selection. The specific item may be reserved for a certain amount of time allowing the selection. Once selected by the customer, the specific item will be vended from the carousel.

Certain embodiments may allow dispensing only from the front row (e.g., closest to the package). There, customer selection may be limited to the front row, and/or selection of sequential items in the same column will be possible.

In alternative embodiments, a series of conveyors could move some items out of a column or row, so that an interior item can be vended to the customer. Then, the conveyors could move the remaining items back into the tray for return to storage.

Embodiments could offer the customer multiple qualities for evaluating when selecting their item. The customer could evaluate color pictures of the item from multiple angles. The customer could also be offered hyperspectral images.

A system according to embodiments could show a customer a rating that signifies the firmness of the item. The rating could be on a scale showing maximum firmness for similar items. For example, the firmest pear (right off a tree) could be rated with a value of 10, while a pear on the day of expiration could be rated a value of 0.

The scale could be adjusted based on the season of the item. For example, off-season produce might have a narrower range of possible ratings.

Similarly, a rating scale could be shown for various characteristics of product items. Examples can include but are not limited to:

sugar content in fruit the ripeness of certain items like bananas or avocados an overall rating that shows our compiled assessment of the overall quality of the item. The rating scale could be any set of numbers or an A, B, C, D, F scale or similar.

Product handling systems according to embodiments may include merging and/or shipping areas. At the end of the aisle conveyors, other conveyor systems (or product moving mechanisms) may transfer packages either to other aisles or to a shipping area.

Multiple packages can be merged into one or more delivery packages. For embodiments featuring transient packages, individual items may be lifted or otherwise transferred (such as poured) into delivery packages.

Product handling systems may feature a buffer station where packages are waiting. This waiting may be for other Packages in the same shipment, or for other reasons.

The nature of delivery packages according to embodiments, are now described. Delivery packages can be bags, simple boxes, or boxes having spacers inside.

One packaging option is for single layer stackable boxes. Another option is to have boxes with several heights, with the box ultimately used determined by the largest item it is designated to hold.

A box height could be a designed to have 1 or more layer, with a packaging material for contact with fragile items, and remaining layers for regular items. Packaging for a fragile layer could have a formed plastic or cardboard insert sized to fit various types of items (e.g., round, oblong, flat, etc.).

Packaging may be single use from recyclable material, and may be recycled. Packaging could also be designed to be returnable from the customer.

Transient packages can be individual bags or boxes with items collected into a larger box. Transient packages can be a large tray on which items in an order are placed for transport to the packing area.

Several delivery packages can be collected for one customer order. This can, for example, be by employing vertical stacking or nylon wrapping or other technique.

Embodiments may employ techniques for controlling the queuing and/or timing of product movement through the product handling system. Particular embodiments may use information from orders received, as well as from orders that are expected. The latter may be accomplished through machine learning techniques that are keyed off of past behavior.

One example of product movement that may be coordinated, is to send packages into aisle conveyors. This package sending may be for delivery, internal movement only, or for transient packages.

Another example of product movement that may be coordinated according to embodiments, is to bring trays to an unload position from the carousels and to the staging position. This movement may need to be done in time to preempt the loading of specific items into the packages.

Still another example of product movement that may be coordinated is action to bring trays, transient packages, or customer pack boxes to the robot loading area. The activity of the conveyors, carousels, and loading mechanisms may be coordinated in order to maximize system throughput and minimize time from receipt of the order to packaging.

Embodiments of product handing systems may function to optimize location of items on trays, and the location of trays in carousels. This allows each carousel and packaging location to be fully utilized.

Embodiments may track performance of the various components. An overall system health may be displayed to the users.

Embodiments of product handling systems may also operate to plan the optimal packing, for example calling upon specific pack boxes as needed to fulfill each order. In one embodiment, the system may place larger, heavier items at the beginning of a cue so that those items are at the bottom of the packaging. Then, as the packaging gets filled, progressively lighter and more fragile items can be positioned on the top.

Embodiments could also function to determine where in the box a particular item should be placed. This allows knowing where product items are located through the entire packaging sequence.

The imaging and sensing data collected from the product items (as well as other available information such as images or other measurements/information taken before arrival at the facility) may be used to attribute properties to the item. Such other information can include data provided on barcodes or similar mechanisms such as RFID tags. These can be located on the individual item, on the incoming tray, or be traced to the incoming shipment. In some embodiments the other information may be measured 'off-line', such as a sample of fruits that are sent to lab tests or tasted.

The customer can be offered various packages if desired. In one example, produce could be selected based upon an expected day of ripeness. Thus an instruction received from the customer may be to "select 7 bananas, one that ripens every day for the next week". Alternatively, a customer could request a box of fruit per day, each box ripening as needed.

In another example, a customer could select kits specifically intended for a certain recipe. Thus bananas slated for use in banana bread, could be ordered as bananas slightly paste their ripe stage.

Further alternatively, a customer could order a lasagna kit. During the selection process, the customer could be offered a list and choose some or all of the ingredients from that list.

Embodiments may allow external links to be placed on recipe sites, so that a user can add the recipe to their list of saved recipes. For example a customer may prefer the pasta sauce available from a particular website, and click the save recipe option. Then, that product item will be added to the customer's profile.

Later, the customer might look through their recipes and plan out meals for the week by selecting each meal and the day it is expected to be eaten. Embodiments could then sort through the order and select items of the best quality on the day scheduled for consumption.

According to embodiments, the product handling system could also be linked to other Internet-of-Things (IoT) devices that are able to determine or predict particular items already present in a customer's refrigerator or cupboard. Those particular items may then be able to be automatically ordered on a recurring time period. Alternatively, when a recipe is ordered, items already possessed by the customer can be automatically removed from the list.

A system according to embodiments could be linked to voice controlled devices. This allows a user to add an item to their grocery list so that it can be saved for a future order. A customer could accomplish this by asking to have items saved to their cart, or by notifying the system of a deficit of certain item. Information relating to particular dishes or recipes could be saved in a similar manner.

System users may have the ability to save past quality preferences. Thus if a customer ordered B level zucchini (for example), that customer could mark a box saving that preference for all future zucchini purchases. This shortens check out time and improves consumer confidence.

Imaging and other (e.g., sensing) parameters may be stored for sufficient time to allow comparison after customer feedback has been received. (This may be about a week for fresh produce purchases.) The stored information could be the raw data or a subset thereof that has been processed (e.g., for compression or encryption).

Parameters or ratings can be referenced to offer different pricing schemes or dynamic (adjustable) pricing based upon quality and/or supply-demand variations.

A customer can provide feedback on particular parameters of the delivered product. Examples of such parameters can include but are not limited to the quality, ripeness date, blemishes, or other parameters of purchased produce.

Systems according to embodiments may utilize machine learning to process feedback information together with other collected parameters (e.g., images of product items). This allows the system to improve an accuracy of predicting general properties (e.g., ripeness day, color, farm, and other attributes) as well as the preferences of a specific customer.

Such data processing can aid customers in obtaining preferences, allow sellers to evaluate supplier performance, and permit suppliers to collect valuable quality control information and improvement feedback.

The user interface (UI) may include virtual or augmented reality images or scenarios. In one example, a user could enter a virtual supermarket where they can inspect and select the specific to be placed into their cart. Such a virtual store environment can be optimized to minimize time spent by down selecting items in an order they are shown according to preferences.

Product items not normally bought by a particular customer can be presented for inspection (including physical handing).

Recipes offered by the system accompanying product items, could be available for customer review to inform about possible uses for the product. If a recipe is selected, the user can be solicited to add the other recipe items to their cart. Alternatively or in addition, a user selecting a recipe could enter a virtual environment displaying finished dishes or recipes for ordering other ingredients as desired.

According to embodiments, a product handling system can provide estimated packing time based upon factors including but not limited to:

the order contents other orders in the queue, and the known content of the block containing other orders.

A product handling system according to embodiments could suggest changes in the order to reduce pack readiness time. The system could also actively suggest changes to the order based upon price considerations, for example to meet a budget requirement.

Example

An example of a product handling system is now described. An embodiment of an automated system allows rapidly distributing a large number (on the order of many 10,000's) of unique incoming products into packages for customer delivery.

According to one embodiment, the system provides an automated grocery store offering rapid (e.g., minutes) fulfillment and packaging. In particular, grocery items typically involve 1,000s or 10,000s of unique items.

For example, individual product items in the field of fresh produce, may comprise a large volume of associated data. That is, an individual fruit or vegetable (e.g., an apple) may be associated with one or more of the following pieces of information:

product item identifier (ID)

size color variety harvest date source (e.g., farm)

visual inspection result non-visual inspection result (e.g., softness, gas sample, many others)

This information could be stored in electronic format in a non-transitory computer readable storage medium. In one example, the information could be stored as fields in a data object stored in a database. The information could travel associated the particular product item, together with product handling specific data (such as a tray identifier, tray location identifier).

Upon user selection of the particular product item (e.g., apple), the product handling system could dispense the item to the consumer together with packaging (e.g., box, bag, together with any insert) within a short time frame.

While this particular example describes an embodiment that is designed for use in the packaging and delivery of fresh produce, this is not required. Other potential applications may call for the rapid fulfilment from a large number of product options, for example in the area of recycling of clothing or other items.

Particular embodiments may be especially suited to allow rapid distribution of a large number (on the order of many 10,000's) of unique incoming products into packages for customer delivery. By contrast, a conventional on-line retailer may carry millions of different individual items in warehouses for delivery.

Embodiments may thus offer a space efficient solution that may be local within proximity of customer demand. However, some embodiments could be located in larger warehouses outside of densely populated areas. Systems may permit a high level of quality control, allowing customers to avoid the inefficient travel to and from a store in order to select individual items for freshness and relevance.

In summary, embodiments may offer optical (hyperspectral, potentially 3D, potentially multi-angle) or other (like acoustic, pressure gauge, gas sensing systems, spectroscopy) inspection of some or all incoming material (e.g., loose produce) in bulk form.

Embodiments permit customer selection of specific product items (e.g., a particular tomato) based upon one or more of the following:

specific information (images)

specific or aggregated sensor data typical images (of others that we sorted into same bin)

meta data accompanying the items (manufacturer's location and pick date if applicable, storage and transportation conditions, etc.)

the rank of a specific item within a larger aggregate of items other criteria (such as size, weight, volume, color).

Embodiments may offer storage of product items within carousels that control multiple environmental factors (e.g., temperature, humidity, product to product proximity and interactions, mold growth, gas detection). Such a carousel-based storage system could be designed to allow rapid packing of individual products to provide rapid order fulfillment.

Embodiments may allow the vending of fresh produce into either a delivery package, an inner package, or a transient package. Here, an inner package represents a tray that will later go into a box with others. A transient package serves just to carry the product item(s) to a place where a shipment package is consolidated.

In the case of direct vending into a delivery package, that packaging may include a generic form of spacing or cushioning or an insert that will be placed before loading based on the expected items to be places into that delivery package (e.g., round indents for the packaging of stone fruit).

According to certain optional embodiments, inner packages, and/or individual items, and/or transient packages may be merged into a delivery package if appropriate.

In some cases, other material may be added to prevent damage to items in shipping or packaging. Examples can include but are not limited to cardboard, shredded paper, inflatable plastic bags, or other fillers. Alternatively, the individual dispensed product items may be covered with another flat or shaped surface or a stretchable or inflatable membrane for protection during shipping.

Embodiments may permit individual item selection by a consumer based on imaging and other sensor data. This selection may be enhanced by learning consumer preference(s) based upon image, collected data, and other sensors. This may be achieved independently, or in connection with automated features.

Various product handling systems according to embodiments may exhibit one or more of the following features. Certain embodiments may hold for a customer, a specific selected unique product items while they are in their cart. Some embodiments may save quality preferences of a customer for future orders.

Particular embodiments may feature recipe buttons that allow user to save a recipe, and select one or more particular product items of that recipe as part of an order. Product bundling features may facilitate a user ordering whole recipes, kits or a series of items. Various embodiments may allow optional browsing and selection by meal options instead of individual items.

Voice controlled additions to a cart may be allowed for future orders. Various embodiments may implement dynamic pricing based upon factors that can include but are not limited to expiration dates, consumer feedback, and conveyor load. Some embodiments may dispense product items for packaging according to expected expiration date.

Figure 11:
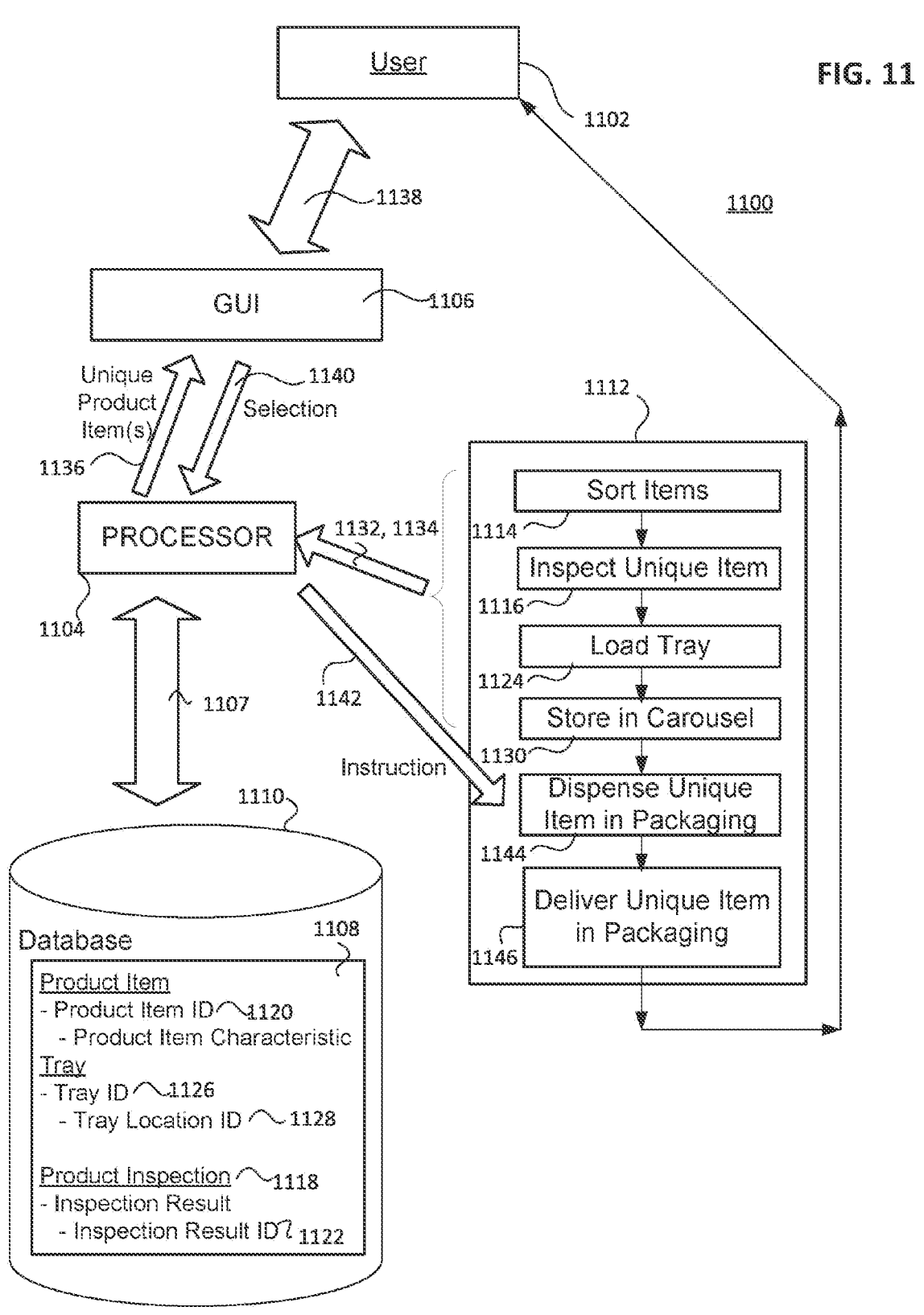
FIG. 11 is a simplified diagram illustrating an embodiment of a product handling system according to an example.

FIG. 11 is a simplified diagram illustrating an embodiment of a product handling system 1100 according to an example. Specifically, a user 1102 interacts with a processor 1104 via a graphical user interface (GUI) 1106.

The processor is in communication 1107 with both a database 1108 in a non-transitory computer readable storage medium 1110, and the various other system components 1112.

Specifically, those other components serve to sort 1114 incoming items, with the processor assigning each a product item identifier that is stored in the database.

The individual product items are then inspected 1116. The processor assigns an identifier 1118 to each of the inspections, the results of which are stored in the database together with the product identifier 1120 and the inspection result identifier 1122.

As described extensively above, the individual unique product items are then loaded 1124 into tray(s). Again, the processor stores in the database, the corresponding tray identifier 1126 and tray location identifier 1128 associated with each individual product item identifier.

Next, the trays are moved to the carousel for storage 1130. A carousel identifier 1132, and a location 1134 of the tray within the carousel, may be stored by the processor in the database associated with the other IDs, thereby allowing tracking of tray and product item.

The specific data relevant to various product items is then communicated 1136 from the processor to the GUI, where it is displayed 1138 to the user. Based upon this displayed product item data, the user provides an input to select 1140 a particular product item.

The processor receives this selection, and in response communicates an instruction 1142 to the carousel. Based on that instruction, the carousel dispenses 1144 the unique product item into packaging. Finally, the product item together with the packaging are delivered 1146 to the customer.

Clause 1A. A method comprising:

sorting a first unique product item from a plurality of product items;

assigning a first identifier to the first unique product item;

conducting a first inspection of the first unique product item;

storing in a non-transitory computer readable storage medium, a first inspection result associated with the first identifier;

disposing the first unique product item on a tray at a location that is assigned a second identifier;

storing in the non-transitory computer readable storage medium, the second identifier associated with the first identifier;

moving the tray to a carousel; and storing the tray in the carousel under a controlled environmental condition.

Clause 2A. A method as in clause 1A further comprising:

communicating the first identifier and the first inspection result to a customer;

receiving from the customer an instruction including the first identifier;

in response to the instruction, referencing the second identifier based on the first identifier;

in response to the referencing, causing the carousel to dispense the product item from the first unique location into a packaging; and distributing the product item in the packaging to a consumer.

Clause 3A. A method as in clause 2A wherein:

conducting the first inspection comprises conducting an optical inspection; and the first inspection result comprises an image of the unique product.

Clause 4A. A method as in clause 2A further comprising:

conducting a second inspection of the first unique product item;

storing in the non-transitory computer readable storage medium, a second inspection result associated with the first identifier; and communicating the second inspection result to the customer along with the first identifier and the first inspection result.

Clause 5A. A method as in clause 4A wherein the second inspection is other than optical in nature.

Clause 6A. A method as in clause 1A wherein the controlled environmental condition is selected from temperature, humidity, illumination exposure, and proximity to another unique product item.

Clause 7A. A method comprising:

communicating to an interface, an inspection result for a unique product item stored under a controlled environmental condition within a carousel;

receiving from the interface, a selection of the unique product item;

in response to the selection, referencing a data object stored in a database to correlate a first identifier of the unique product item with a second identifier of a specific location within a tray in which the unique product item is disposed; and based upon the second identifier, communicating an instruction to the carousel to dispense the unique product item into packaging.

Clause 8A. A method as in clause 7A wherein prior to the communicating the method further comprises:

sorting the first unique product item from a plurality of product items;

assigning the first identifier to the first unique product item;

conducting a first inspection of the first unique product item;

storing in a non-transitory computer readable storage medium, the data object associating the first identifier and the inspection result;

disposing the first unique product item on the tray at the specific location assigned to the second identifier;

storing in the non-transitory computer readable storage medium, the data object associating the second identifier with the first identifier;

moving the tray to the carousel; and storing the tray in the carousel under the controlled environmental condition.

Clause 1B. An apparatus comprising:

a first carousel configured to receive from a first transport network, a tray including a unique location associated with a first identifier and bearing a unique product item associated with a second identifier, the first carousel configured to maintain the unique product item under a first controlled environmental condition;

a transfer mechanism configured to dispense the unique product item into a first packaging at a staging location; and a second transport network configured to move the unique product item and the first packaging from the staging location for distribution to a customer.

Clause 2B. An apparatus as in Clause 1B wherein the first packaging comprises a delivery packaging.

Clause 3B. An apparatus as in Clause 1B wherein the second transport network is configured to move the unique product item for distribution via a second carousel.

Clause 4B. An apparatus as in Clause 3B wherein the first packaging comprises a transient packaging.

Clause 5B. An apparatus as in Clause 3B wherein the second transport network comprises an aisle conveyor belt.

Clause 6B. An apparatus as in Clause 1B wherein the transfer mechanism comprises a robot.

Clause 7B. An apparatus as in Clause 1B wherein:

the tray defines an opening; and the transfer mechanism comprises a member moveable into the opening to contact the unique product item.

Clause 8B. An apparatus as in Clause 1B wherein:

the first transport network is in a first plane intersecting the carousel;

the second transport network is a second plane also intersecting the carousel; and the carousel is configured to move the tray between the first plane and the second plane.

Clause 9B. An apparatus as in Clause 1B wherein:

the first transport network is in communication with a first end of the carousel;

the second transport network is in communication with a second end of the carousel opposite to the first end; and the carousel is configured to move the tray between the first end and the second end.

Clause 10B. An apparatus as in Clause 1B further comprising an inspection station configured to interrogate the unique product item prior to being disposed to the unique location.

Clause 11B. An apparatus as in Clause 10B wherein the inspection station includes an optical camera.

Clause 12B. An apparatus as in Clause 1B wherein the first packaging comprises a bag or a box.

Clause 13B. An apparatus as in Clause 1B wherein the first packaging further comprises an insert.

Clause 14B. An apparatus as in Clause 13B wherein the insert comprises a filler.

Clause 15B. An apparatus as in Clause 1B further comprising a loading station configured to dispose the unique product item in the unique location of the tray.

Clause 16B. An apparatus as in Clause 11B wherein:

the tray defines an opening; and the loading station comprises a member moveable into the opening to contact the unique product item.

Clause 17B. An apparatus as in Clause 16B wherein the member comprises a robot.

Clause 18B. An apparatus as in Clause 11B wherein:

the tray defines an opening; and the first transport network comprises a member moveable into the opening to contact the unique product item.

Clause 19B. An apparatus as in Clause 18B wherein the member comprises a pin.

Clause 20B. An apparatus as in Clause 19B wherein the first transport network comprises a conveyor.

Figure 12:
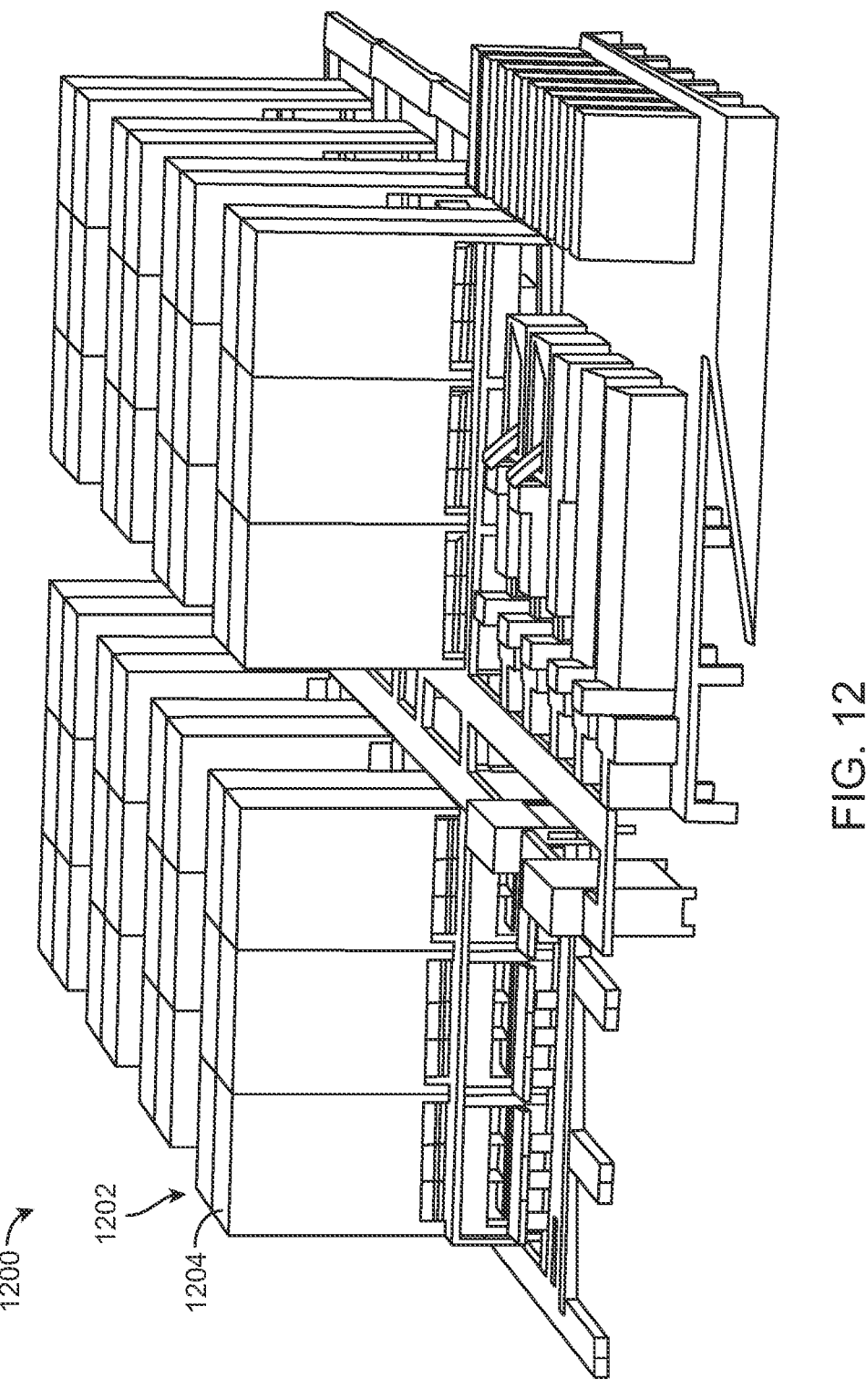
FIG. 12 shows a perspective view of an embodiment of a product handling system.

FIG. 12 shows a perspective view of a product handling system according to an embodiment. Product handling system 1200 includes multiple banks 1202 comprising six carousels 1204 each, that are oriented in two rows back-to-back.

Storage of particular items within a specific carousel, is typically determined at least in part by the conditions of that carousel. Certain items may be stored in groups calling for the same or similar conditions.

For example a set of fruit product items that call for a suite of conditions such as:

high relative humidity (RH), low temperature, low oxygen, and high CO2, can all be stored together in the same carousel.

Product types calling for different storage conditions, may all be stored together in a different carousel. For example, in contrast with fruit product items, certain dairy product items may call for:

low temperature, and normal RH conditions.

Each carousel may thus be characterized in part by its particular suite of environmental conditions, as well as by its physical location within the system.

Figure 13:
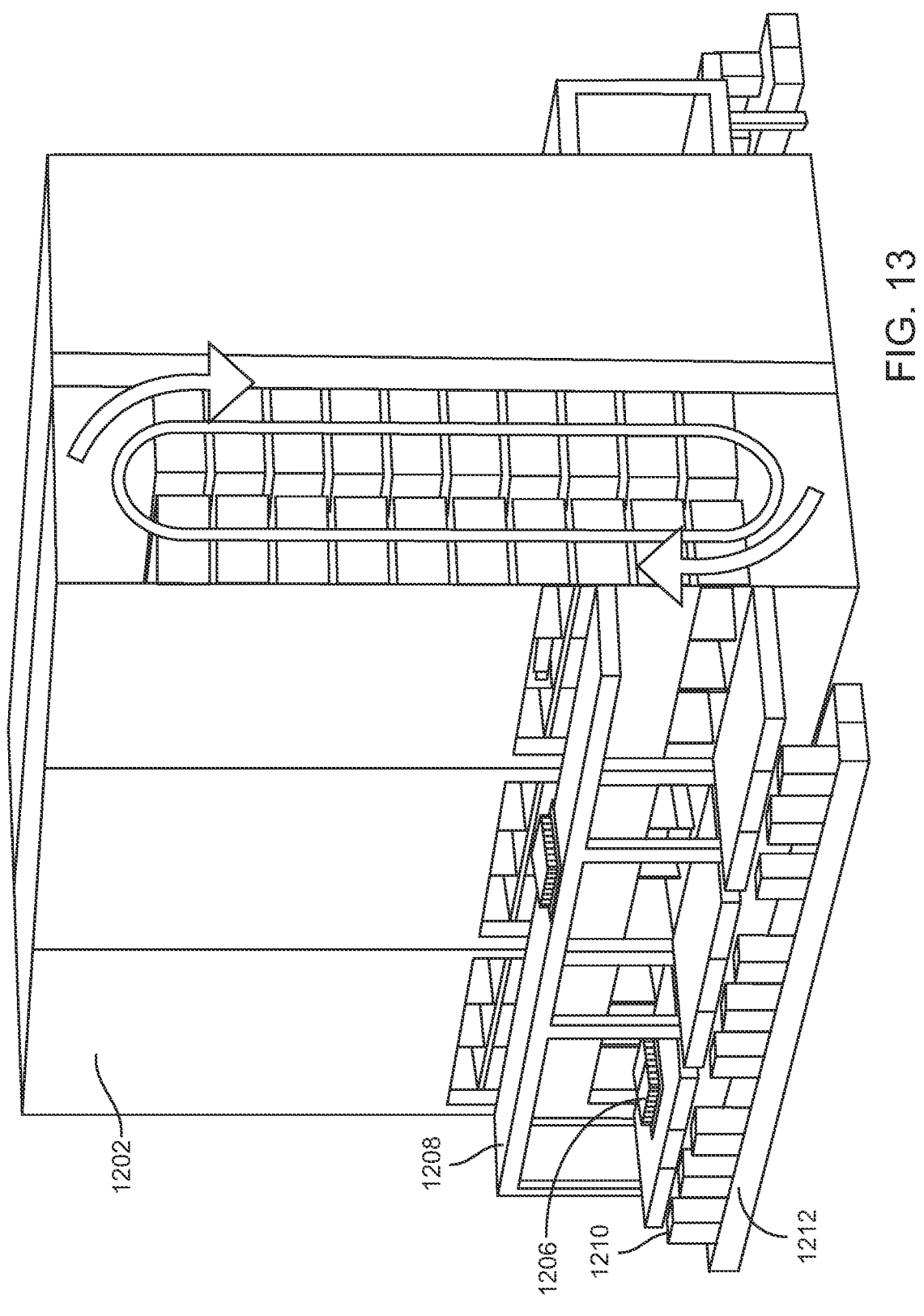
FIG. 13 shows a side view of one carousel bank of the system of FIG. 12.

FIG. 13 shows a side view of one carousel bank of the system of FIG. 12, with the side wall of one carousel cut away. This system utilizes a two-level transport path configuration, with trays 1206 arriving for loading on an upper level 1208, and trays being retrieved and products being dispensed into bags 1210 on a lower level 1212. Details regarding the product retrieval and unloading process for this particular embodiment, are further described below.

Returning to FIG. 12, it is noted that multiple carousels of the same type (e.g., "Berries") may be present in a single system. This redundancy may be introduced in order to distribute the items throughout the system and increase bag path efficiency. Unwanted bottlenecks in the flow of materials through the system can be avoided, e.g., where product(s) of a particular carousel are popular and hence need to be dispensed/replenished, often.

It is further noted that the arrangement of carousels, and even banks of same, may be carefully determined in order to enhance the efficiency of flow of materials through the system. For example, carousels storing items typically purchased together, may be grouped to be physically near one another, thereby reducing inefficiencies of travel time/distance.

The specific location of product items in the carousels can be adjusted over time. This may be done in response to the identification of product purchasing behaviors that emerge for particular customers or subsets thereof Such trends may be determined with the aid of intelligent learning approaches that are trained on past customer behavior.

Other considerations may influence carousel location within the system. For example, as described herein the placement of items within a bag may be carefully determined, with fragile products being dispensed last, on top of more durable items. Thus, carousels storing such fragile products may be located downstream in the process flow, with items ordered in a way that those slated for the bottom of the bag drop first, and those slated for the top of the bag drop last.

In addition to relative fragility, a dispensing order may also depend upon relative product item size. Certain approaches may seek to dispense a large item (e.g., a tall box of cereal) early in the sequence, and then dispense smaller products around it.

Returning to FIG. 13, the cut-away view shows the storage of multiple trays of products within the rotating carousel. Depending upon factors such as the number and quantity of products to be stored, carousels may be of varying sizes. Examples of standardized carousel heights can include but are not limited to (in feet): 13.5, 17.25, 21, 24.75, and 28.5. Other heights may also be used.

Conditions within each carousel are carefully maintained, and the environment of each selectively modified in order to extend product life. Environmental conditions that may be relevant for storing products in a desired state, can include but are not limited to:

time of storage;

temperature;

relative humidity;

gas levels (e.g., O2, CO2);

ethylene removal;

light exposure;

cross contamination;

Volatile Organic Compound (VOC) levels;

mold spore levels; and cross contamination.

Detection of such conditions can take place within the carousel itself, checking multiple trays at a same time. Alternatively, such conditions can be detected on an item-by-item basis during product intake and sorting, or prior to dispensing.

Hence, products that are desired to be maintained under similar conditions, may be stored within the same carousel. Incorporated by reference herein for all purposes, is the following document: Agricultural Handbook No. 66, "The Commercial Storage of Fruits, Vegetables, and Florist and Nursery Stocks", printed by the U.S. Department of Agriculture as revised February 2016. This publication provides a table listing compatible fresh fruits and vegetables during 7-day storage.

Considerations other than environment may dictate the storage of products within or outside of, the same carousel. For example, consumer safety reasons may require the segregation of product items that are the source of food allergies. Hence, the certain carousels may be dedicated to the storing of nuts only.

Details regarding the dispensing items from the tray with a conveyor from below, are now provided. In particular, the product retrieval and dispensing apparatus according to particular embodiments, may offer three services:

removing tray from carousel;

removing items from tray; and placing items from tray into a bag.

Figure 14:
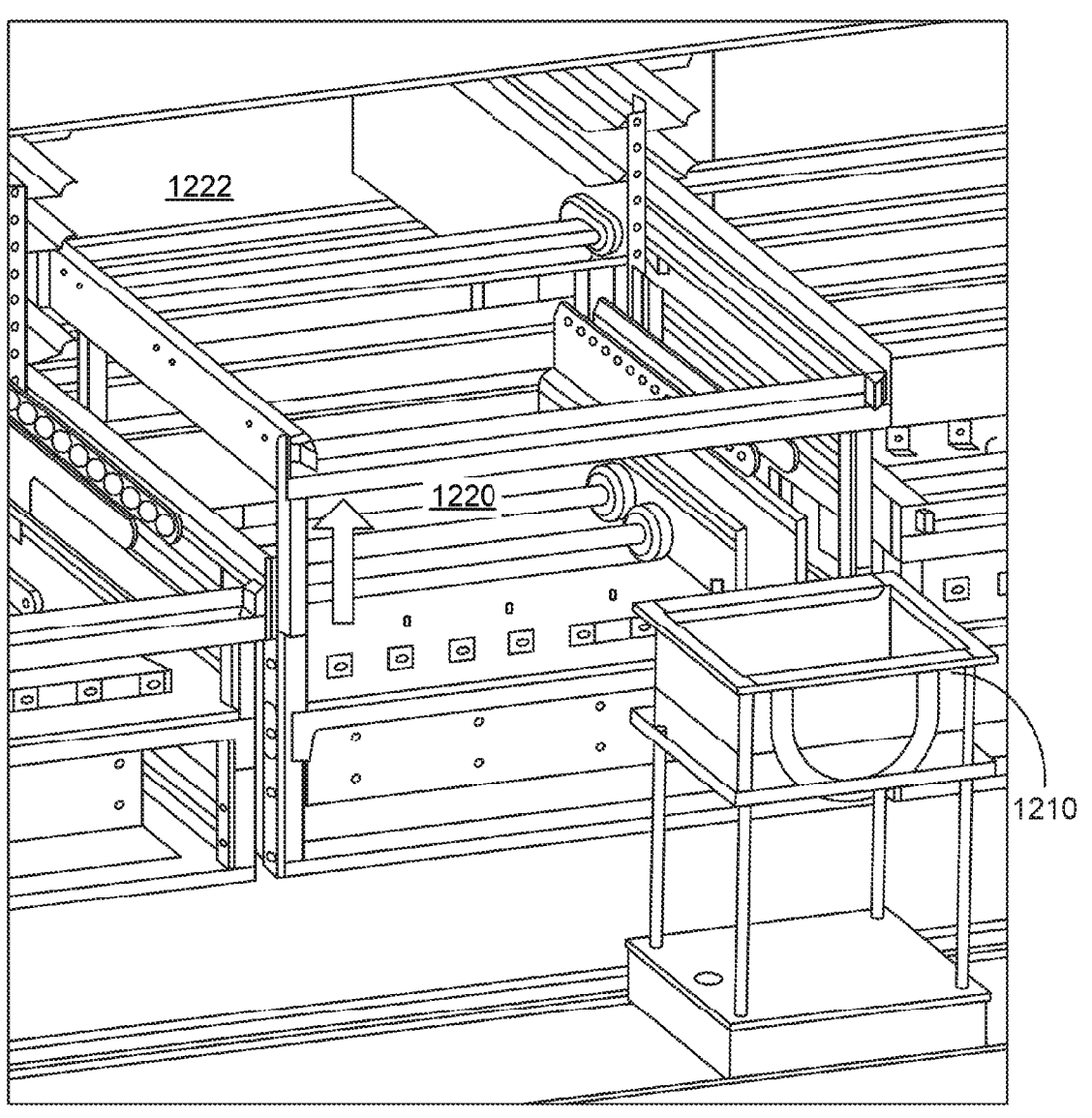
FIG. 14 shows a perspective view of a bag approaching and halting in front of the carousel on the transport path.

FIG. 14 shows a perspective view of bag 1210 (shown with handles folded down), that is approaching and halting in front of the carousel on the transport path. At this time, the frame 1220 rises up to the level of the carousel opening 1222.

Figure 15:
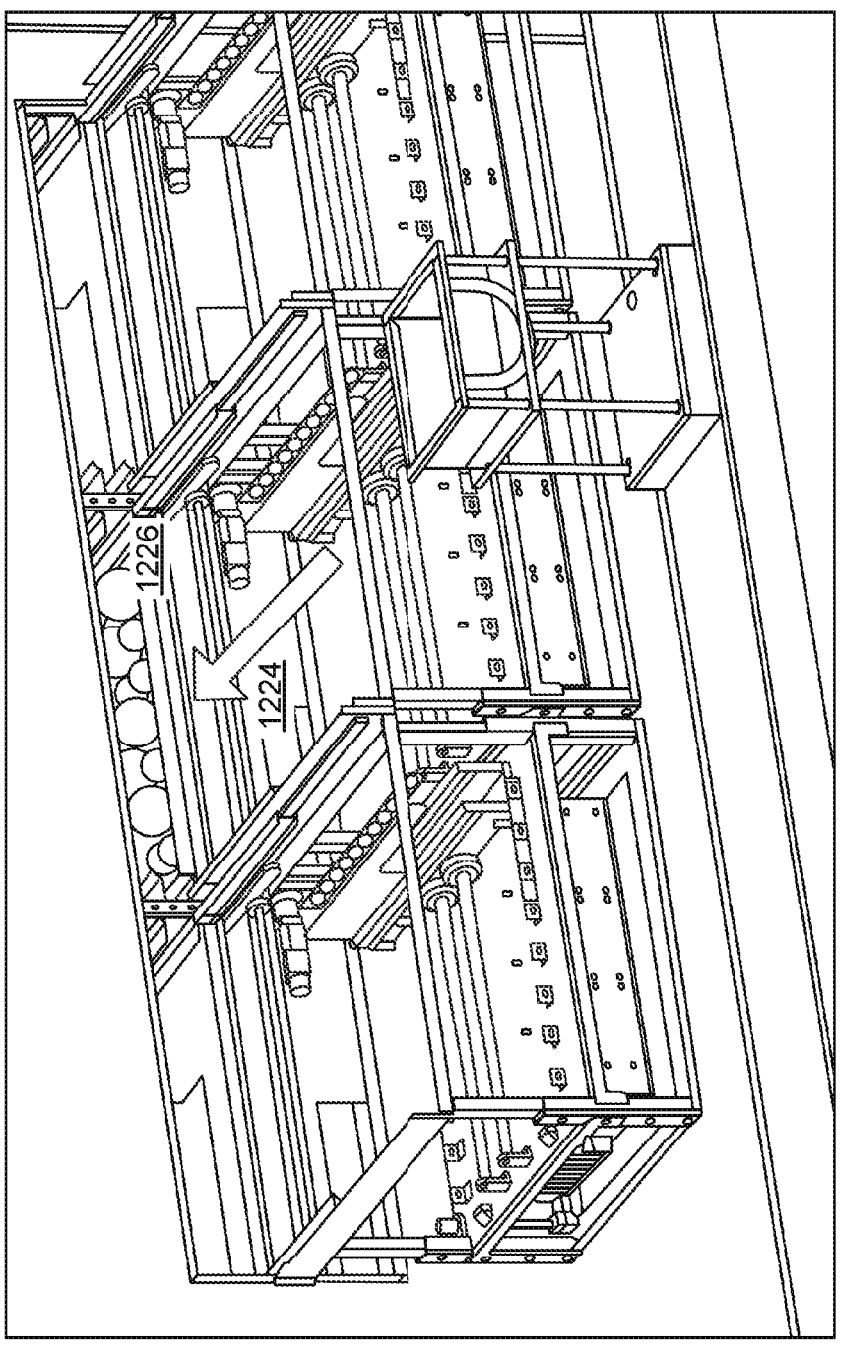
FIG. 15 shows a perspective view of forks from the frame extending into the carousel and lifting a tray.
Figures 16, 17:
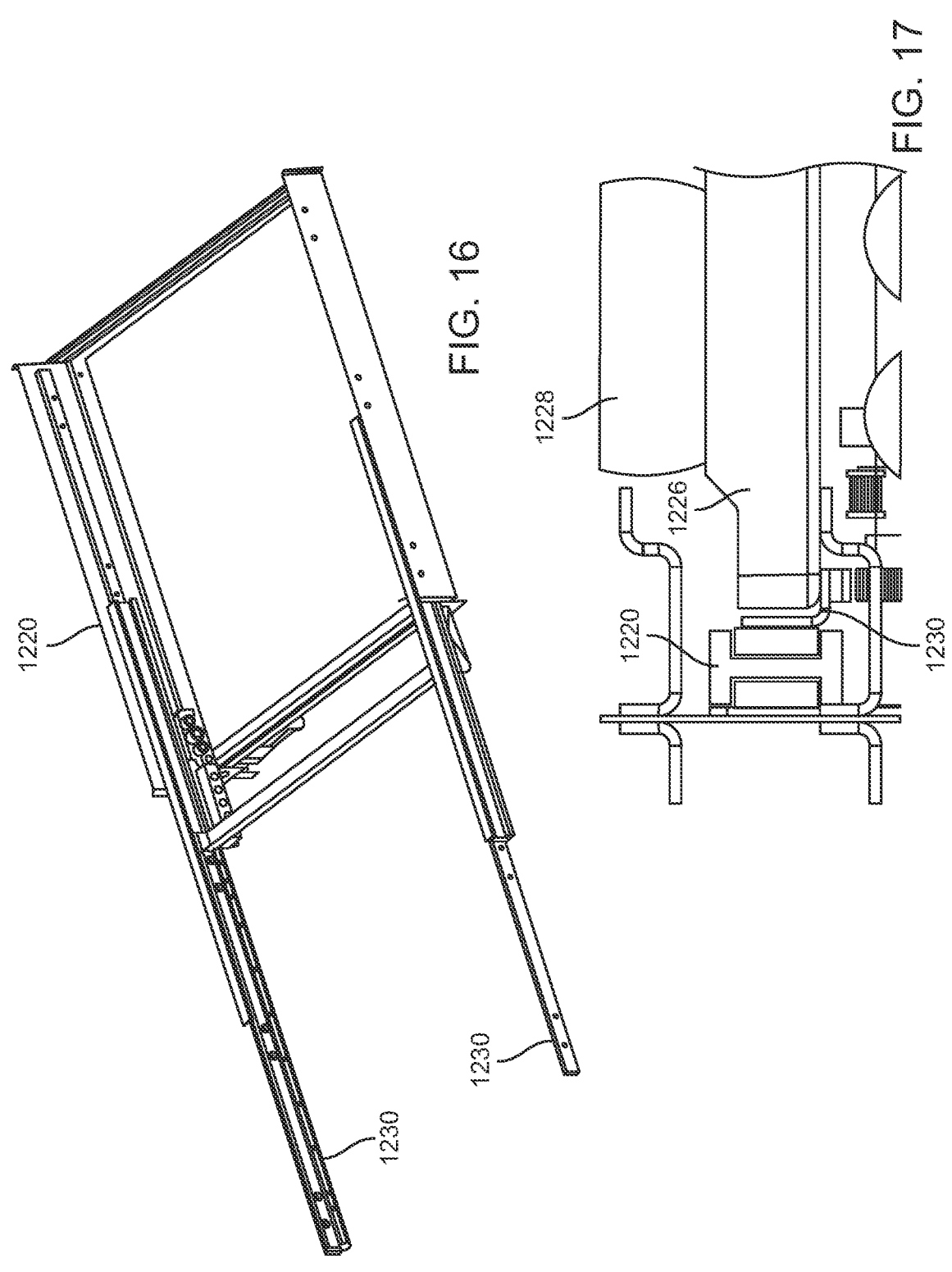
FIG. 16 shows a perspective view of the frame showing the forks extended.
FIG. 17 shows an end view of the frame showing the fork extending underneath the edge of the tray loaded with products

FIG. 15 shows a perspective view of forks from the frame extending 1224 into the carousel and lifting a tray 1226 present therein. FIG. 16 shows a perspective view of the frame 1220, showing the forks 1230 extended therefrom. FIG. 17 shows an end view of the frame 1220, showing the fork 1230 extending underneath the edge of the tray 1226 having product 1228 disposed thereon.

Details regarding the architecture of the machinery along the retrieve axis, are now described in connection with FIGS. 18-19D. In particular, FIG. 18 shows a perspective view of the frame prior to the extension of the forks.

Figures 18, 19A, 19B:
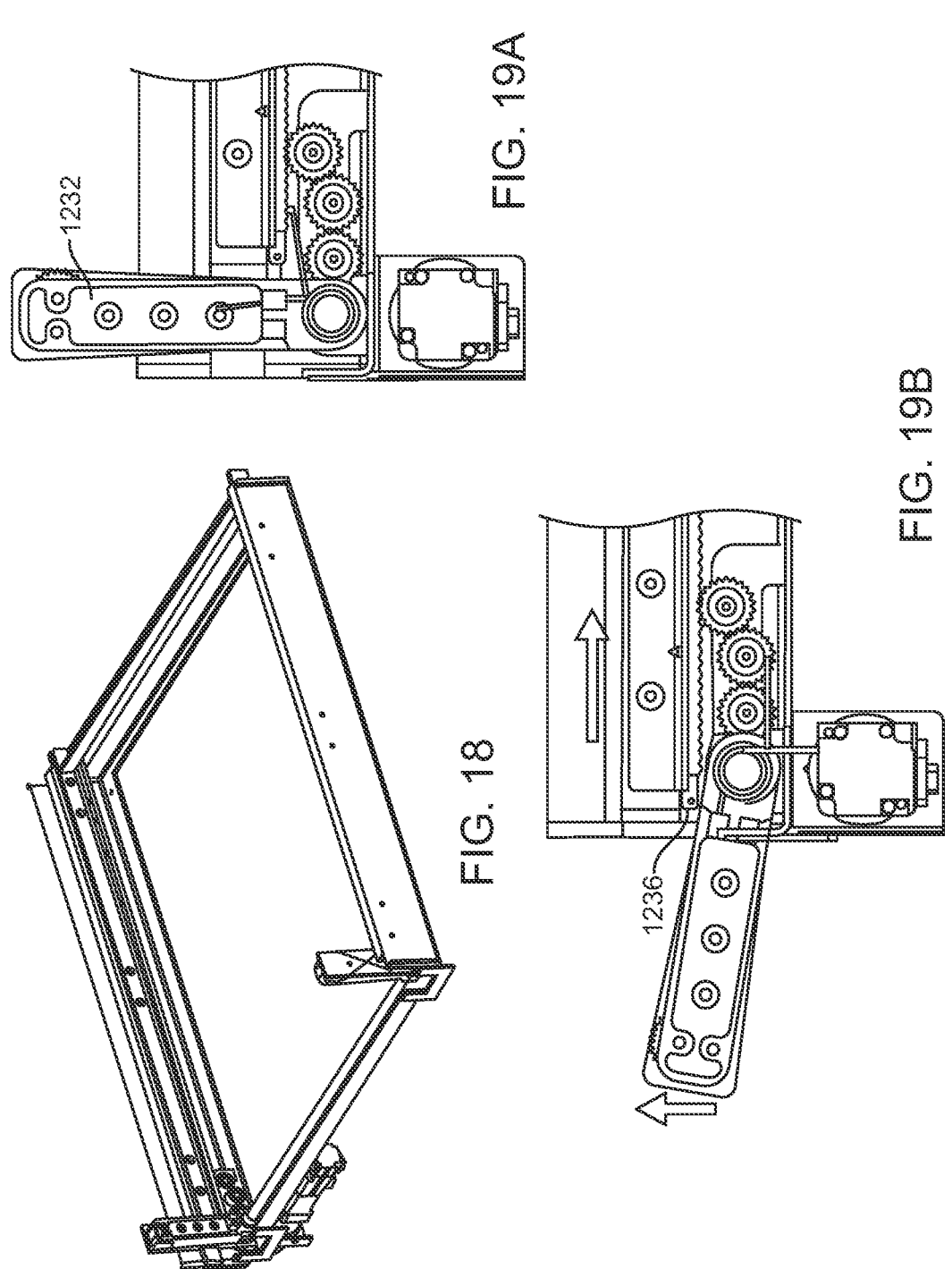
FIG. 18 shows a perspective view of the frame prior to the extension of the forks.
FIGS. 19A-D show enlarged views of the front of the frame during the retrieval process.
Figure 19C:
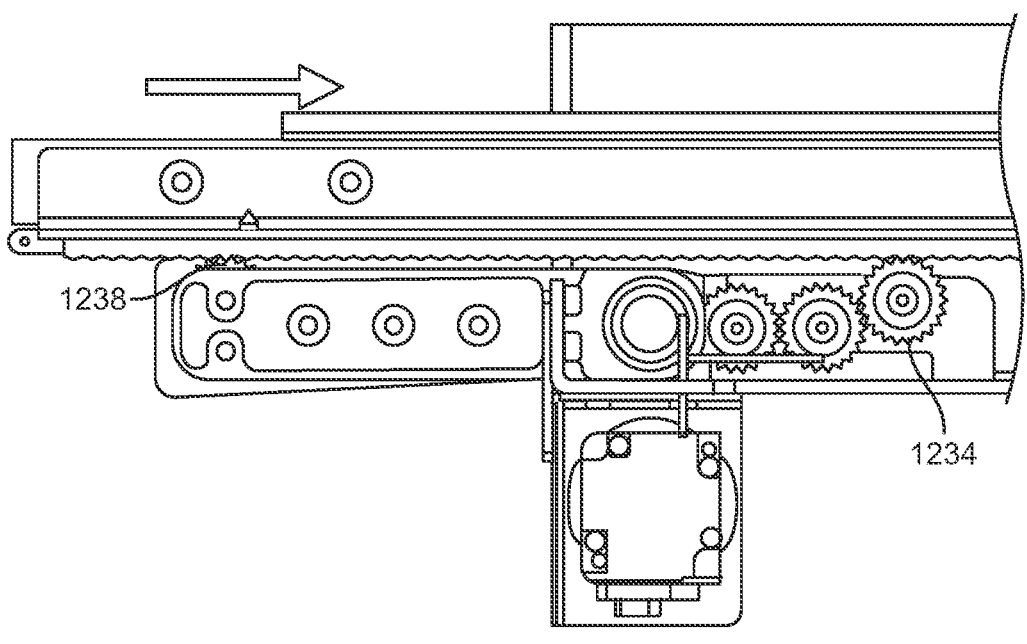
Figure 19D:
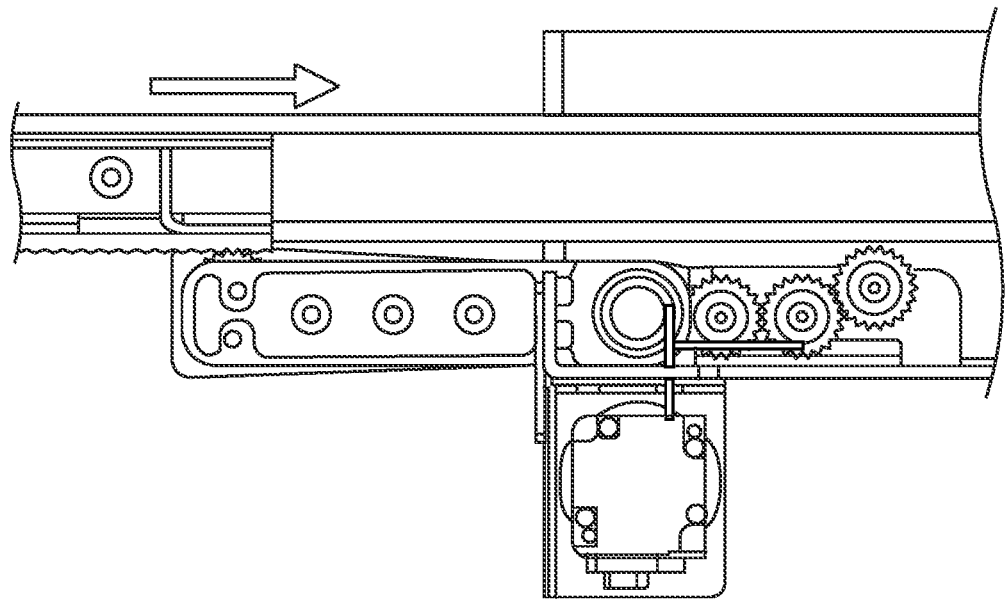

FIGS. 19A-D show enlarged views of the front of the frame during the retrieval process. In FIG. 19A, a drive flipper 1232 is spring loaded in the up position. FIGS. 19B-D show that when the fork end effector is extended by the rearward drive gear 1234, a roller interface 1236 that rides on the drive flipper pushes it down into position.

After some amount of travel, the forward drive gear 1238 engages the rack. The gearing is designed so that both drive gears can interact with the rack at the same time and pass off the rack to each other. At full extension only, the forward drive gear is engaged.

Between FIGS. 19C and 19D, the flipper raises the forks to cause the tray to come off of its supports in the carousel. A benefit is that the back side of the forks do not stick out into space, and can be flush with the end of the tool.

Figure 20:
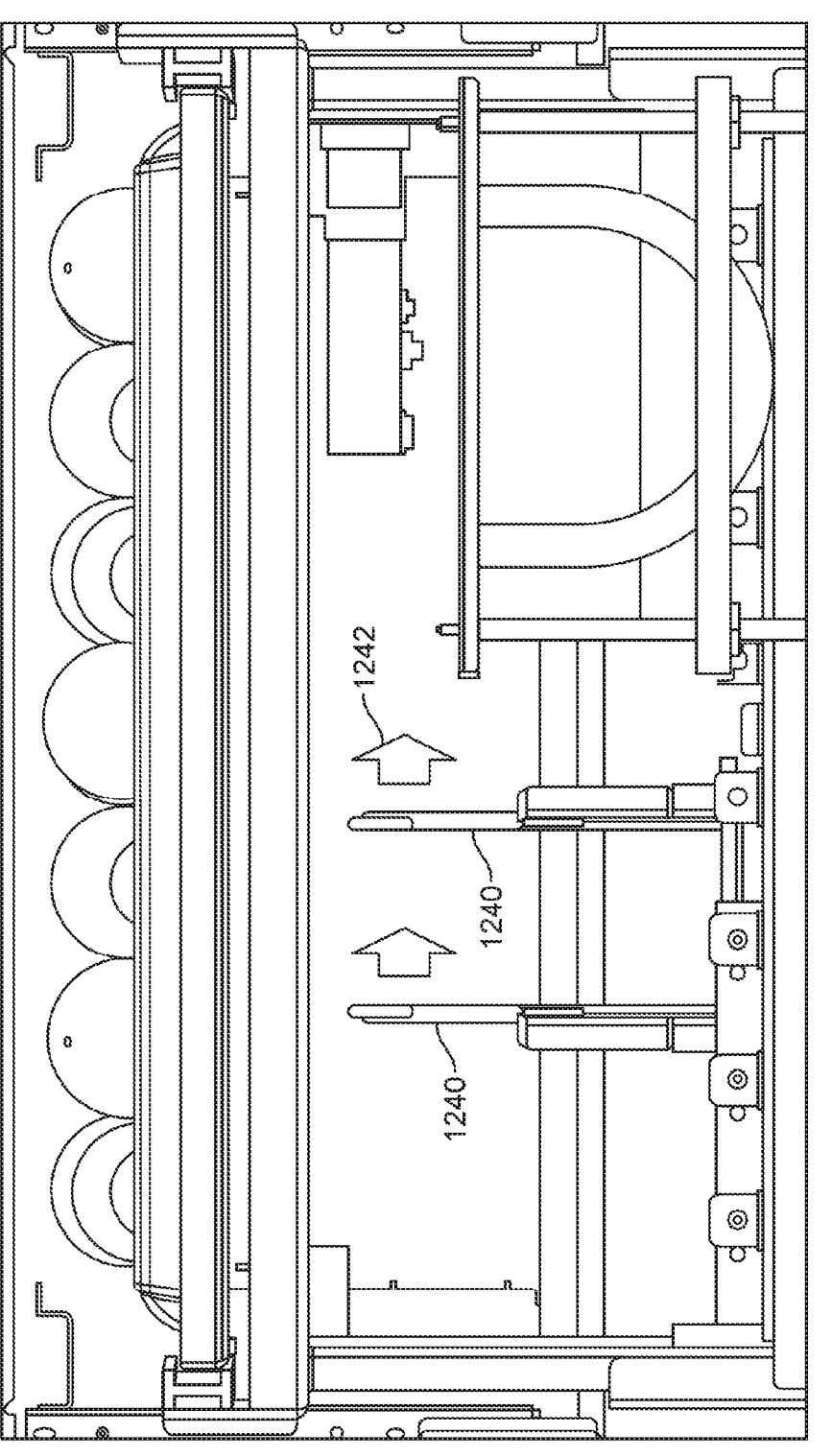
FIG. 20 is an end view of the frame with the extended forks engaging the tray as part of the retrieval process.

FIG. 20 is an end view of the frame with the extended forks engaging the tray as part of the retrieval process. As the forks lift the tray from the carousel, product conveyors 1240 move laterally 1242 to the specific pick location (i.e., underneath the row of the tray from which items are to be dispensed).

Figures 21, 22:
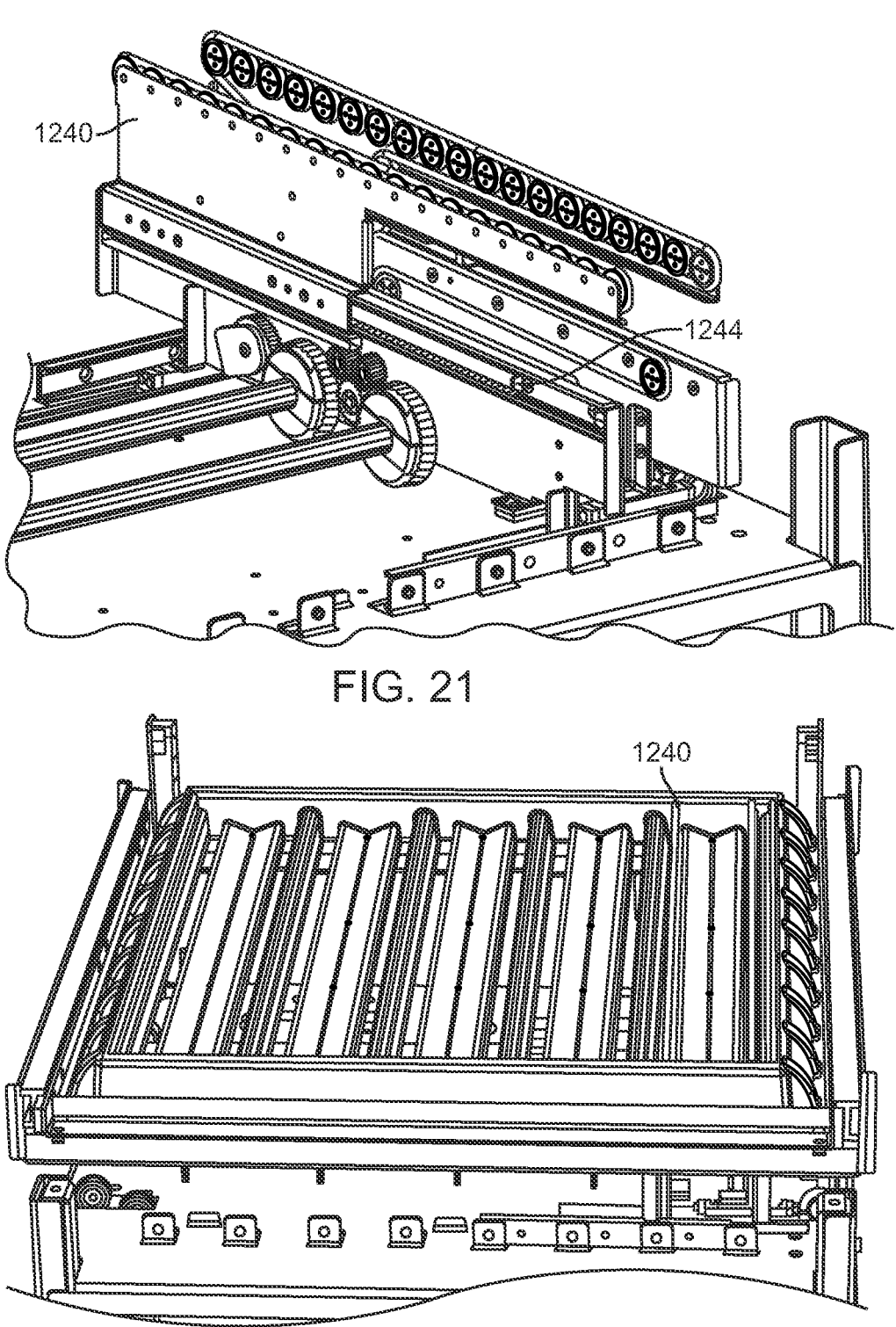
FIG. 21 shows a perspective view of a product conveyor which includes a slide.
FIG. 22 shows a perspective view of a tray (here empty for illustration) lowering over the product conveyors.
Figure 23:
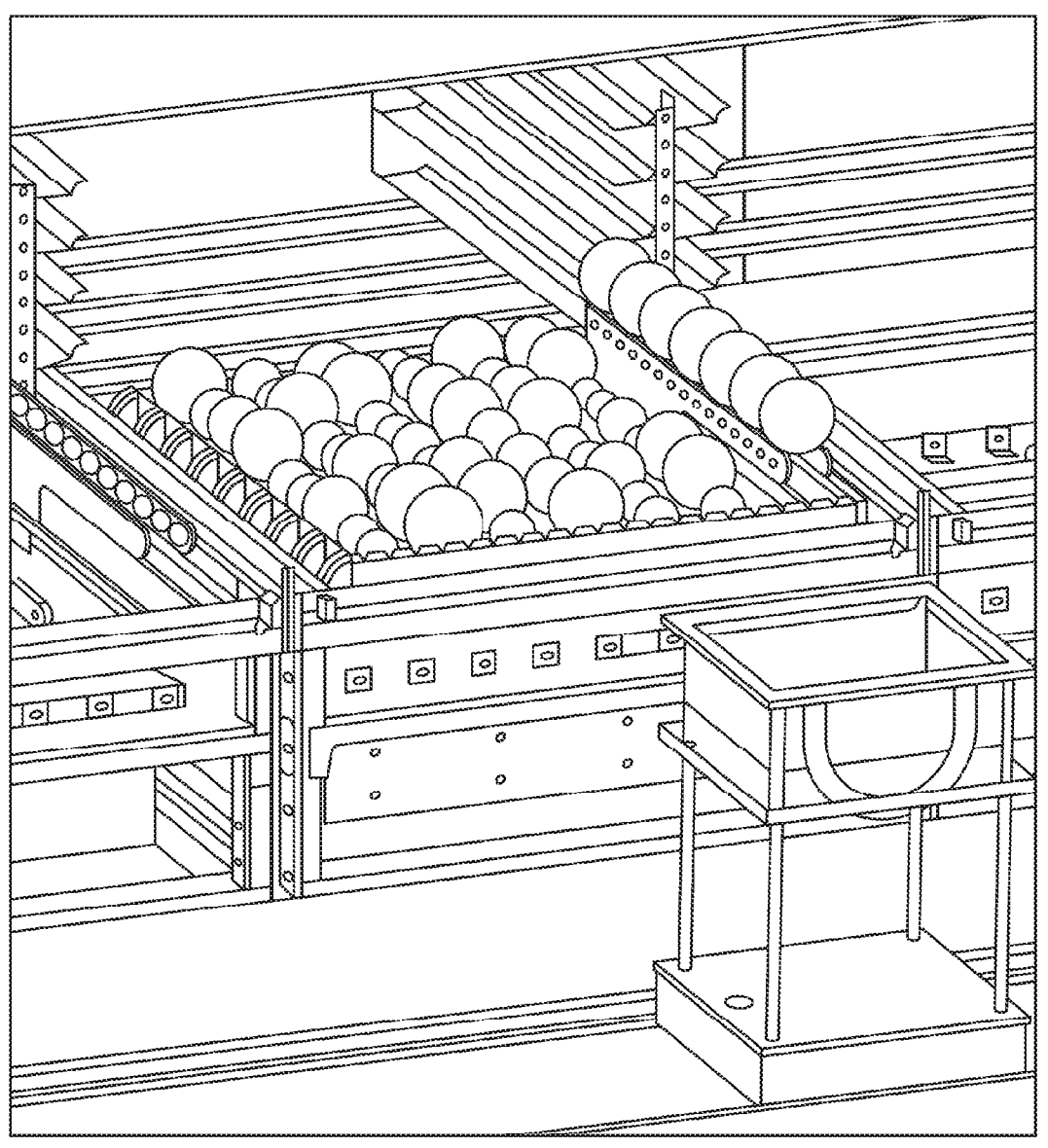
FIG. 23 shows a perspective view of the product conveyors engaging to lift the products from the lowered tray.

FIG. 21 shows a perspective view of a product conveyor 1240 which includes a slide 1244. FIG. 22 shows a perspective view of a tray (here empty for illustration) lowering over the product conveyors. FIG. 23 shows a perspective view of the product conveyors engaging to lift the products from the lowered tray.

Figure 24A:
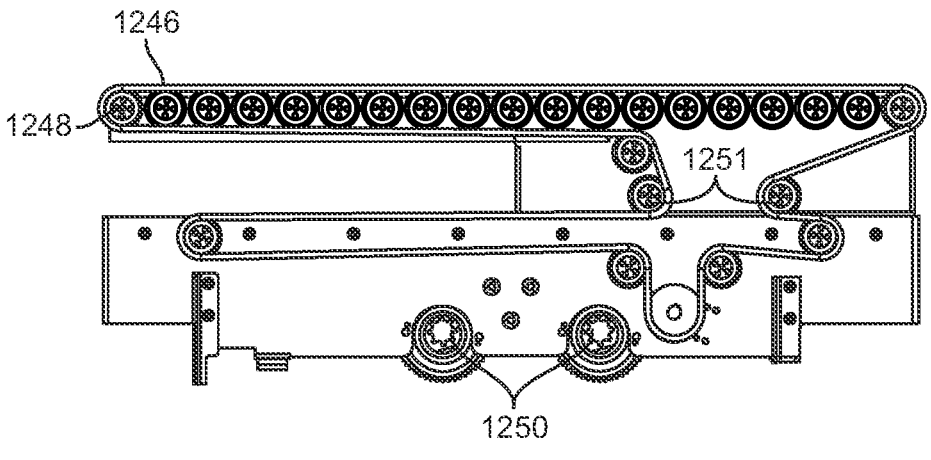
FIGS. 24A-B show side views of the product conveyor in non-extended and extended positions, respectively.
Figure 24B:
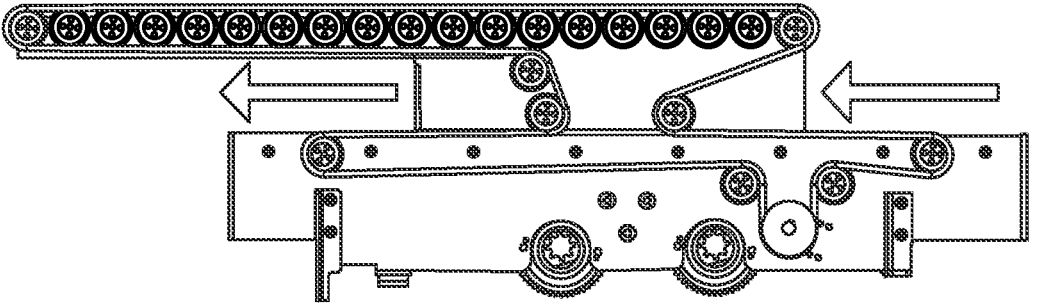
Figure 25:
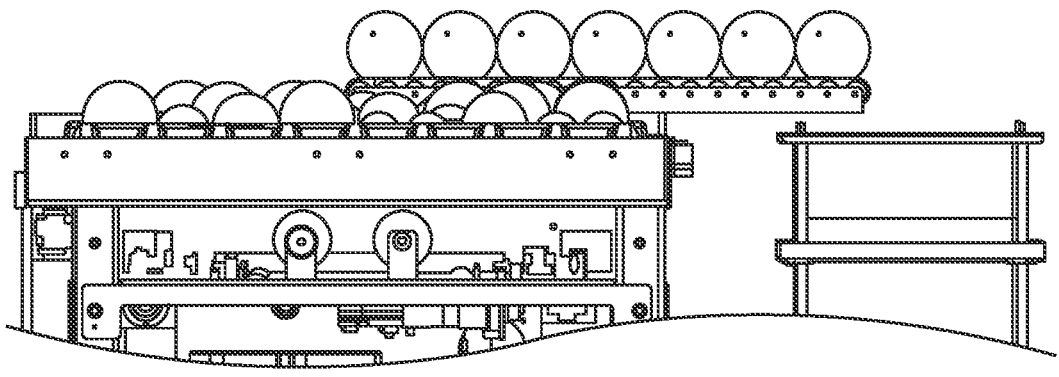
FIG. 25 shows a side view of the extended product conveyor bearing products lifted from the tray.

FIGS. 24A-B show side views of the product conveyor in non-extended and extended positions, respectively, including belt 1246 and fixed pulleys 1248. FIG. 25 shows a side view of the extended product conveyor bearing products lifted from the tray. In particular, the product conveyor can slide forward off the tray and over the customer bag, in order to drop the item in a specific location.

Here, the belt stays tensioned as it moves between fixed pulleys. Pulleys 1251 move forward and back. They stay between the outside pulleys. This helps to ensure that tension is maintained in the belt.

Belt movement and sliding action may be driven by two splines 1250 and gears so that motors are fixed under the unit, making it easily removable and cleanable. As the conveyor, 1240 slides left and right to fit into the correct slot in the tray, the spline will stay engaged with the gears that drive the sliding action and the belt movement.

Figure 26:
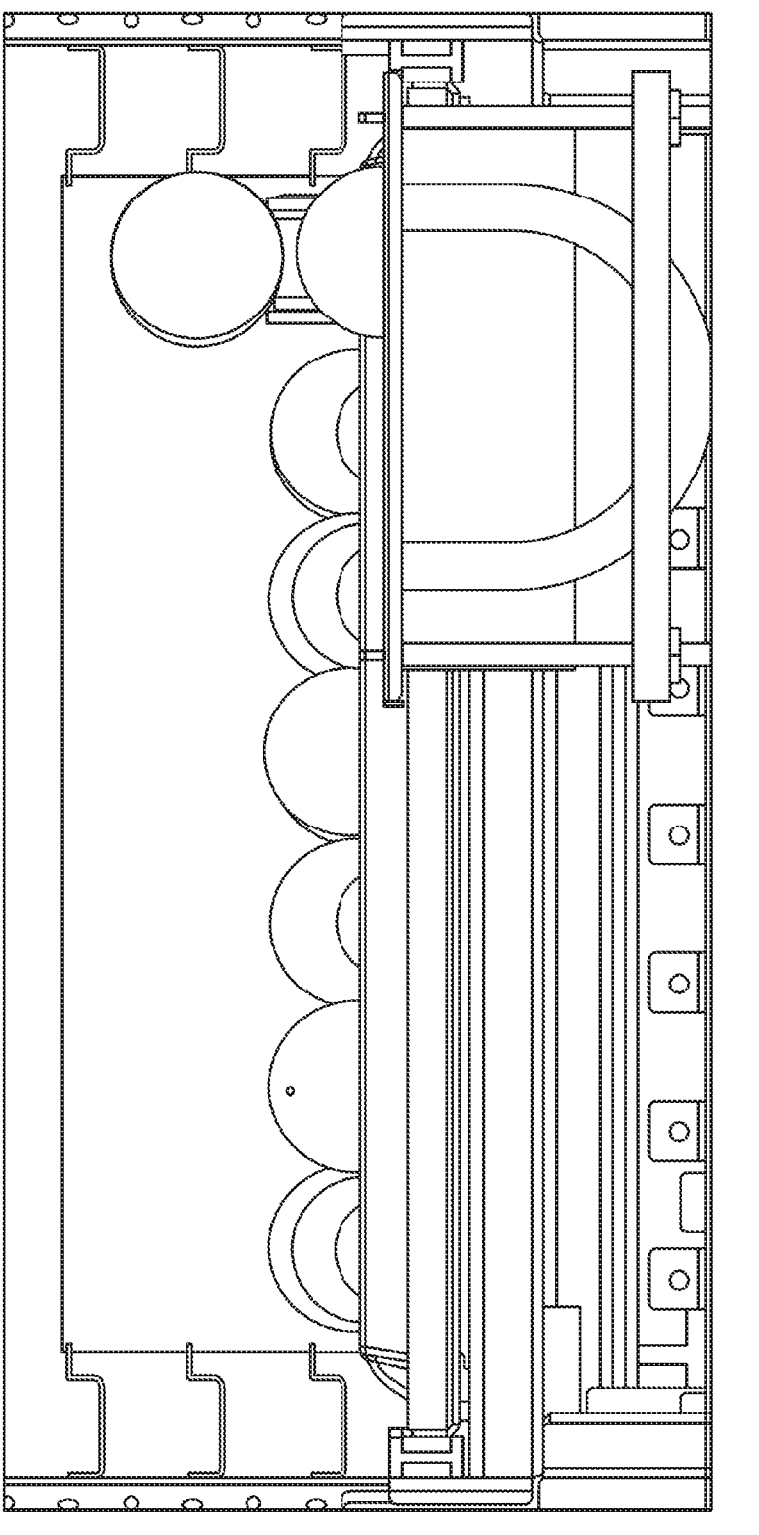
FIG. 26 shows a front view of the item being moved off of the extended product conveyor into the bag.

FIG. 26 shows a front view of the item being moved off of the extended product conveyor into the bag.

Figures 27A, 27B, 27C:
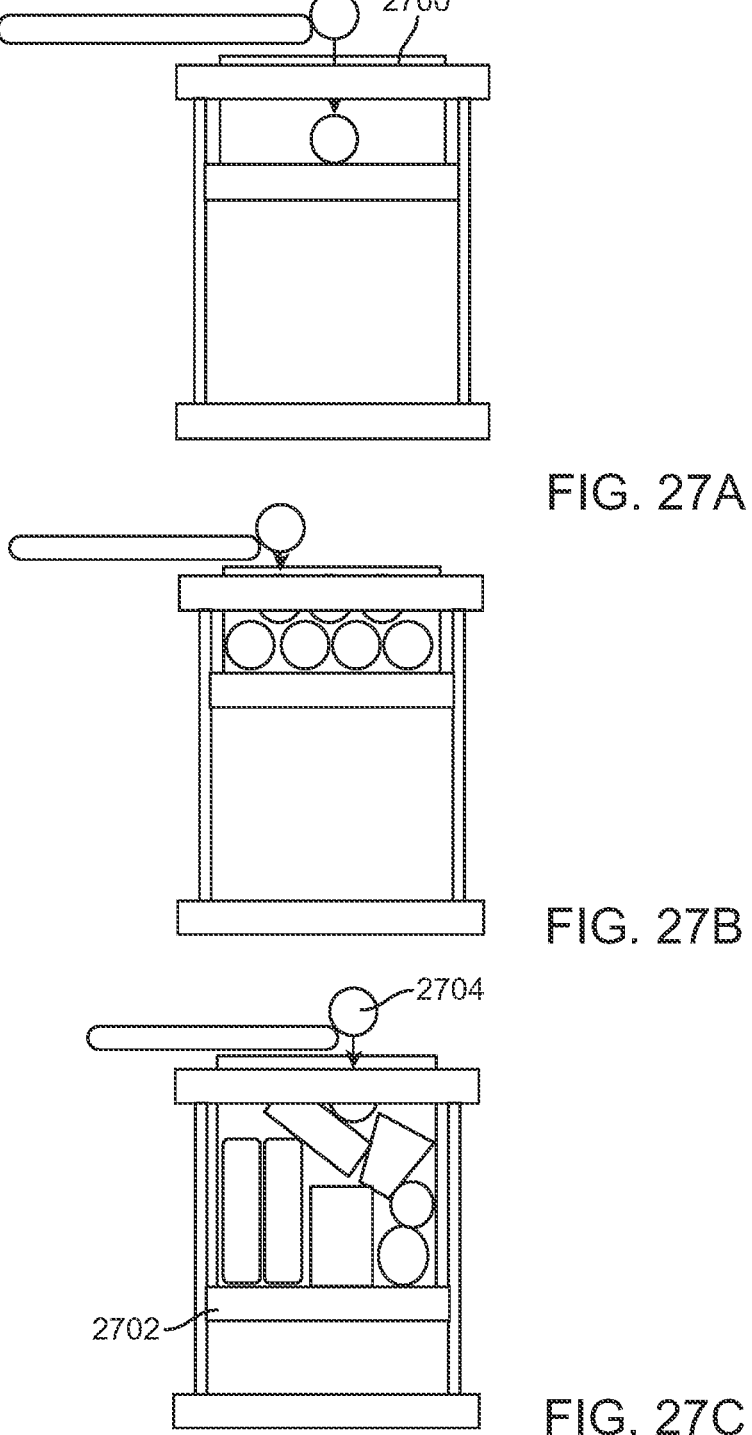
FIGS. 27A-C are side views showing a sequence of disposing a product into a bag according to an embodiment.

FIGS. 27A-C are side views showing a sequence of disposing a product into a bag according to an embodiment. At FIG. 27A, the customer bag 2700 starts bunched up at the top. FIGS. 27B-C show that as the bag becomes filled, a motor lowers the platform 2702 that the bag is sitting on, and additional items 2704 are placed on top.

A benefit of this approach is that the drop height is always the same height. Additionally, some items can be positioned in specific locations by controlling one or more parameters such as:

bag height;

conveyor position; and/or bag location.

In an example, a product in the form of a bottle of wine could be initially disposed in the tray, oriented parallel to the product conveyors. As the bottle tips over the edge of the product conveyor, the bottom of the bottle will reach the bag and stop at an angle, resting against the product conveyor. The product conveyor can then push the top of the bottle forward until it is sitting upright.

As described herein, one benefit of product handling systems according to embodiments, is that they may allow for the full diversity of products of a conventional grocery store, to be simply organized, stored, and then accessed. One feature that is particularly helpful in this regard is the tray element.

Figures 28, 28A, 28B:
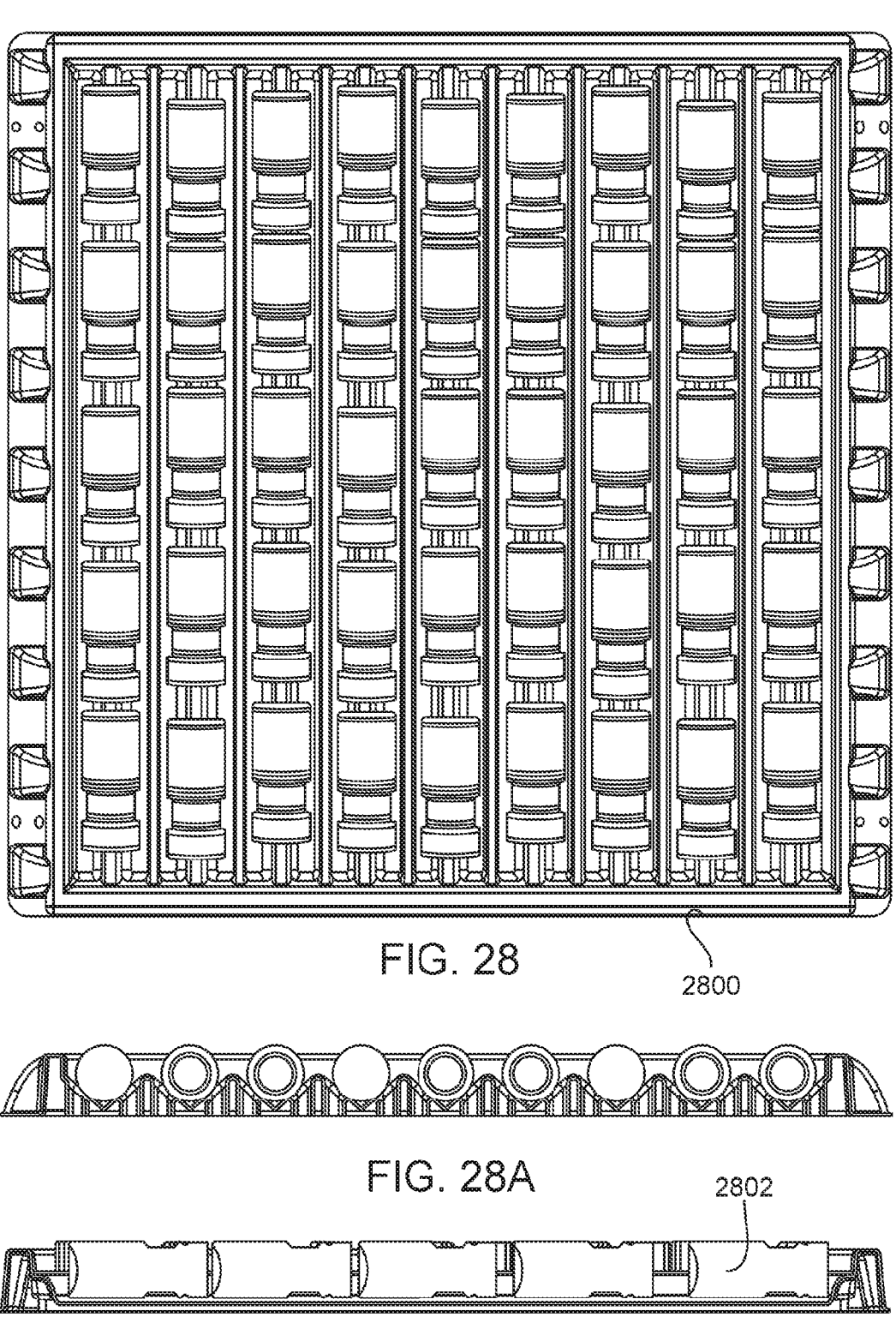
FIGS. 28-28B show views of a first tray type according to an embodiment.

Particular embodiments may feature two different tray types, each type configured in various sizes to receive different products. A first tray type is designed to store products that are round or cylindrical in shape, and hence exhibit a roughly circular cross-section FIGS. 28 and 28A-B show overhead and cross-sectional views, respectively, of such a first tray type 2800 according to an embodiment. Here the tray is supporting products 2802 of cylindrical shape having a roughly circular cross-section. These trays can also hold spherical items.

Figures 29, 29A, 29B:
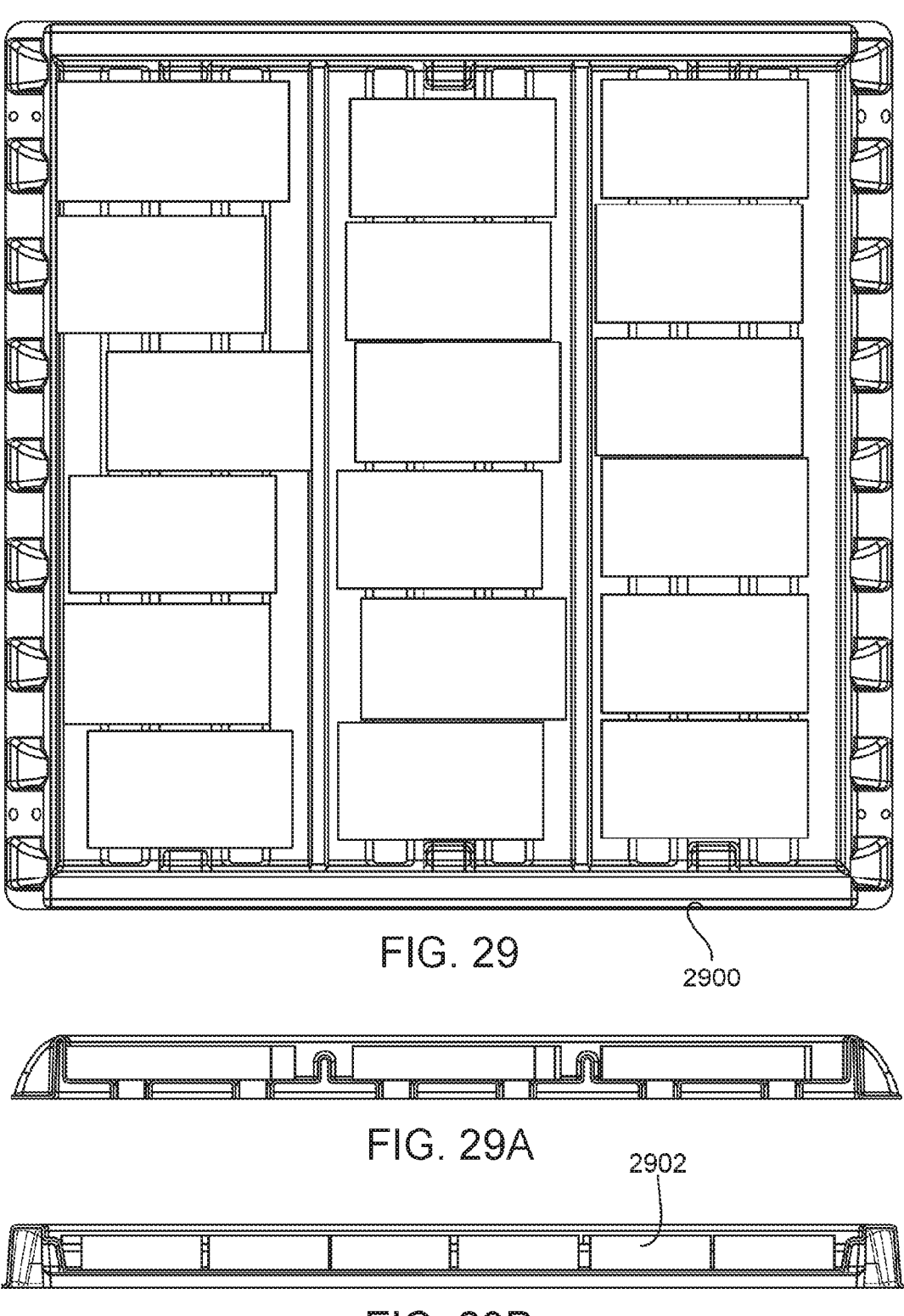
FIGS. 29-29B show views of a second tray type according to an embodiment.

By contrast, FIGS. 29 and 29A-B show overhead and cross-sectional views, respectively, of a second tray type 2900 according to one embodiment. Here the tray is supporting products 2902 of cuboid shape having a roughly rectangular cross-section. This tray type may differ from the other tray type in not having concave features configured to receive product items having a rounded cross-section.

Given these two basic types, various sizes of row dimensions may allow for the support of a wide variety of potential products, as is described in the following tables.

TABLE

| Group I (circular product cross-section) | | |
| Tray # | Range of Product Cross-Sectional Diameter (mm) | Example Product |
| --- | --- | --- |
| I.1 | ~30 to ~47 | Loose Carrot |
| I.2 | ~47 to ~65 | Avocado |
| I.3 | ~55 to ~87 | Orange |
| I.4 | ~80 to ~123 | Bell Pepper |
| I.5 | ~115 to ~155 | Cauliflower Head |
| I.6 | ~140 to ~207 | Banana Bunch |

TABLE

| Group II (rectangular product cross-section) | | |
| Tray # | Range of Product Width (mm) | Example Product |
| --- | --- | --- |
| II.1 | ~55 to ~75 | Spaghetti Box |
| II.2 | ~75 to ~95 | Cheese block |
| II.3 | ~95 to ~115 | ½ Gallon Juice |
| II.4 | ~115 to ~145 | Bag of Flour |

27

TABLE-continued

| Group II (rectangular product cross-section) | | |
| Tray # | Range of Product Width (mm) | Example Product |
| --- | --- | --- |
| II.5 | ~145 to ~195 | Gallon of Milk |
| II.6 | ~195 to ~300 | Frozen Pizza |

As previously described, embodiments may employ sensing of characteristics of products that are stored in the carousel, in order to ensure delivery at predetermined levels of freshness. One way that this can be done is by product imaging.

Figures 30, 31:
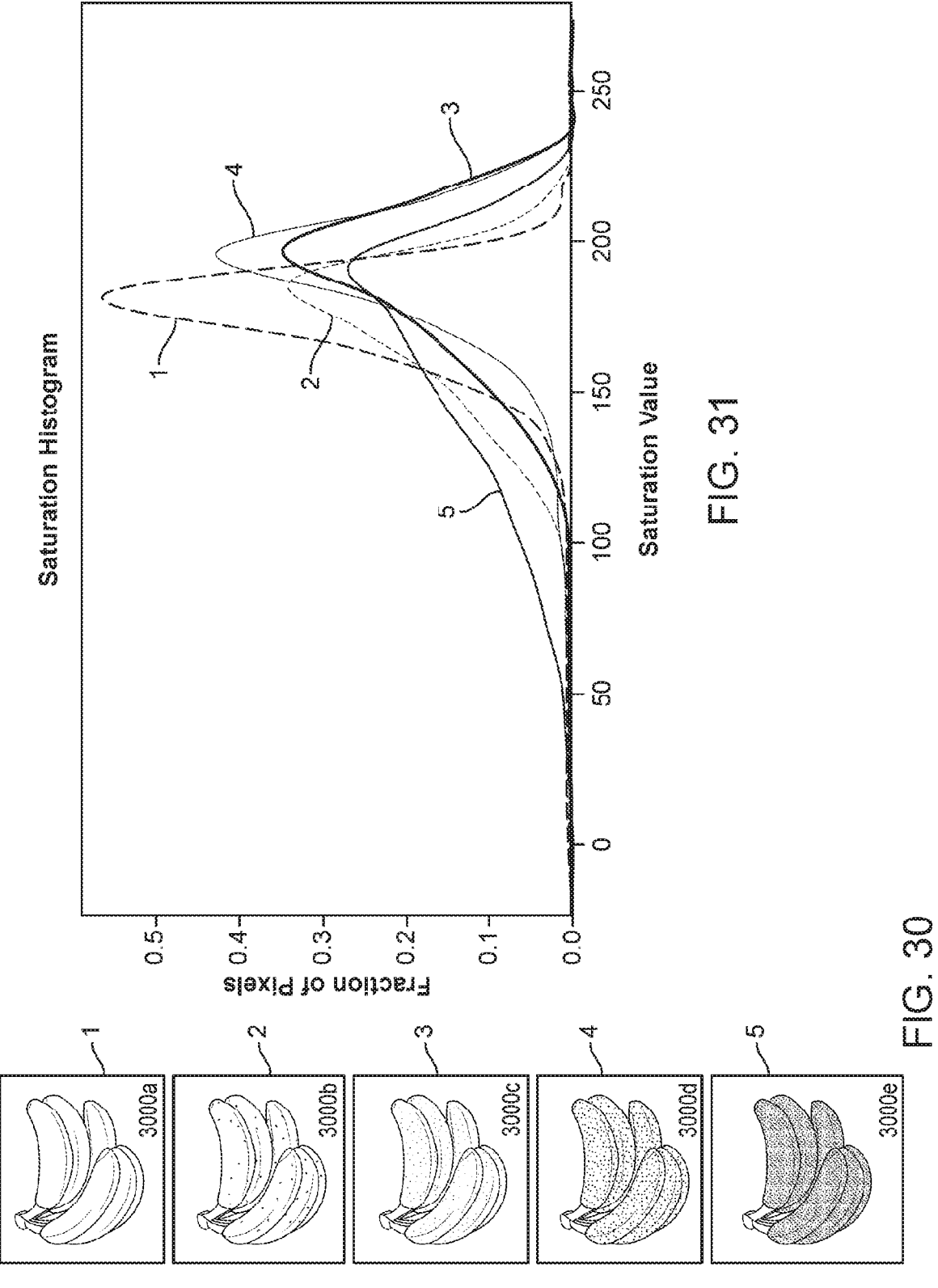
FIG. 30 shows a simplified view of an approach taking a series of optical images of a product (here a bunch of bananas) at different stage of its freshness lifetime.
FIG. 31 is a histogram of saturation data.

Specifically, optical characteristics of specific products at specific stages of freshness can be taken and recorded, in order to provide one method of quality measurement. FIG. 30 shows a simplified view of such an approach, where a series of optical images 3000a-e have been taken of a product (here a bunch of bananas) at different stage of its freshness lifetime, ranging from as harvested, to pre-ripe (e.g. green), to ripe, and then to over-ripeness (e.g., suited for banana bread), and finally to no longer consumable.

Various optical characteristics of the image may be measured for each picture and stored, and a database created from the measurements. Exemplary optical characteristics which can be sampled by imaging according to embodiments, can include one or more of the following color properties:

hue;

saturation; and/or brightness.

Using machine learning techniques in combination with artificial intelligence (AI) approaches, these images taken of produce along its freshness lifecycle, can be automatically segregated into quality groupings, depending upon how their optical properties (e.g., colors) change over time.

In one example, thirty-eight (38) images were taken of the specific bunch of bananas over its freshness lifetime. Saturation color property data for pixels of each of these images was sorted into 16 bins. Then, over ten iterations of K-means clustering, the resulting five groupings of product quality in FIG. 30 emerged.

FIG. 31 is a resulting histogram of the saturation data, showing a fraction of pixels exhibiting different values. By referencing such color properties stored in a database in connection with additional images that are acquired of new incoming produce, embodiments can immediately and accurately assign a freshness category to that incoming produce.

In summary: calculating one or more color properties of pixels in various optical images of a perishable product (such as produce), and then using that color property data in order to develop a database, can provide a model of the typical freshness life cycle of that produce. Such approaches would allow future color measurements to accurately predict a current status of newly-received instances of that perishable product during its freshness lifecycle (e.g., from harvested, to pre-ripe, to ripe, to over-ripe, to no longer useable).

It is noted that the freshness correlation just described above, is not limited to being based upon the sensed optical property of saturation. Other pixel optical data (such as from hyperspectral or multi-spectral imaging) can be referenced in the database.

Moreover, freshness prediction need not be based exclusively upon sensed optical characteristics. To enhance accuracy of the product freshness model and database, other factors could also be correlated within the database with the product and considered, including but not limited to one or more of:

diameter;

length/width/height (LWH);

weight;

shape;

blemish count;

blemish size;

detection of the presence of mold or insects;

elapsed time from harvesting;

firmness;

texture; and sugar content.

In addition to the inspection data mentioned above, data incoming with the product item from the source, could also be included in the database and correlated with expected freshness and other AI procedures. Examples of such incoming data types can include but are not limited to:

source (e.g., grower);

location (e.g., orchard #);

heat treatments;

radiation treatments;

pesticides;

organic certification;

Genetically Modified Organism (GMO);

days of sunshine;

days of rain;

harvest date;

days in storage;

transport company;

transport type;

transport conditions (e.g., temperature, duration); and time processed.

One or more of the data types described above, may be further correlated with product item data that is also stored in the database. Examples of such product item data can include:

unique product item identifier;

Stock Keeping Unit (SKU);

locations (including past locations) of the specific product item within the product handling system (e.g., by carousel, tray, tray row, row position);

textual descriptor (e.g., "golden delicious apple");

product classification (e.g., according to taxonomies set forth by international/national regulatory bodies, such as Import & Export);

brand name;

varietal;

vintage;

special notices (e.g., potentially allergenic, citations to federal/state/local regulation—e.g., Food & Drug-FDA, Agricultural-USDA);

association with other product items (e.g., by incoming shipment, by recipe, by meal kit, others);

packaging status (e.g., none/loose, paper packaging, plastic packaging, vacuum packaging, modified atmosphere packaging);

recommended shelf life.

One or more of the data types described above, may be further correlated with customer data that is also stored in the database. Examples of such customer data can include but are not limited to:

dynamic pricing data (e.g., per-quality pricing, coupons, bulk discounts);

data of product image offered to customer as part of selection process;

user feedback;

producer preferences;

repeat ordering trends;

temporal ordering trends (e.g., time of day, seasonal, annual, holiday, others);

customer location;

customer diets;

customer menus;

customer health (e.g., allergies);

inventory of items already available in customer's home.

One or more of the data types just described may be further correlated with system data that is also stored in the database. Examples of such system data can include but are not limited to:

tray identifier;

row-within-tray identifier;

position-within-row identifier;

carousel identifier;

carousel storage condition(s);

bag identifier;

storage time;

dispense time;

inter-carousel transfer time(s).

Thus according to some embodiments, the database could be a relational-type database having rows corresponding to individual incoming product items that are being handled, and various columns corresponding to different properties of that item (e.g., source, freshness state, carousel conditions, many others as mentioned herein). Such a database structure allows the data relevant to each handled product item to remain associated with that product over the entire lifetime of the handling process (e.g., from intake, through storage, retrieval, and final dispensing to the customer).

As mentioned above, embodiments may employ artificial intelligence (AI) and machine learning techniques—for example to assess product freshness and predict future freshness based upon inspection and other data types. Such AI approaches involve a specialized procedure executed by a processor, which recognizes correlations between a corpus of known starting conditions and resulting historical outcomes. The specialized procedure is trained and refined based upon the historical outcomes, and is then used to predict outcomes for new starting conditions not previously encountered (e.g., a new product being received for imaging).

Figure 32:
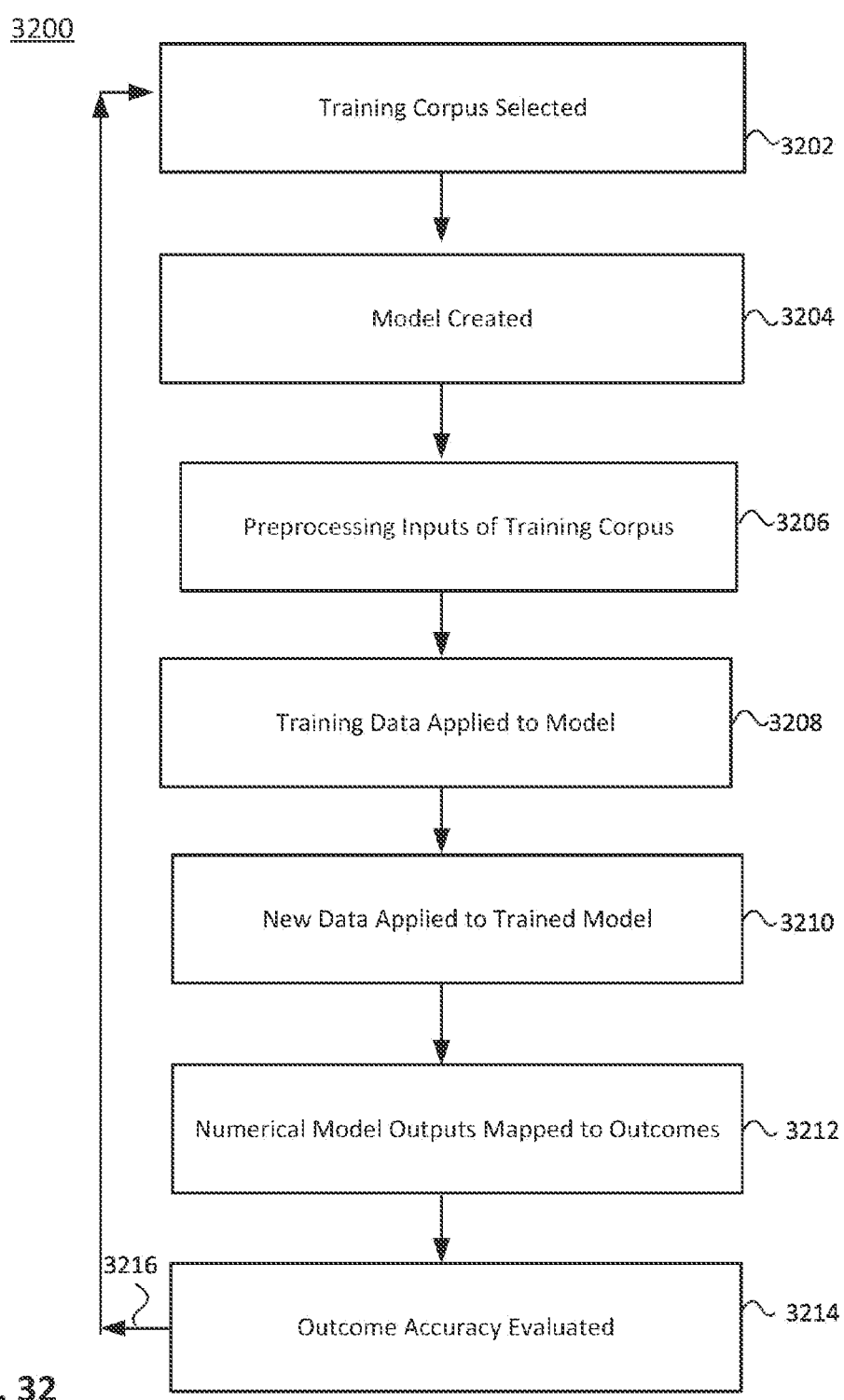
FIG. 32 shows a simplified flow diagram illustrating a machine learning process.

FIG. 32 shows a simplified flow diagram illustrating a machine learning process 3200. At 3202, a training data corpus is selected. That training data represents the various historical inputs, and the corresponding known results.

At 3204, a model for predicting the results from the corresponding inputs is created. That model is mathematical in nature, and can be in the form of weighted equations, neural nets, and others.

The model is configured to receive inputs in numerical form. Accordingly, at 3206 preprocessing is performed upon the various inputs of the training set, in order to convert them into numbers recognizable by the model. Such preprocessing can involve a variety of techniques such as normalization, tokenization, and others.

At 3208, the training data is applied to the model to refine its structure. In certain embodiments this training phase may involve the adjustment of weights within the model, to allow it to better reflect the historical results that are produced from the known inputs. These model outputs are also in numerical form, and typically represent likelihoods of a plurality of outcomes. In this manner, the model is trained by the training data.

At 3210, a new input is applied to the model that has been trained by the training data. In response, the trained model outputs a probability that the new input corresponds to a particular outcome. This application of new data to the trained model is known as the inference phase.

At 3212, the numerical results output by the model are mapped into useful information. For example, the mapping to an outcome may correlate a numerical result into to a particular product freshness state.

At 3214, the accuracy of the new predicted output can be evaluated. This evaluation of accuracy can then be fed back 3216 into the training corpus to help further refine the accurate performance of the model in predicting outcomes from new inputs. This new input is applied to the model as trained by the training data.

Figure 33:
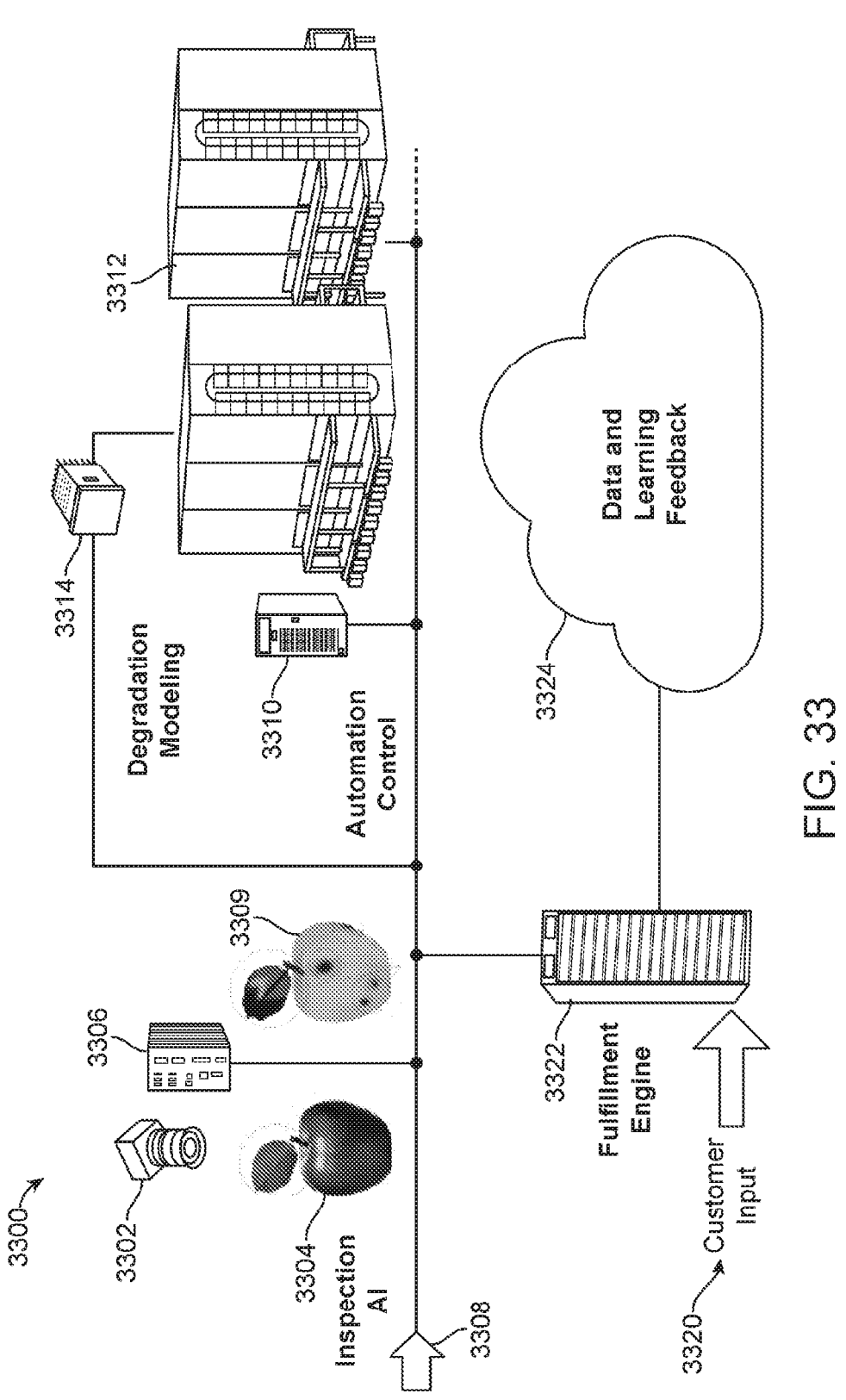
FIG. 33 shows a simplified diagram illustrating the implementation of artificial intelligence principles to product handling according to embodiments.

FIG. 33 shows a simplified diagram illustrating the implementation of artificial intelligence principles to product handling according to embodiments. System 3300 comprises imaging camera 3302 that performs an optical inspection upon incoming perishable product 3304 (here an apple). That optical inspection may be for visible wavelengths, multiple wavelengths (multi-spectral imaging), or may include other than visible wavelengths (hyperspectral imaging).

The optical data resulting from the optical inspection is stored in database 3306. As described previously, other data may also be stored in the database, for example incoming product source and transportation data 3308.

Based upon this stored data, an assessment of the physical state 3309 of the product may be produced by an inspection artificial intelligence model. That state may reveal blemishes or other features characteristic of product freshness (e.g., water content).

The product is then routed by automation control 3310 to a particular carousel 3312 based upon considerations such as its freshness, expected shelf life, and popularity. A separate AI degradation model 3314 may predict the progression of the stored product through its freshness lifecycle (e.g., as harvested, pre-ripe, ripe, overripe, not usable). This degradation model can ensure that only products of an accurately predicted freshness, are ultimately dispensed to the customer according to his or her preferences.

In particular, FIG. 33 also shows a customer input 3320 received by a fulfillment engine 3322. The engine processes the input, and in response causes the carousel to dispense the product at its known state of freshness according to the AI model. As described above, the fulfillment engine may utilize data including learning feedback 3324 (e.g., from the customer) in order to enhance the accuracy of this product dispensing process.

As described herein, artificial intelligence and machine learning approaches may prove useful in predicting a number of different type of outcomes in the overall product handling process. One example is using automated quality prediction procedures and models in order to separate Stock Keeping Units (SKUs) into quality groups that a consumer can select from between based upon their preferences. Actual images of the individual items may be offered to the customer during this product selection process.

Artificial intelligence and machine learning approaches may also be utilized in connection with dynamic pricing of specific items. That is, automated quality prediction procedures and models can be used to dynamically price each individual item based upon properties such as freshness, expected expiration, and demand.

Automated quality prediction models may also be referenced in order to rank the individual product items belonging to a SKU, by their ripeness and expiration dates.

In summary, the following table lists several AI models, together with their expected inputs and outputs.

| AI Model | Input | Output |
|---|---|---|
| Inspection | Optical data<br>Other inspection data (e.g., detection of mold, ethylene, etc.) | Product Blemishes<br>Product Water Content |
| Freshness Lifecycle | Optical<br>Product Blemishes<br>Source/Transport data<br>Other inspection data (e.g., detection of mold, ethylene, etc.) | Product Freshness State<br>Expiration Date |
| Product Pricing | Freshness State<br>Customer Data | Dynamic Product Price |
| Product Ranking | Multiple Product SKUs<br>Multiple Product Freshness States | Multiple Product SKUs Grouped by Freshness State |
| Product Storage | Freshness State<br>Storage Conditions<br>Other Storage Factors (e.g., allergies, typical purchase with other products)<br>Popularity (e.g., possible bottlenecks)<br>Expected Depth Location in Bag | Location of Product for storage in Carousel and Tray of Product Handling System |
| Product Dispensing | Freshness State<br>Product Ranking<br>Customer Preferences<br>Expected Depth Location in Bag | Bag for Receiving Dispensed Product |

Successful application of various such AI approaches may help to ensure that a product exhibiting the quality desired by a customer, can be rapidly and efficiently delivered to that customer. For example, the consumer may be offered his or her selection of SKUs in a way that allows the customer to always consume the item at peak ripeness. This can lead to increased customer satisfaction.

Product handling systems according to embodiments, may provide the customer with the ability to purchase a set of individual product items belonging to a particular SKU, with each individual item turning ripe on the day requested by the customer.

Embodiments may also provide the customer with the ability to purchase individual product items belonging to a complementary set of SKUs. That is, items belonging to certain SKUs may commonly be purchased together (e.g., cake ingredients), and the system facilitates handling and delivery of a set of those SKU items together.

Embodiments also allow for dynamic pricing of handled items. By generating and storing in the database an up-to-date and accurate assessment of product quality and expiration date for each item, the items can be dynamically priced for sale. For example, aging produce having an earlier expiration date can be dynamically priced at a lower value, allowing for more rapid sale and product turnover, and reducing waste.

Product handling approaches according to embodiments can exhibit increased efficiency and flexibility in other ways. For example, the large number of data types stored in the database and available to various AI models, can permit automatic filtering of a consumer's product choices or meal kit choices. This filtering can be based upon stored factors such as consumer diets, consumer allergies, and current availability of bulk items in stock at a consumer's home.

As described above, product handling methods and apparatuses according to embodiments, may be particularly useful for delivering perishable items. In some embodiments the shelf life of a product may be measured in days, for example in the case of fresh produce. Other products may have lifespans that are significantly longer than a week, for example pre-packaged products or aged items such as cheese and wine. Examples of product lifespans may be accommodated according to embodiments are 1 day, 2 days, 3 days, 4 days, 5 days, 6 days, 1 week, 2 weeks, 1 month, 6 months, 1 year, and 5 years.

While the above description has focused upon the handling and storage of perishable items, embodiments are not limited to such examples. Alternative embodiments can store non-perishable goods, e.g., those expected to have lifetime of five years or greater.

Clause 1C. A method comprising:

receiving a perishable product item;

sensing an optical image of the perishable product item, the optical image comprising a plurality of pixels;

calculating color properties for at least some of the plurality of pixels;

storing the color properties in a database; and predicting a freshness state of the perishable product item based upon the color properties, by referencing a freshness model trained according to historical freshness data.

Clause 2C. A method as in Clause 1C further comprising:

identifying a blemish on the perishable product item based upon the color properties, by referencing an inspection model trained according to historical blemish data; and storing the blemish in the database.

Clause 3C. A method as in Clause 2C wherein the freshness model further considers the blemish in predicting the freshness state.

Clause 4C. A method as in Clause 1C further comprising:

loading the perishable product item into a carousel maintained under an environmental condition based upon the freshness state; and storing the environmental condition in the database.

Clause 5C. A method as in Clause 4C further comprising:

controlling the environmental condition based upon the freshness state to prolong a freshness of the perishable product item.

Clause 6C. A method as in Clause 4C further comprising dispensing the perishable product item from the carousel by, causing a product conveyor to protrude through an opening in the tray to contact the perishable product item, and advancing the conveyor to cause the perishable product item to fall into a bag having a bottom positioned at a first height proximate to the conveyor.

Clause 7C. A method as in Clause 6C further comprising:

lowering the bottom of the bag away from the conveyor prior to receiving another product item dispensed on top of the perishable product item.

Clause 8C. A method as in Clause 6C wherein the dispensing is in response to a consumer input accepting a price of the perishable product item.

Clause 9C. A method as in Clause 8C further comprising:

dynamically calculating the price according to a price model based upon the freshness state.

Clause 10C. A method as in Clause 8C further comprising:

prior to receiving the consumer input, separating the perishable product item into a freshness grouping based upon the freshness state and a consumer preference stored in the database.

Clause 11C. A method as in Clause 8C further comprising:

prior to receiving the consumer input, displaying the optical image to the consumer.

Clause 12C. An apparatus comprising:

a product handling carousel storing a perishable product item under an environmental condition;

a database storing a freshness state of the perishable product, a carousel identifier, and the environmental condition;

a fulfillment engine configured to reference the freshness state and the carousel identifier in response to a customer input, and cause the carousel to dispense the perishable product item into a bag.

Clause 13C. An apparatus as in Clause 12C further comprising a frame having forks extendable to retrieve a tray from the product handling carousel.

Clause 14C. An apparatus as in Clause 12C further comprising a product conveyor configured to, protrude through an opening in a tray to contact the perishable product item, and advance to cause the perishable product item to fall into a bag having a bottom positioned at a first height proximate to the conveyor.

Clause 15C. An apparatus as in Clause 14C wherein the frame is moveable to lower the tray over the product conveyor.

Clause 16C. An apparatus as in Clause 14C further comprising a moveable platform configured to lower a bottom of the bag upon receiving the perishable product item.

Clause 17C. An apparatus as in Clause 12C wherein:

the perishable product item exhibiting an approximately circular cross section is supported on a tray of a first type; or the perishable product item exhibiting an approximately rectangular cross section is supported on a tray of a second type.

Clause 18C. An apparatus as in Clause 12C further comprising a camera configured to:

sense an image of the perishable product item, the image comprising a plurality of pixels;

calculate color properties for at least some of the plurality of pixels; and store in the database, the color properties associated with the perishable product item.

Clause 19C. An apparatus as in Clause 18C wherein the database is configured to store the color properties together with at least one of system data, customer data, and incoming data associated with the perishable product item.

Clause 20C. An apparatus as in Clause 18C wherein the fulfillment engine is configured to: process the color properties to generate a freshness state for the perishable product item; and store in the database, the freshness state associated with the perishable product item.

Further details regarding the inspection of products to determine defects, are now described. Embodiments may use machine learning in combination with inspection to detect defects in produce based on their area and defect type.

There are at least two ways to inspect for defects. A first approach involves developing a model for each variety of produce. This amounts to around 700 different models.

An alternative approach develops a universal model for each defect. Examples of such universal models could comprise a bruise model and a cut skin model. This defect-based approach results in only about 40 models being needed, reducing development time and enhancing robustness.

Specifically, utilizing visual/near-infrared imaging in combination with machine learning, allows object detection for product item quality. Camera systems are used to take images of produce in a controlled lighting environment.

The images cover wavelengths in the visible RGB range as well as in the near infrared (NIR) wavelength range. This can be accomplished with multiple cameras (e.g. one RGB camera and one NIR camera), or a single multi-channel camera.

Specific filters can be added to the cameras to focus the inspection on a particular band of wavelengths, especially for the NIR camera. Each of the image modalities may reveal different types of defects on produce. For example, FIGS. 34A-B show NIR images, and FIGS. 34C-D show RGB images.

The acquired images are labeled, and then used to train machine learning models to detect defect(s) that may be present. The models can be trained in at least two different ways.

According to one approach, a model is trained to detect all possible kinds of defects on a single type of item (e.g., apples), by using a training set comprising known defects on a series of images taken of that one item type.

According to another approach, a model is trained to detect a specific defect (e.g., a bruise) across many types of produce (e.g. as found on apples, pears, tomatoes, peaches, etc.) using a training set comprising images including the specific defect on a variety of produce types.

The object-detection type model is one possible example. Here, the RetinaNet deep learning algorithm was adapted for this purpose. The size of the resulting bounding box around the detected defect, indicates the size of the defect.

The resulting information on differentiated defects in the images, and the size of each defect, is combined with a produce-specific algorithm to determine a quality grading for the item.

Moreover, this information can also be combined with other information (including harvest date, prior storage conditions, future storage conditions, etc.) in a procedure which predicts how the produce will ripen or degrade over time.

While the above has described inspection of items utilizing a camera, this is not required. As an alternative or supplement to a camera, a spectrometer may also be used.

Specifically, spectrometer measurements (e.g., reflection, absorbance, transmission, etc.) of an item in the VIS/NIR wavelength range (−350-2500 nm), permits analysis of the external/internal properties of the item, which can include but are not limited to:

color;

external defects;

internal browning;

dry matter content;

sugar content;

firmness;

rot; and others.

In one implementation, portable spectrometers have been developed for agricultural applications in inspecting produce before picking, or for later handheld inspection of individual pieces of produce.

An embodiment of a process according to a particular example, may take spectrometer VIS/NIR measurements of incoming produce items. That spectrometer data may be correlated with quality, defects, and current ripeness level of produce. FIG. 35 shows a simplified spectrograph.

The spectrometer ripeness prediction is combined with data from other camera inspection systems and historical information on produce (e.g., date picked, variety, growing location, previous storage conditions, storage conditions while in grocery store). This data may be used to assess optimal time to deliver produce to customer and predict timeline for how produce will ripen and/or decay while in the grocery store. This approach reduces waste, improves operations/logistics, and improves customer satisfaction.

Products may be inspected prior to entering storage in the carousel(s). Product lifetime may be estimated based upon the inspection results.

In some embodiments, however, products can be automatically inspected after storage, either exclusively or in combination with inspection prior to storage. Such post-storage inspection can employ one or more of the following techniques.

Cameras may be used to inspect a full tray or products directly after being pulled from the carousel. Cameras may also inspect individual products after they are removed from a tray and before they are dispensed into a bag.

Moreover, sensors other than visual sensors (e.g., cameras) may be employed to inspect the products. For example, berries degrade quickly by getting moldy—a negative experience for the customer.

It is possible to sense mold by "sniffing" the gas around the product. In once embodiment, a nozzle could just be positioned to suck air from inside a clamshell enclosing a berry. The sampled air could then be analyzed. In another approach each case could go through a closed box where the air is analyzed for mold spores.

Details regarding apparatuses that may be utilized for product inspection, are now provided. A variety of methods may flip and/or spin product items during camera inspections to allow interrogation from multiple sides.

Product item shapes may be generally classified into spheres, cylinders, and cuboids. After inspection, the items are sorted into trays based on various criteria. A number of approaches may be used to place items onto trays as part of intake, inspection, and/or sorting of individual unique product items incoming to the system.

One approach utilizes a pivoting belt conveyor. FIGS. 36A-B show perspective views of a single conveyor having a linkage that can be angled from flat over a range of angles.

Items can translate through the conveyor. FIGS. 37A-F show simplified views of pivoting belt conveyor flows.

Figure 37A:
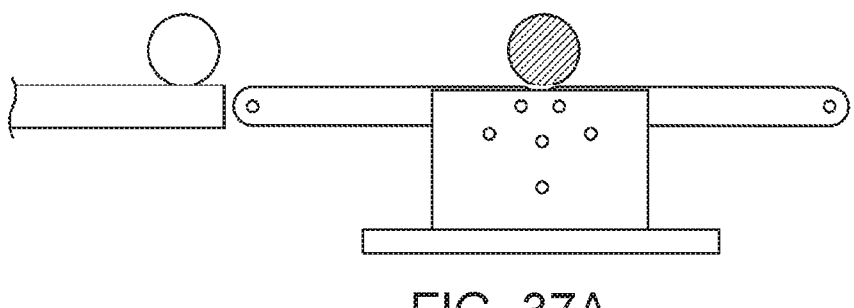
FIGS. 37A-F show simplified views of pivoting belt conveyor flows.
Figure 37B:
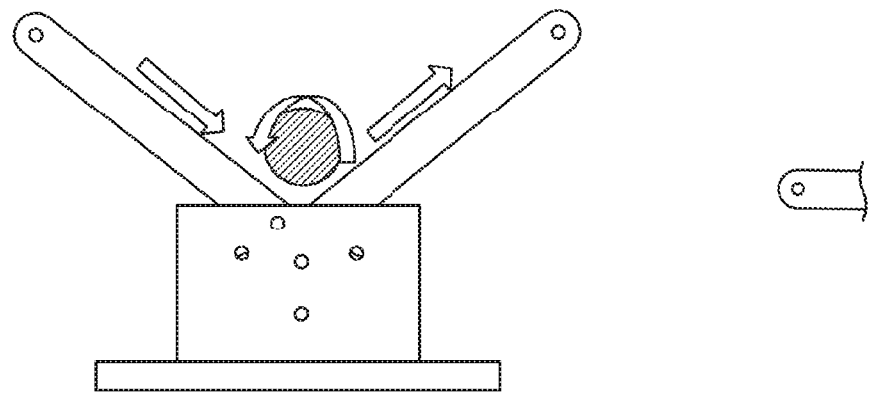
Figure 37C:
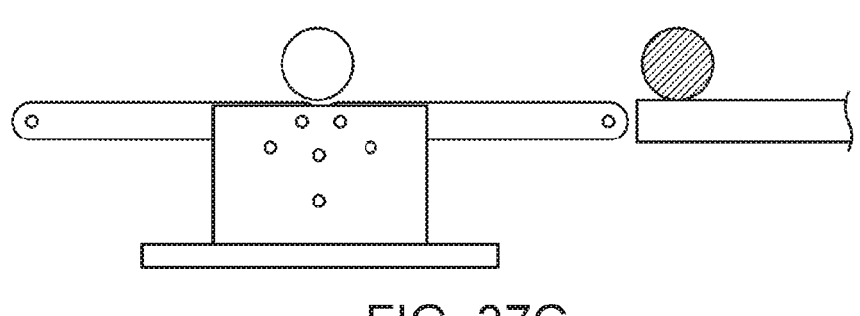

Spheres and cylinders will roll when the conveyor is rotated up at an angle. This is shown in FIGS. 37A-C.

Figures 37D, 37E, 37F:
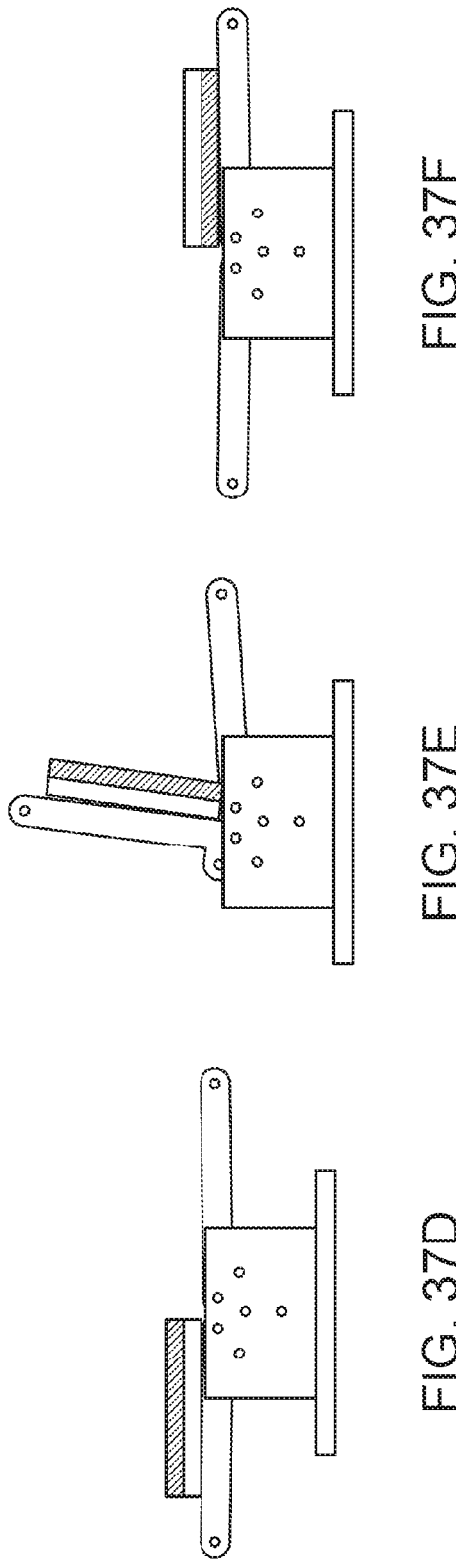
Figures 38A, 38B, 38C, 38D:
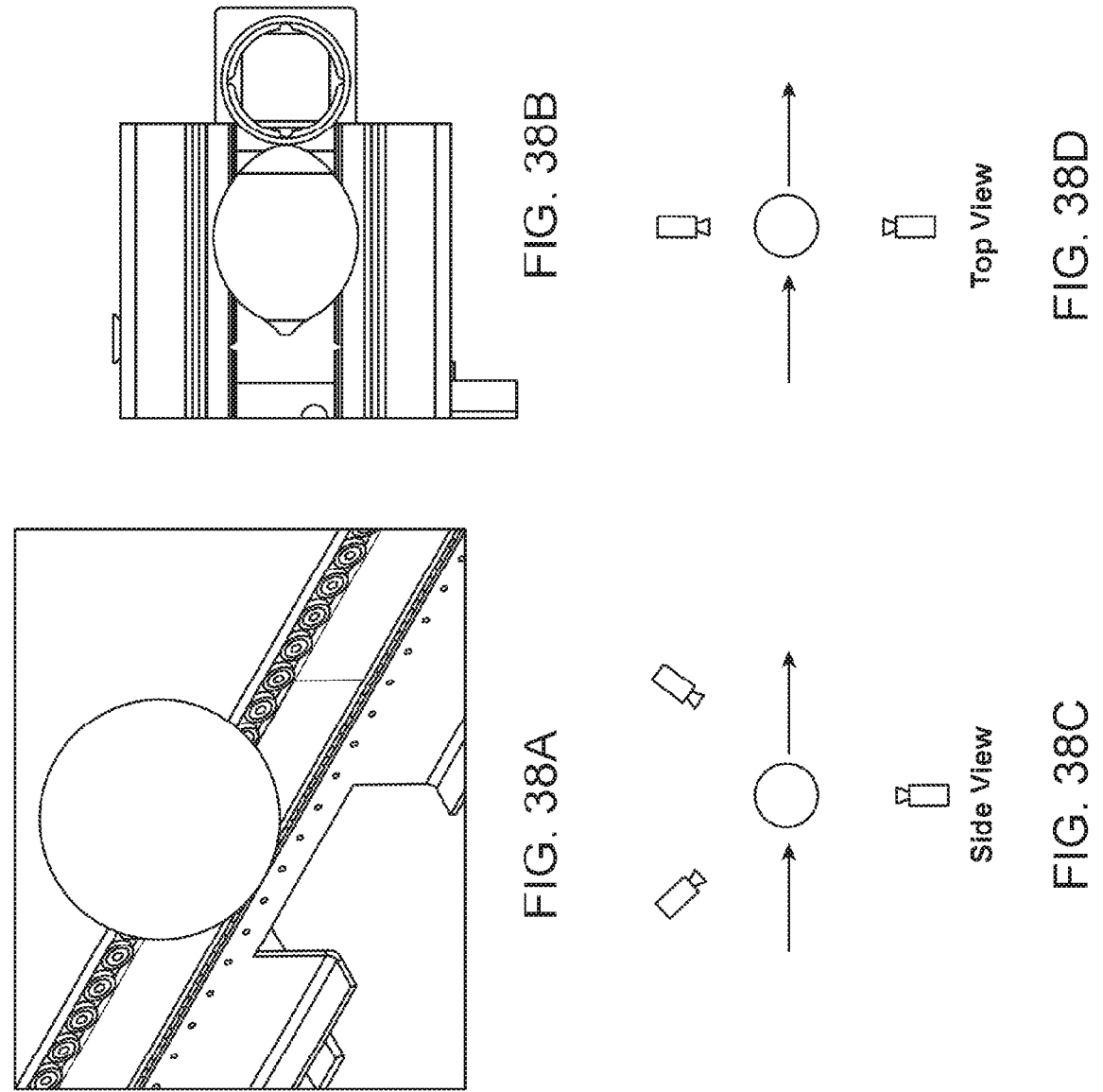
FIGS. 38A-D show various views of an embodiment of a simple convey with multiple cameras approach.

Also, the unit can fold over itself in order to flip a box item. This is shown in FIGS. 37D-F.

It is noted that two O-ring belt conveyors can convey almost all items. And, cameras from 6 directions take images of the items. FIGS. 38A-D show various views of an embodiment of such a simple convey with multiple cameras approach. Using six cameras as shown, all sides of the item can be imaged quickly.

Figures 39A, 39B:
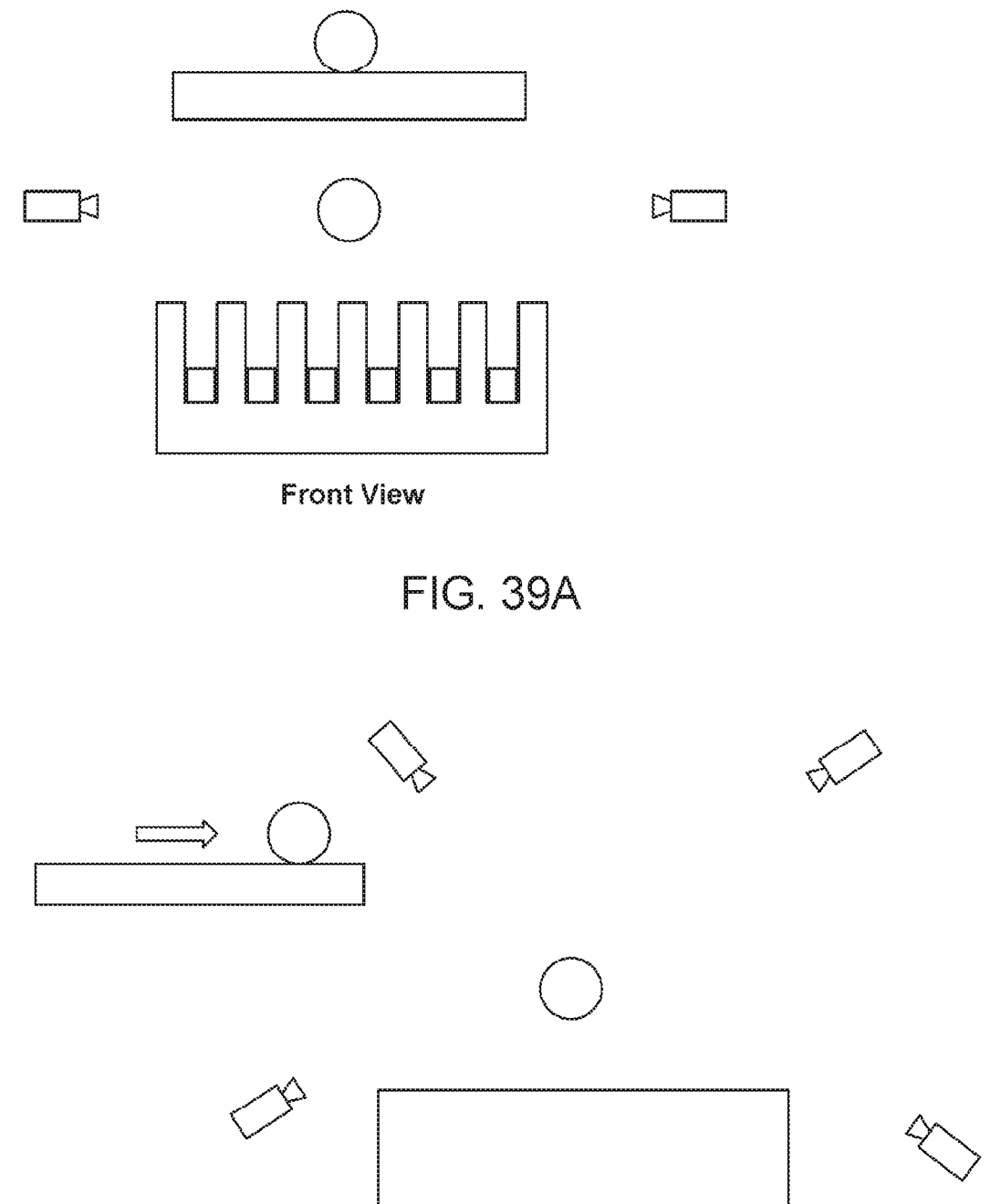
FIGS. 39A-B show different views of an approach imaging items in free fall.

Certain approaches may utilize free fall imaging of items. That is, as items fall off of a conveyor, they are imaged in the air. FIGS. 39A-B show different views of such an approach.

Multiple cameras capture all sides of the items. The item is caught with a cushioned conveyor or other soft landing pad, before moving the produce further along the conveyor. This method allows for quick image capture of all sides of an item, without having to deal with other hardware being in the camera field of view. This permits a single machine learning model to be used with the images taken from all cameras.

Figure 40:
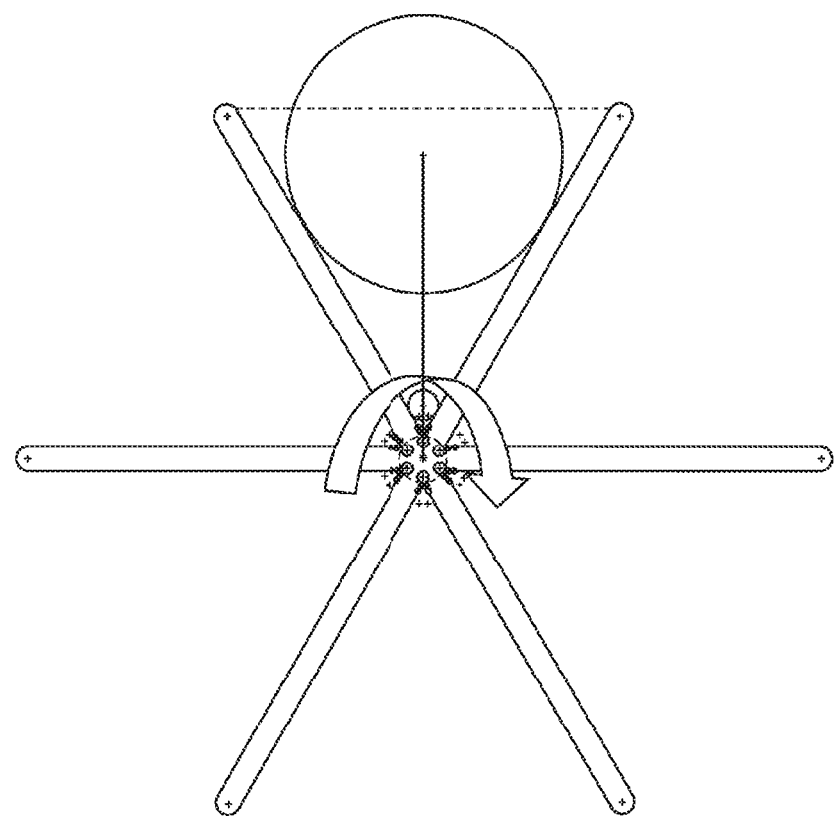
FIG. 40 shows a side view of a star wheel conveyor according to an embodiment.
Figure 40A:
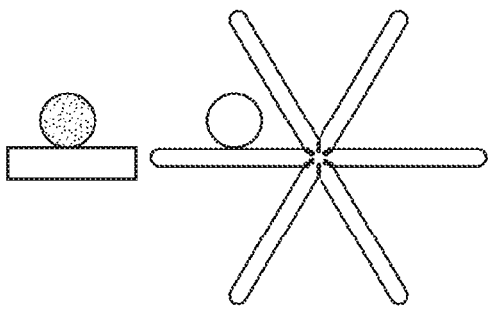
FIGS. 40A-C show simplified views illustrating that spheres and cylinders can be rotated as the conveyor belt runs.
Figure 40B:
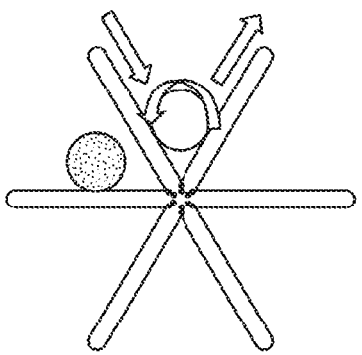
Figure 40C:
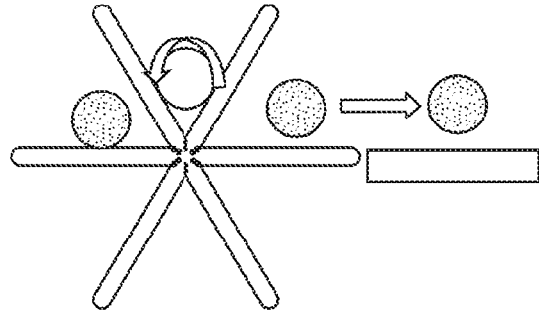

Another possible approach utilizes a star wheel conveyor, as shown in FIG. 40. The star wheel conveyor is a multi-arm conveyor that can rotate. FIGS. 40A-C show simplified views illustrating that spheres and cylinders can be rotated as the conveyor belt runs. When in the 12 o'clock position, the item can be imaged while rotated.

Figure 40D:
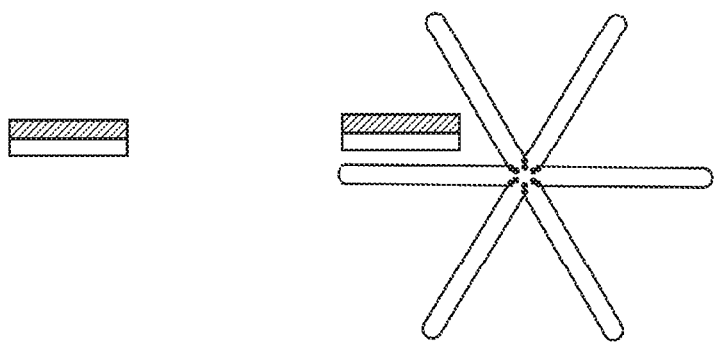
FIGS. 40D-F show simplified views of the flipping of cuboid items when going through the system.
Figure 40E:
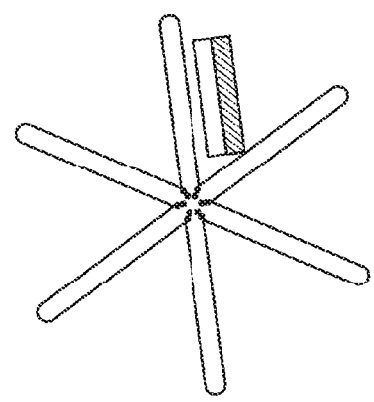
Figure 40F:
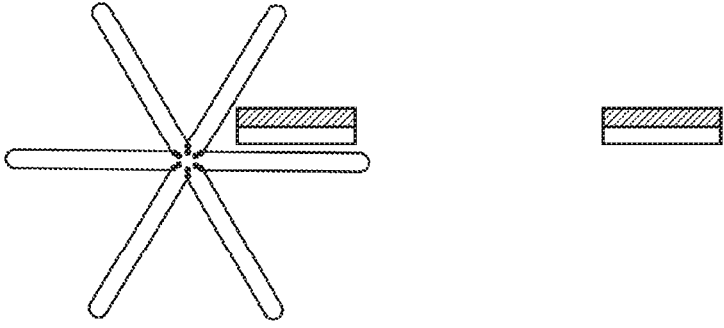

Cuboid items can be flipped when going through the system. This is shown in FIGS. 40D-F.

Such a star wheel conveyor allows many items to be completely imaged with a limited number of cameras. The cameras may have the same mechanical components in the FOV, which simplifies the machine learning.

Figure 41A:
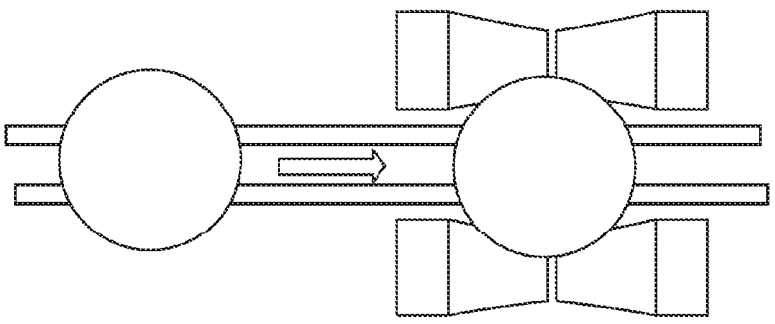
FIG. 41A shows a top view.
Figure 41B:
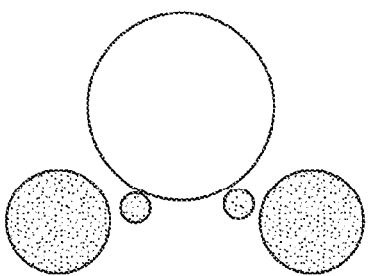
FIGS. 41B-C show end views, of a popup roller conveyor.
Figure 41C:
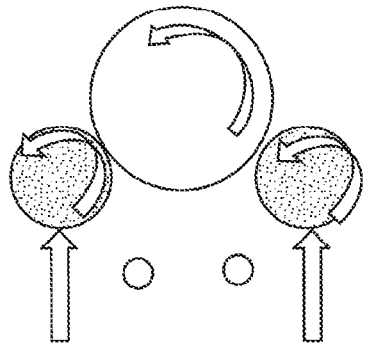

Still another approach may utilize a popup roller conveyor. FIG. 41A shows a top view, and FIGS. 41B-C show end views of such a mechanism.

According to this approach, two o-ring belts convey items in the store. The rollers pop up next to the conveyor when the item is in place. Cylinders and spheres are rolled along the conveyor, thereby presenting all sides of the item to a few cameras. Different size rollers may be used based on the item size.

This system allows for a majority of items to be fully imaged with a limited number of limited cameras. The cameras may have the same mechanical components in the FOV, which simplifies the machine learning strategies.

Figure 42A:
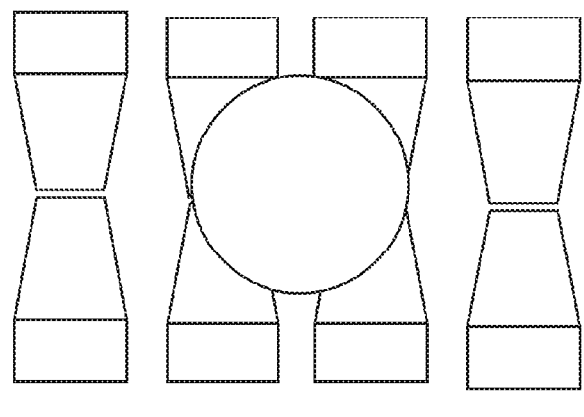
FIG. 42A shows a top view.
Figure 42B:
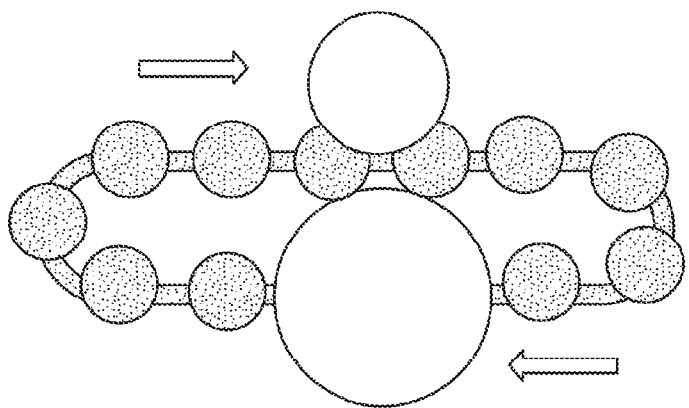
FIGS. 42B-C show perspective end views of an embodiment of a roller and spinner conveyor mechanism.
Figure 42C:
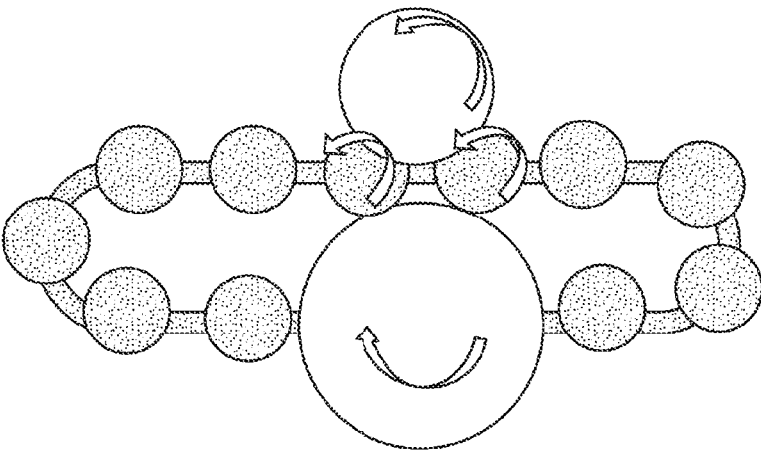

Another mechanism that may be useful for handling items within the system, is a roller and spinner conveyor. FIG. 42A shows a top view, and FIGS. 42B-C show perspective end views of an embodiment utilizing this approach.

Here, the conveyor comprises trapezoidal rollers, and items are carried along by the conveyor. The roller/spinner conveyor stops and the rollers spin, thereby rolling cylinders and spheres. Again, this action allows sides of the item to be presented to only a few cameras. The cameras will have the same mechanical components in the FOV, which simplifies the machine learning.

FIGS. 43A-45C show other possible approaches for handling items for positioning onto a tray. These methods, described below, can be utilized alone or in various combinations.

Figure 43A:
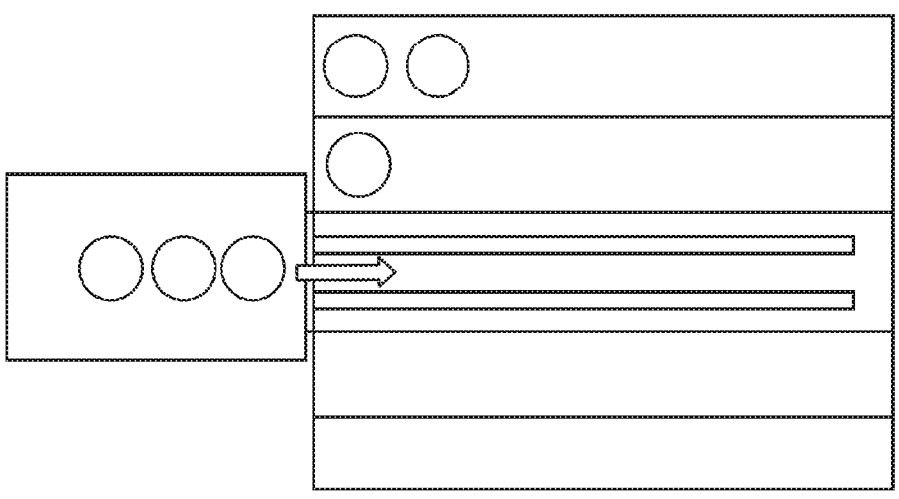
FIGS. 43A-B illustrate top and side views, respectively, of a pop through conveyor mechanism that may be utilized to position items on a tray.
Figure 43B:
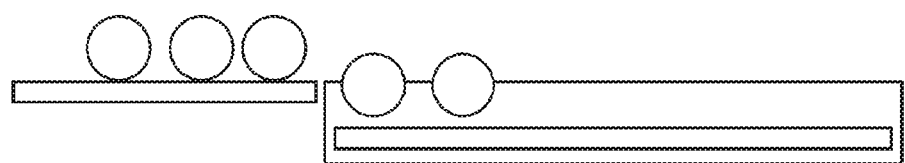

A pop through conveyor offers a possible approach for item handling. FIGS. 43A-B illustrate top and side views, respectively, of such a mechanism. Here, the tray moves left and right while pop through conveyors advance items along a belt.

Specifically, this concept provides an auto tray loading concept that is similar to the dispense station. Two belt conveyors distribute the items along the length of each row. The tray moves so the items are located in the correct row. This approach allows items of different grades to be separated in their distinct row of the tray, without requiring a buffer system or unique classification separation system.

Figure 44A:
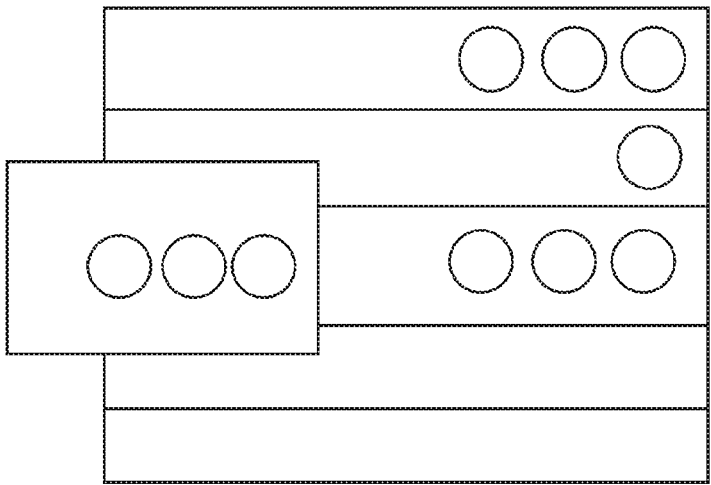
FIGS. 44A and 44B show simplified top and side views respectively of a XYZ gantry mechanism according to an embodiment that may be utilized to position items on a tray.
Figure 44B:
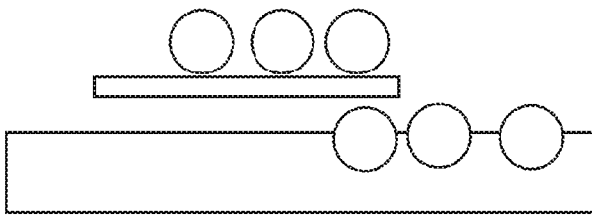

Still another item handling approach may utilize an XYZ gantry mechanism. FIGS. 44A and 44B show simplified top and side views respectively, of an embodiment according to this approach. In these figures the tray moves left and right and in and out. The item feed drops item into the tray.

Here, the trays are disposed on a moveable XYZ gantry, and move the tray to a distinct position so the item may be placed in the exact position desired. This concept allows items of different grades to be separated in their distinct row of the tray without needing a buffer system or unique classification separation system.

Figure 45A:
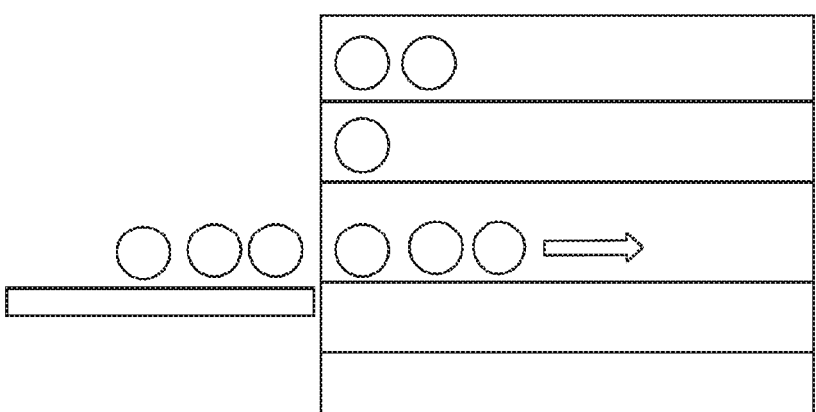
FIG. 45A shows a side view.
Figure 45B:
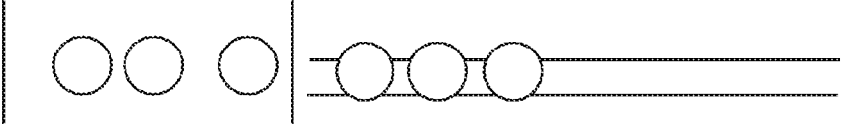
FIGS. 45B-C show top views, illustrating a vertical stack buffer system according to an embodiment that may be utilized to position items on a tray.

Still other item handling approaches may utilize a vertical stack buffer system. FIG. 45A shows a side view, and FIGS. 45B-C show top views, illustrating an embodiment.

Specifically, this approach offers a post-inspection, pre-tray loading grade and size filtering system, allowing items of the same grade and/or size to be are grouped together. This mechanism allows for a simpler tray loading mechanism as all items are filtered into the correct category, prior to being taken to the tray loader.

In the specific approach illustrated in these figures, there is a vertical buffer that builds each row. So, the infeed becomes more complex, moving up and down and left to right to feed a fixed tray position.

Figure 45C:
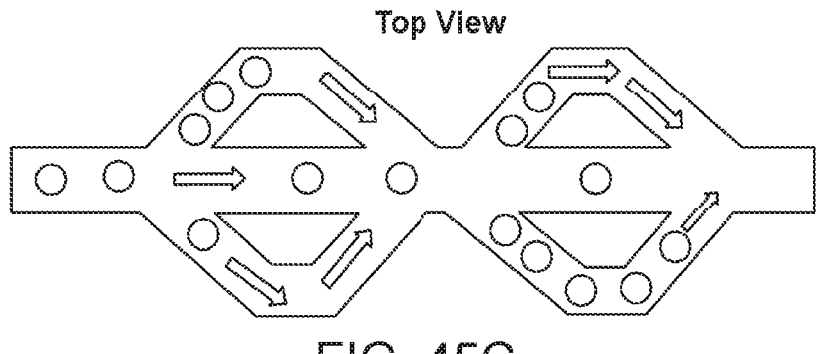

As shown in the top view of FIG. 45C, the conveyor branches to allow First In, First Out (FIFO) filtering amongst each branch. Each branch contains the same size and/or grade.

This multiple conveyor setup shown in FIG. 45C, allows for a simpler tray stocking mechanism, as all items are filtered into the correct category prior to being taken to the tray loader. This embodiment also offers relative simplicity from a mechanical perspective.

As has been previously discussed, embodiments may call for items to be stored under controlled conditions, in a carousel structure. Various aspects of possible designs for the carousel element, are now described.

Initially, it is noted that trays can be shifted from one carousel to another. This may be done automatically in order to control ripeness.

For example, an avocado should be initially stored in a cold carousel in order to preserve its life. Then, a few days prior to being dispensed, the avocado should be shifted to a different carousel that is maintained under warmer temperature conditions, and paired next to an ethylene producing item. This will initiate ripening.

Once the ripening process has commenced, the avocado could be shifted back to a colder carousel to keep it from over-ripening. The avocado can then be sold to a consumer at the desired ripeness. Such a carousel-shifting approach allows more products to be stored in inventory, without spoilage and loss of desirable characteristics (e.g., flavor and nutrients in the case of a produce item).

Figure 46:
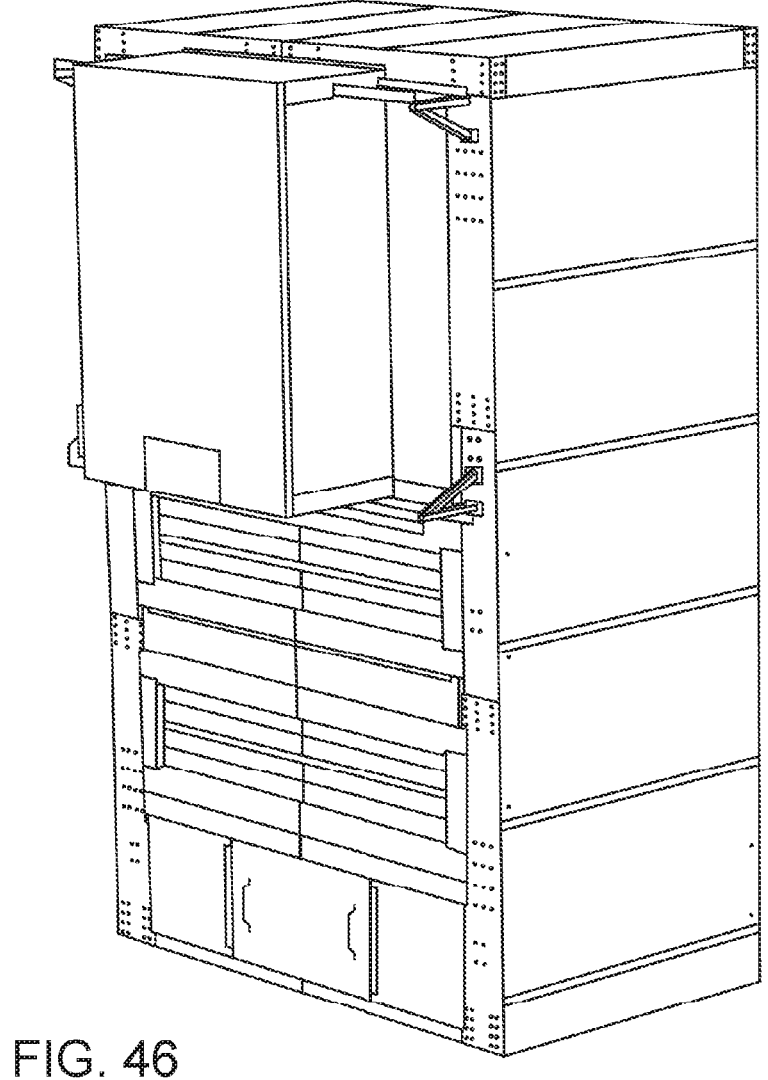
FIG. 46 shows a simplified perspective view of a carousel front according to an embodiment.

FIG. 46 shows a simplified perspective view of a front of a carousel according to an embodiment. As previously illustrated, items are stored within the carousel upon moveable (e.g., vertically moveable) carriers.

Figure 46A:
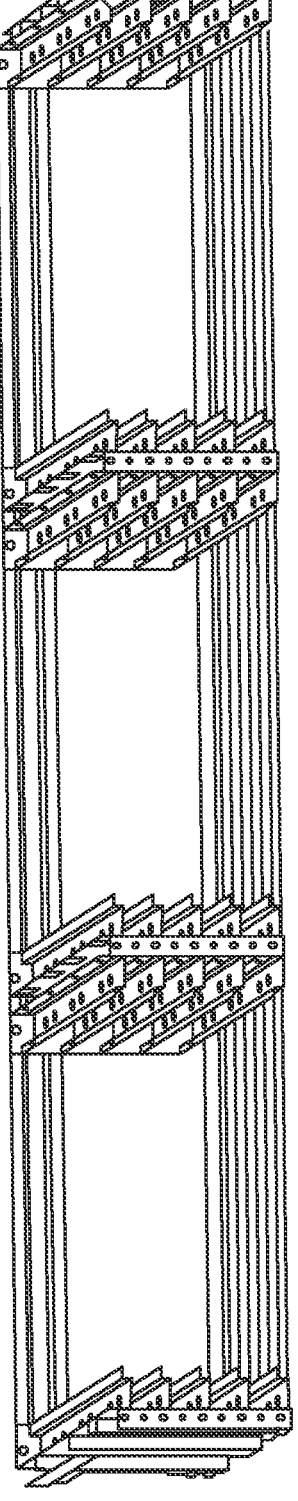
FIG. 46A illustrates a perspective view of one possible embodiment of a carrier.

FIG. 46A illustrates a perspective view of one possible embodiment of a carrier. This carrier embodiment features lower support beams.

Figure 46B:
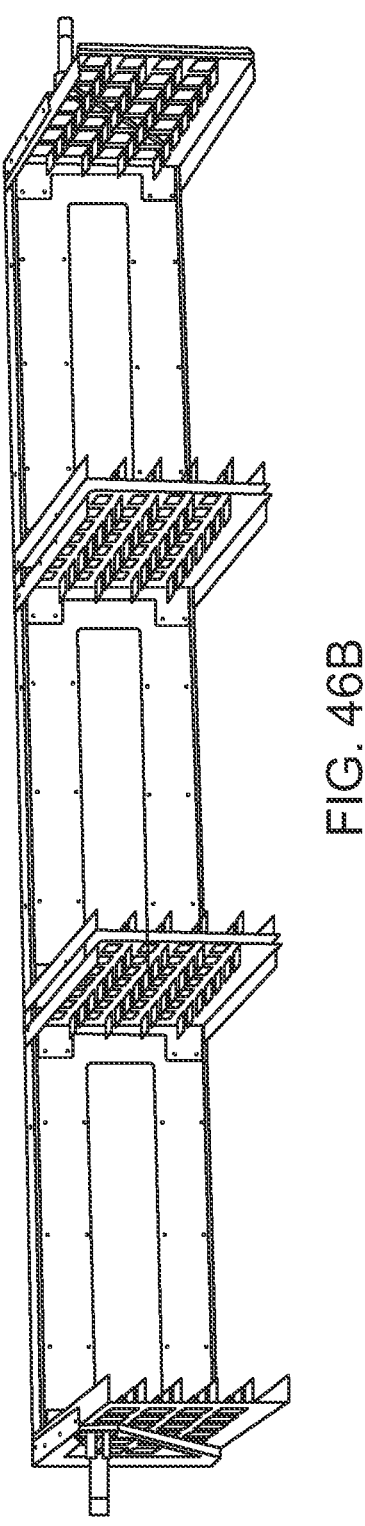
FIG. 46B illustrates a perspective view of an alternative embodiment of a carrier.

FIG. 46B illustrates a perspective view of an alternative embodiment of a carrier. Here, the lower supports are replaced with backside support beam(s). Such a back-support approach may effectively increase the density of items that may be stored within the carousel.

Specifically, by avoiding the space occupied by a bottom support beam, a carrier design can fit 7, 6, 5, or 4 shelves. Carriers of various capacities may be available in each carousel, as needed.

Figures 46C, 46D:
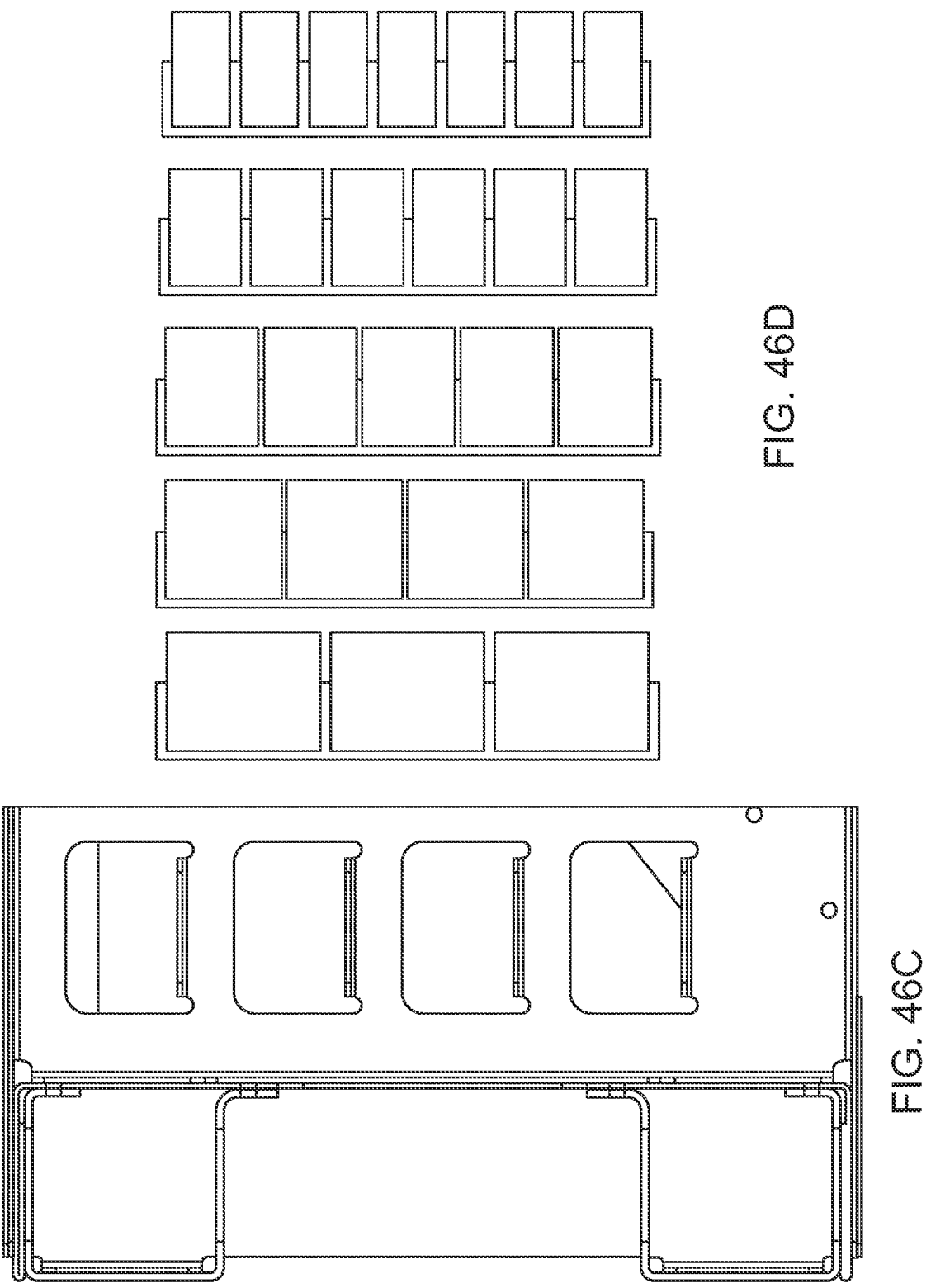
FIG. 46C shows a simplified front view of a carrier.
FIG. 46D shows carriers having a different number of levels, and per-level pitches.

FIG. 46C shows a simplified front view of a carrier. Here, two 3 mm back support beams take most of the load, and transfer to outer support walls. The back beams support vertical load, and resist deflection/twisting.

Extending out of the page in FIG. 46C, is a single part featuring tabs to hold trays. By eliminating the bottom supports (and increased back support) this embodiment affords enhanced vertical tray stacking density-according to some embodiments thereby allowing one more full layer of trays per carrier. Particular embodiments may offer 10.2% more product storage because of the back (rather than bottom) support design.

Various configurations may further enhance densities of vertically stacked trays within a carousel. For example, while the specific embodiment of FIG. 46B offers support for multi-layers for trays with a fixed pitch, that pitch may not be optimal for all items.

Different types of carriers may be present in each carousel. Each carrier can be constructed to handle different level counts in order to maximize density.

For example, FIG. 46D shows carriers having a different number of levels, and per-level pitches, to allow storage of different items. As shown in FIG. 46D:

a carrier having 4 levels might offer a greatest stacking density for trays storing honey dew melons and 2 gallon milk jugs.

a carrier having 5 levels, might offer a greatest stacking density for trays storing green peppers and mayonnaise jars.

a carrier having 6 levels, might offer a greatest stacking density for trays storing oranges and pasta boxes.

a carrier having 7 levels, might offer a greatest stacking density for trays storing apples and rice boxes.

a carrier having 8 levels, might offer a greatest stacking density for trays storing limes and salad dressing bottles.

Once items are stored within the carousel upon a tray supported by a carrier, individual items may be dispensed therefrom. Various details regarding particular embodiments of dispensing mechanism are now described.

Figure 47:
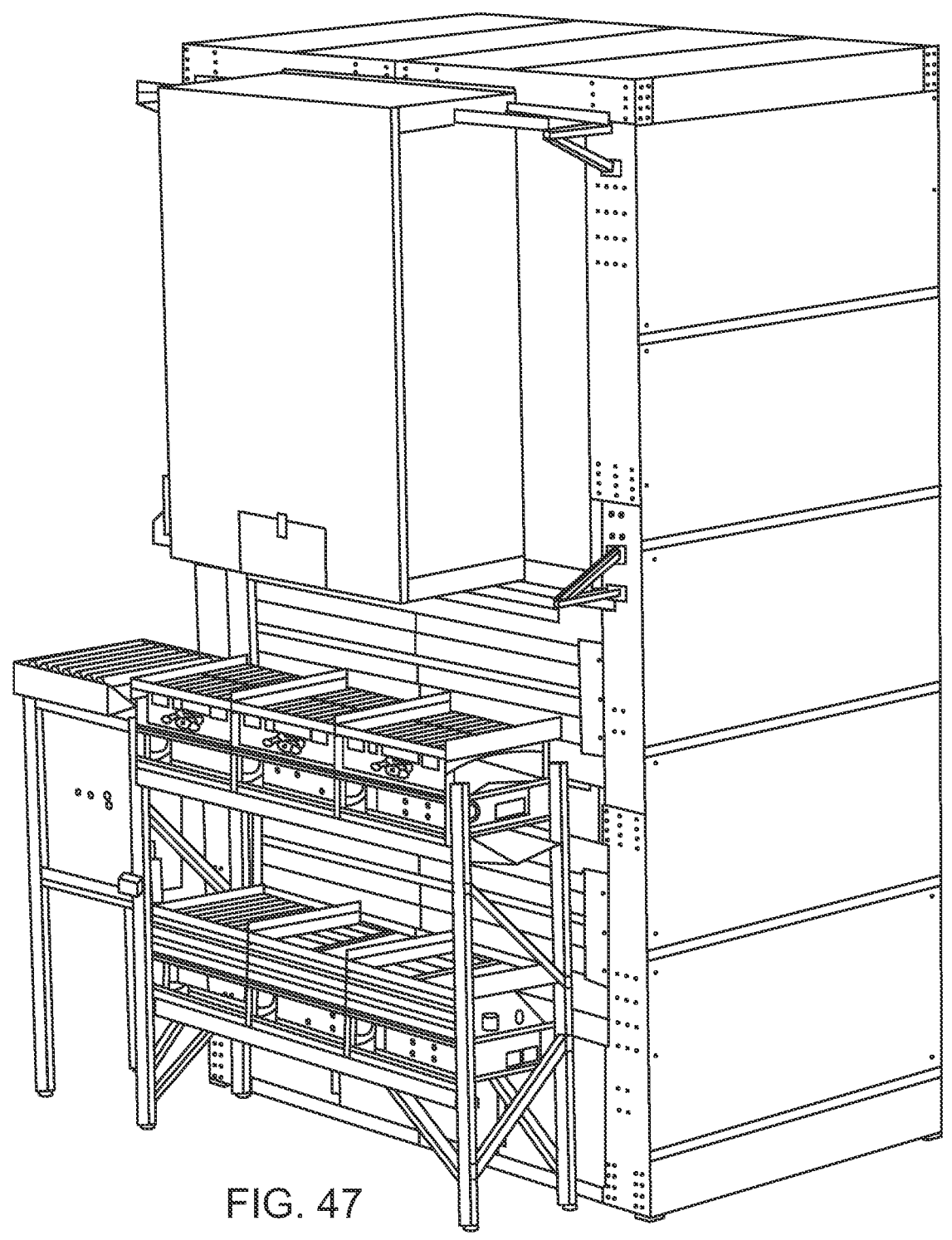
FIG. 47 shows a perspective view of a front side of a carousel embodiment having a dispensing station attached thereto.

FIG. 47 shows a perspective view of a front side of a carousel, having attached thereto a dispensing station according to an embodiment. The view of FIG. 47 may usefully be contrasted with the previous view of FIG. 46.

An item dispensing station according to embodiments may feature one or more elements to enhance performance. For example, it is important to avoid items falling off the dispense station. Accordingly, certain embodiments may feature a dispense conveyor backstop on the pop through conveyor, in order to keep items from falling backwards.

Figure 48A:
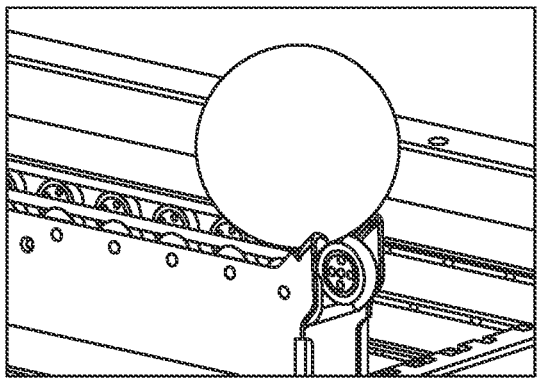
FIG. 48A shows an enlarged view of a tail on a conveyor.
Figure 48B:
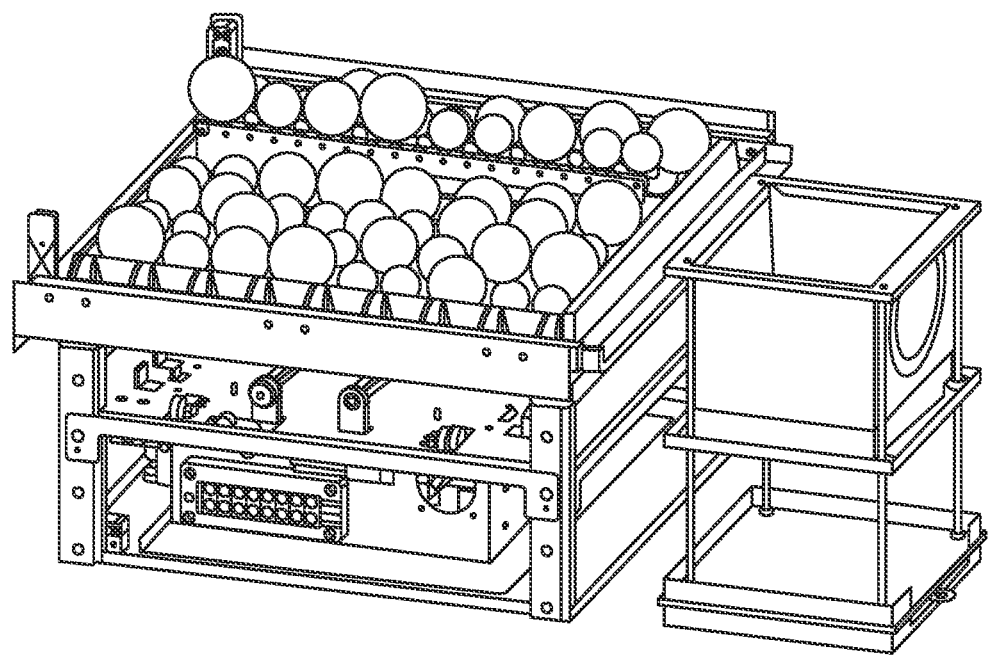
FIG. 48B shows a simplified perspective view of the pop-through conveyor of the dispense station, poised to dispense item(s) from a particular tray row.

FIG. 48A shows an enlarged view of a tail on the conveyor, which prevents items from rolling off the back when the tray is lowered over it and items from a row are dispensed. FIG. 48B shows a simplified perspective view of the pop-through conveyor of the dispense station, poised to dispense item(s) from a particular tray row.

Figures 49A, 49B:
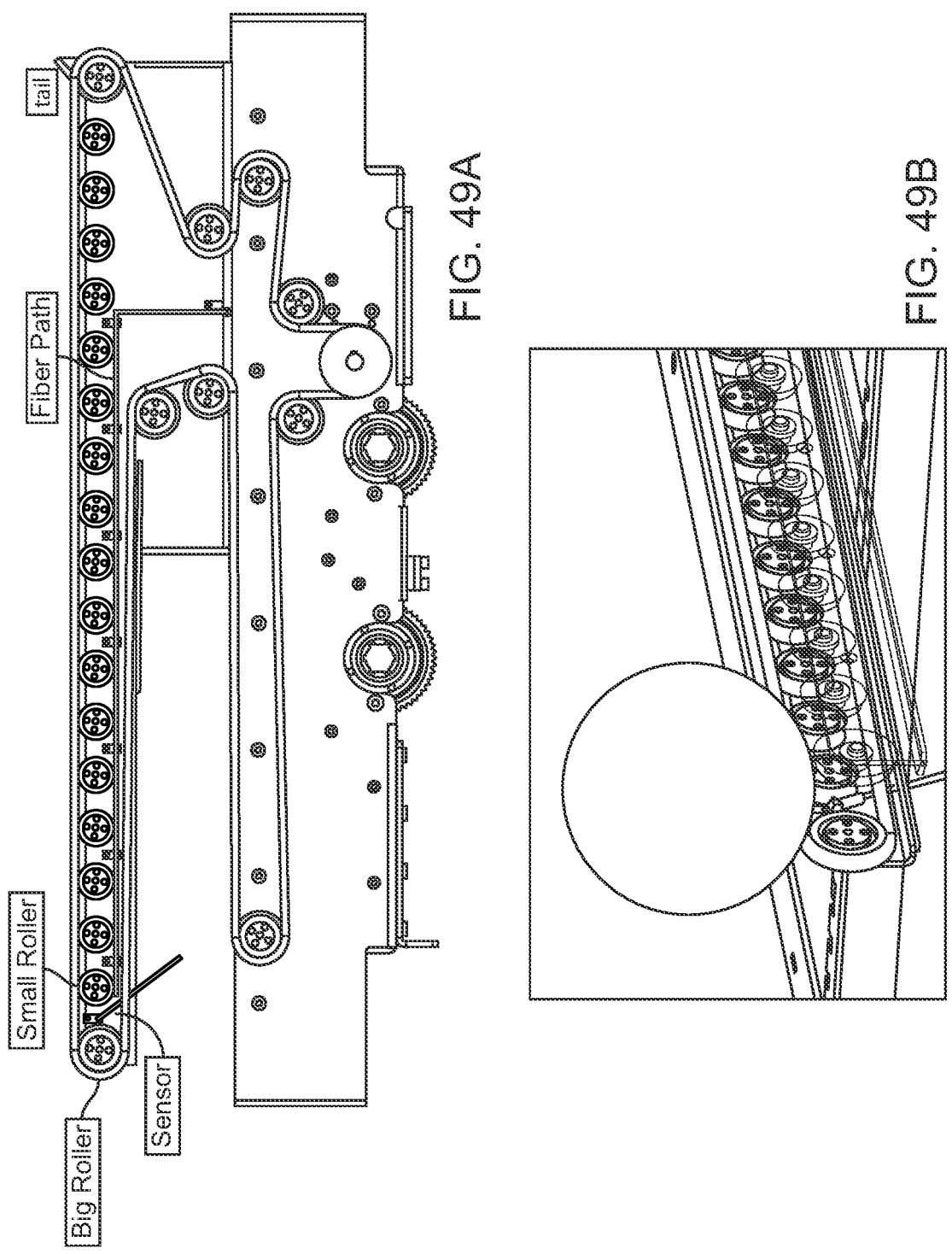
FIG. 49A shows a side view of a pop-up conveyor mechanism including an optical sensor for dispensed item detection.
FIG. 49B shows an enlarged view of the optical sensor in the pop-up conveyor.

Dispense stations according to embodiments may also feature sensors for detecting dispensed items. FIG. 49A shows a side view of a pop-up conveyor mechanism including an optical sensor for dispensed item detection. FIG. 49B shows an enlarged view of the optical sensor in the pop-up conveyor.

This presence sensor detects when an item arrives at the end of the conveyor. The length of the item is already known, so once the item is detected the conveyor can be driven the known amount to dispense the item off of the conveyor end. The sensor also detects that the item has left the conveyor, thereby allowing reliable confirmation of dispensing a single item.

Figure 50:
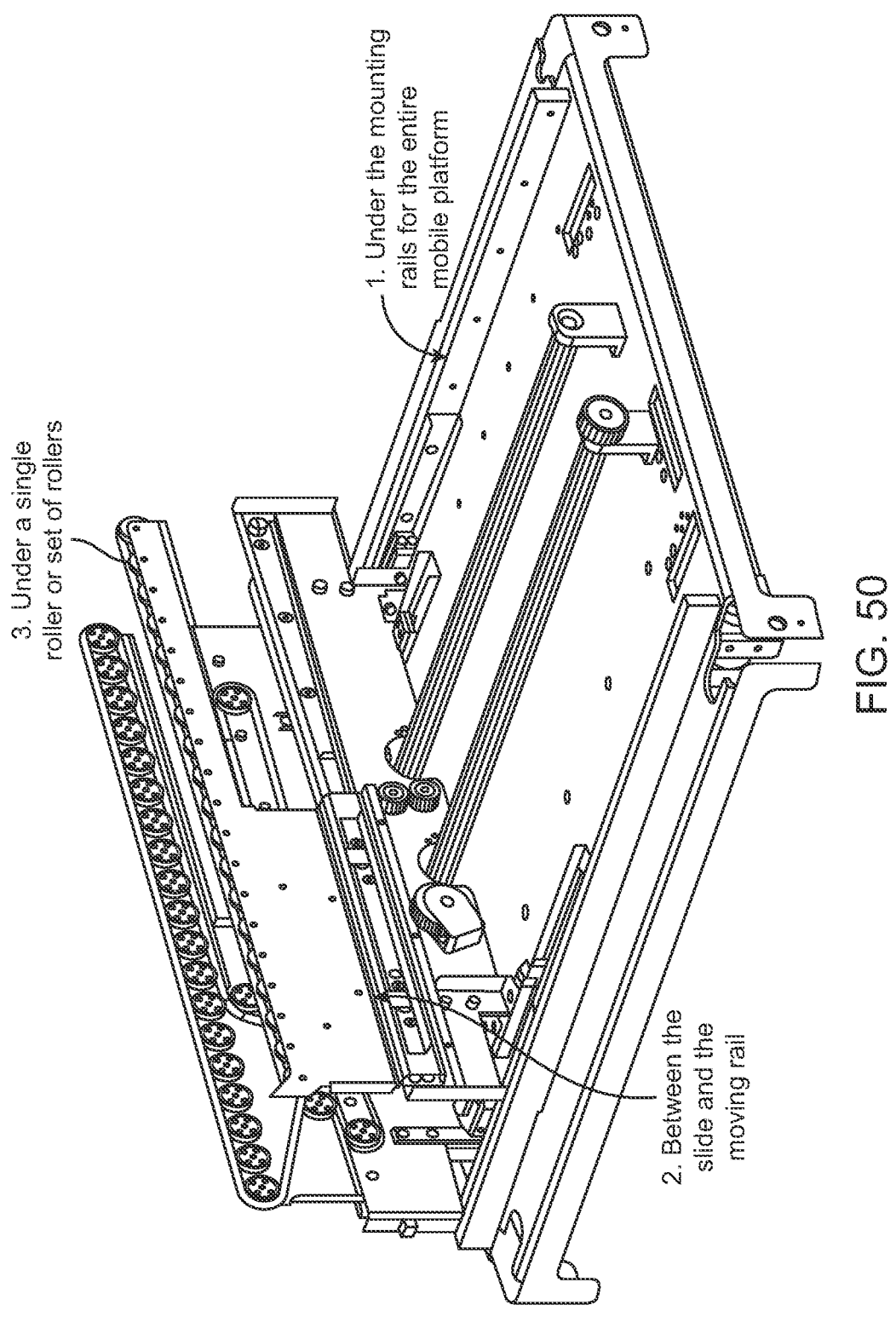
FIG. 50 shows a perspective view of a dispense station configured with load cells.

Weight can also be detected as a sensed quantity during dispensing. FIG. 50 shows a perspective view of a dispense station configured with load cells for this purpose.

Load cells may permit weight measurement to detect items falling off the dispense station (e.g., off of the back). Load cells can also be used to detect the change in weight as an item leaves the conveyor.

Load cells may be positioned in a number of different possible locations, including but not limited to:

under the mounting rails for the mobile platform;

on the extending conveyor rail; and/or at a strain gauge between the end rollers.

As an item is dispensed off the end of the conveyor, the load cell reading marks a step change, indicating the reduction in mass on the conveyor. This again permits reliable dispensing of just one item at a time from the tray.

In order to accurately accomplish item dispensing in a reliable manner, it may be useful to precisely control tray position. Maintaining positional control of the tray within a tolerance, allows the dispense conveyors to repeatedly fit through the slots in the tray, while reducing the layers of closed loop motion control.

Figure 51A:
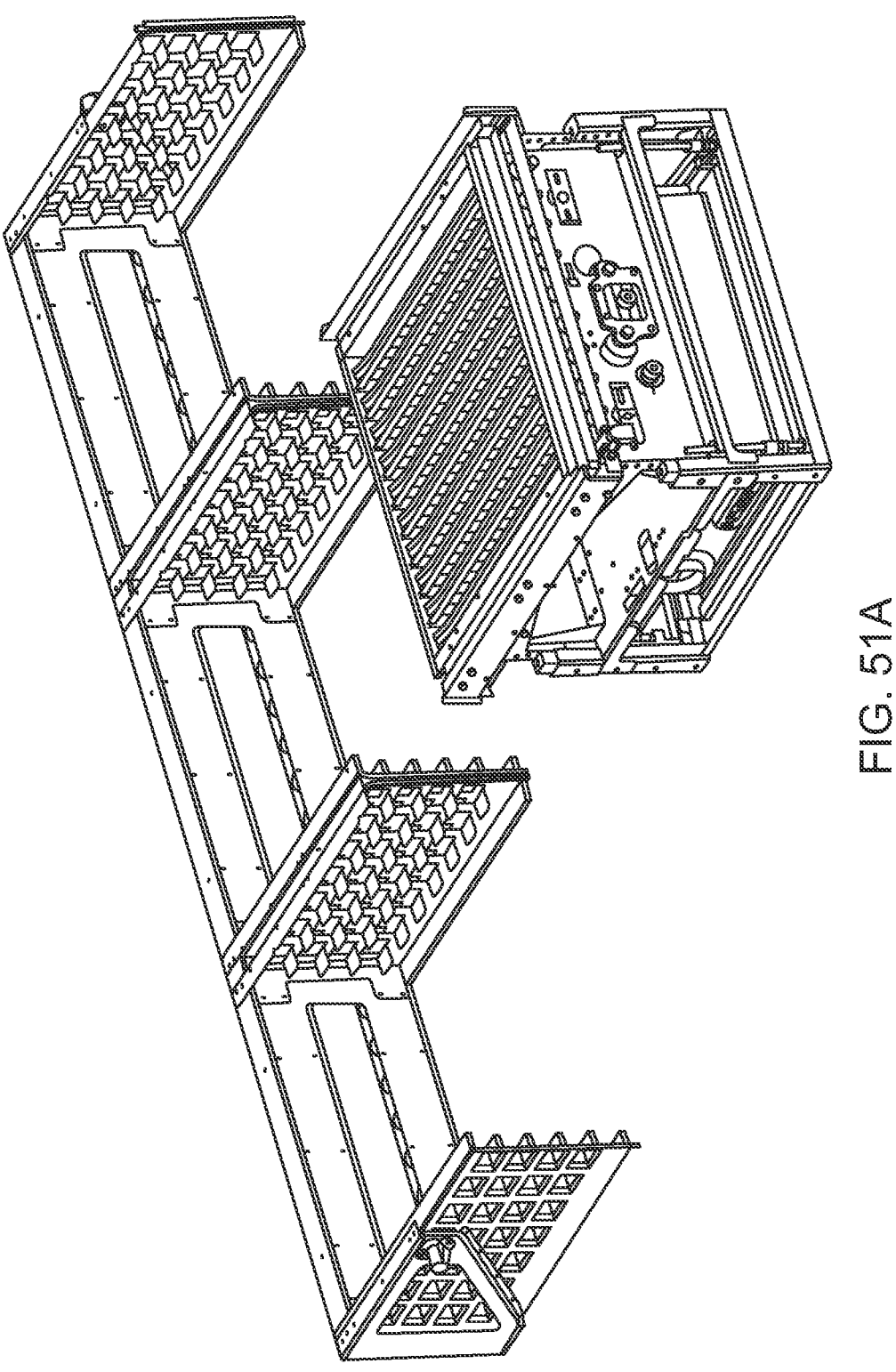
FIG. 51A shows a tray arriving at the carousel.
Figure 51B:
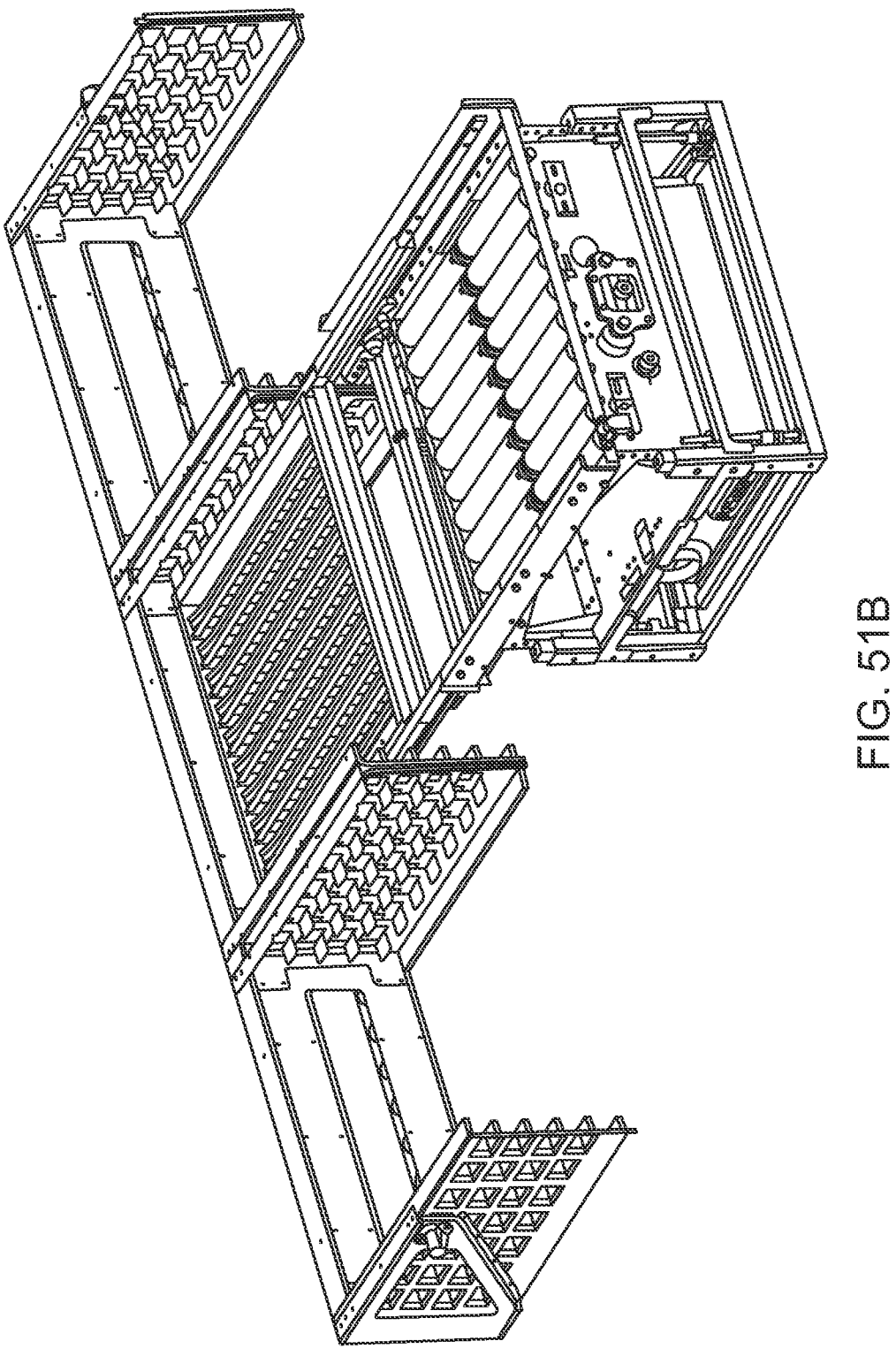
FIG. 51B shows the tray loaded into the carousel.

The exercise of positional control over the tray may commence when the tray arrives at the carousel (FIG. 51A), and is then loaded into the carousel (FIG. 51B). From the time the tray is initially physically contacted, it is passed from pinned location to pinned location.

Figure 51C:
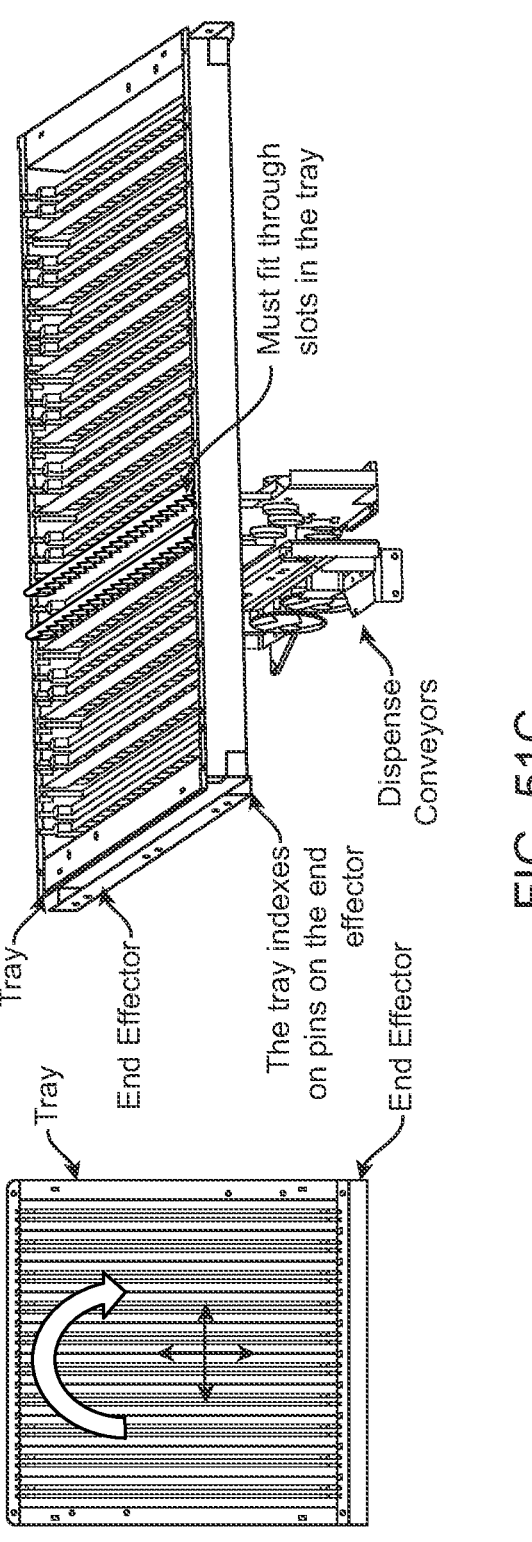
FIG. 51C shows a simplified view illustrating the use of indexing pins.

FIG. 51C shows a simplified view of the use of indexing pins. Specifically, the tray lifter aligns with the tray and lifts it up with the end effector. These end effectors on the tray lifters inserting and removing the tray from the carousel, have pins that index with the tray.

The carrier has pins that index with the tray. The tray arrives at the upper tray lifter and is lifted by the end effector. The end effector pins index with the tray, locating it precisely. The upper tray lifter inserts the tray into the carrier, where it also indexes on pins.

Using such passive (e.g., pin) features to control position of the tray during storage, allows for closer tolerances on the dispensing end effector while still allowing retrieval without closing the loop between the end effector position and the tray position.

Exercising positional control of the tray on the end effector, also permits precise disposition of the dispensing conveyors so they fit through the slots in the tray without closing the loop between tray position and dispensing conveyor position.

Details regarding designs for the end effector are now described. It was discovered that reaching relatively deep into a narrow space called for better control over the angle of the end effector, than:

reaching into a short space, or not reaching in at all, and just hooking the front end of the tray.

Figure 52A:
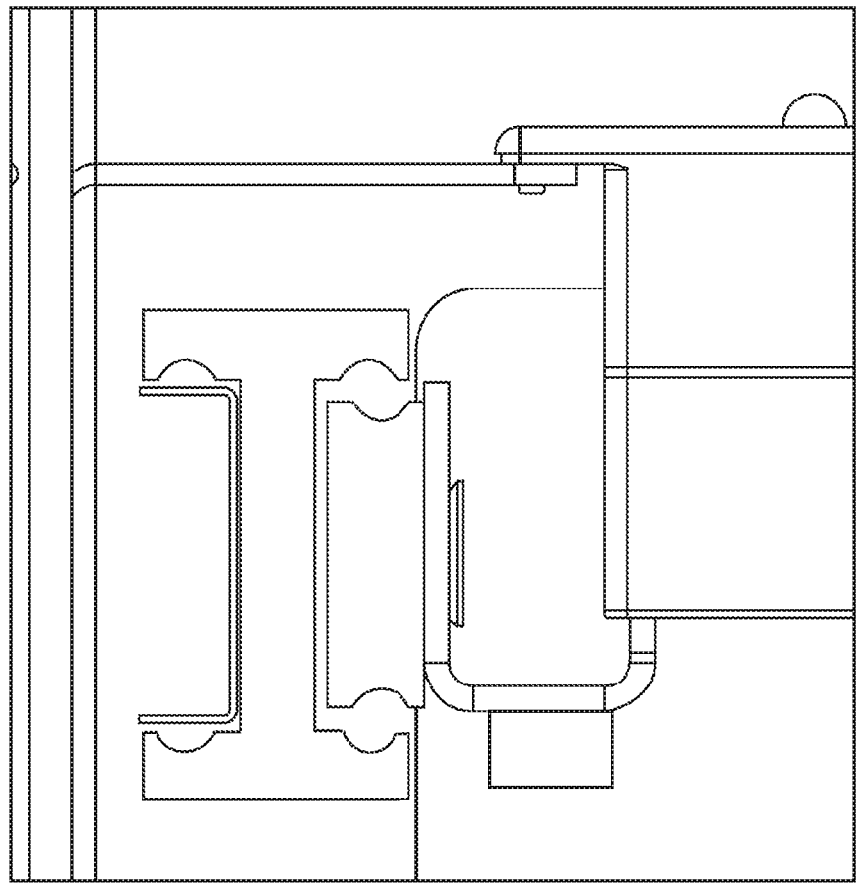
FIG. 52A illustrates a simplified side view of an end effector design according to one embodiment.

Accordingly, FIG. 52A illustrates a simplified side view of an end effector design according to one embodiment. Here, using injection molded parts for the trays allowed for a simplification in the carrier. The shelf upon which the tray sits, was made flat rather than a U-shape, in order to dodge the tray lifter linear slides.

Figure 52B:
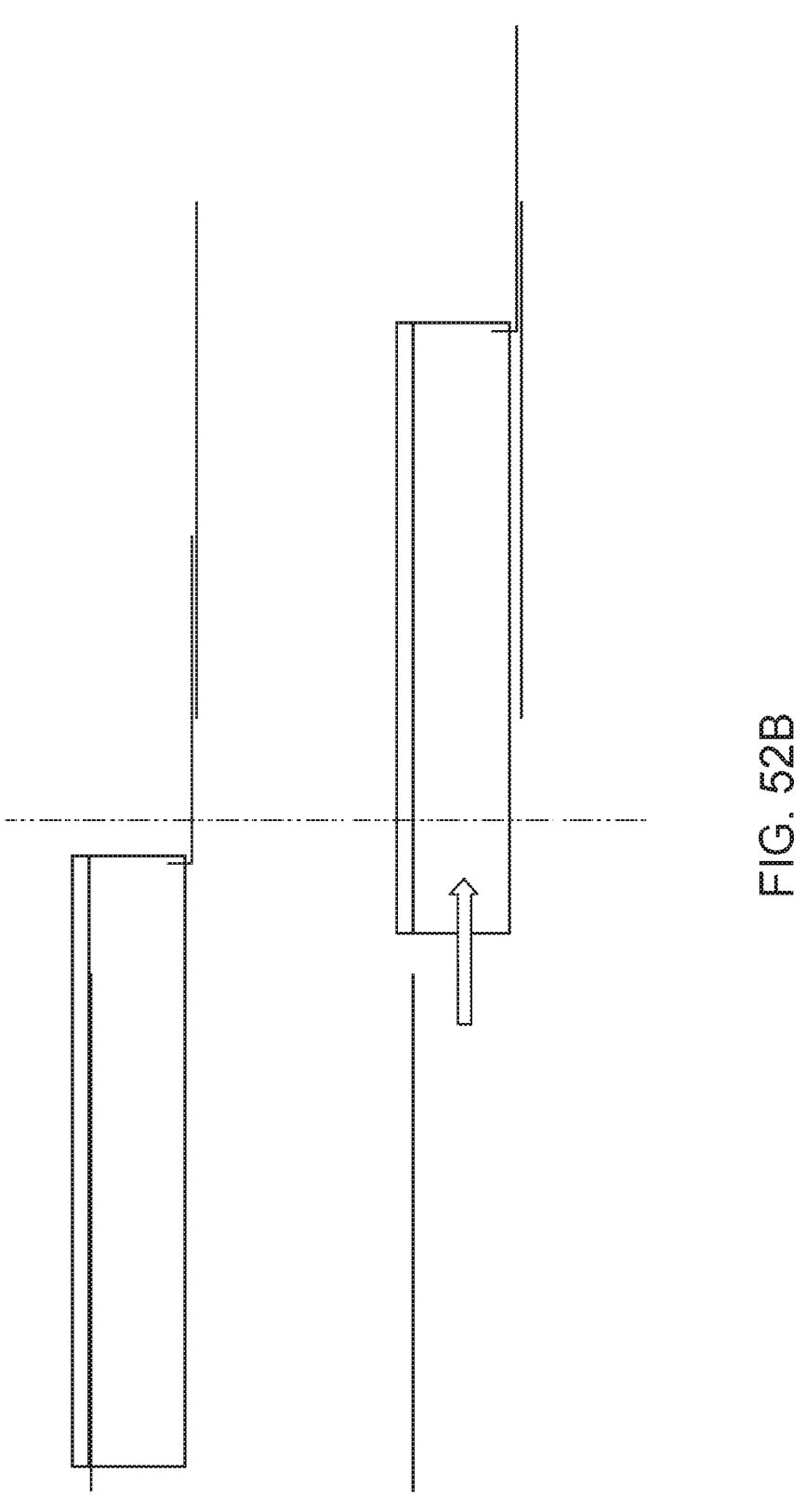
FIGS. 52B-C show alternative embodiments.

FIG. 52B shows an alternative embodiment wherein the end effector on the tray lifter, is a hook that engages with the front edge of the tray. The tray is pushed into or pulled out of the carrier, by the hook end effector.

The tray slides on the carrier shelf and also slides on a shelf on the tray lifter. This eliminates the issue of leveling the carriers to the tray lifter and maintaining level tolerance for every carrier in every loaded state.

Figure 52C:
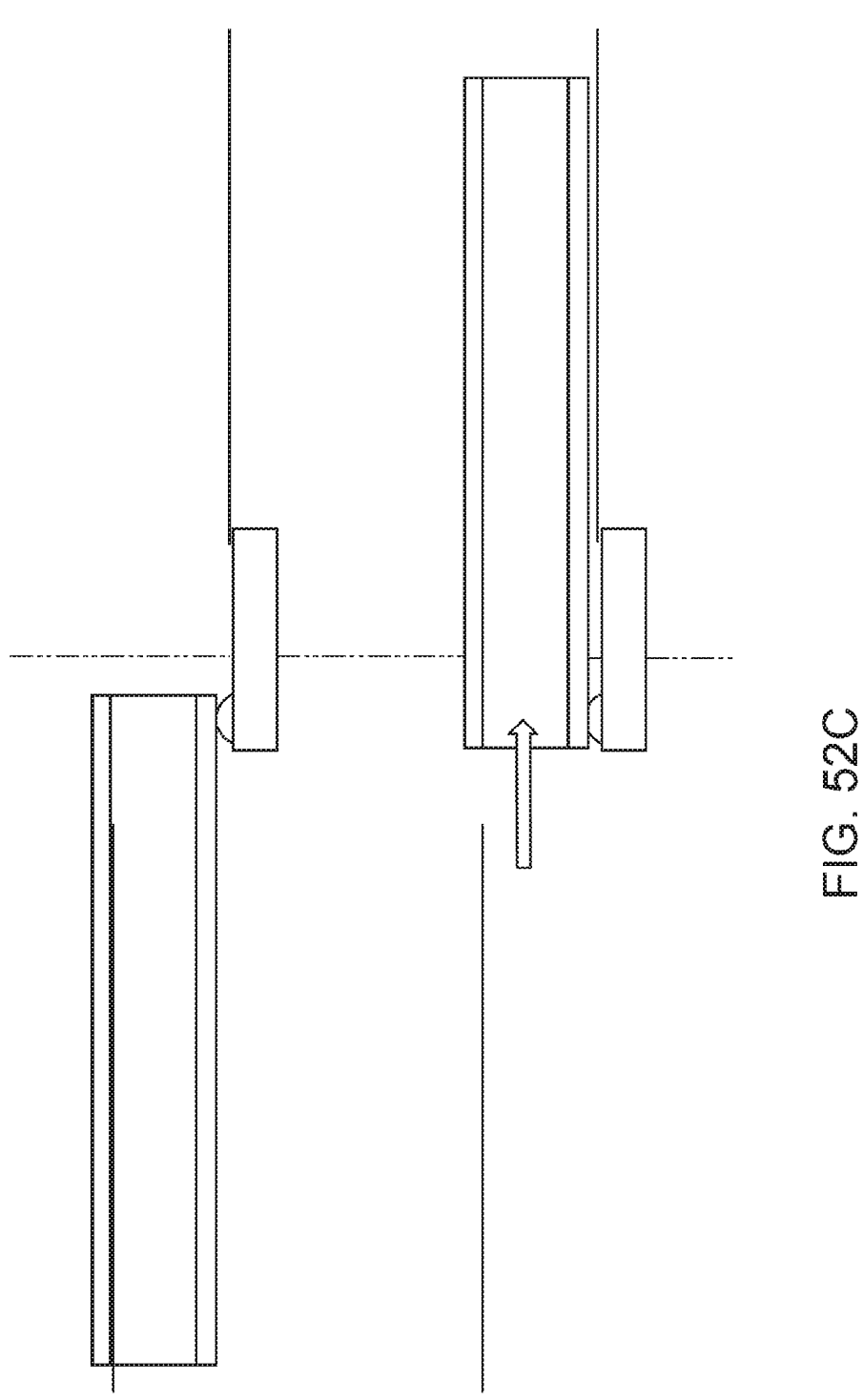

FIG. 52C shows another alternative embodiment. Here, the end effector on the tray lifter may have a pinion gear that engages with a rack (which may be molded into the tray). Driving the pinion gear pulls the tray out of the carrier and onto the tray lifter. This eliminates the problem of leveling the carriers to the tray lifter, and maintaining a tight level tolerance for every carrier in every loaded state.

Figure 53A:
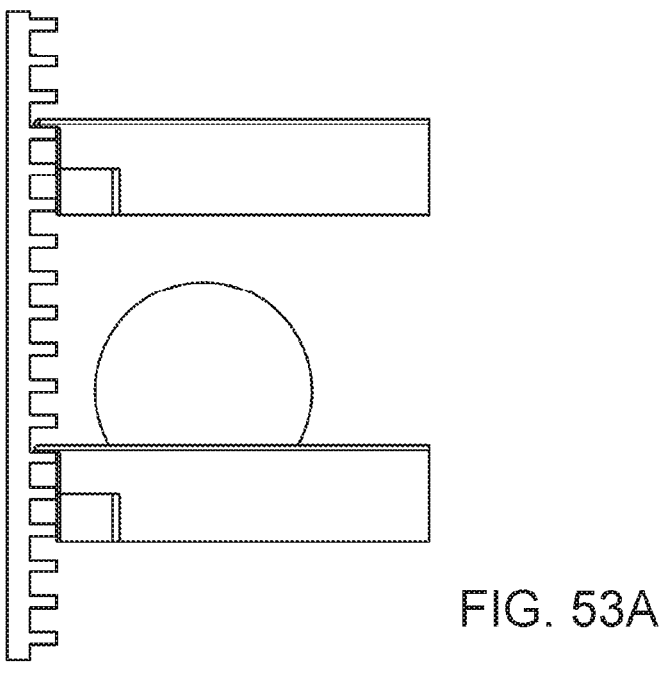
FIGS. 53A-B show different views of embodiments of a carrier design.
Figure 53B:
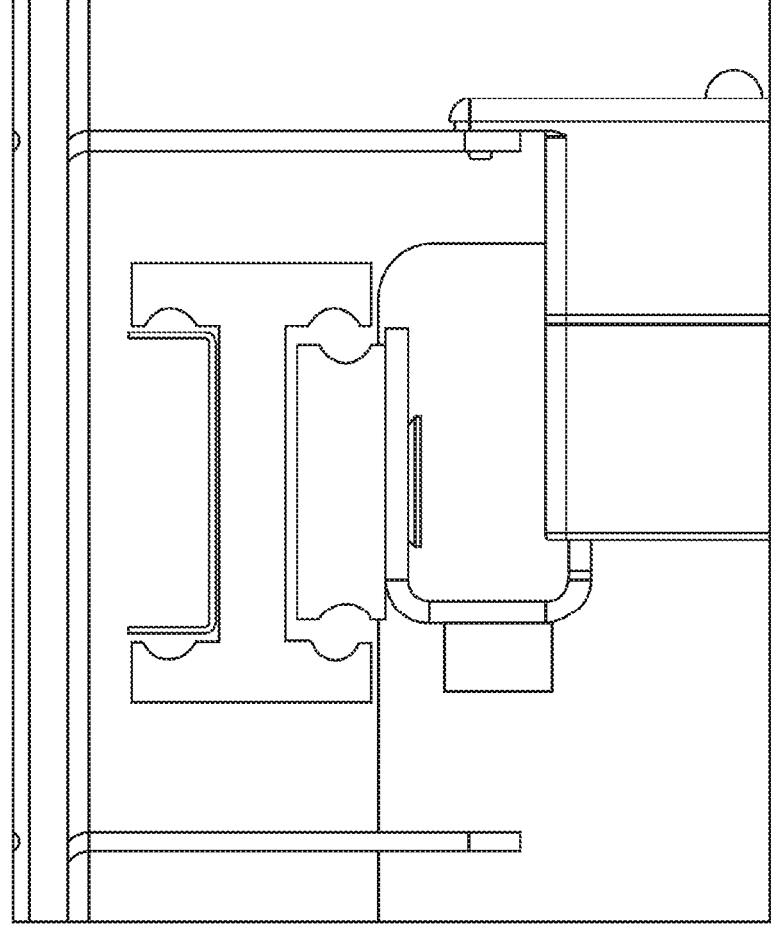

FIGS. 53A-B show different views of carrier design embodiments configured to interact with the end effectors of FIGS. 52B-C. Here, with the new hook design or gear rack design, the slides do not have to insert into the carrier.

This allows for increasing the pitch of the carrier shelves receiving the tray. Such increased shelf pitch promotes an increase in tray packing density, by allowing choice of the best shelf to put the tray on to allow it to be closest to the next tray above or below.

It is noted that the slides holding the end effector need to fit between the shelves. Not needing to preserve open space for slides, allows the shelf pitch to be tighter. The tray can be positioned closer to the one above or below it depending on the height of items in the tray.

Details regarding various designs for the customer bag and the transporting same for shipping, are now discussed.

A traveler containing a bag to receive dispensed items, may feature a platform that can be raised and lowered. There are several possible ways to raise and lower the platform.

Figure 54B:
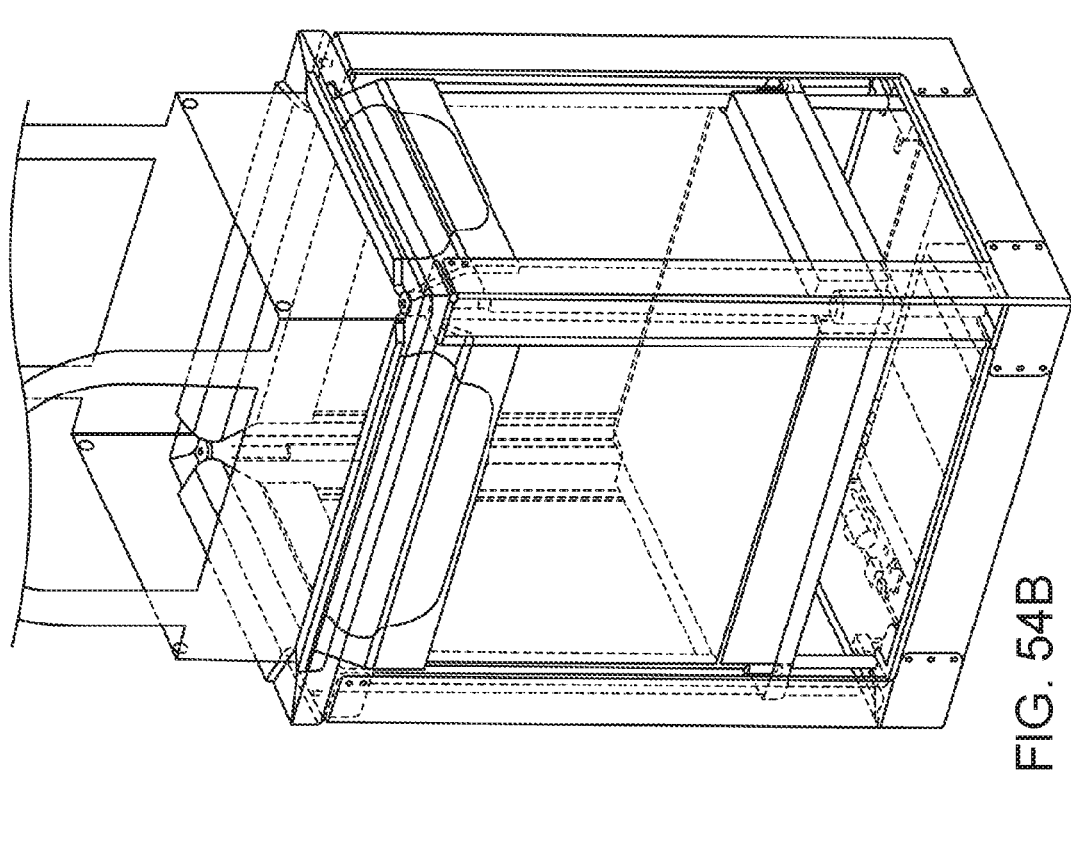
FIGS. 54A-B show perspective views of embodiments of a traveler.
Figure 54A:
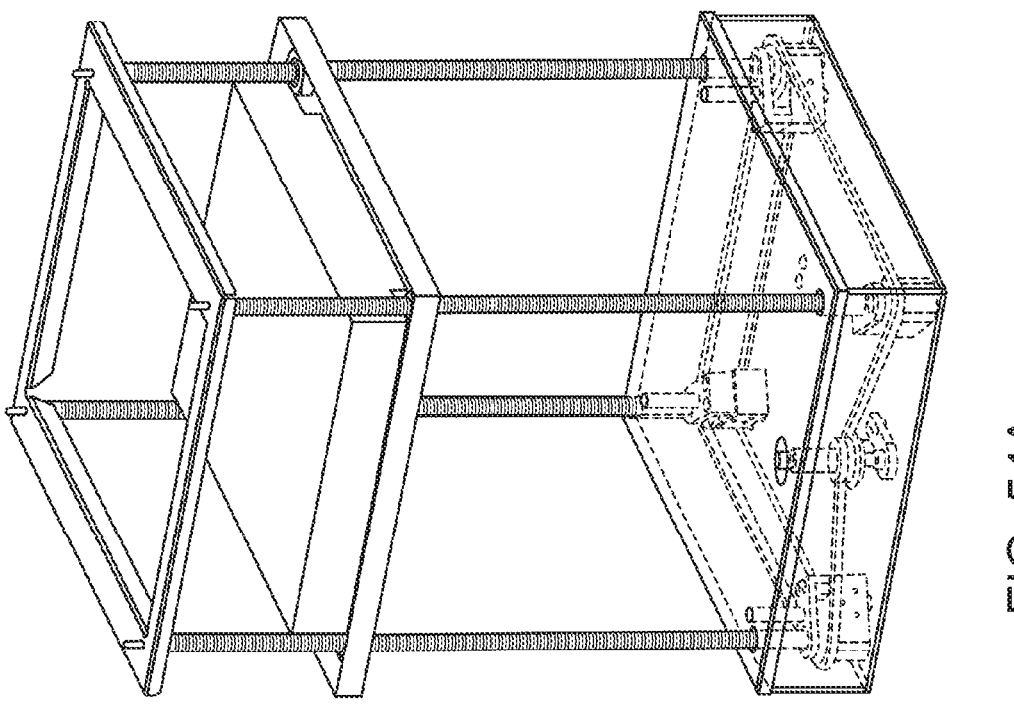

FIG. 54A shows a perspective view of one embodiment of a traveler. In this embodiment, the traveler platform may be moved up and down through the operation of lead screws that are driven by a chain or belt.

FIG. 54B shows an alternative embodiment of a traveler. Here, the platform may be raised or lowered utilizing linear actuator(s), and guide rail(s) located in opposite corners.

Alternative designs for travelers are of course possible. Certain embodiments could feature the platform attached to a scissor lift. Some embodiments could feature the platform lifted in corners by belts or pulleys. Also, a traveler design could comprise an assembly of springs that compress when the bag is full, and extend when the bag is empty.

Figure 55A:
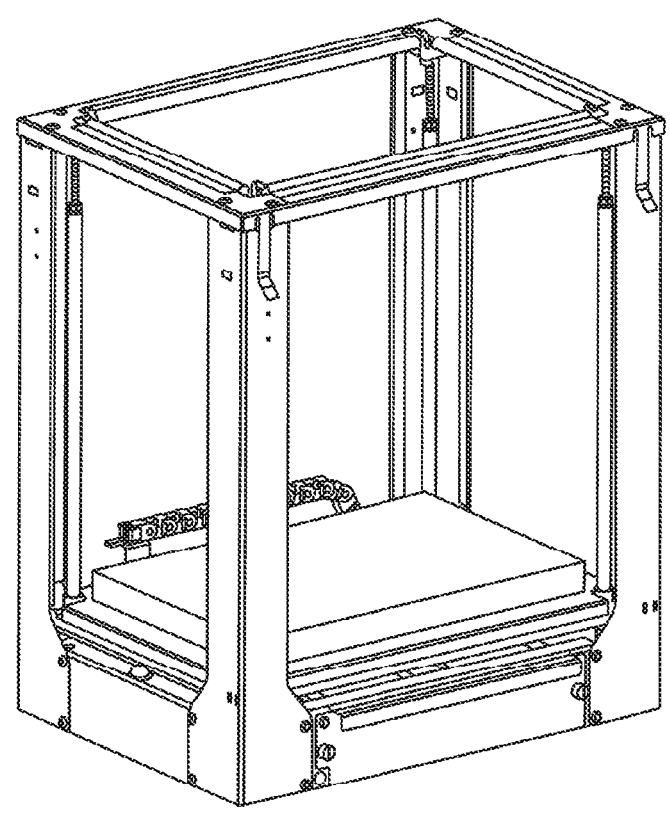
FIGS. 55A-B show views of a traveler embodiment incorporating load cells.
Figure 55B:
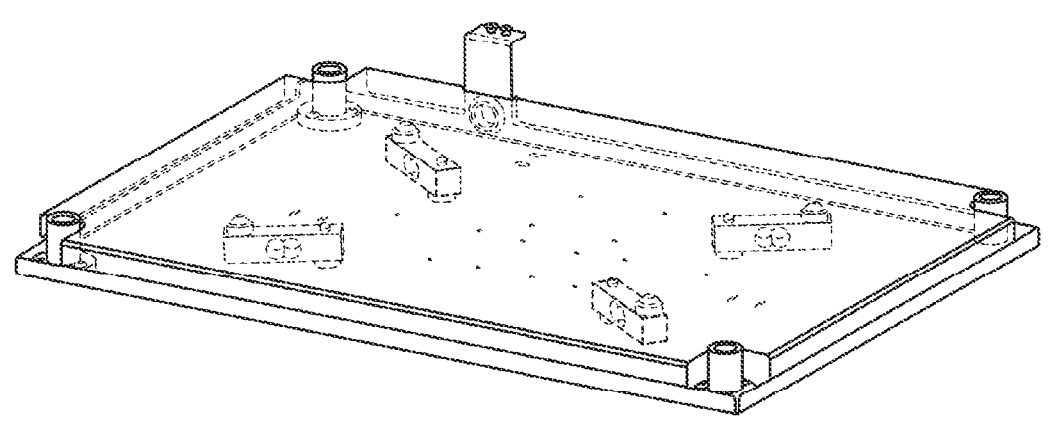

Some embodiments may add load cell(s) to the platform, allowing measurement of changes in weight at the traveler. FIGS. 55A-B show views of an embodiment of a traveler incorporating load cells.

In this embodiment, the load platform comprises two plates. The bottom plate is anchored to lead nuts that travel up and down the screws.

Four cantilever beam load cells support the top plate. These load cells measure the weight of items in the bag, helping to determine if items were successfully dispensed.

While the specific configuration of load cell may vary, the basic concept features the measurement of weight changes to evaluate dispensing. Given known item weights, with proper calibration the difference between weight changes (e.g., 1 apple vs. 2 apples) can reveal when possible errors occur.

Bag(s) for housing items dispensed from the carousel, are supported by the traveler. One or more methods may be utilized to hold the bag in place at the top of the frame.

Figure 56A:
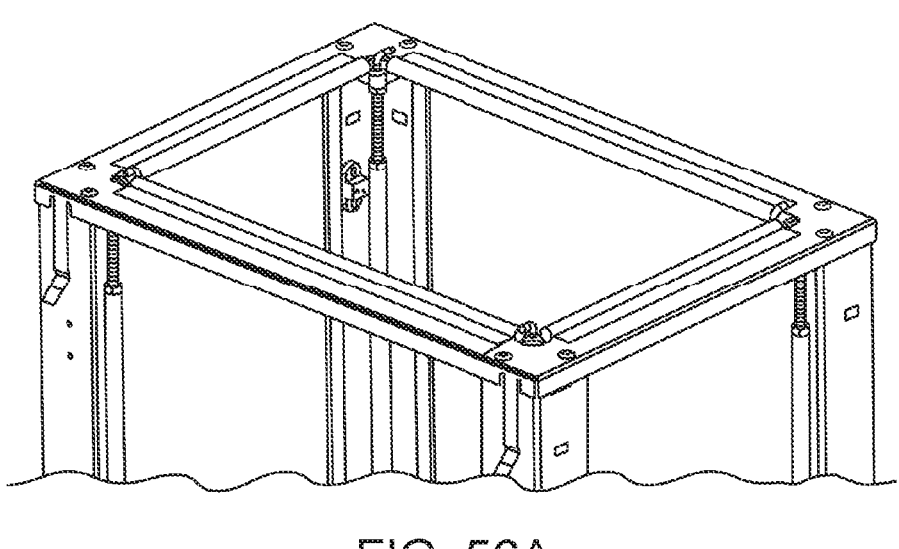
FIGS. 56A-B show top perspective, and enlarged views respectively, of a traveler including a frame.
Figure 56B:
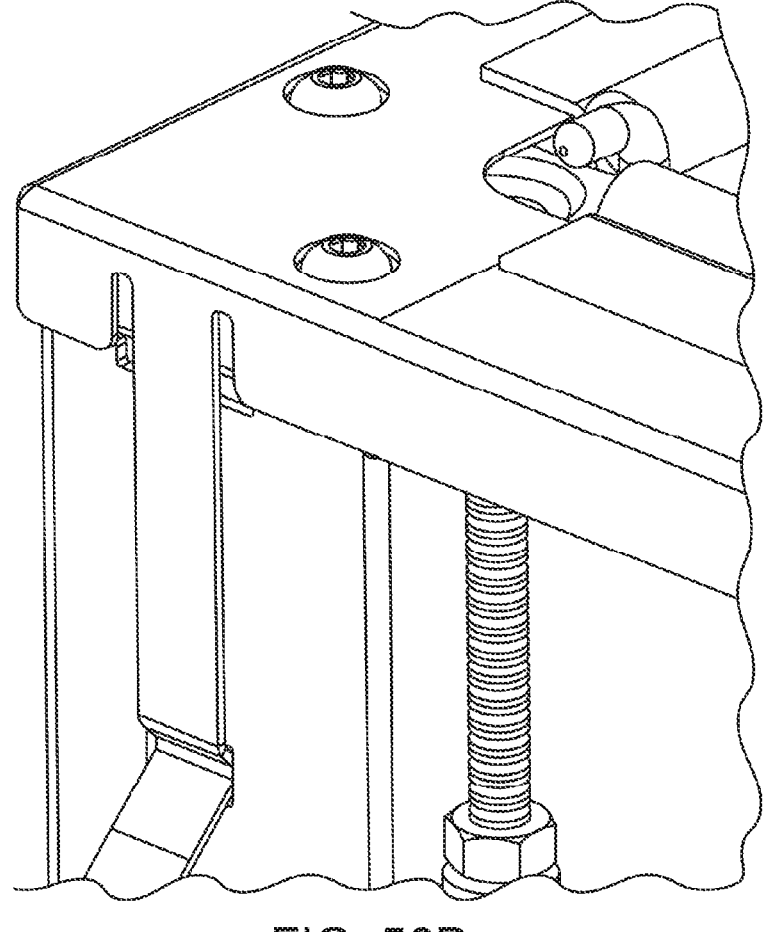

FIGS. 56A-B show top perspective, and enlarged views respectively, of a traveler including a frame. Bags are first bunched or accordioned, around a rectangular box for quick loading into the traveler. This restrains fabric to the perimeter of the bag, thereby leaving the bag bottom exposed to receive the dispensed item, without interference from bunched fabric.

According to particular embodiments, the bags may have fabric grommets installed in their upper corners. Bags are loaded into the traveler by hooking the grommets over bent pegs located in the upper corners of the frame.

A hinged lid (with an integrated latch) opens and closes to lock the bag in place. The inner rim of the lid may be lined with bulb edge guards to protect dispensed items from being damaged.

Figure 57A:
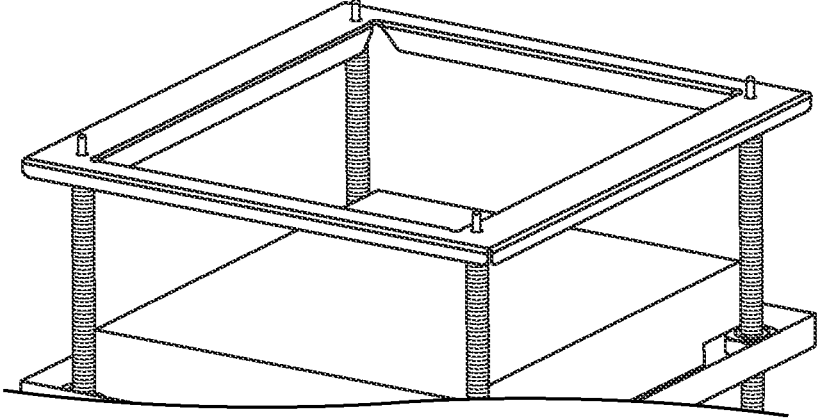
FIGS. 57A-B shows different embodiments of travelers.

However, alternative designs for the traveler are possible, with the bag being fixed according to other approaches. For example, FIG. 57A shows a traveler embodiment featuring straight vertical grommet pegs, sticking up. An (optional) removable rubber cap may be tethered to the bottom of the peg, for a quick locking feature with a part that doesn't get lost.

Figure 57B:
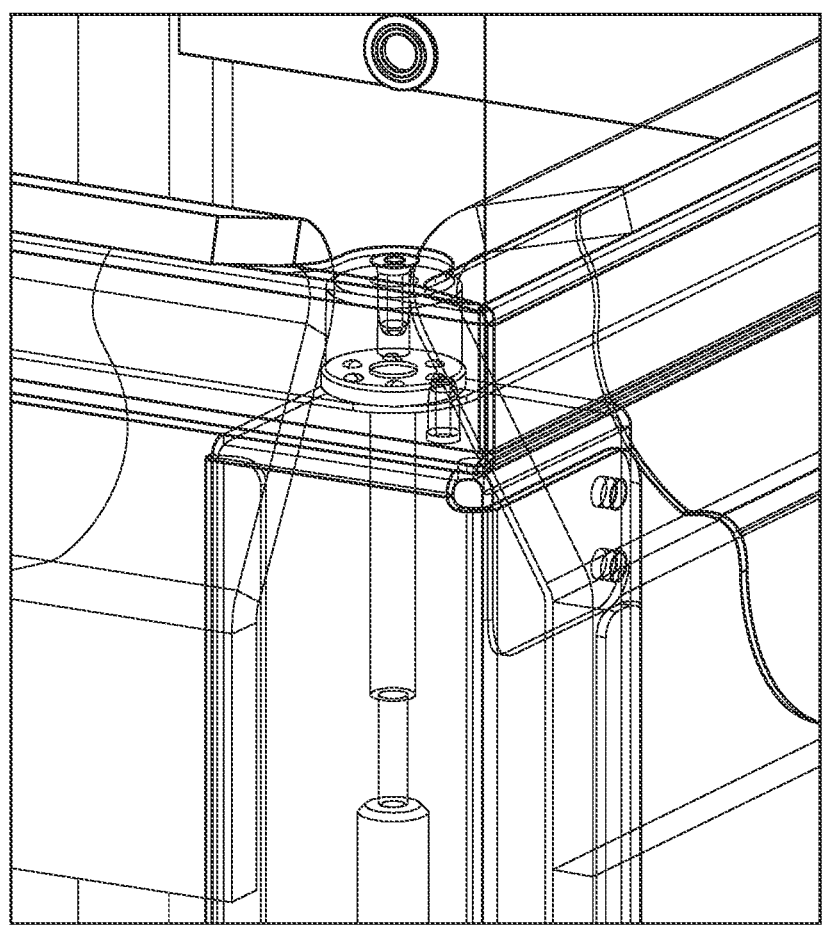

FIG. 57B shows an alternative traveler embodiment featuring straight vertical grommet pegs, sticking down, embedded in the lid. When closed, the pegs insert into holes, locking the bag in place.

Still further alternative traveler designs are possible. Some embodiments may feature a quick turn arm and locking post. Other embodiments may include velcro tabs sewn on to the upper bag corners. Magnets could also be used as clamps.

Figures 58A, 58B:
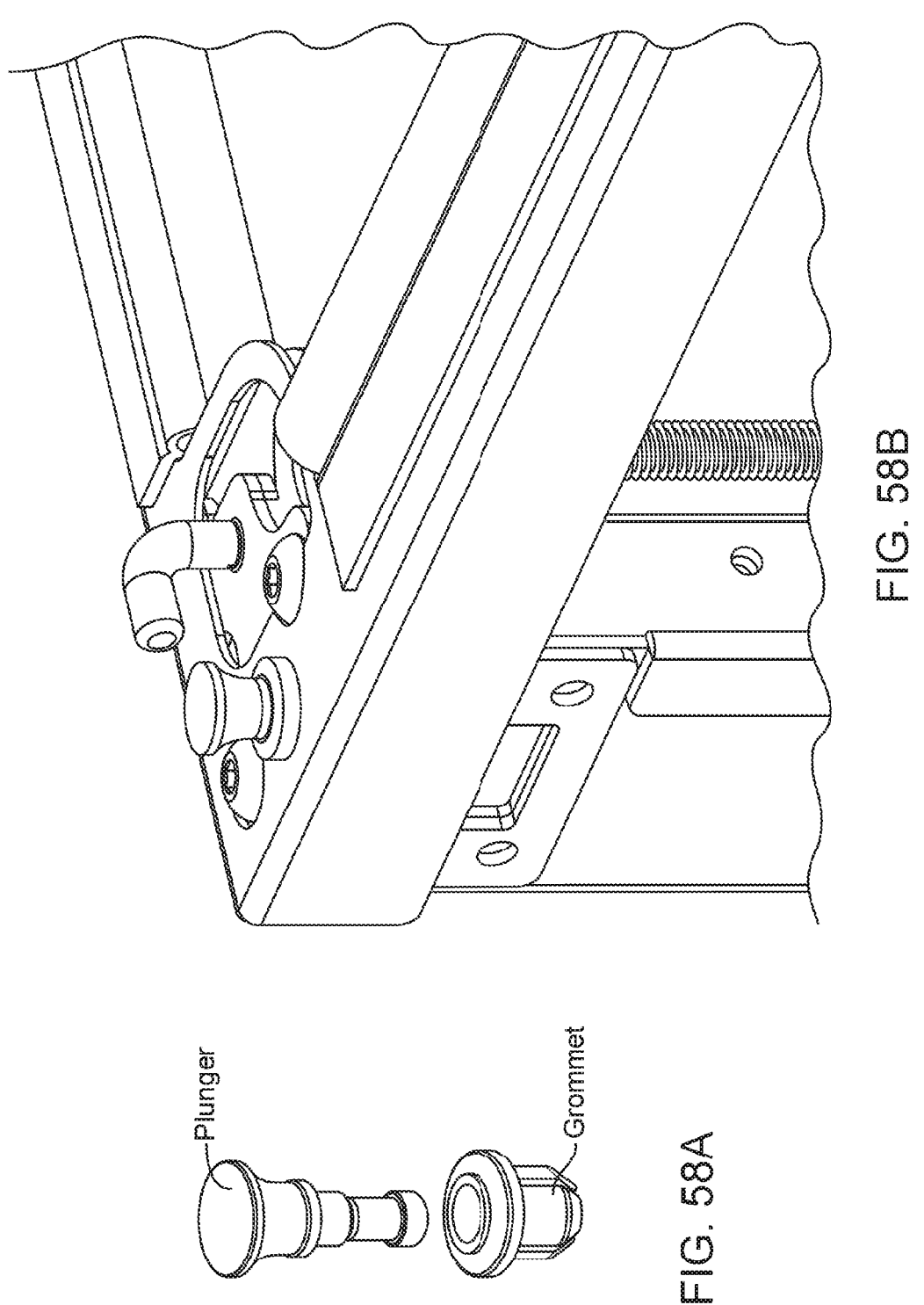
FIGS. 58A-B show simplified views of a plunger and grommet, and traveler embodiment incorporating same.

FIGS. 58A-B show simplified views of a plunger and grommet, and traveler embodiment incorporating same. Here, pop-out panel fastening plungers are installed in bag rim to lock into place. A loop of sheet metal wraps around grommet and bag fabric, clamping the bag in place.

Figures 59A, 59B, 59C:
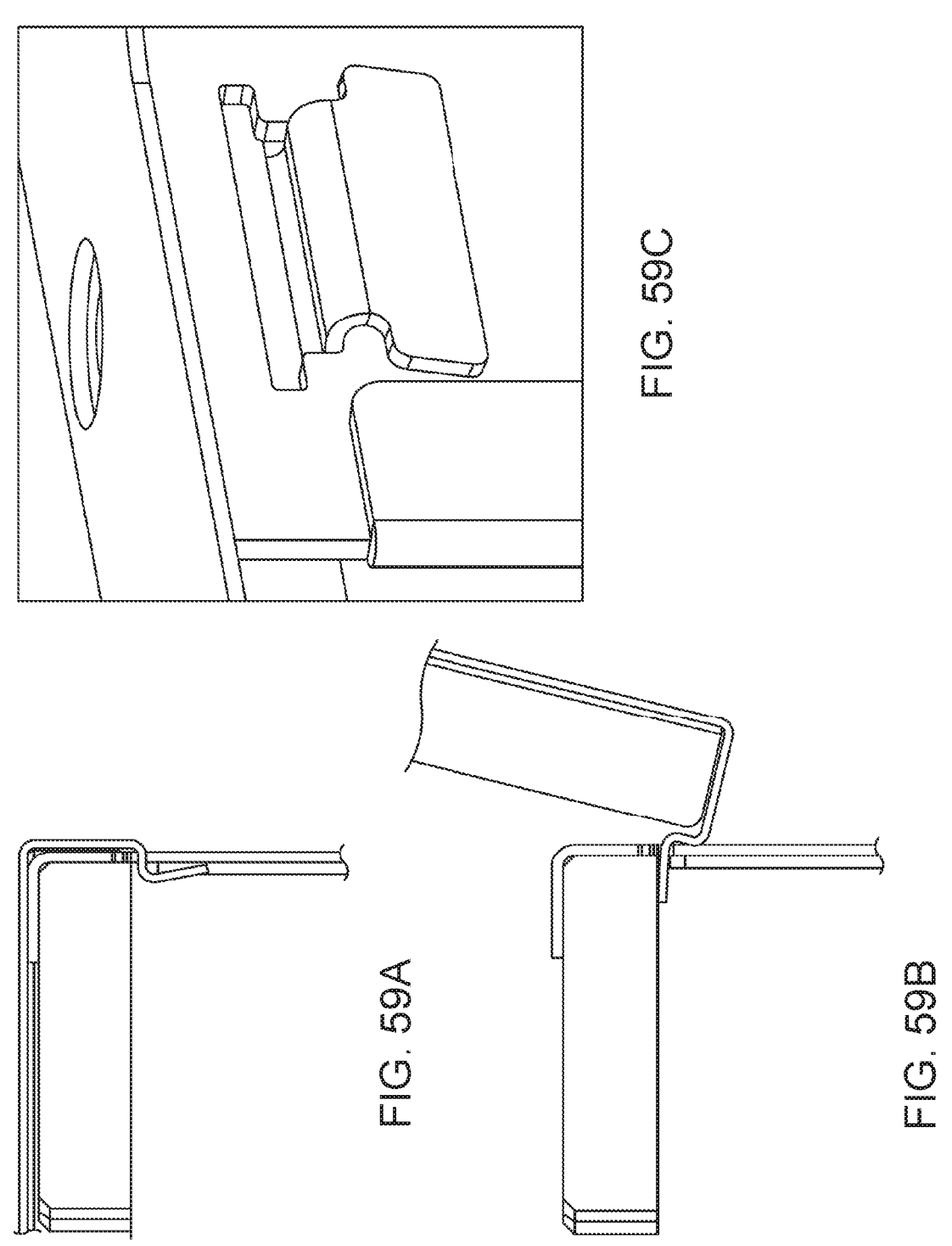
FIGS. 59A-C show simplified views of a hinged lid.
Figures 60A, 60B:
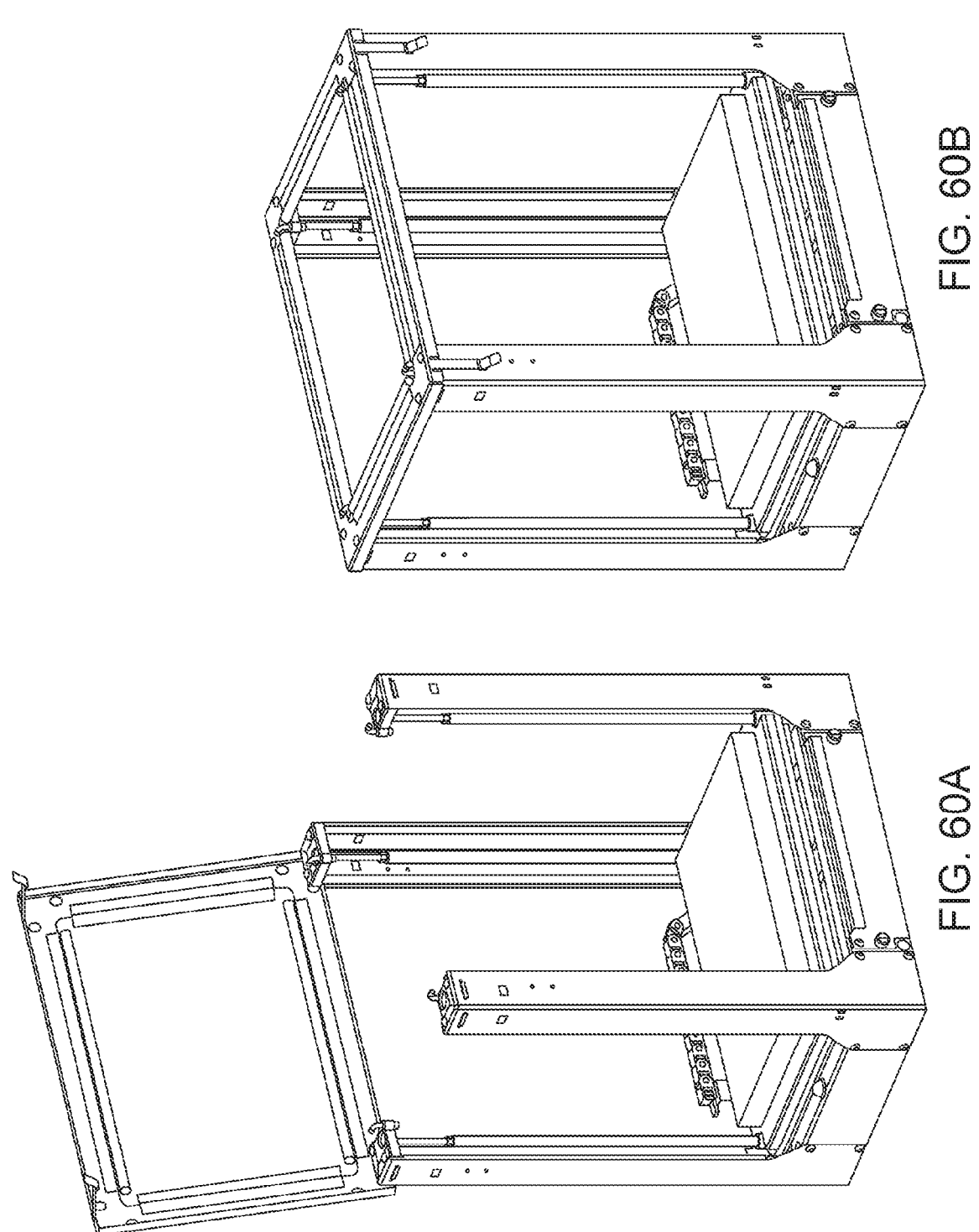
FIGS. 60A-B are perspective views of a traveler with the lid open and closed, respectively.

A traveler according to an embodiment may feature a frame topped with a hinged lid. FIGS. 59A-C show simplified views of a hinged lid. The enlarged view of FIG. 59C shows the T-profile hinge integrated into sheet metal, locked in place after initial assembly by installing a block covering the wide slot. FIGS. 60A-B are perspective views of a traveler showing the hinge and spring clasp, with the lid open and closed, respectively.

According to certain embodiments, the traveler may be powered by a quick-swappable battery pack design that can be easily replaced for charging. The battery pack may comprise a housing and two sealed lead acid batteries wired in series inside the housing.

Figures 61A, 61B:
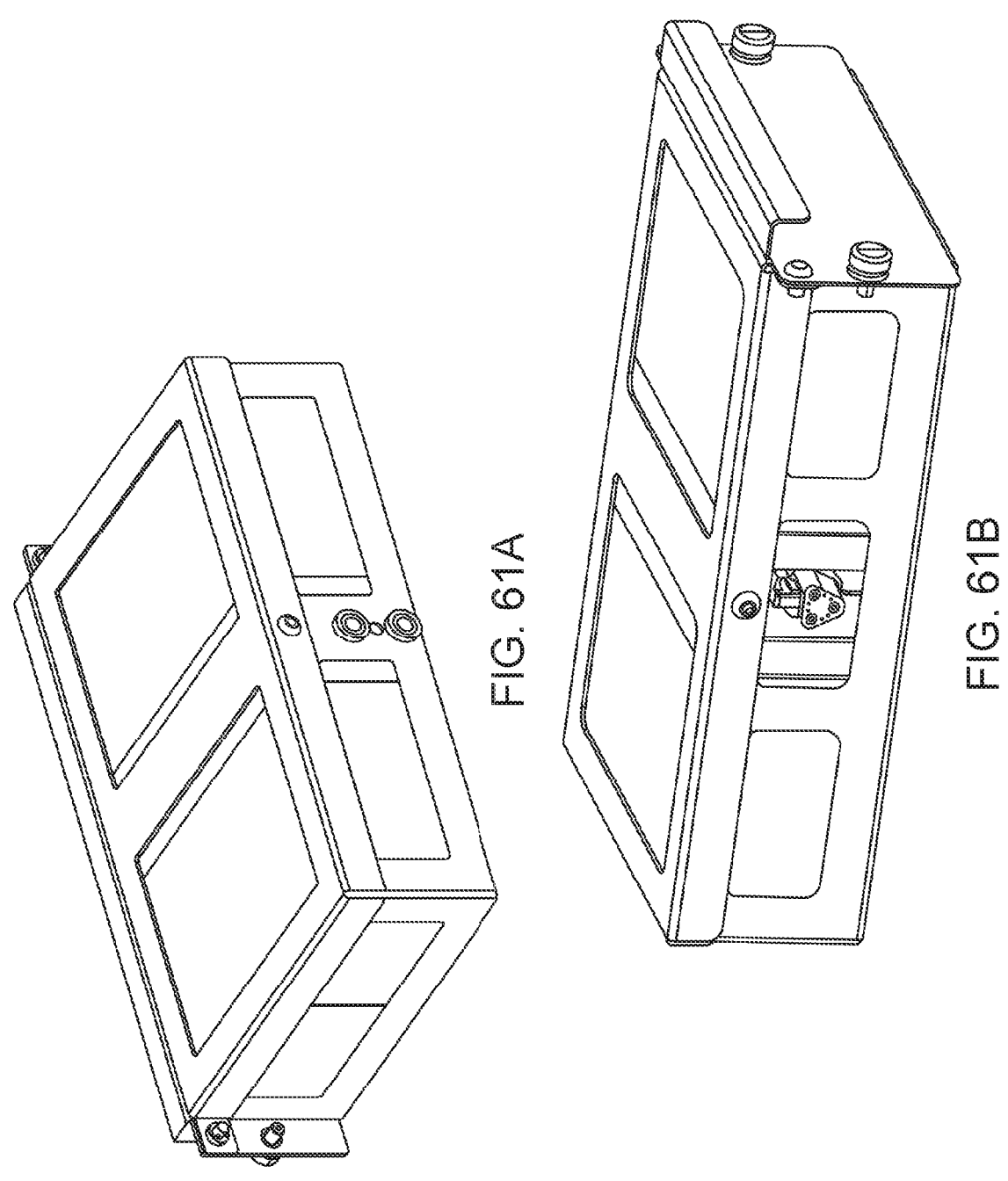
FIGS. 61A-B are perspective views of different battery pack embodiments.

FIG. 61A shows a battery pack embodiment with the power plug located in the back of the housing relative to the front flange. FIG. 61B shows a battery pack embodiment with the power plug located on the side of the housing relative to the front flange.

A processor can measure the battery's state of charge by reading its voltage. When the battery pack is low on charge, it can be removed from the traveler base without tools. It may be unplugged without any loose wires; the power plug and jack are embedded in the traveler base and battery pack housing, respectively.

The battery pack may be charged in a parallel rack system located close to the bag unloading station. A fully charged battery can be loaded into the traveler so it can continue its work with only a short interruption.

Figure 62:
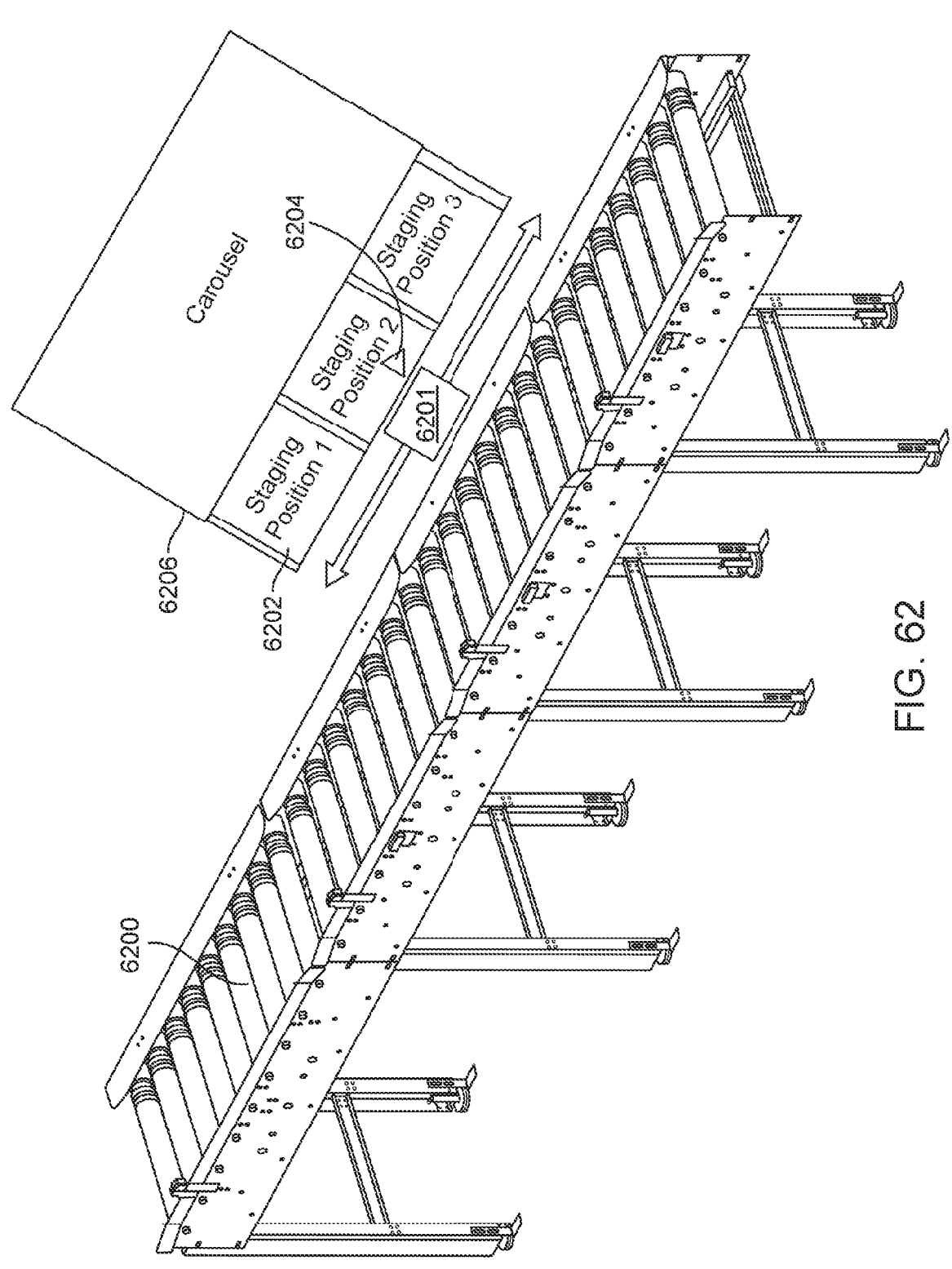
FIG. 62 shows conveyors that can stop at a specific stage, in order to receive items dispensed from a given carousel.

As noted previously, particular embodiments may afford movement of the traveler based on conveyor action. FIG. 62 is a simplified view showing conveyors 6200 can stop tray 6201 in front of an individual staging position 6202, to receive item(s) 6204 dispensed from a given carousel 6206.

In particular embodiments, the conveyor system for the traveler may comprise a collection of modular conveyor sections and 90° transfer stations. This conveyor system moves the travelers around the fulfilment center to accomplish their tasks (e.g., receiving dispensed items, possibly loading trays into carousels).

The conveyors may be arranged in grids and loops. Each section is capable of running in both forward and reverse directions.

According to embodiments, each conveyor section is an independently controlled set of rollers linked together with drive O-rings. One roller pin in each conveyor section has an integrated motor with servo control that allows precise positioning of a traveler on that section, in the dimension of conveyance (e.g., across the dispensing station located at the front of the carousel).

Position control along this dimension, combined with position control of the dispense arms of the tray lifter in a perpendicular dimension, allows items to be dispensed to precise locations in the bag.

When a traveler is supported by rollers of adjacent conveyor sections, control software may instruct coordinated movement of both conveyors until the traveler is fully in control of the downstream section. At that point, the section can move the traveler around without affecting the positions of other travelers.

This independent control can facilitate precise item dispensing at every dispense station. A photoelectric sensor may be integrated in each conveyor section to trigger a reference position of the traveler as it moves onto the section.

Different variations on the design and operation of the traveler component, could serve to enhance system operation. For example, in certain embodiments the traveler may include its own drive system (e.g., wheels, tracks, rails, others) and/or sensors (e.g., cameras, line-following optics) that permit autonomous or semi-autonomous movement throughout the fulfilment center.

Certain embodiments may feature the addition of duplicate bag locking mechanisms. These could allow each traveler to carry multiple bags at once.

It is noted that a single traveler could fulfil a single order, multiple orders, or parts of separate orders, during various trips around the fulfilment center. This can lead to enhanced efficiency.

Certain embodiments may feature the addition of a tray-carrying attachment to the traveler. This would allow the traveler to bring trays to each carousel for loading. Such integration of tray loading and item dispensing with a common moveable structure (the traveler), would lead to substantially simplified operation.

Some embodiments could feature the addition of a high speed actuator capable of moving the load platform downward at high speed. Such near-matching the downward projectile velocity of a dropped item could desirably reduce impact forces on the item and upon the load platform.

Some specific details regarding design and operation of trays according to particular embodiments, are now provided. Trays may be fabricated utilizing an injection molding approach that ensures high strength.

Figure 63A:
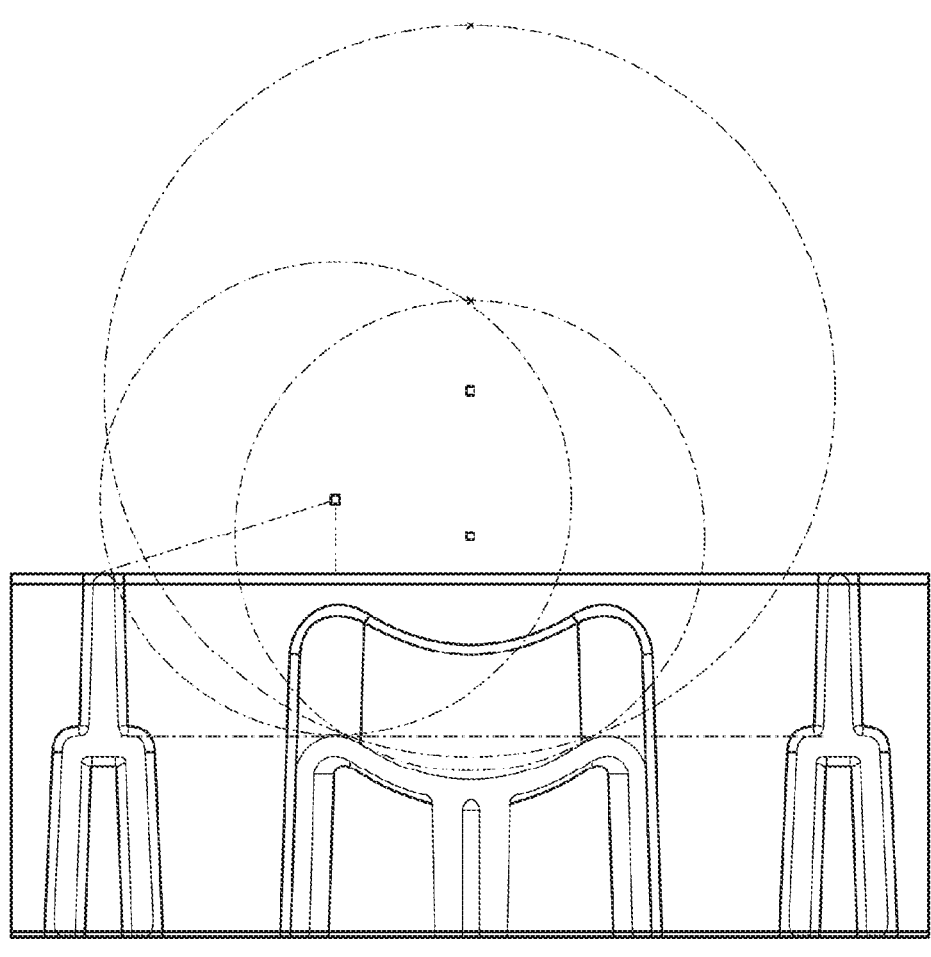
FIG. 63A shows an end view of a tray that is configured to hold circular items.

According to certain embodiments, the entire tray may be created as a single, unitary injection-molded piece. FIG. 63A shows an end view of a tray that is configured to hold circular items.

Here, the largest outer diameter (OD) of a stored item, matches pitch. The smallest OD is determined by a center of a round cross-section not tipping past hump on the center beam of the tray.

Figure 63B:
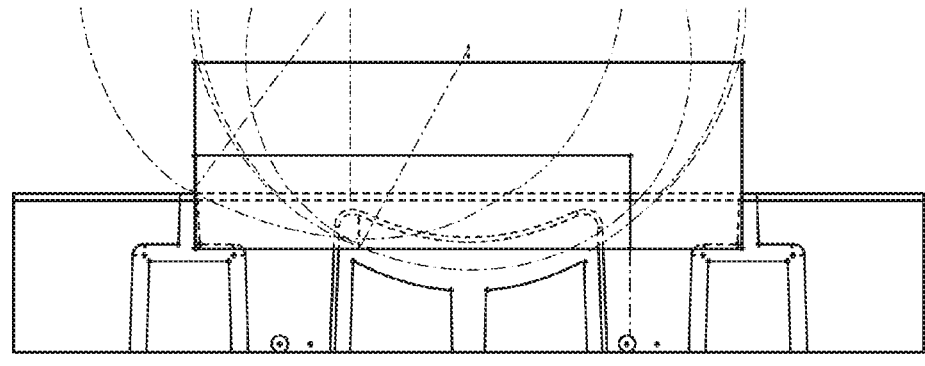
FIG. 63B shows an end view of a tray configured to hold cuboid items.

The strength of the center beam is dependent upon height. This reduces packing density in the carousel. The base may be widened with ribs in order to resist side loads FIG. 63B shows an end view of a tray configured to hold cuboid items. Boxes may also fix in the same rows and rounds. As width of stored items increases, items start to rest upon the lips of side walls. This serves to spread the load while keeping smaller boxes under belts. Conveyor belts of the dispensing station go up through same position, depending on tray type and item type (e.g., round vs cuboid). Belts are designed to ensure contact with the smallest allowable box item of a given tray type.

Figure 64:
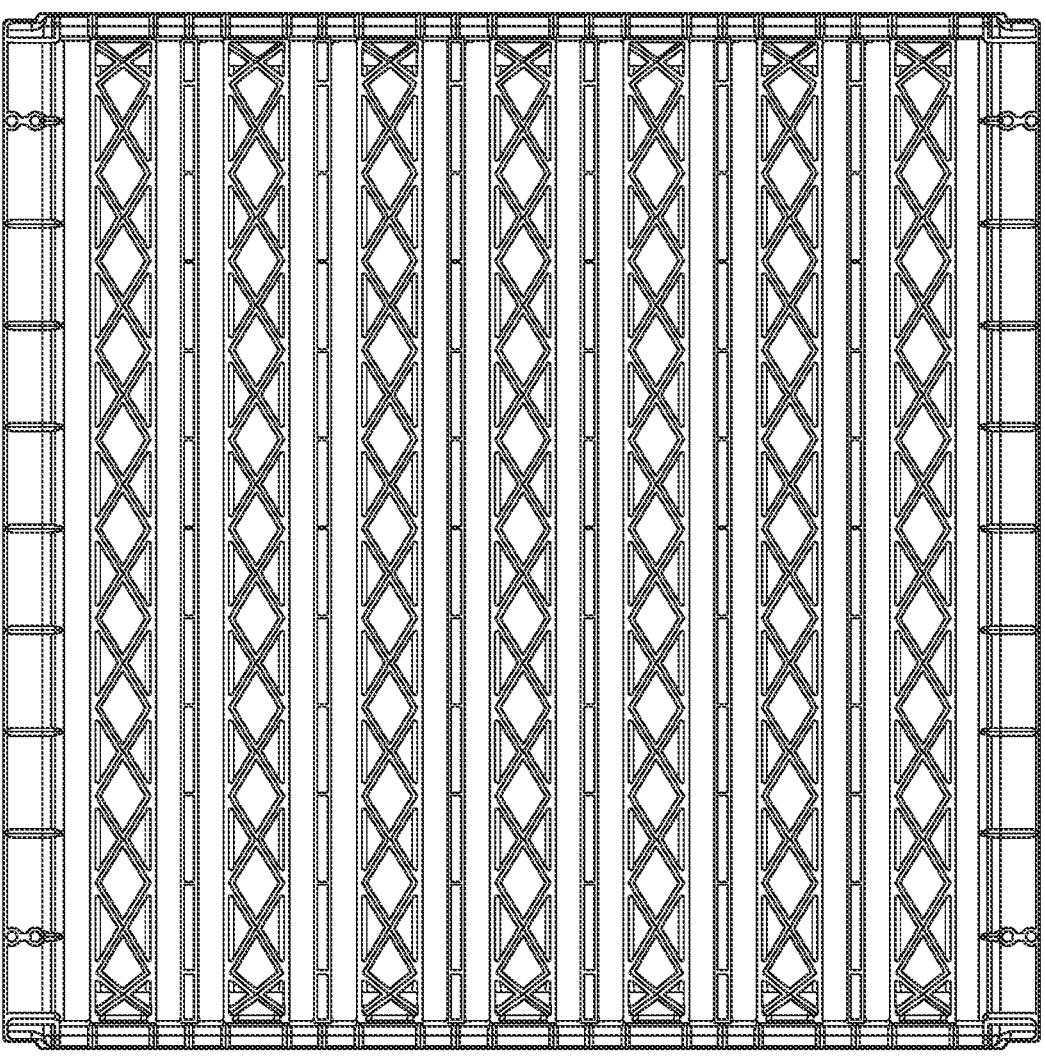
FIG. 64 shows a top view of a tray according to an embodiment.

FIG. 64 shows a top view of a tray according to an embodiment. Bumps stop items from traveling past the curve of the belt. Holes molded in for indexing to the carousel and to the dispense station. Crossing webs to add additional support and torsional resistance Webs in outer beam, align with inner beam walls in order to reduce wall deformation.

Reliance upon a single, unitary tray design, can increase manufacturing cost. Moreover, the resulting fixed size of tray features (e.g., number of rows, width of rows, number and shape of separators) can limit flexibility and degrade efficiency.

Figures 65A, 65B:
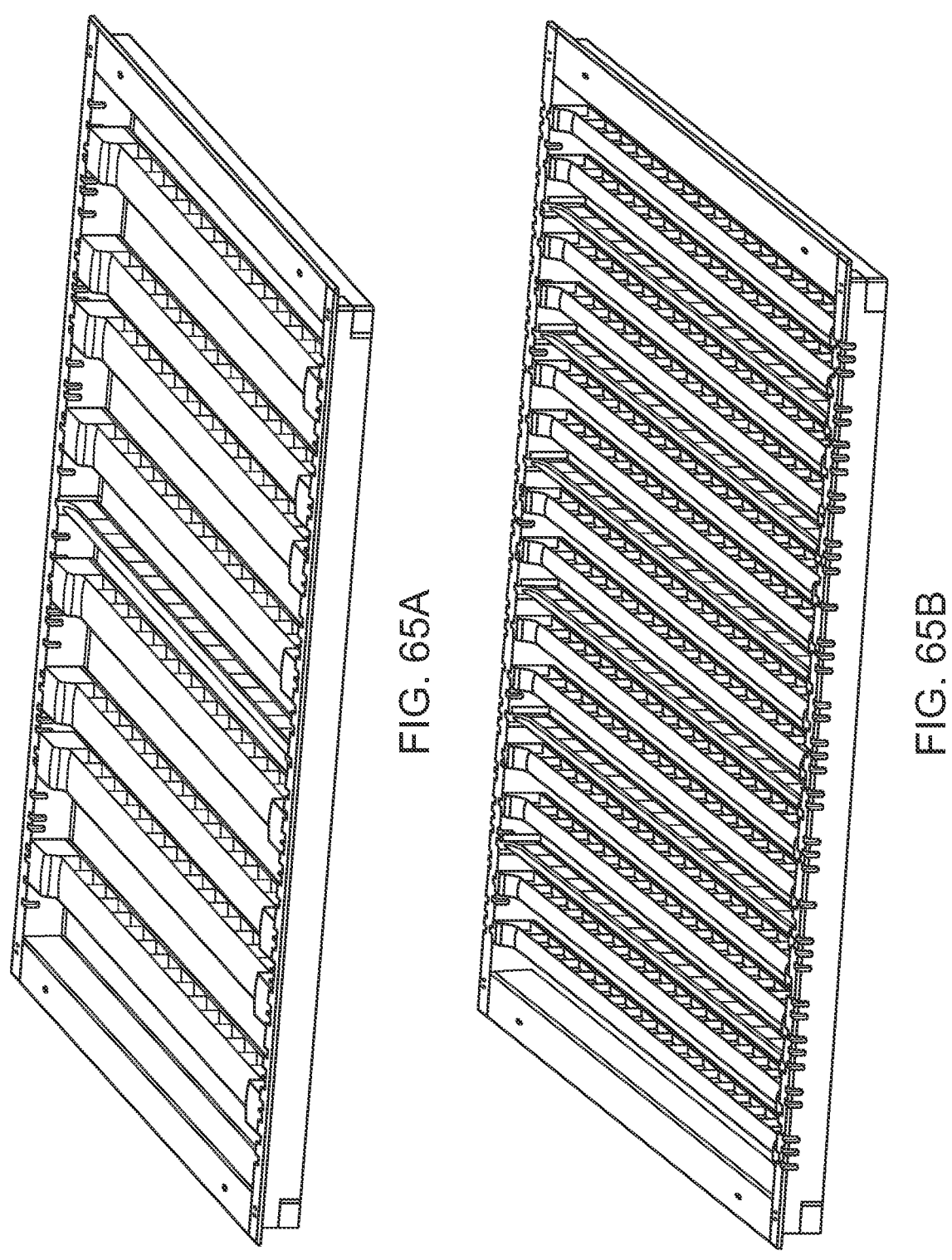
FIGS. 65A-B show perspective views of multiple tray types that may be assembled from a plurality of parts.

Accordingly, alternative embodiments may feature a design that allows different tray types to be assembled from a plurality of injection molded parts. FIG. 65A shows a perspective view of one tray type, and FIG. 65B shows a perspective view of another tray type, that may be assembled from a plurality of parts.

Figures 66A, 66B:
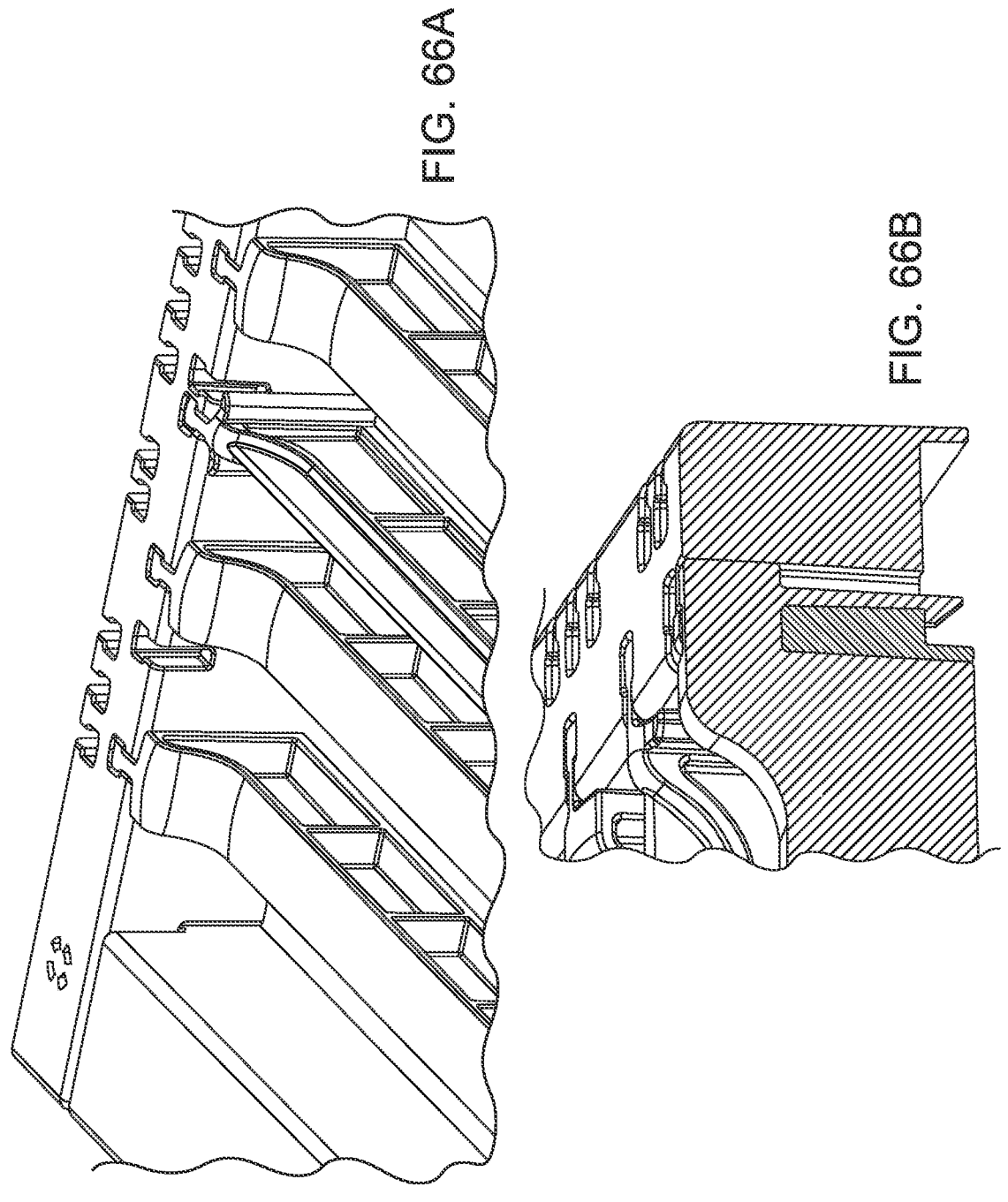
FIGS. 66A-B are enlarged tray views showing multiple types of support beams.

The enlarged tray views of FIGS. 66A-B show 2 types of support beams. One type has mates on both sides. Center beams clip into the support beams. There are 4 types of center beams, with a center separation beam being of one type.

Figure 67A:
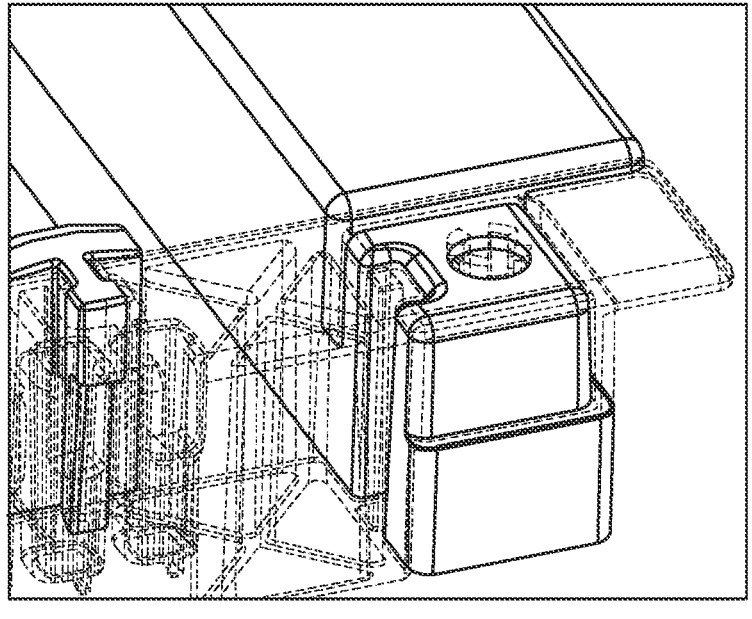
FIGS. 67A-B are enlarged views showing tray features formed from multiple molds.
Figure 67B:
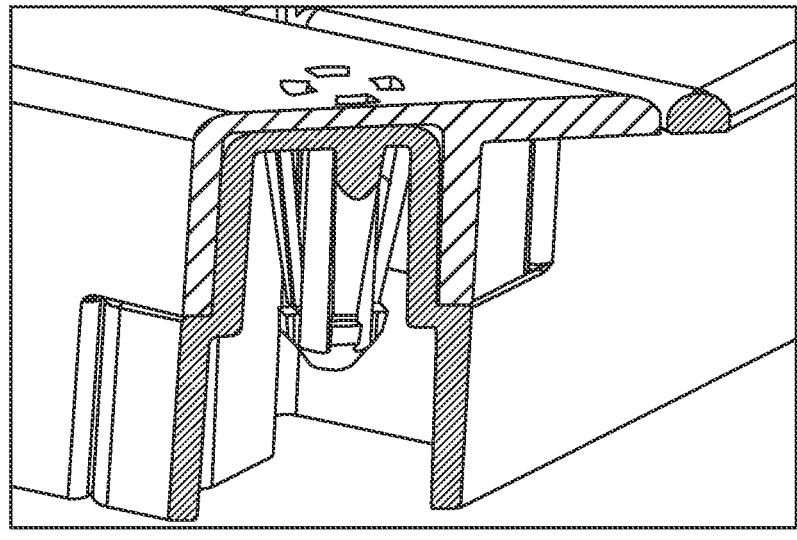

FIGS. 67A-B are enlarged views showing tray features formed from multiple molds. In particular, the view of FIG. 67A shows the support beam fitting over the side beam. Key features keep parts from turning at the bottom. The view of FIG. 67B shows a pin poking through 4 tabs, bending them back, and locking the pin vertically.

In some embodiments, trays having various different features may be assembled on demand. Equipment may be designed to accomplish this tray assembly process.

Specifically, item handling systems according to embodiments may utilize a fixed number (e.g. 10) of tray types. Each tray type may hold a certain size of item.

Individual trays may comprise a plurality of parts in the form of long, narrow, injection molded pieces that clip together to form a tray.

Following item inspection, the tray loading station needs to receive an appropriate tray type to load the inspected item into.

Rather than store stacks of trays of each type, a machine may access the individual pieces stored sorted according to type. Then, on demand, the machine may then assemble a tray of a certain size.

It is noted that the unassembled pieces have a higher storage density than the assembled tray. Thus, on-demand tray assembly can save valuable space within the fulfillment facility.

According to embodiments, the machine could also assemble on-the-fly, trays in configurations other than the limited number of standard types. This could be done by building rows with different spacings, as called for by the tray loading station.

Empty trays removed from the carousel could be returned to the machine. There, the empty trays are automatically broken back down into individual pieces for efficient storage.

Such approaches featuring on-demand tray assembly, may offer one or more benefits. As mentioned above, these approaches may save space on the line.

Also, on-demand tray assembly may allow for a larger variety of trays types, and may decrease the distance a tray has to travel to get to the tray loading station if the machine can be located closer (potential time reduction).

On-demand tray assembly may reduce the total number of tray piece parts required. This is because trays can be reconfigured as necessary, rather than wasting tray inventory space on tray types that aren't being utilized.

Figure 68:
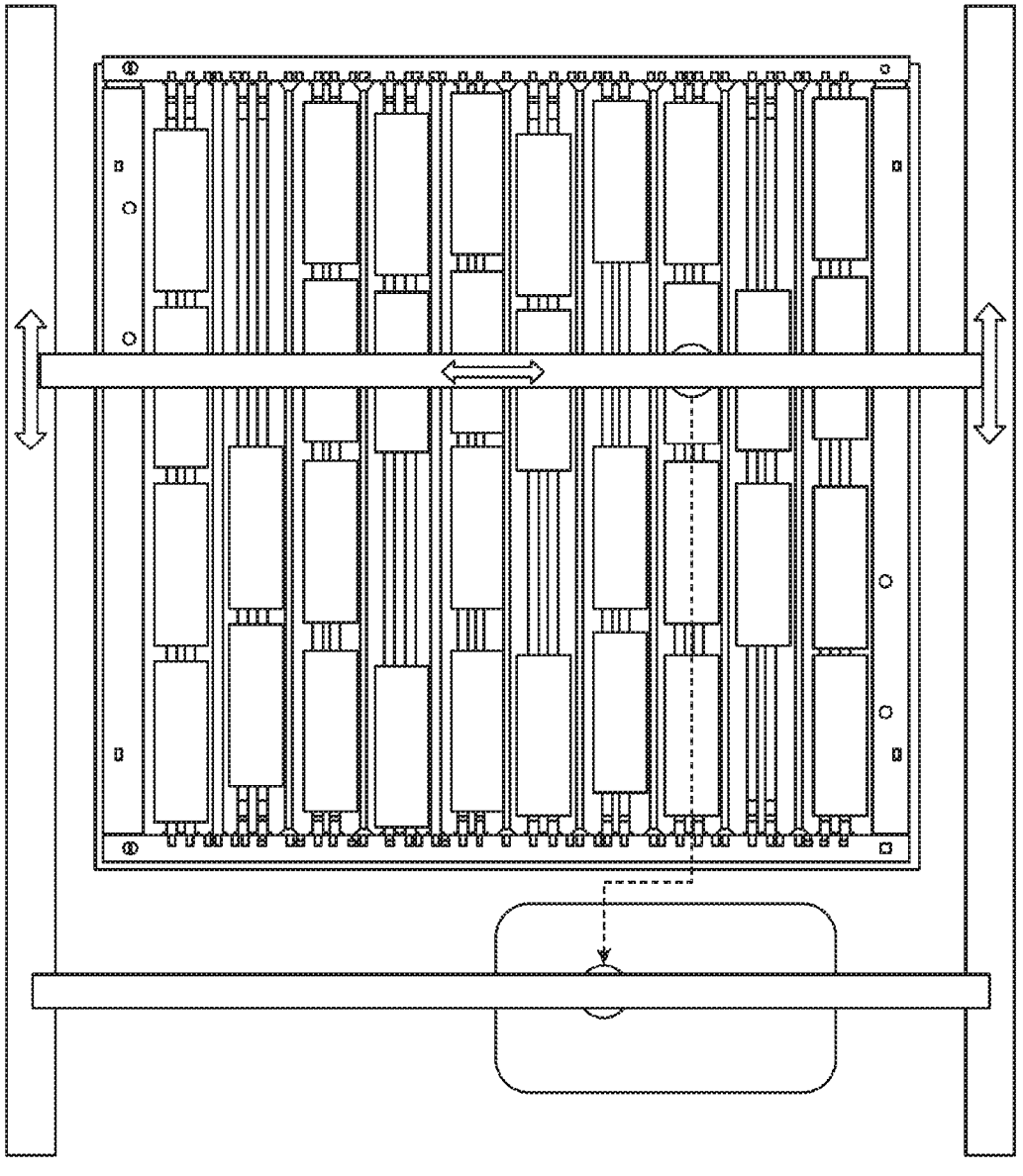
FIG. 68 shows a simplified view of a gantry robot according to an embodiment.

Returning now to discussion of general system operation, under some circumstances it may be desired to dispense an item that is not located at the end of a tray row (e.g., is stored in the middle of the tray). Accordingly, certain embodiments may utilize a gantry robot for dispensing purposes, as is shown in the simplified view of FIG. 68.

For example, when each item in a SKU has a different value, it may be desired to dispense from the center of a tray. Thus where the product is a steak, there may be 40 images of different cuts of steak that are available to show the customer for selection. By allowing a gantry to access center portions of the tray, all of the steak cuts can be available for dispensing.

Another possible circumstance that may be favorable to the use of a gantry robot, is where the items are not amenable to conveyor dispensing. This could be due, for example, to the items' size, shape, and weight. In such cases, a gantry robot may be a viable alternative.

Also, when items are small and thin (e.g., a gravy packet or beef jerky pouch), it would be advantageous to stack them vertically in one tray and then pick the top item from each tray. This increases density.

Finally, dispensing with a gantry robot could be useful when an item is rarely purchased. Under such circumstances, it is inefficient to carry an entire row of that SKU. The use of a gantry robot to pick from the center of a tray, allows placement of multiple SKUs in one row, and picking them out as needed.

It is further noted that a gantry robot could be employed in combination with a conveyor. Specifically, a gantry fixed at the end of conveyor belt(s) could catch the item and lower it into the bag. This could reduce damage to items.

Item handling systems according to embodiments, may not be limited to a single physical location. Items may be dispensed and delivered from multiple smaller sites that are located relatively close to one another (e.g., in different neighborhoods within a single large metropolitan area).

Under such conditions, an inventory management solution may feature one central store (the hub) and many satellite stores (the spokes). This approach could be implemented with tray packaging performed at the hub, and trays shipped to each spoke. Carrying racks could be designed to allow distribution vehicles to rapidly and easily perform loading, transport, and unloading.

Figure 69:
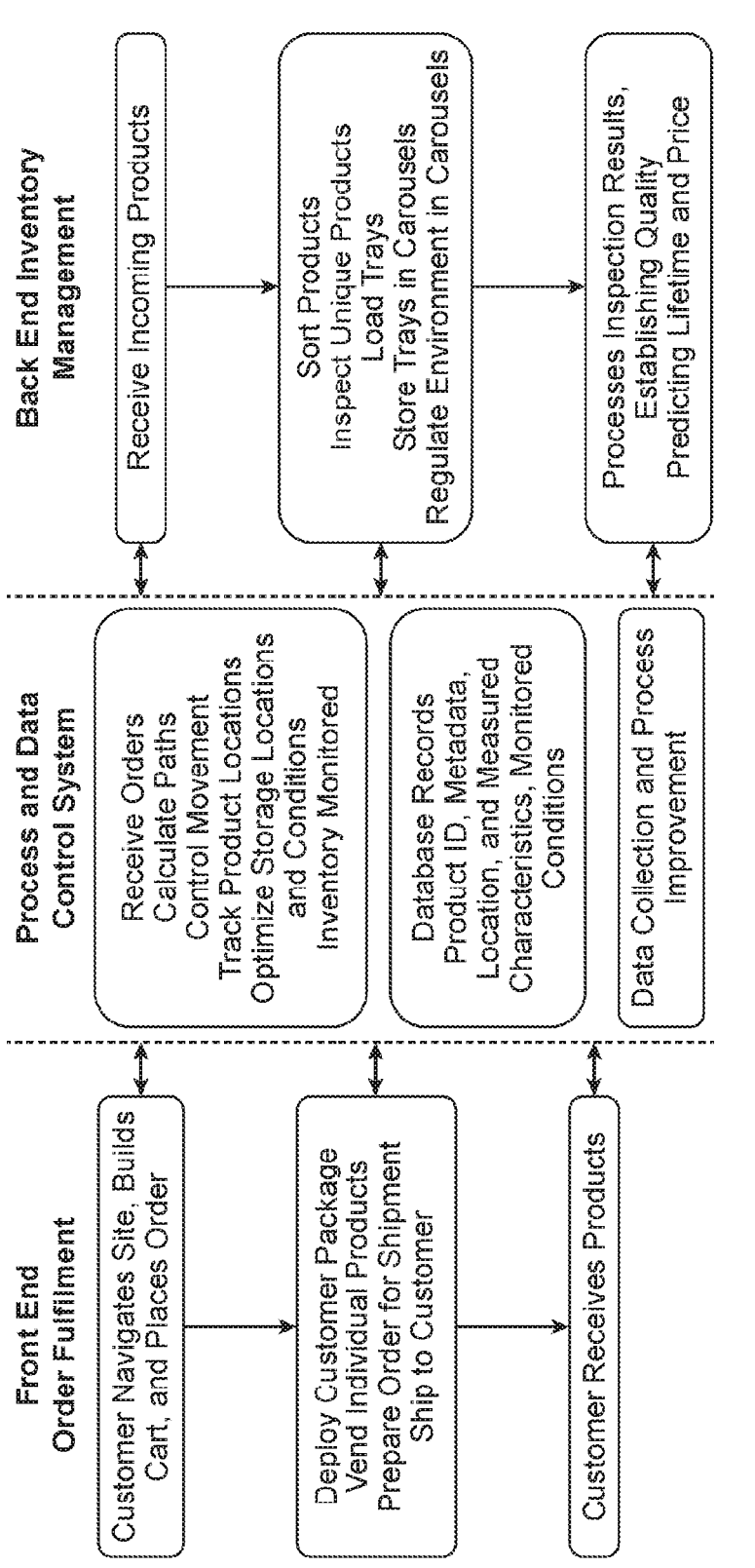
FIG. 69 is a simplified flow diagram summarizing process control according to an embodiment.

In summary, FIG. 69 offers a simplified flow diagram of a process control according to an embodiment. This flow diagram illustrates the interaction between a central process and control system with various phases of order fulfillment on the front end, and inventory management on the back end.

A system according to various embodiments may include one or more features to enhance automated dispensing and delivery of handled items. For example, in order to replace pallet jacks, robotic pallet jacks can be utilized remove items from trucks that are delivering bulk goods for intake, inspection, sorting, and loading into carousels. Also, robotics systems that can raise and lower pallets and insert into shelving, may be relied upon to lift pallets onto shelves. Further, once a pallet is ready for inspection, automation equipment may move boxes from pallets, and move the box contents onto a conveyor.

Moreover, particular embodiments may automate order packing as follows. When a full traveler arrives, equipment would lift a bag out of the traveler and move it to a shipping area. Another piece of equipment could place a new bag into the traveler.

A robotic cart would be deployed to transport bags from the factory to the parking lot. The robotic cart would place bags into the mode of transportation for delivery.

A variety of delivery options are of course possible. Vehicles could be manually driven by humans, or self-driven. Alternatives can include delivery by bikes, carts, drones, or trucks plus drones.

It is noted that various embodiments may enhance a customer's experience by allowing flexibility and choice in selecting items. A customer may search for items on a website utilizing a search bar.

Under this approach, the user enters a product name, and in response is presented with a list of options. The customer selects an option, which is added to the customer's cart. While the search bar approach is fast for individual items, it can be laborious for a cart comprising multiple items. Also, the search bar approach requires a customer to know desired items in advance.

In contrast, with the search bar approach, an aisle-based approach involves a customer seeking a particular product item, to traverse a complex hierarchy. Thus, a customer seeking to purchase a red onion, may need to:
click fruits and vegetables
click vegetables, then
scroll to find red onions.

Such an aisle-based approach takes longer than searching if a customer knows ahead of time what is desired. But, the aisle approach affords the customer the ability to browse different options, and get inspiration for other products. However, aisle-based selection can be tedious due to the many possible available options to scroll through in each aisle.

Accordingly, particular embodiments may permit customer searching for items based upon categories. This approach can specifically lead customers to the particular items that they want to buy.

Under the category-based approach, a customer browses item categories, permitting visualization in a more useful manner. The categories would begin as general, and then narrow to become more specific.

Figure 70:
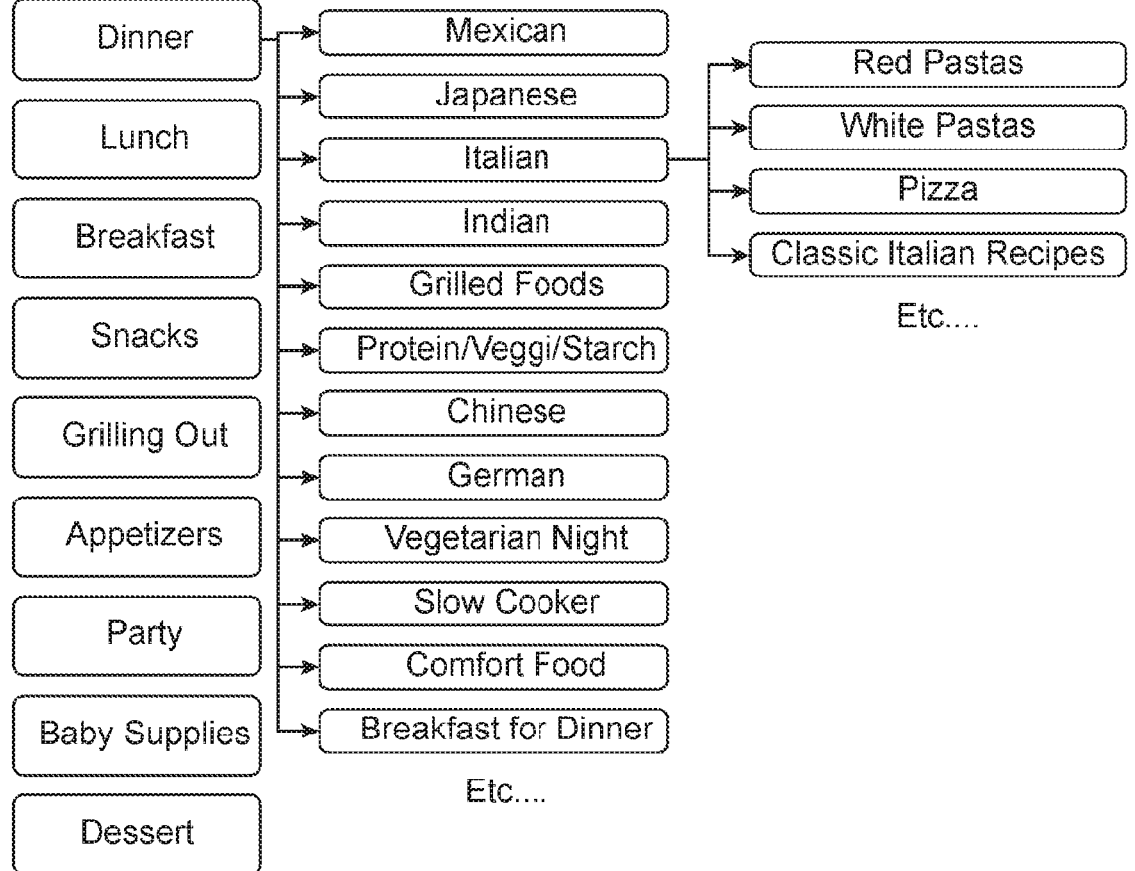
FIG. 70 shows a simplified view of food item categories organized into a tree hierarchy for searching.

For example, FIG. 70 shows a simplified view of categories for food items that are organized into a tree hierarchy. Once the category "Pizza" is selected by a customer, the website offers a variety of items for selection.

One possibility is to display for customer selection, standard pizza options (e.g., pizza crust, sauce, cheese). Meat Lovers will add sausage and salami (for example). Such category-based searching can depict ingredients going into making a pizza. So, this approach shows different types of pizza dough (frozen, refrigerated, different brands), the sauces (bottled, cans, brands), different vegetables, etc.

Then, the user could (de) select one or more suggested items, removing or changing the brand. Finally, the user could add to the cart all of the items selected by category, and move on to a different category.

Over time, an engine of the system could learn preferences of specific users/user groups, and suggest appropriate option the next time the pizza category is selected.

Embodiments may suggest ideas to a customer based upon machine learning. Embodiments could suggest specific items for purchase available in stock in large volumes.

Through the user of category-based searching, the consumer's experience is more rapid and intuitive. For example, in shopping for grocery items, customers traditionally think in terms of item groups of meals and categories, e.g.:

"We need three dinners tonight, I need breakfast and lunch food for the week and I wanted to make that chocolate cake on Wednesday for Sue to take to school".

Here, the user can go to each category and select out their dinners in a few action steps (e.g., clicks). Similarly, a customer can select a recipe for the cake and obtain all the ingredients at once, or they can click each ingredient from one basic list if they have a recipe.

In this manner, customers are free to select items in a more intuitive manner, mirroring how they think and in terms of groups of items. Thus instead of having to choose and select 30 separate items, they are selecting instead only 7:

3 dinners
2 lunch options
1 breakfast option
1 cake option.

Category-based selection can enhance the speed of purchase, moving customers through the site faster. Currently it can take around 60 min to fill a virtual shopping cart, a time comparable to (or even longer than) physically going to a grocery store. Improving the check out time is can aid in securing a steady on-line customer base.

Category-based item shopping can also enhance the flexibility of the seller. Grocery stores may seek to leverage relations between items by placing them in physical proximity (e.g., salsa next to chips, marinades by the meat counter). However, this is done in a crude, opportunistic manner, constrained by available physical space (it is unfeasible to position pizza sauce, veggies, pepperoni, and pizza dough, all in a same aisle).

By contrast, a website offers a virtually unlimited variety of ways to group related items to facilitate common purchase. Category-based selection leverages this inherent advantage of web-based shopping, to enhance the user's experience.

As described in detail above, embodiments of systems and methods for handling items may be particularly suited for implementation in conjunction with a host computer including a processor and a computer-readable storage medium. Such a processor and computer-readable storage medium may be embedded in the apparatus, and/or may be controlled or monitored through external input/output devices.

Figure 71:
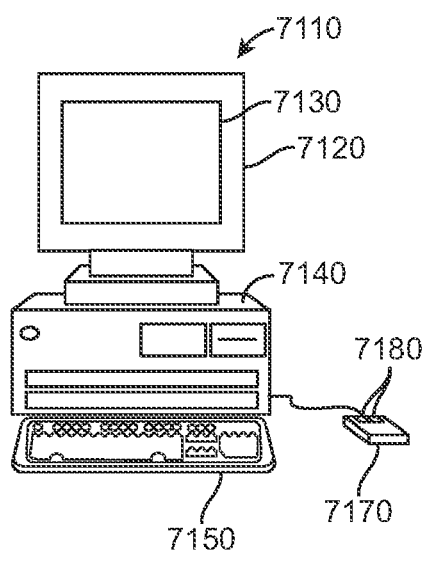
FIG. 71 shows an embodiment of a computer system utilized to implement item handling.

FIG. 71 is a simplified diagram of a computing device for processing information according to an embodiment. This diagram is merely an example, which should not limit the scope of the claims herein. One of ordinary skill in the art would recognize many other variations, modifications, and alternatives.

Embodiments according to the present invention can be implemented in a single application program such as a browser, or can be implemented as multiple programs in a distributed computing environment, such as a workstation, personal computer, mobile device or a remote terminal in a client server relationship.

FIG. 71 shows computer system 7110 including display device 7120, display screen 7130, cabinet 7140, keyboard 7150, and mouse 7170. Mouse 7170 and keyboard 7150 are representative "user input devices." Mouse 7170 includes buttons 7180 for selection of buttons on a graphical user interface device. Other examples of user input devices are a touch screen, light pen, track ball, data glove, microphone, and so forth.

FIG. 71 is representative of but one type of system for implementing various embodiments. It will be apparent to one of ordinary skill in the art that many system types and configurations are suitable for use in conjunction with item handling.

According to one example, computer system 7110 includes a Pentium™ class based computer, running Windows™ XP™ or Windows 7™ operating system by Microsoft Corporation. However, the apparatus is easily adapted to other operating systems and architectures by those of ordinary skill in the art without departing from the scope of the present invention.

As noted, mouse 7170 can have one or more buttons such as buttons 7180. Cabinet 7140 houses familiar computer components such as disk drives, a processor, storage device, etc. Storage devices include, but are not limited to, disk drives, magnetic tape, solid-state memory, bubble memory, etc. Cabinet 7140 can include additional hardware such as input/output (I/O) interface cards for connecting computer system 7110 to external devices external storage, other computers or additional peripherals, further described below.

Figure 71A:
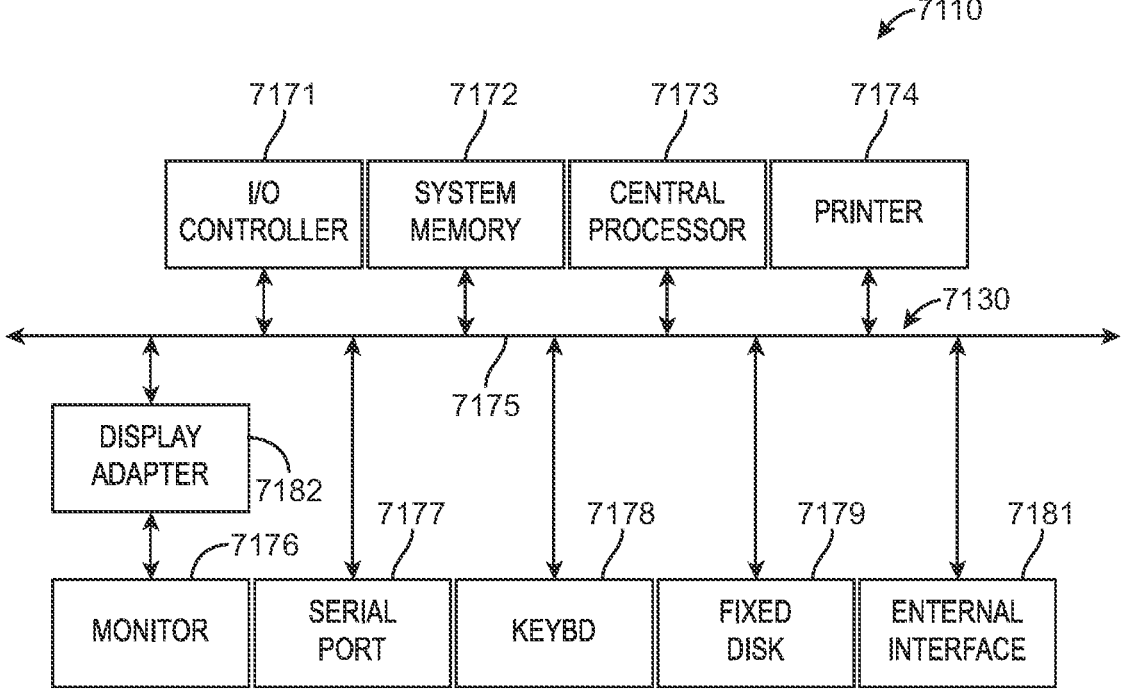
FIG. 71A illustrates basic subsystems in the computer system of FIG. 71.

FIG. 71A is an illustration of basic subsystems in computer system 7110 of FIG. 71. This diagram is merely an illustration and should not limit the scope of the claims herein. One of ordinary skill in the art will recognize other variations, modifications, and alternatives.

In certain embodiments, the subsystems are interconnected via a system bus 7175. Additional subsystems such as a printer 7174, keyboard 7178, fixed disk 7179, monitor 7176, which is coupled to display adapter 7182, and others are shown. Peripherals and input/output (I/O) devices, which couple to I/O controller 7171, can be connected to the computer system by any number of approaches known in the art, such as serial port 7177. For example, serial port 7177 can be used to connect the computer system to a modem 7181, which in turn connects to a wide area network such as the Internet, a mouse input device, or a scanner. The interconnection via system bus allows central processor 7173 to communicate with each subsystem and to control the execution of instructions from system memory 7172 or the fixed disk 7179, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

As previously mentioned, item handling systems according to embodiments are not limited to conveyor-type systems. Alternative embodiments could include a drive system for a traveler that is responsible for receiving items dispensed from a carousel, and even also responsible for moving trays having items disposed thereon, for loading into a carousel.

Figures 72A, 72B:
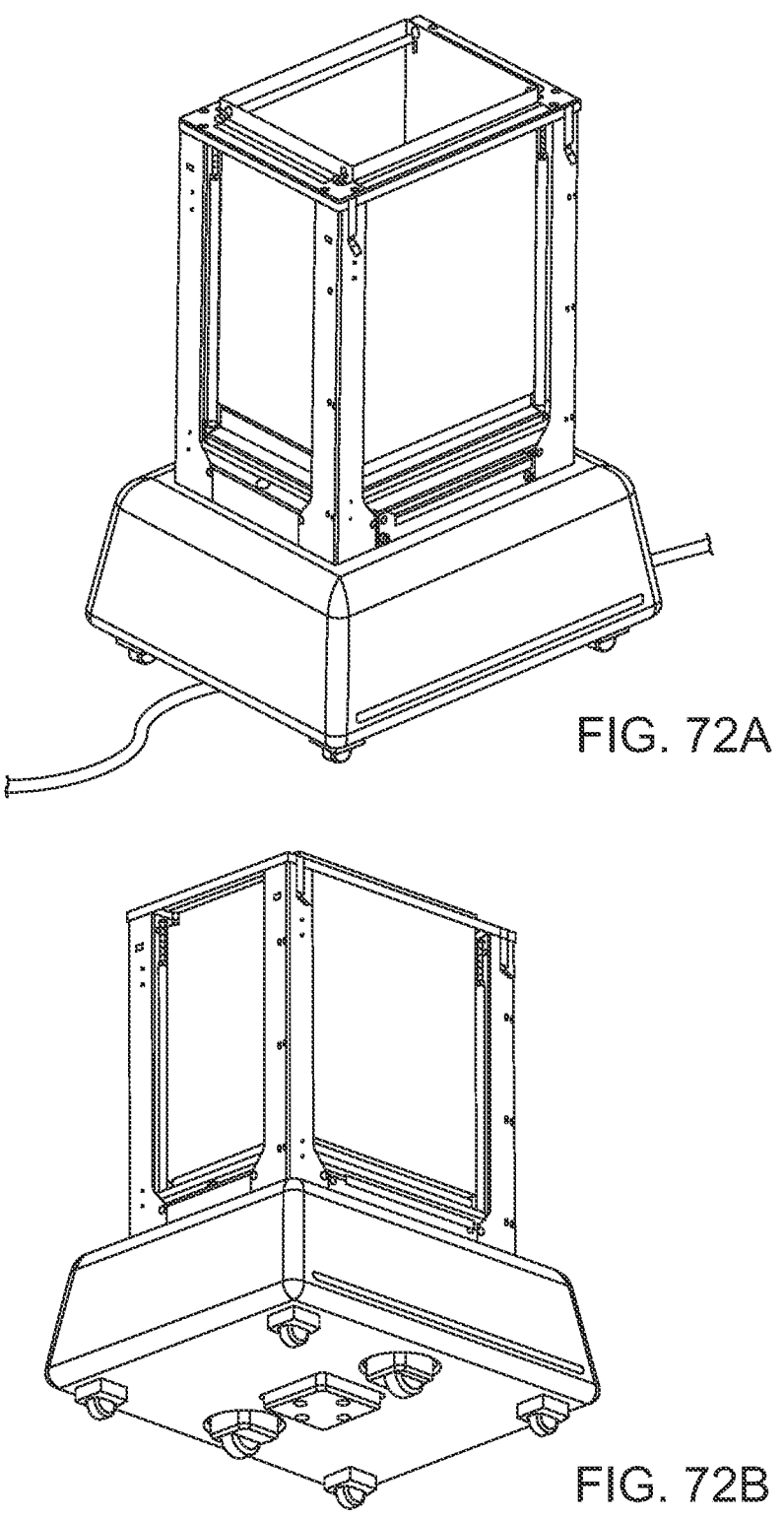
FIGS. 72A-B show views of different traveler embodiments featuring a drive system.

FIGS. 72A-B show views of different traveler embodiments featuring a drive system. Such a traveler may feature integration of a drive system, e.g., tracks (FIG. 72A), wheels (FIG. 72B), others, and sensors (e.g., cameras, line-following optics) in order to allow the traveler to move itself around the fulfilment center.

Figures 73A, 73B:
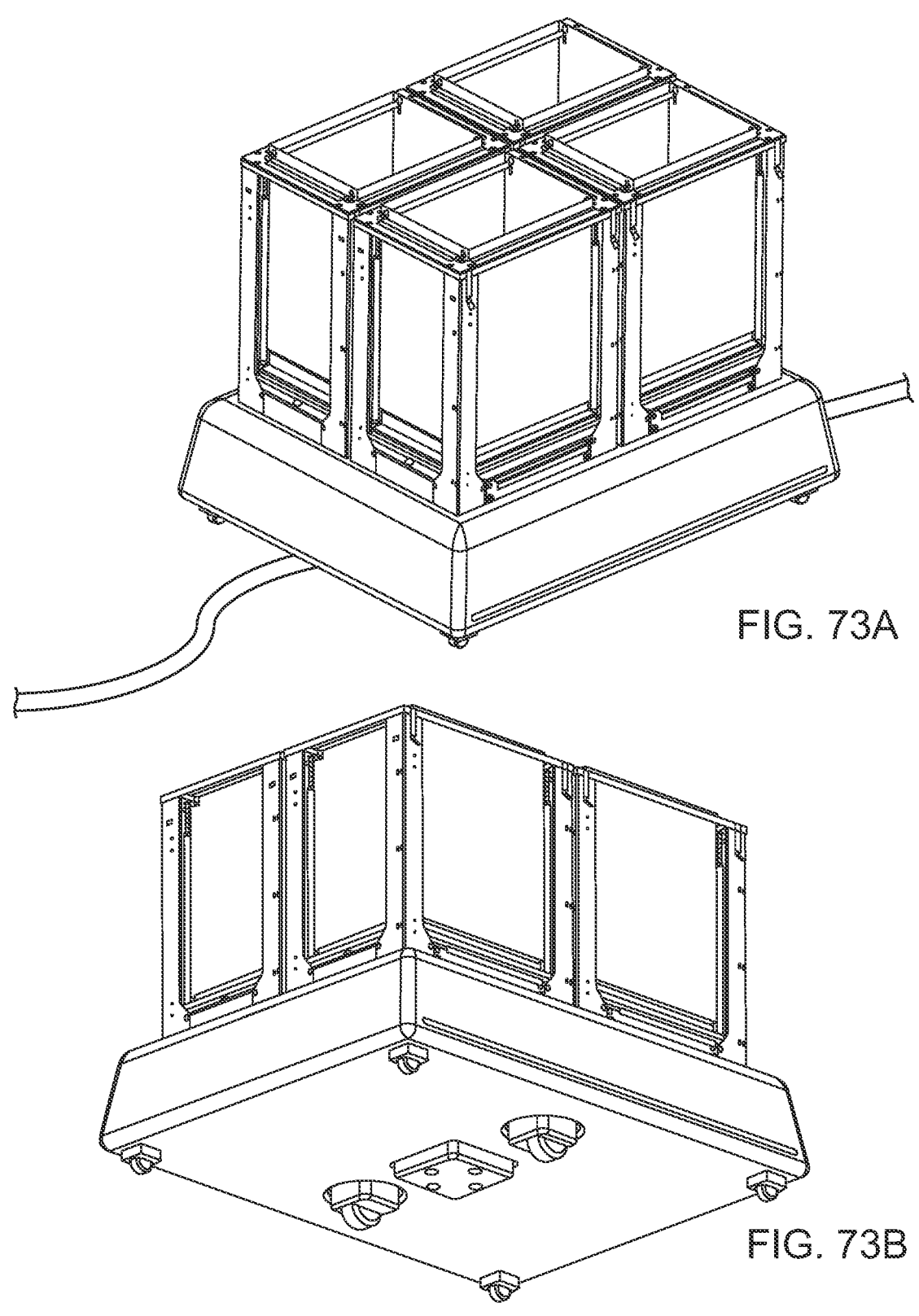
FIGS. 73A-B show embodiments of tracked and wheeled travelers, respectively, featuring multiple bags added to a single drive unit.

Moreover, certain embodiments of travelers may feature multiple bags added to a single drive unit, e.g., track (FIG. 73A), wheels (FIG. 73B). Such embodiments may feature duplicate bag locking mechanisms so that each traveler can carry multiple bags at once. In this manner, a single traveler can fulfil more of a single order, or parts of separate orders, during trips around the fulfilment center for improved efficiency.

Figure 74A:
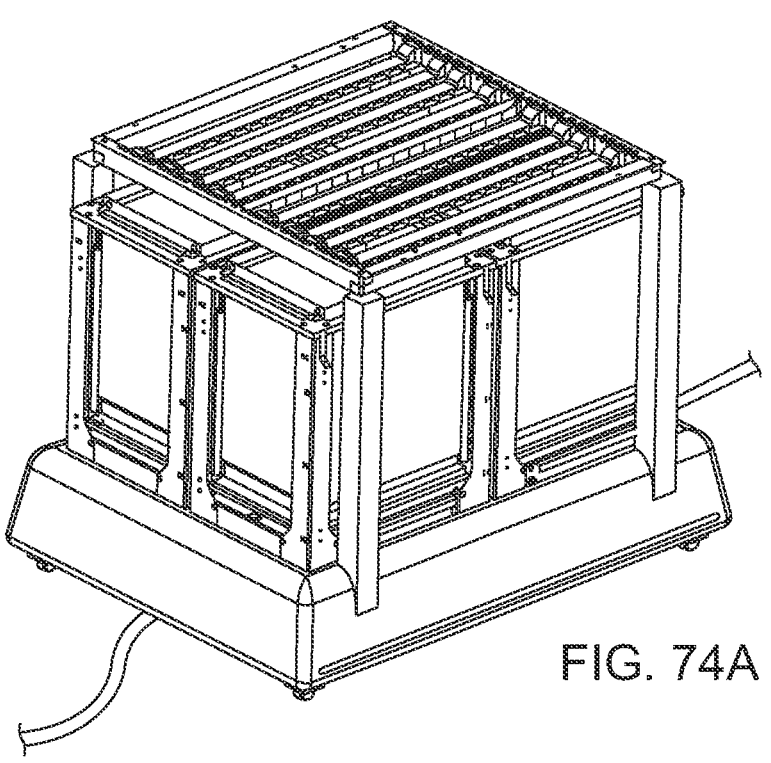
FIGS. 74A-B show embodiments of tracked and wheeled travelers, respectively, carrying a tray.
Figure 74B:
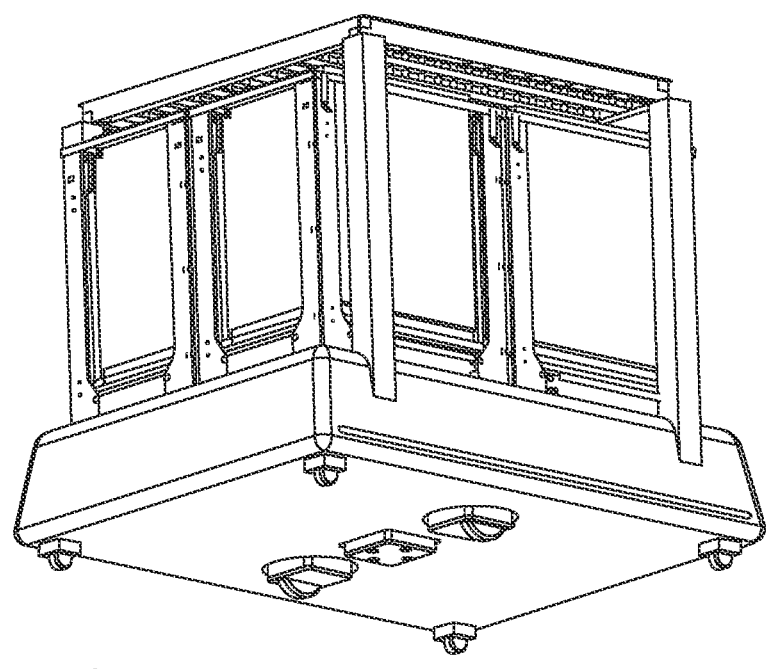

It is further noted that a traveler may be equipped to include a tray carrying capability. The addition of such a tray-carrying attachment may allow the traveler to bring trays to each carousel. FIGS. 74A-B show embodiments of tracked and wheeled travelers, respectively, carrying a tray.

Figures 75A, 75B, 75C:
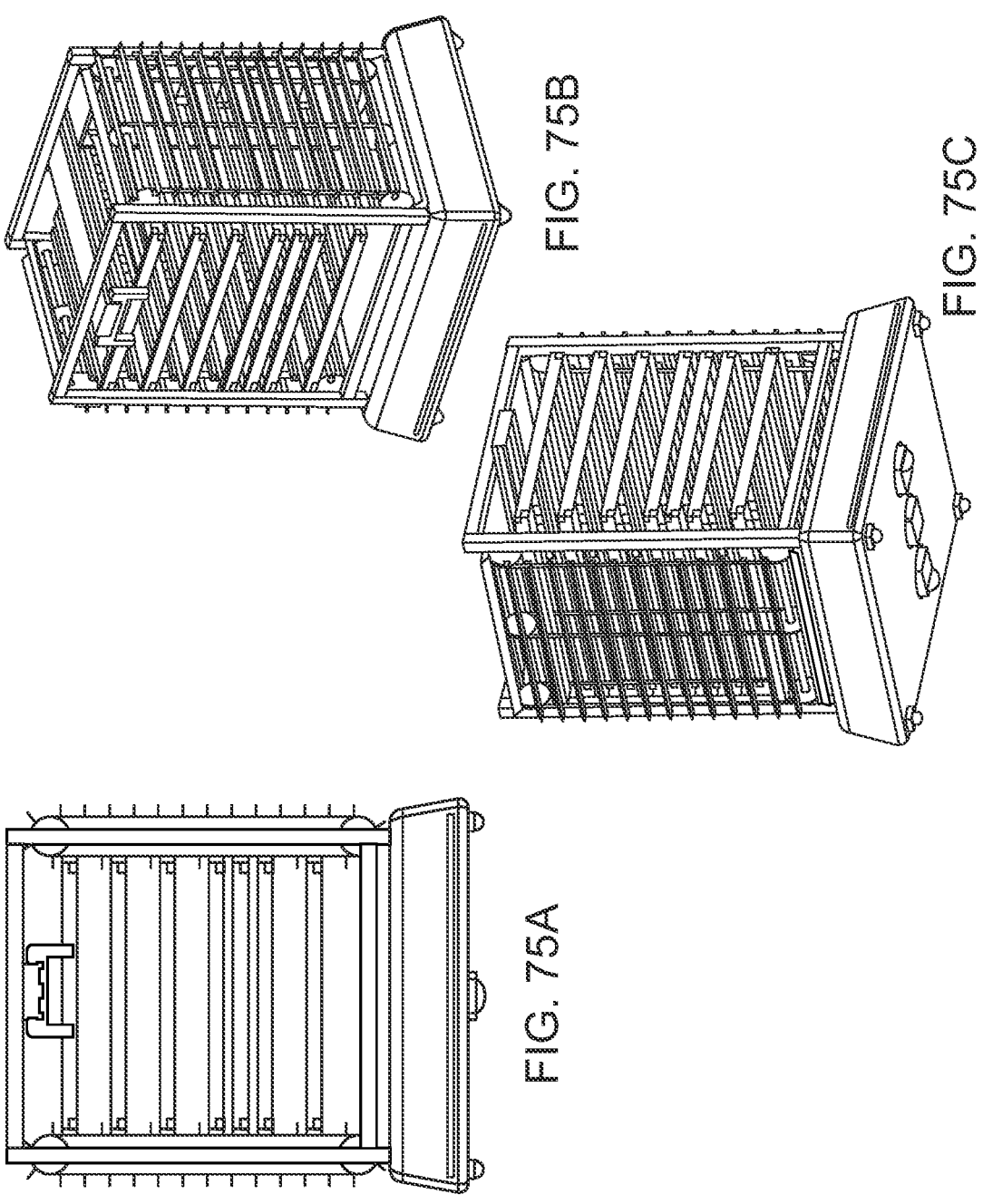
FIGS. 75A-C show respective front, front perspective, and side perspective views of a wheeled tray traveler robot.

It is noted that a traveler need not be equipped to carry a bag for receiving dispensed items. According to some embodiments, a traveler could be designed to carry tray(s) only. FIGS. 75A-C show front, front perspective, and side perspective views respectively, of such a (wheeled) tray traveler robot.

Under certain implementations, there could be two robot types on the floor of the fulfillment center. One robot type carries customer bags between carousels, filling them with dispensed items as they go. The other robot type carries multiple (e.g., ~5-15 full trays), loading them into carousels as they go. The robots could be environmentally controlled to ensure the condition chain is maintained.

Clause 1D. An apparatus comprising:

a first carousel storing a first product under a first set of environmental conditions, the first product corresponding to a first Stock Keeping Unit (SKU);

a second carousel storing a second product under a second set of environmental conditions different from the first set of environmental conditions, the second product corresponding to a second SKU different from the first SKU; and packaging disposed on a traveler that is moveable to, a first station proximate to the first carousel to receive the first product dispensed in a first direction into the packaging, and then a second station proximate to the second carousel to receive the second product dispensed in the first direction into the packaging, and then a shipping station proximate to a vehicle for receiving the packaging.

Clause 2D. An apparatus as in Clause 1D further comprising a first tray configured to support the first product and a third product in the first carousel, the third product corresponding to a third SKU different from the first SKU and the second SKU.

Clause 3D. An apparatus as in Clause 2D wherein: the first tray is configured to support the first product in a first row; and the apparatus further comprises a second tray moveable within the first carousel in a second direction proximate to the first dispensing station.

Clause 4D. An apparatus as in Clause 3D wherein the first direction is substantially orthogonal to the second direction.

Clause 5D. An apparatus as in Clause 4D wherein the first direction is horizontal.

Clause 6D. An apparatus as in Clause 5D wherein the second direction is vertical.

Clause 7D. An apparatus as in Clause 2D wherein the first item is dispensed to the packaging from the first tray located within the first carousel.

Clause 8D. An apparatus as in Clause 2D wherein the first item is dispensed to the packaging from the first tray moved outside the first carousel.

Clause 9D. An apparatus as in Clause 2D wherein the first tray defines an opening receiving a moveable member to contact the first product.

Clause 10D. An apparatus as in Clause 9D wherein the moveable member comprises a belt configured to move in the first direction.

Clause 11D. An apparatus as in Clause 10D wherein: the first direction is horizontal; and the first tray is configured to move vertically for the belt to project within the opening and contact the first product.

Clause 12D. An apparatus as in Clause 10D wherein: the first direction is horizontal; and the belt is configured to move vertically to project within the opening and contact the first product.

Clause 13D. An apparatus as in Clause 2D wherein: the first direction is horizontal; and the first tray is configured to drop the first product in a vertical direction off a tray end into the packaging.

Clause 14D. An apparatus as in Clause 13D further comprising a flexible member configured to cushion the first product falling into the packaging.

Clause 15D. An apparatus as in Clause 14D wherein the cushion is disposed within the packaging.

Clause 16D. An apparatus as in Clause 2D wherein the tray comprises a plurality of injection molded parts assembled based upon dimensions of the first product.

Clause 17D. An apparatus as in Clause 1D wherein the traveler includes a weight sensor.

Clause 18D. An apparatus as in Clause 1D wherein: the first set of environmental conditions comprises a first condition selected from, a first temperature,
a first humidity,
a first light level,
a first gas ambient,
a first mold spore level, or
a first ethylene level; and
the second set of environmental conditions comprises a second condition different from the first condition and selected from,
a second temperature,
a second humidity,
a second light level,
a second gas ambient,
a second mold spore level, or
a second ethylene level.

Clause 19D. An apparatus as in Clause 18D wherein the second carousel is configured to receive from the carousel, the first tray supporting the first product.

Clause 20D. An apparatus as in Clause 18D wherein: the first set of environmental conditions is configured to prolong a shelf life of the first product; and the second set of environmental conditions is configured to accelerate a ripening of the first product.

Clause 1E. An apparatus comprising:

a first carousel storing under a first set of environmental conditions, a first product supported on a first tray;
a second carousel storing under a second set of environmental conditions different from the first set of environmental conditions, a second product supported on a second tray; and
a non-transitory computer-readable storage medium in communication with the first carousel and with the second carousel to record data comprising,
a first identifier of the first product,
a first location of the first product,
a second identifier of the second product, and
a second location of the second product.

Clause 2E. An apparatus as in Clause 1E wherein the first location comprises: a third identifier of the first carousel;

a fourth identifier of the first tray; and
a fifth identifier of a position of the first product within the first tray.

Clause 3E. An apparatus as in Clause 1E wherein the data further comprises status information of the first product.

Clause 4E. An apparatus as in Clause 3E wherein the status information comprises: a weight of the first product;

a visual inspection result of the first product;
a non-visual inspection result of the first product;
an image of the first product;
a harvest date of the first product;
a shipping date of the first product;
a receipt date of the first product;
an expiration date of the first product;
a quality of the first product;
a name of the first product;
a brand of the first product;
a supplier of the first product;
a history of environmental storage conditions of the first product;
a moisture content of the first product;
a variety of the first product;
a Stock Keeping Unit (SKU) of the first product;
a regulatory classification of the first product;
a recipe including the first product;
dynamic pricing data; or feedback data.

Clause 5E. An apparatus as in Clause 3E further comprising an engine configured to: receive a first input specifying a particular SKU; match the particular SKU with the first product; and provide at least a portion of the status information regarding the first product to a customer.

Clause 6E. An apparatus as in Clause 5E wherein the portion of the status information comprises an image of the first product.

Clause 7E. An apparatus as in Clause 5E wherein the portion of the status information comprises a quality of the first product.

Clause 8E. An apparatus as in Clause 5E wherein the engine is further configured to: receive a second input selecting the first product; and instruct the first carousel to dispense the first product into packaging.

Clause 9E. An apparatus as in Clause 8E wherein the engine is further configured to: receive a third input selecting the second product; and instruct the second carousel to dispense the second product into the packaging.

Clause 10E. An apparatus as in Clause 9E wherein the engine is configured to instruct the second carousel to dispense the second product into the packaging before the first product, based upon a path between the first carousel, the second carousel, and a shipping station.

Clause 11E. An apparatus as in Clause 9E wherein the engine is configured to instruct the second carousel to dispense the second product into the packaging before the first product, based upon a consideration comprising a weight, a size, or a fragility of the first product relative to the second product.

Clause 12E. An apparatus as in Clause 8E wherein the packaging comprises a bag.

Clause 13E. An apparatus as in Clause 8E wherein the packaging is disposed on a traveler moveable between the first carousel and the second carousel.

Clause 14E. An apparatus as in Clause 13E wherein the traveler is configured to move on a conveyor.

Clause 15E. An apparatus as in Clause 13E wherein the traveler is configured to move on a rail.

Clause 16E. An apparatus as in Clause 13E wherein the traveler is configured to carry the first tray.

Clause 17E. An apparatus as in Clause 13E wherein the traveler comprises wheels.

Clause 18E. An apparatus as in Clause 17E wherein the traveler is capable of semi-autonomous movement.

Clause 19E. An apparatus as in Clause 8E wherein the engine is further configured to instruct inspection of the first product prior to dispensing into the packaging.

Clause 20E. An apparatus as in Clause 1E wherein the first tray comprises a plurality of injection molded parts assembled based upon dimensions of the first product.

Clause 1F. A method comprising:
receiving a first product;
performing a first inspection of the first product;
an engine determining from the first inspection, a quality of the first product;
the engine recording in a non-transitory computer readable storage medium, the quality related to an identifier of the first product;
based upon the quality, sorting the first product into a first tray stored in a first carousel under a first set of environmental conditions;
the engine recording in the non-transitory computer-readable storage medium, a location of the first item related to the identifier and the quality; and
in response to a first input, the engine offering the first item for a customer selection including display of the quality.

Clause 2F. A method as in Clause 1F wherein the quality comprises an image of the first product.

Clause 3F. A method as in Clause 1F wherein the quality is determined from a physical appearance of the first product.

Clause 4F. A method as in Clause 1F wherein the quality is determined from a taste of the first product.

Clause 5F. A method as in Clause 1F wherein the quality is determined from a ripeness of the first product.

Clause 6F. A method as in Clause 1F wherein the quality is determined from a nutritional value of the first product.

Clause 7F. A method as in Clause 1F wherein the quality is determined from a physical makeup of the first product.

Clause 8F. A method as in Clause 1F wherein the quality is determined from a lifetime of the first product.

Clause 9F. A method as in Clause 8F wherein the engine is further configured to predict the lifetime utilizing a model.

Clause 10F. A method as in Clause 9F wherein the model considers one of more conditions of the first set of environmental conditions.

Clause 11F. A method as in Clause 1F wherein the first inspection comprises an optical inspection.

Clause 12F. A method as in Clause 1F wherein the first inspection comprises spectroscopy.

Clause 13F. A method as in Clause 1F further comprising: the engine determining a price for the first product based upon the quality; and the engine displaying the price with the quality.

Clause 14F. A method as in Clause 1F wherein the first input comprises a Stock Keeping Unit (SKU) of the first product.

Clause 15F. A method as in Clause 1F further comprising: based on the quality, the engine instructing transfer of the first product to a second carousel under a second set of environmental conditions different from the first set of environmental conditions.

Clause 16F. A method as in Clause 15F wherein:
the first set of environmental conditions is configured to prolong a shelf life of the first product; and
the second set of environmental conditions is configured to accelerate a ripening of the first product.

Clause 17F. A method as in Clause 1F further comprising:
in response to a second input comprising the customer selection, the engine instructing dispensing of the first product into packaging.

Clause 18F. A method as in Clause 17F further comprising: the engine instructing movement of the traveler and the packaging to a shipping station.

Clause 19F. A method as in Clause 17F further comprising: the engine instructing movement of the traveler to receive a second product dispensed from a second carousel under second environmental conditions different from the first environmental conditions.

Clause 20F. A method as in Clause 1F further comprising: the engine instructing assembly of the first tray from a plurality of injection molded parts based upon dimensions of the first product.

Clause 1G. A method comprising:
an engine referencing data in a database to display a plurality of related products, the data comprising a product identifier and a product quality;
the engine receiving from a customer a single selection of a category of the related products;
in response to the single selection, the engine instructing a system to dispense a subset of the related products matching the category.

Clause 2G. A method as in Clause 1G wherein the plurality of related products comprise ingredients of a meal recipe.

Clause 3G. A method as in Clause 2G wherein the category comprises a meal type.

Clause 4G. A method as in Clause 3G wherein meal type comprises breakfast, lunch, dinner, or dessert.

Clause 5G. A method as in Clause 1G further comprising:
the engine instructing the system to dispense the subset further based upon a second input removing certain products from the entire set of related products.

Clause 6G. A method as in Clause 1G further comprising:
the engine receiving a second input specifying a substitute product; and
the engine instructing the system to dispense the substitute product in place of one of the products of the subset.

Clause 7G. A method as in Clause 1G wherein the plurality of related products are based upon a purchase history of the customer stored in the database.

Clause 8G. A method as in Clause 1G wherein the plurality of related products are based upon a preference of the customer stored in the database.

Clause 9G. A method as in Clause 1G wherein the plurality of related products are based upon a budget of the customer stored in the database.

Clause 10G. A method as in Clause 1G wherein the plurality of related products are based upon an existing inventory of the customer stored in the database.

Clause 11G. A method as in Clause 1G further comprising: sorting a plurality of related products based upon a quality assigned according to an initial inspection; and loading the plurality of related products into respective trays based upon the sorting.

Clause 12G. A method as in Clause 11G further comprising: the engine instructing assembly of the plurality of trays from injection molded parts based upon dimensions of the plurality of related products.

Clause 13G. A method as in Clause 11G wherein the initial inspection comprises an optical inspection.

Clause 14G. A method as in Clause 13G wherein the optical inspection comprises a visual inspection.

Clause 15G. A method as in Clause 11G wherein the initial inspection comprises spectroscopy.

Clause 16G. A method as in Clause 11G further comprising:

the engine instructing storage of the respective trays under controlled environmental conditions based upon the inspection.

Clause 17G. A method as in Clause 11G further comprising:

the engine instructing a subsequent inspection prior to dispensing the plurality of related products.

Clause 18G. A method as in Clause 17G where the subsequent inspection is of a same type as the initial inspection.

Clause 19G. A method as in Clause 17G where the subsequent inspection is of a type other than the initial inspection.

Clause 20G. A method as in Clause 20G wherein the initial inspection comprises an optical inspection.

Clause 1H. An apparatus comprising:

a plurality of unique individual product items stored upon trays within a plurality of carousels under different environmental conditions;

a non-transitory computer-readable storage medium configured to record at least a location and a status of each unique individual product item;

a graphic user interface (GUI) configured to offer a customer selection between a first unique individual product item and a second unique individual product item; and an engine in communication with the GUI and the non-transitory computer-readable storage medium, the engine configured to instruct dispensing of the first unique individual product item from a first carousel into a packaging in response to the customer selection.

Clause 2H. An apparatus as in Clause 1H wherein the first unique individual product item and the second unique individual product item differ from each other based upon an attribute.

Clause 3H. An apparatus as in Clause 2H wherein the attribute is stored in the non-transitory computer readable storage medium associated with the location and the status.

Clause 4H. An apparatus as in Clause 2H wherein the attribute is based upon a first inspection performed prior to the dispensing.

Clause 5H. An apparatus as in Clause 4H wherein the first inspection is performed prior to loading the first unique individual product item into the first carousel.

Clause 6H. An apparatus as in Clause 5H wherein the first inspection is performed with the first product item disposed on a tray.

Clause 7H. An apparatus as in Clause 5H wherein the first inspection is performed prior to the first product item being disposed on a tray.

Clause 8H. An apparatus as in Clause 7H further comprising an apparatus configured to assemble the tray from a plurality of injection molded pieces upon receipt of an instruction from the engine.

Clause 9H. An apparatus as in Clause 4H wherein the first inspection comprises rotating the first unique product item to obtain multiple views.

Clause 10H. An apparatus as in Clause 9H further comprising a conveyor configured to handle the first unique individual product item during the first inspection.

Clause 11H. An apparatus as in Clause 10H wherein the rotating is orthogonal to a direction of travel along the conveyor.

Clause 12H. An apparatus as in Clause 10H wherein the conveyor comprises a pivoting belt conveyor.

Clause 13H. An apparatus as in Clause 10H wherein the conveyor comprises a star wheel.

Clause 14H. An apparatus as in Clause 10H wherein the conveyor comprises a roller.

Clause 15H. An apparatus as in Clause 14H wherein the conveyor comprises a spinner and roller conveyor.

Clause 16H. An apparatus as in Clause 10H wherein the conveyor comprises a pop up conveyor Clause 17H. An apparatus as in Clause 4H further comprising a gantry to perform the rotating.

Clause 18H. An apparatus as in Clause 4H further comprising a camera to perform the first inspection.

Clause 19H. An apparatus as in Clause 2H wherein the attribute is further based upon a second inspection performed during the dispensing.

Clause 20H. An apparatus as in Clause 2H wherein the attribute comprises a current quality, a projected future quality, or a ripeness.

Clause 1I. An apparatus comprising:

a plurality of unique individual product items stored within a plurality of carousels under different environmental conditions;

a non-transitory computer readable storage medium recording, an inspection result of each of the plurality of unique individual product items, and a location of each of the plurality of unique individual product items;

a processing engine in communication with the plurality of carousels and with the non-transitory computer readable storage medium; and a plurality of stations associated respectively with the plurality of carousels and configured to dispense unique product items into packaging upon receipt of an instruction from the processing engine.

Clause 2I. An apparatus as in Clause 1I wherein the non-transitory computer-readable storage medium further records a Stock Keeping Unit (SKU) related to the inspection result and the location.

Clause 3I. An apparatus as in Clause 1I wherein the non-transitory computer-readable storage medium further records a product item quality related to the location and generated from the inspection result by the processing engine.

Clause 3I. An apparatus as in Clause 1I wherein the inspection result comprises an image.

Clause 4I. An apparatus as in Clause 3I wherein the image comprise visible wavelengths.

Clause 5I. An apparatus as in Clause 3I wherein the image comprises other than visible wavelengths.

Clause 6I. An apparatus as in Clause 1I wherein the inspection result comprises a spectrograph.

Clause 7I. An apparatus as in Clause 1I wherein the inspection result comprises chemical sensing.

Clause 8I. An apparatus as in Clause 7I wherein the chemical sensing detects spoilage.

Clause 9I. An apparatus as in Clause 7I wherein the chemical sensing detects a mold spore.

Clause 10I. An apparatus as in Clause 1I wherein sorting the plurality unique individual product items into the plurality of carousels is based upon the inspection result.

Clause 11I. An apparatus as in Clause 1I further comprising a mechanism configured to handle the plurality of unique individual product items during inspection for disposing on a tray.

Clause 12I. An apparatus as in Clause 11I wherein the inspection comprises rotating a unique product item to obtain multiple views.

Clause 13I. An apparatus as in Clause 12I wherein the mechanism comprises a conveyor.

Clause 14I. An apparatus as in Clause 13I wherein the rotating is orthogonal to a direction of travel along the conveyor.

Clause 15I. An apparatus as in Clause 13I wherein the conveyor comprises a pivoting belt conveyor.

Clause 16I. An apparatus as in Clause 13I wherein the conveyor comprises a star wheel.

Clause 17I. An apparatus as in Clause 13I wherein the conveyor comprises a roller.

Clause 18I. An apparatus as in Clause 13I wherein the conveyor comprises a spinner and roller conveyor.

Clause 19I. An apparatus as in Clause 13I wherein the conveyor comprises a pop up conveyor.

Clause 20I. An apparatus as in Clause 12I wherein the mechanism further comprises a gantry to perform the rotating.

Figure 76:
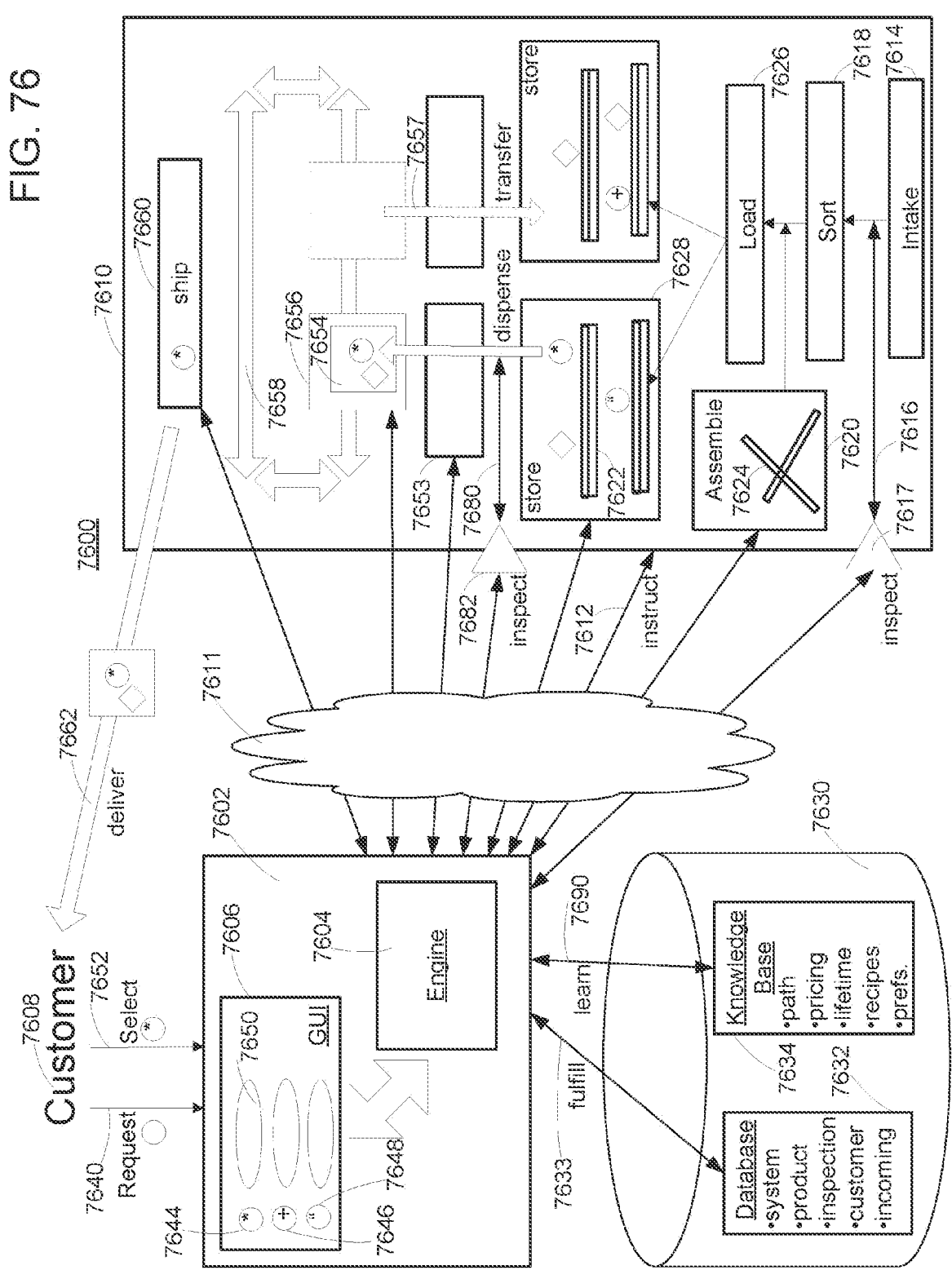
FIG. 76 is a simplified block diagram showing an overview of a system according to an embodiment.

FIG. 76 offers a simplified block diagram showing an overview of a system according to an embodiment. Specifically, system 7600 comprises a platform 7602 including a processing engine 7604 and a graphic user interface 7606 in communication with a customer 7608.

The platform is in communication with a facility 7610 via a communications network 7611. In particular, the engine is configured to provide instructions 7612 to cause the facility to intake 7614 a plurality product items in bulk form, to perform an inspection 7616 (e.g., utilizing camera 7617) of those bulk items, and to sort 7618 those bulk items on the basis of the inspection.

Further on the basis of the inspection, the platform is further configured to instruct an apparatus 7620 to assemble trays 7622 from individual parts 7624 (e.g., injection molded pieces). The trays then receive the sorted product items, and are in turn loaded 7626 into carousels 7628. As has been described extensively above, those carousels are maintained under particular set(s) of environmental condition(s).

The platform is further in communication with non-transitory computer-readable storage medium 7630 having data stored thereon. For example, database 7632 may comprise data regarding various aspects of the system and the products stored therein.

Data stored in the database may be referenced by the platform to fulfill 7633 a customer order. In particular, the customer may issue to the platform, a request 7640 specifying a particular item type 7642 (e.g., a specific apple varietal such as golden delicious). The platform may receive the request, and reference that item according to a table storing SKU information.

Then, with reference to data in the database, the platform may return to display to the customer in the GUI, data regarding a plurality of unique individual product items 7644, 7646, and 7648 matching the request. The data may comprise specific information 7650 regarding those individual product items, including but not limited to an image, a lifetime, and others.

Then, the GUI is configured to receive a user selection 7652 of one of the particular product items. In response, the engine is configured to instruct a dispensing station 7653 of the facility to dispense that unique individual item from the tray and carousel, into packaging 7654 supported in a moveable traveler 7656.

While the particular embodiment shown in FIG. 76 depicts the routing of product items directly from the dispensed carousel to a shipping station for delivery, this is not required. Alternative embodiments could employ an intermediate carrier shuttle structure. There, items are dispensed to the intermediate carrier shuttle, that is in turn brought to a different location for consolidation of product items into packaging.

In some embodiments, it is noted that the processing engine may communicate to the facility, an instruction to transfer 7657 a product item from one storage carousel to another. Such a transfer instruction can be based upon considerations such as an expected ripeness of the product item, a storage capacity of a particular carousel, and an expected future order of a product item (e.g., as may be predicted by machine learning). This transfer can be accomplished utilizing a traveler (as shown), or alternatively utilizing a different system component.

According to certain embodiments, the product dispensing and/or transfer may be accompanied by an inspection 7680 (e.g., as performed by a camera 7682). This dispensing/transfer inspection may be the same, or may be different, from the original inspection forming the basis for the initial sorting.

Finally, once all of the selected customer items have been collected in the packaging, the engine is configured to instruct the traveler to move along path 7658 to shipping station 7660. There, the packaging is offered for delivery 7662 to the customer.

According to certain embodiments, this delivery may comprise the customer receiving the product items in the packaging as conveyed via a vehicle (e.g., drone, truck, car, bicycle). According to alternative embodiments, however, delivery could not feature an automated drop, but rather pickup by a human customer. Such manual delivery options could utilize visual cues such as indicator lights or screen cartoons.

It is noted that the non-transitory computer readable storage medium of FIG. 1 further comprises a knowledge base 7634. The data of that knowledge base may be referenced by the engine in performing machine learning processes 7690, as has been mentioned previously. Those learned characteristics may be utilized to enhance efficiency of system operation and the quality of the customer experience interacting with the system.

For example, according to some embodiments a customer may be able to provide feedback about specific items. That feedback can be used to better predict preferences and other quality attributes.

Furthermore, information regarding item availability able to be combined with expected demand and expected inventory replenishment, could be utilized to incentivize specific consumption trends. This can be accomplished by, amongst other techniques, placement in web browsers, relative pricing, promotions, and suggestions of recipes that include such items or otherwise.

Figures 77A, 77B:
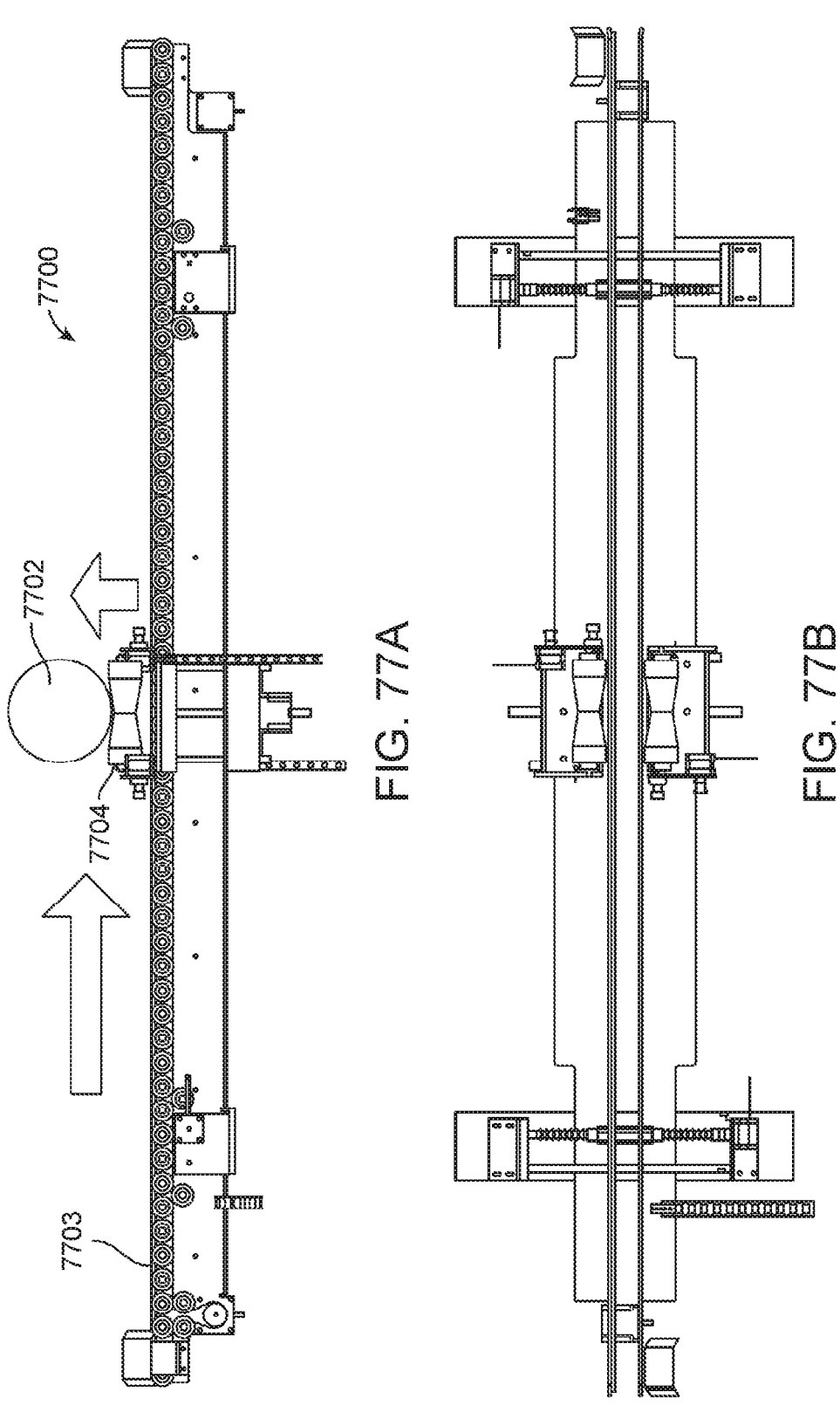
FIGS. 77A-E show various views of a design for an inspection station.
Figure 77C:
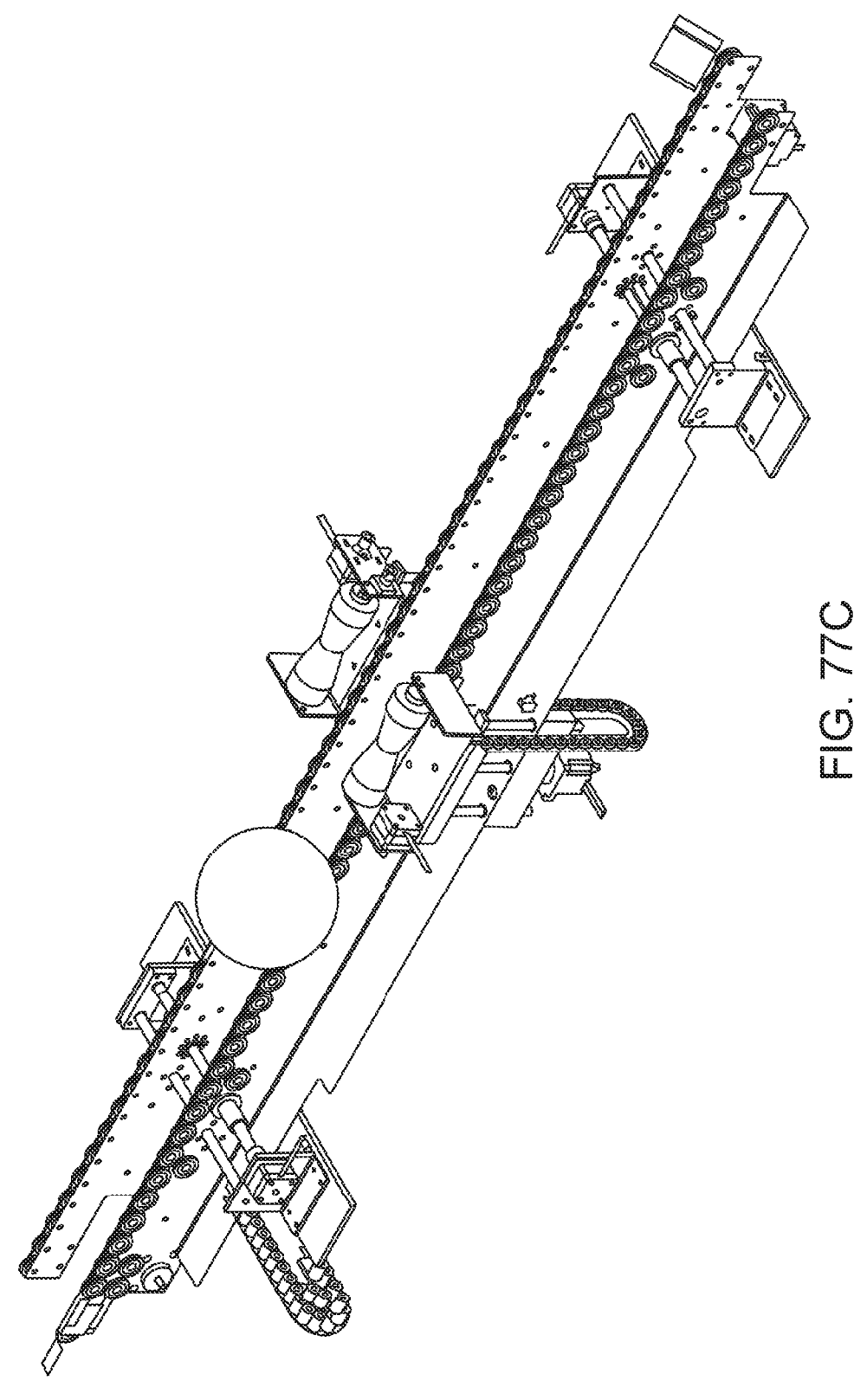

FIGS. 77A-C show front, top, and perspective various views of one embodiment of a design 7700 for an inspection station. Here, the product items 7702 enter on the left, move along the conveyor 7703 to the center.

Figure 77D:
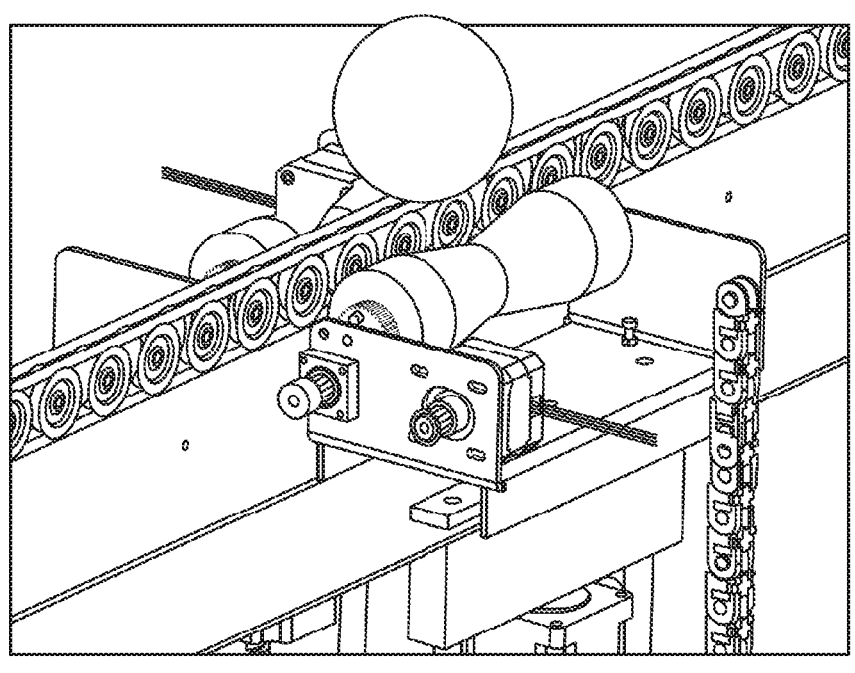

The item gets lifted by the rollers, the rollers spin and cameras take pictures from above. FIG. 77D shows a perspective view with the rollers 7704 raised.

Figure 77E:
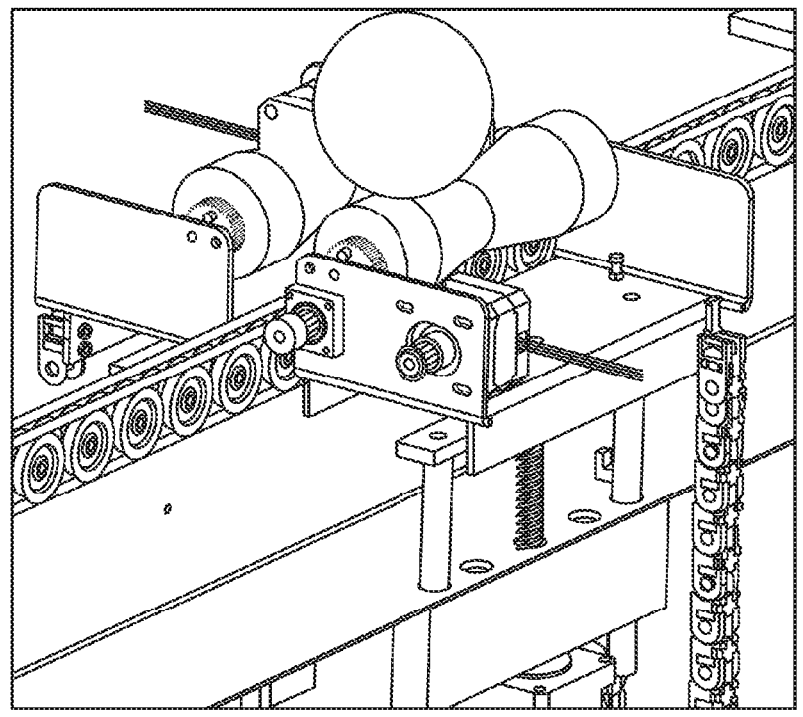

The items is dropped back onto the conveyors and the items advances forward with its classification. FIG. 77E shows a perspective with the rollers lowered.

Figures 78A, 78B, 78C:
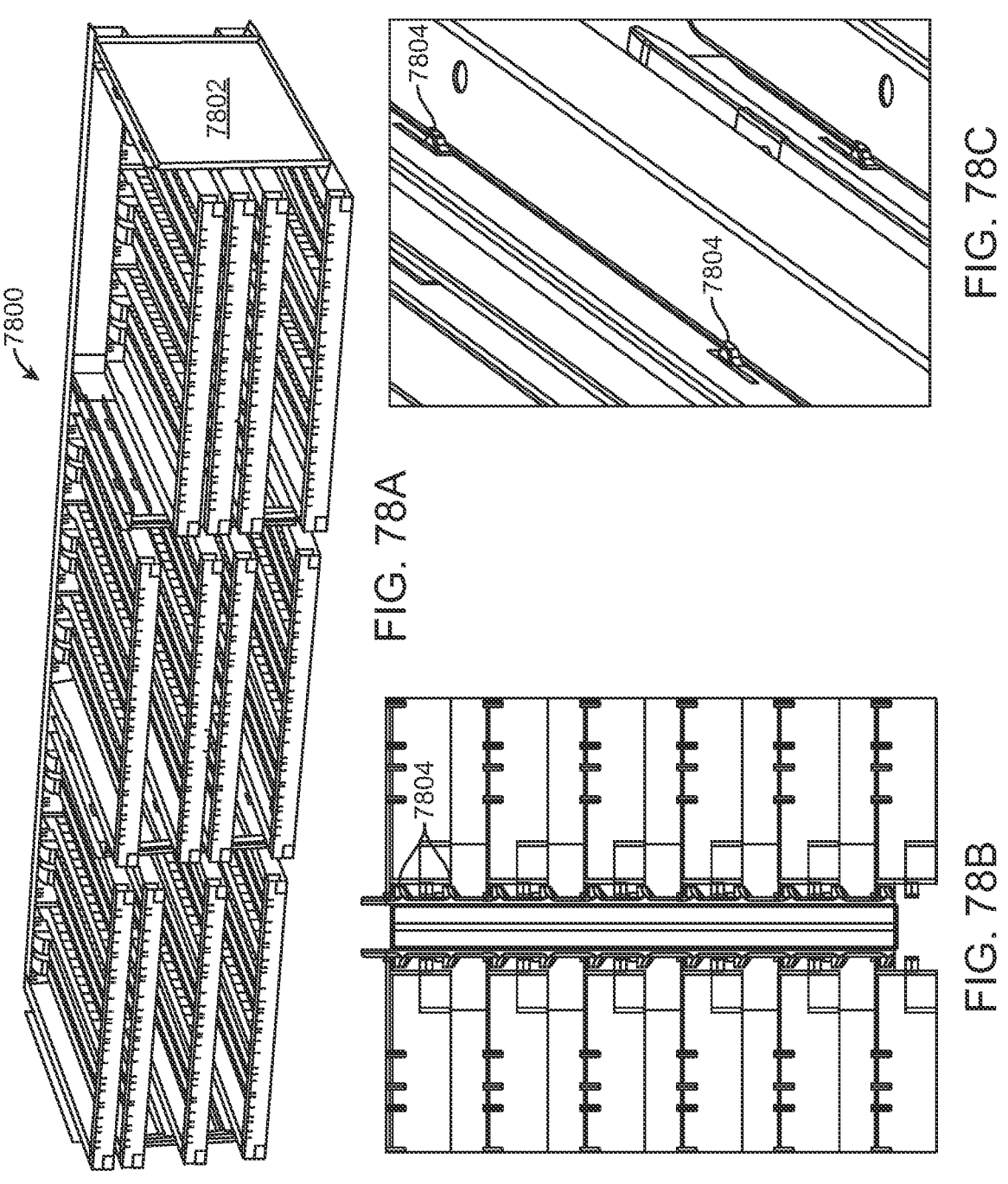
FIGS. 78A-C show various views of a carrier design.

FIG. 78A shows a perspective view of an alternative carrier design. According to this embodiment, the carrier 7800 features plastic walls 7802 to hold the tray flange in space.

To locate the tray, a click in place feature was added to the carrier and tray. Specifically, when the tray is inserted, it moves past four clasps 7804 (two on each side of the tray) that are shown in the wall edge view of FIG. 78B, and the enlarged view of FIG. 78C. These clasps bend back during installation and then lock the tray in place once installed. This keeps the tray centered in the carrier and it keeps it from sliding out or shifting while the carousel rotates.

The carrier embodiment shown may offer benefits by avoiding the consumption of space otherwise needed to fit the forks into the carrier to remove the tray. Now, without that consumed space, the tabs can be smaller.

Also, because the dispensing tool does not need to fit into the carrier, a higher number of slots can be designed for trays. In this particular embodiment, 2× the number of slots have been added. This affords flexibility when inserting trays into the carrier, to achieve maximum density.

According to some embodiments, an interior of a carousel may be lined with foam panels. These foam panels attached to the walls with a hooking bracket, illustrated in perspective and side views in FIGS. 79A-B.

Here, the hooking bracket 7900 has teeth 7902 that sink into the foam of the panels. The bracket may or may not be glued on, too. Also, the bracket may be covered with some of the same coating that the foam is covered in. The bracket may or may not be inset into a pocket in the foam.

The frame of the carousel could have a projecting stud 7904 with which the bracket could mate. So, to install the panel, the foam gets lifted so the stud goes through the large holes. Then the panel is lowered down and two or more brackets get secured to the studs as they slide into the key hole shape.

Figure 80A:
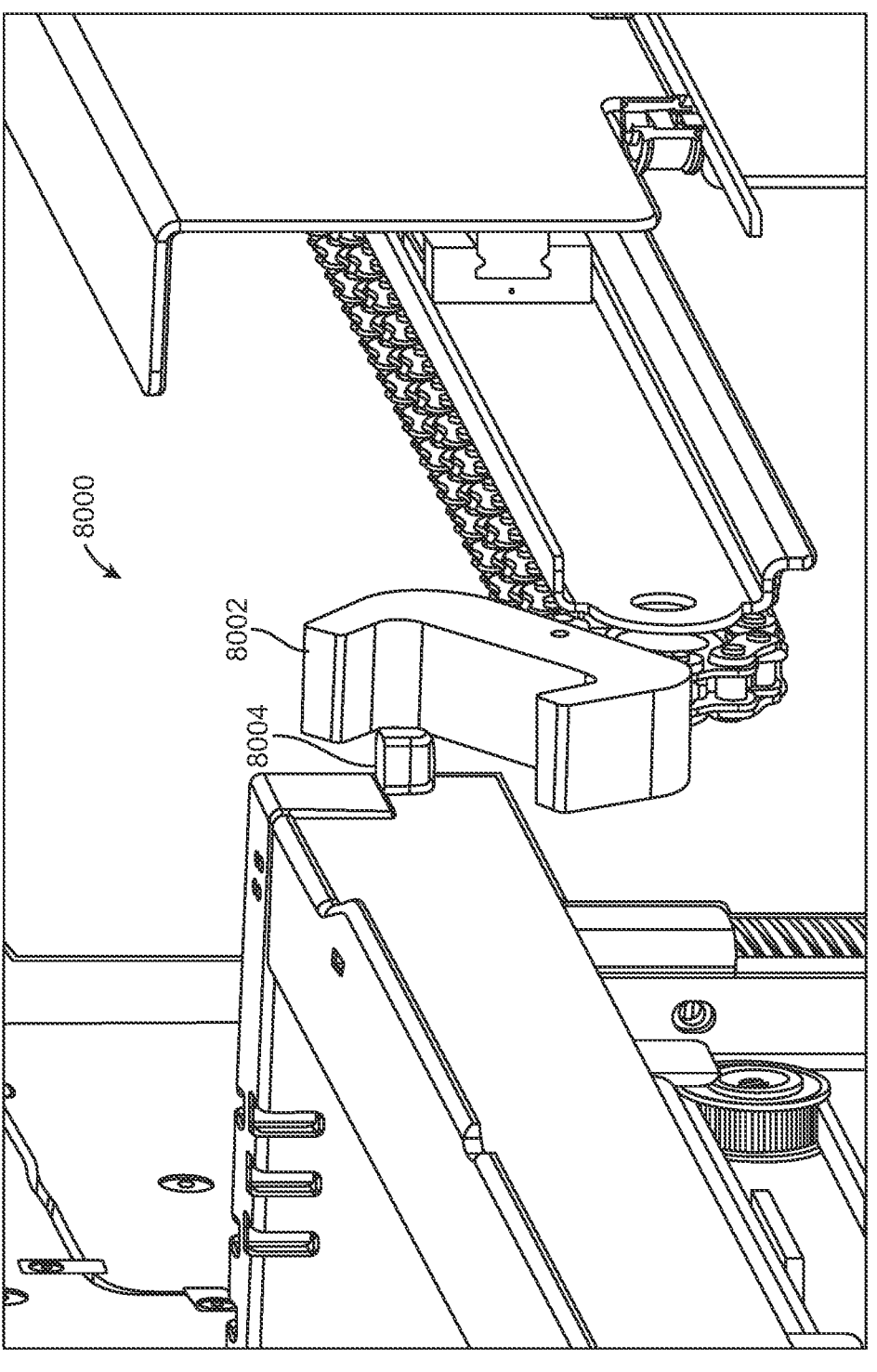
FIGS. 80A-B show various views of an embodiment of a dispensing approach.
Figure 80B:
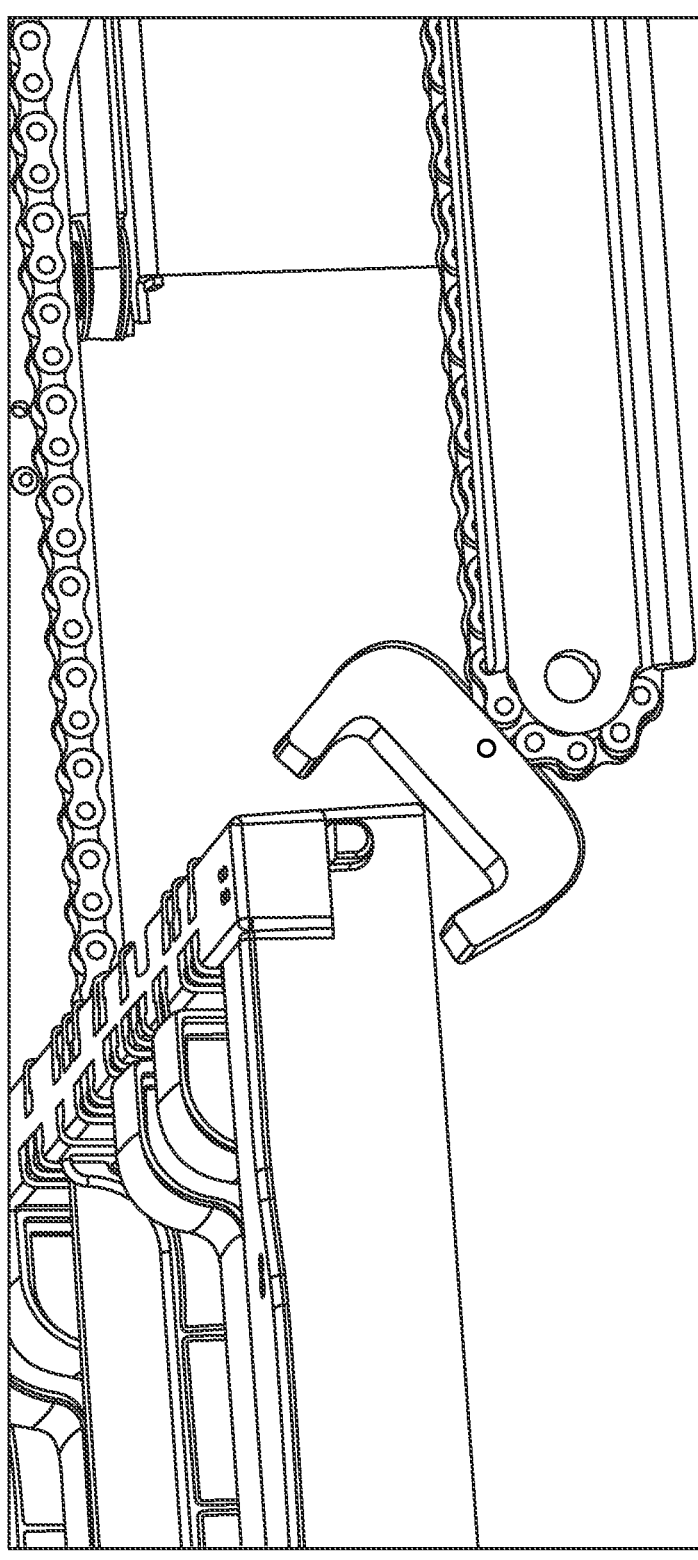

FIGS. 80A-B show various views of an embodiment of a dispensing approach. This embodiment 8000 features hooks 8002 that engage the tray 8004 from the front of the carrier.

Such an approach may offer certain benefits. For example, it avoids tolerance considerations attributable to the carrier tilting back forward. There will be a tolerance in the location of each carrier relative to each other.

With this design, the hook fits into a large area and has a big tolerance itself Now, the position can be off by >5 mm and still engage correctly. This increases tool robustness, and may reduce the cycle time of the dispensing process because less precision is needed.

Figure 81A:
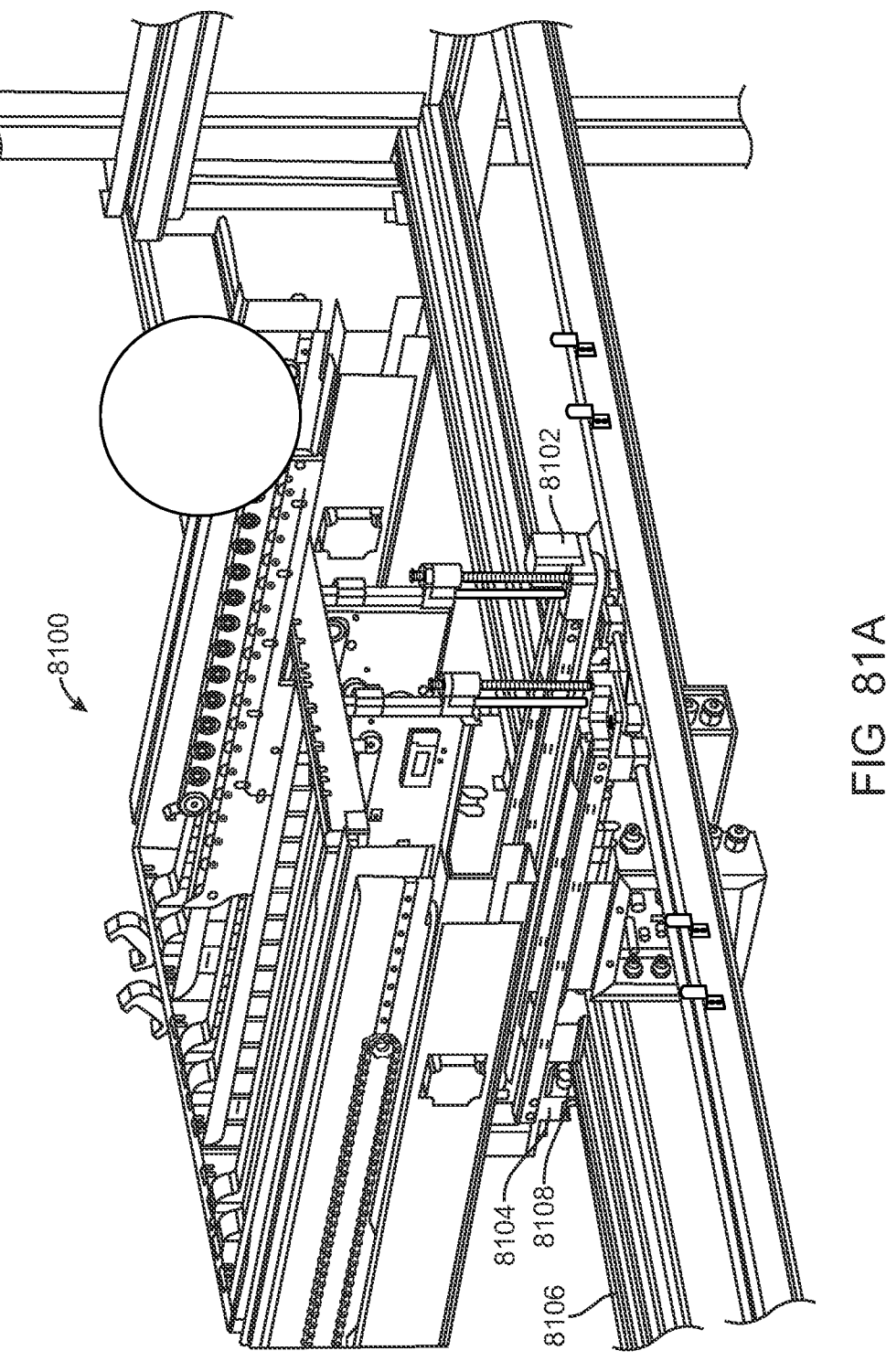
FIGS. 81A-C show various views of an embodiment of a dispensing approach.
Figure 81B:
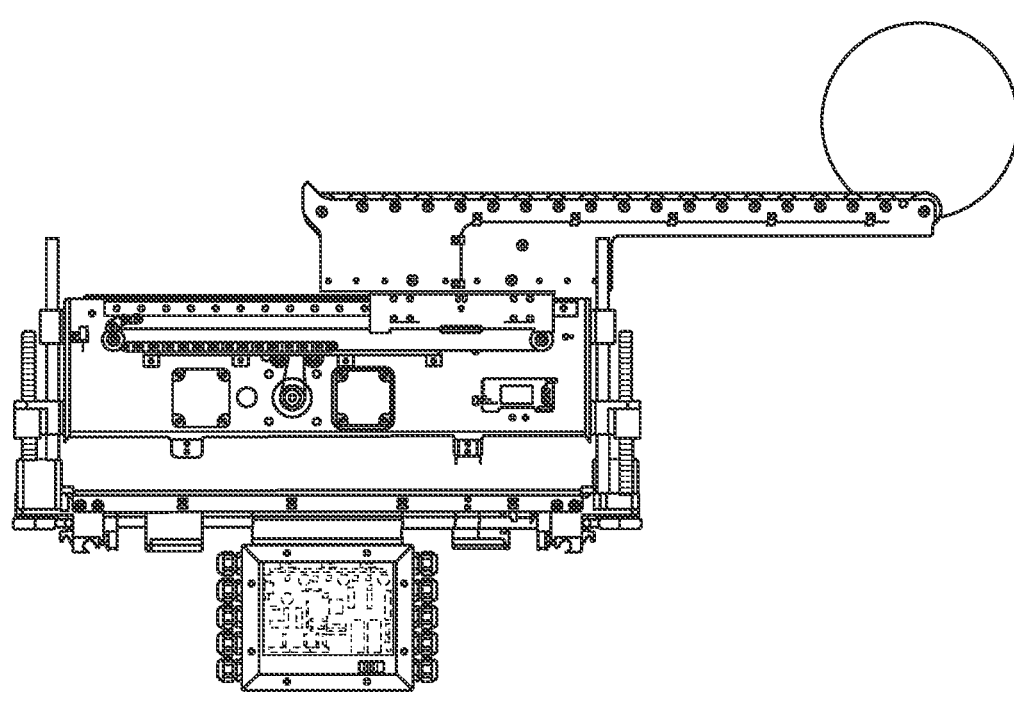
Figure 81C:
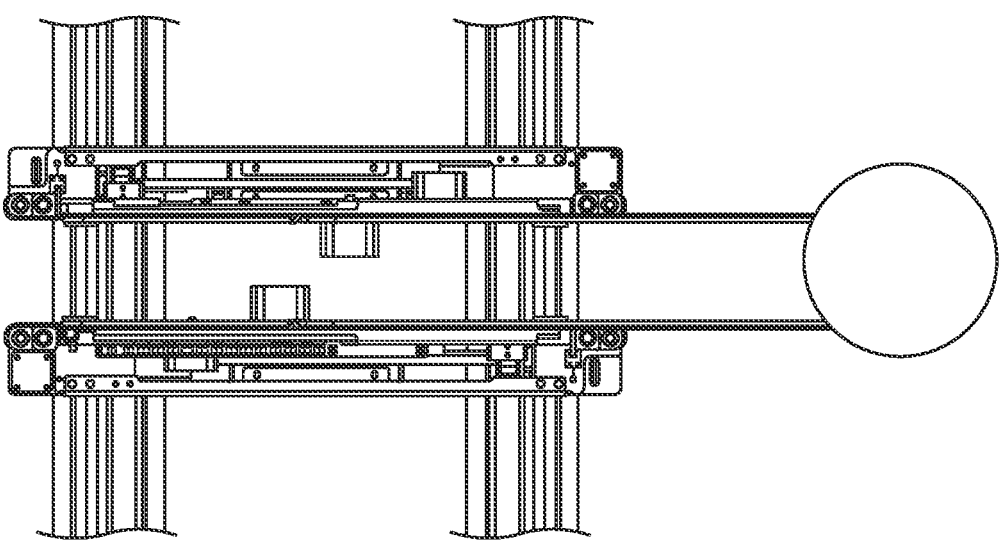

FIGS. 81A-C show perspective, side, and top views respectively, of an embodiment of a dispensing approach 8100. Here, the vertical lift design is incorporated into the pop-through conveyors. In place of splines, motor(s) 8102 were put onto each pop through conveyor. This offers potential savings in cost and complexity, in that stepper motors are cheaper than a single servo plus all the splines and pulleys required to drive them.

This embodiment also features a left-to-right belt drive design 8104 that has a fixed timing belt 8106 and pulleys 8108 that move through it. Again, this reduces cost and complexity, disposing the motors onto the pop through conveyor and making the tool easier to manage.

Figures 82, 83:
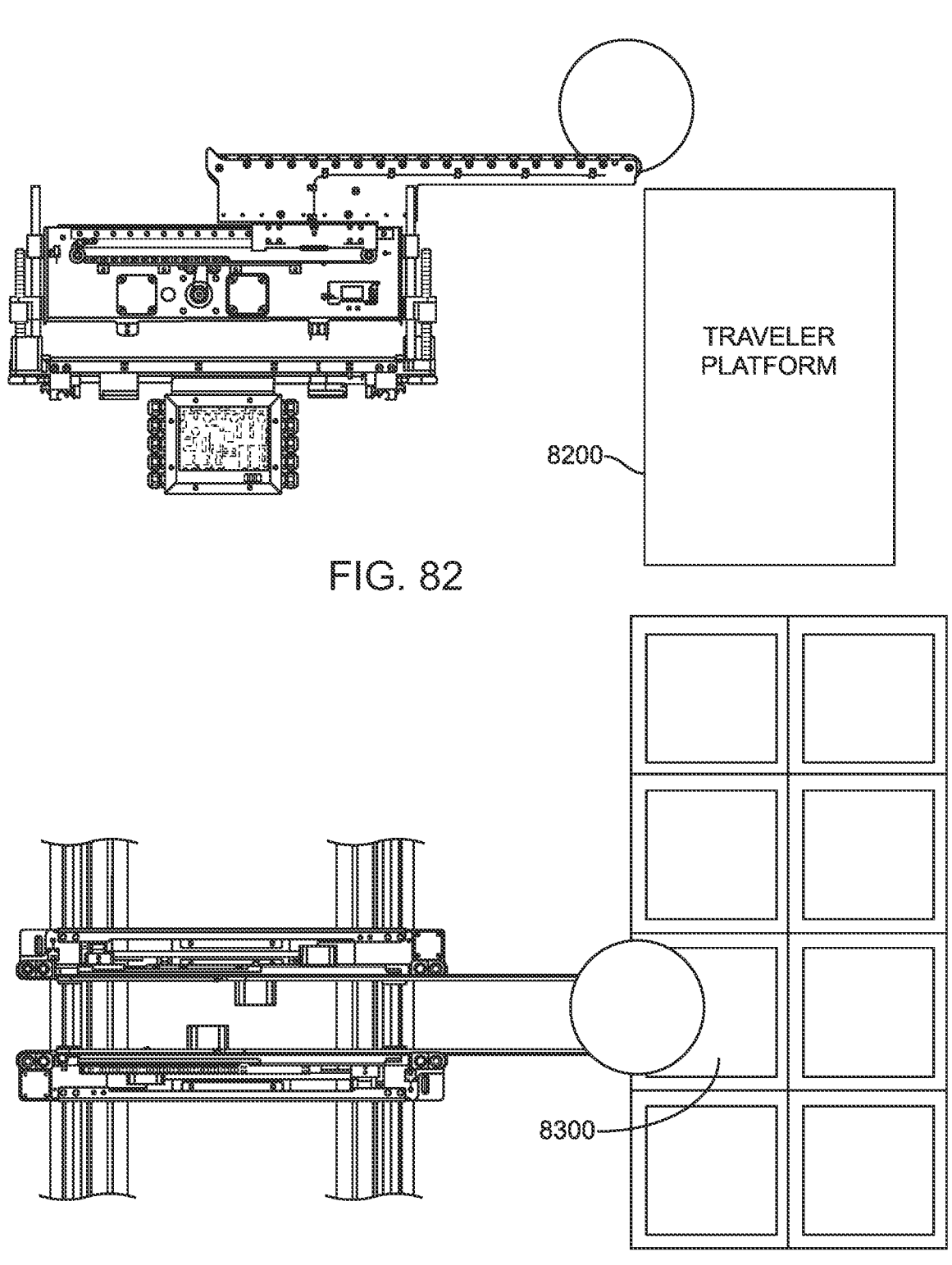
FIG. 82 shows a side view illustrating an embodiment of a dispensing approach.
FIG. 83 shows a top view illustrating an embodiment of a dispensing approach.

FIG. 82 shows a side view illustrating an embodiment of a dispensing approach. Here, product items are moved out from the dispensing tool onto a flat table or a set of conveyors that are built into a surface of the traveler platform 8200. The traveler than moves to the shipping area and an order is consolidated.

This approach allows larger-sized items to be stored and dispensed. Such items may not normally fit into a bag, but this design saves the manual effort of walking down an aisle and picking them from a shelf.

FIG. 83 shows a top view illustrating an embodiment of a dispensing approach. Here, product items are moved out of the dispensing tool. But, instead of the customer bag, the product item drops into a cushioned pocket 8300 that protects the item. The traveler might have multiple buckets that items can be dropped into. These items are then moved to the shipping area and consolidated with the larger order.

This could be used when items are too fragile to be dropped onto other, harder items in a bag. A peach, for example, might get damaged falling onto a box corner or the stem of a butternut squash.

Clause 1J. An apparatus comprising:
a frame translatable to a staging position in front of a carousel;
a fork supported by the frame and configured to extend in a direction toward the carousel to engage a tray holding an item; and
a moveable member configured to,
project vertically into a first opening of the tray,
contact the item at a first point, and
dispense the item from the tray in a direction away from the carousel, into packaging.

Clause 2J. An apparatus as in clause 1J wherein the moveable member comprises a conveyor.

Clause 3J. An apparatus as in claim 2J wherein the conveyor comprises:
a first conveyor belt configured to project through the first opening and contact the item at a first point; and
a second conveyor belt configured to project through a second opening in the tray and contact the item at a second point.

Clause 4J. An apparatus as in clause 3J wherein the first conveyor belt and the second conveyor belt are parallel.

Clause 5J. An apparatus as in clause 2J further comprising a backstop configured to prevent an item from falling off a back side of the tray opposite to the staging position.

Clause 6J. An apparatus as in clause 1J further comprising a load cell.

Clause 7J. An apparatus as in clause 1J wherein the moveable member is configured to translate in a horizontal direction toward the staging position after projecting through the first opening.

Clause 8J. An apparatus as in clause 1J further comprising an item location sensor.

Clause 9J. An apparatus as in clause 8J wherein the item location sensor comprises an optical sensor.

Clause 10J. An apparatus as in clause 9J further comprising an optical fiber.

Clause 11J. An apparatus as in clause 1J wherein the moveable member is configured to move in a vertical direction to project into the first opening.

Clause 12J. An apparatus as in clause 1J wherein the tray is configured to move in a vertical direction to allow the moveable member to project into the first opening.

Clause 13J. An apparatus as in clause 1J wherein the tray comprises an injection molded part.

Clause 14J. An apparatus as in clause 13J wherein the tray comprises a plurality of injection molded parts assembled by a machine.

Clause 15J. An apparatus as in clause 1J wherein the fork comprises a hook configured to engage a hole of the tray.

Clause 16J. An apparatus as in clause 1J wherein the fork is configured to extend along a side of the tray.

Clause 17J. An apparatus as in clause 1J wherein the fork is configured to align with the tray utilizing a pin.

Clause 18J. An apparatus as in clause 1J further comprising a pulley.

Clause 19J. An apparatus as in clause 1J further comprising a spline.

Clause 20J. An apparatus as in clause 1J further comprising a belt.

As discussed at length above, embodiments of product handling systems may feature traveler(s) that are configured to receive dispensed items and to transport same for delivery (e.g., to a customer's vehicle or a delivery vehicle—manned or unmanned). It is noted that a variety of different mechanisms in the form of a Line Following Robot (LFR) may be utilized by embodiments for product handling purposes.

Examples of such mechanisms are summarized below in the following table.

| NAME | ACRONYM | DESCRIPTION |
|---|---|---|
| Line Following Bag | LFB | robot bearing a collapsible bag on top (e.g., for receiving a plurality of product items) |
| Line Following Mini-Bags | LFM | robot bearing multiple mini-bags (e.g., for receiving individual product items such as produce, meat, etc.) |
| Line Following Platform | LFP | robot with a top platform that can receive and move cases or bulk goods |
| Line Following Box | LFBX | robot with box on top designed to interact with dispensing system |
| Line Following Tray | LFT | robot that carries trays |

Here, the term "Line Following" does not necessarily require guidance that is based upon line following principles. Rather other forms of movement are possible, including but not limited to the use of markers, active radar, and others.

Figures 84, 85A:
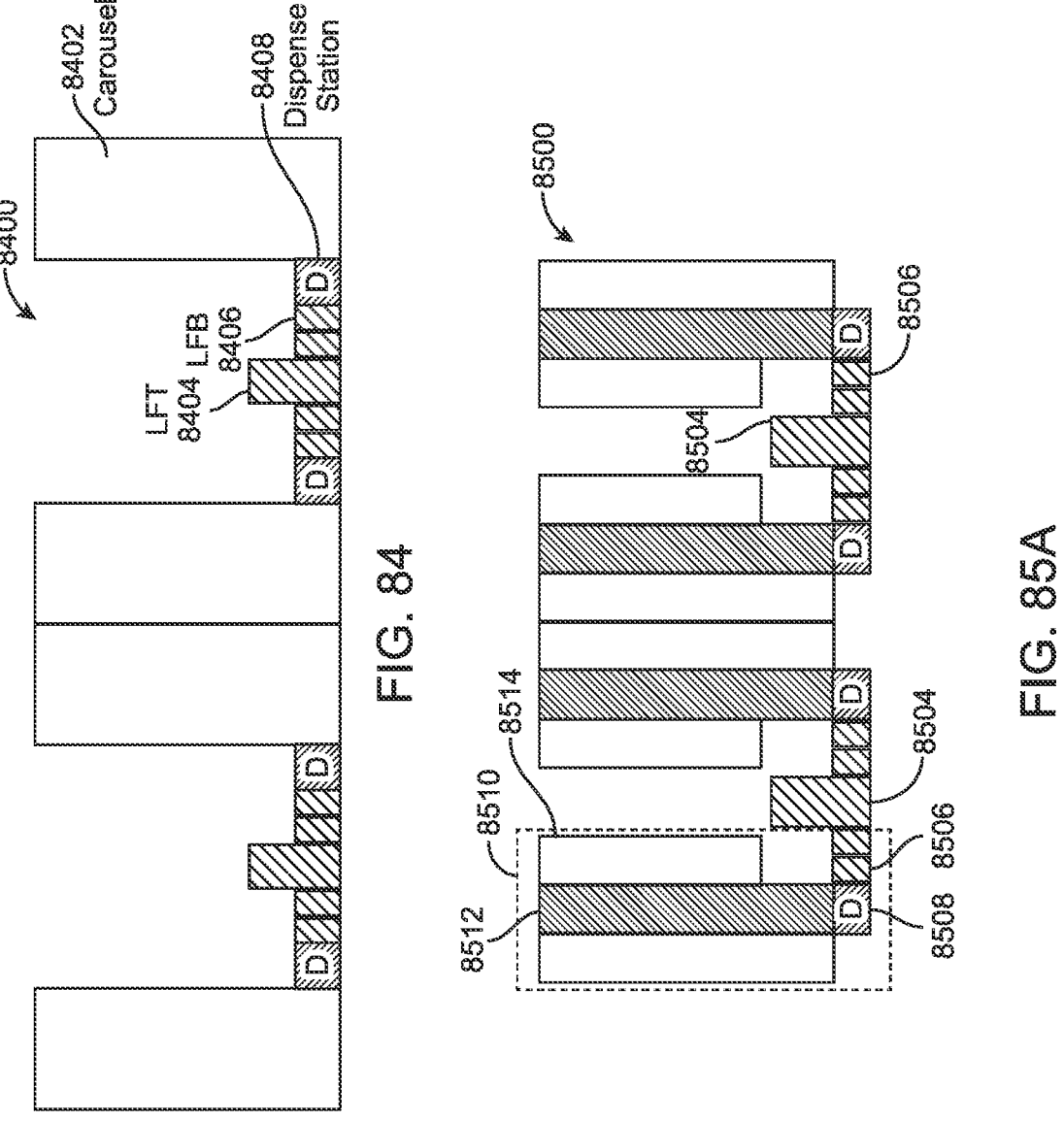
FIG. 84 shows a simplified cross-sectional view of a product handling apparatus comprising a moving carousel.
FIGS. 85A-85F are simplified cross-sectional views showing various embodiments of a product handling system comprising fixed shelving.

According to certain embodiments, product handling approaches may feature item storage on fixed shelving rather than in a moveable carousel. FIG. 84 shows a simplified cross-sectional view of one embodiment of a product handling apparatus.

This product handling apparatus 8400 comprises moving carousel 8402. FIG. 84 further shows the LFT 8404, LFB 8406, and dispense station 8408 mechanisms as described herein, which are used for product handling. (The letter "D" is used throughout as a shorthand to indicate a mechanism for dispensing individual product items from a tray into corresponding packaging, e.g., a bag, a mini-bag, a box, or a platform).

By contrast, FIG. 85A shows a simplified cross-sectional view of an alternative to a moving carousel that features a fixed shelving approach. This product handling apparatus 8500 also comprises a LFT 8504, a LFB 8506, and a dispense station 8508.

The product handling apparatus of FIG. 85A also comprises a central lift storage system 8510 including a vertical lift module 8512. The central lift storage system would transport trays bearing individual product items from the fixed shelving storage 8514 to the dispensing station and ultimately for dispensing into a bag.

In particular, the lift mechanism may comprise a shuttle that can move up and down to contact and remove a tray from the fixed shelving storage. The tray is then brought downward to the dispense station, where product items are dispensed into the LFB.

FIGS. 113A-D show various views of this interaction between a vertical lift mechanism accessing fixed shelving for storage, and a dispense mechanism. In particular, FIG. 113A shows a side perspective view of a lift 11300 located within a shaft 11302 and in the process of retrieving a tray 11304 from the fixed shelving 11305. Further details regarding an embodiment of a lift are provided below in connection with FIGS. 102A-B.

The view of FIG. 113A further shows a portion of the dispense station 11306. In particular, only one of the two independently positionable conveyors 11308 is depicted, as has previously been described in connection with at least FIGS. 20-21, 43A, and 45B.

FIG. 113B shows the lift holding the tray descending over the conveyors of the dispense station. FIG. 113C shows the conveyors independently moving to align to the width of the slots in the tray.

FIG. 113D shows the elevator continuing to descend. As a result, the conveyors project through the slots in bottom of the tray. This lifts off of the tray, the items housed in that line of the tray. Movement of the conveyors can then result in the dispensing of the first and then subsequent items in the line.

Figure 85B:
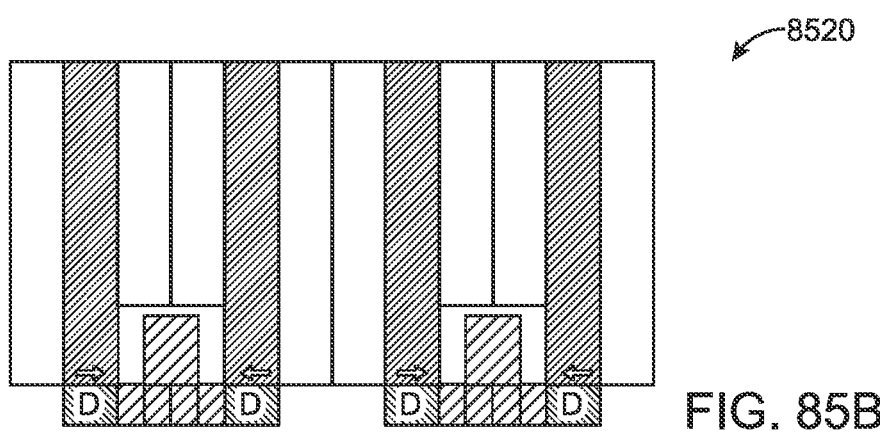

FIG. 85B shows a simplified cross-sectional view of a variation of the product handling apparatus of FIG. 85A. Specifically, for the product handling apparatus 8520, no separate, dedicated lane is provided for the LFT, which must access the storage utilizing the same available space as the LFBs. While increasing storage density, this alternative embodiment may reduce the flexibility by which incoming stocked trays are placed into the fixed shelving.

Returning to FIG. 85A, as described above this shows the dispense station as being located directly underneath the shuttle that is moving vertically up and lowered with the tray. This configuration avoids the need for the conveyors of the dispense station to have the ability to move vertically in order to project through the tray slots (the lift accomplishes this vertical movement instead).

Figure 85C:
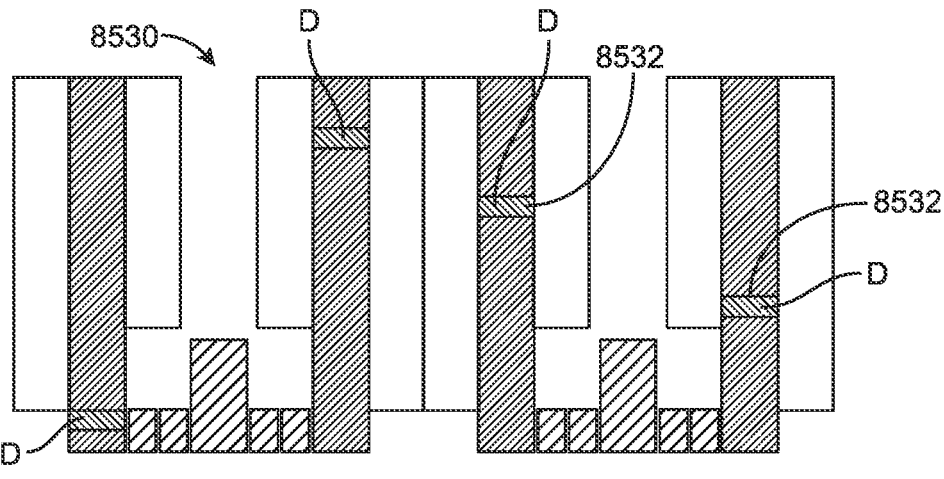

However, this is not required and alternative embodiments may employ a dispensing mechanism that is itself vertically moveable, in conjunction with products that are supported on fixed shelving rather than in a moveable carousel. FIG. 85C is a simplified cross-sectional view of such an embodiment of a product handing apparatus 8530, with the dispensing mechanism 8532 being vertically moveable as shown.

Figure 85D:
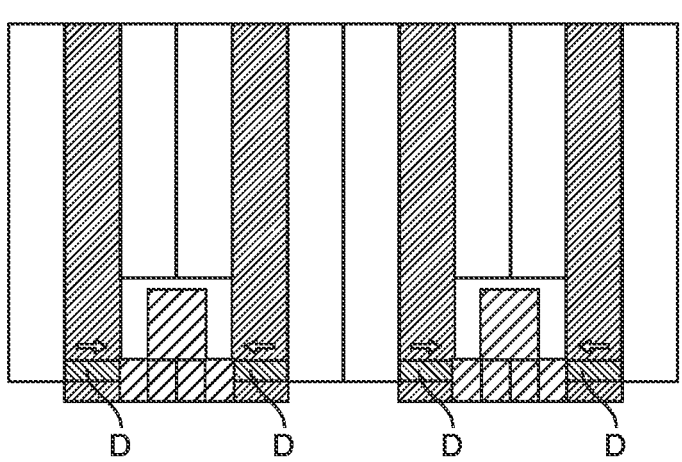

FIG. 85D shows a simplified cross-sectional view of a variation of the product handling apparatus of FIG. 85C. Specifically, for the product handling apparatus 8540, no separate, dedicated lane is provided for the LFT, which must access the storage utilizing the same available space as the LFBs. Again, while increasing storage density, this alternative embodiment may reduce the flexibility by which incoming stocked trays are placed into the fixed shelving.

Returning to FIG. 85A, that shows a configuration where the LFT is disposed to access the fixed shelving storage from a same side of the dispensing station as the LFBs. However, this is not required.

Figure 85E:
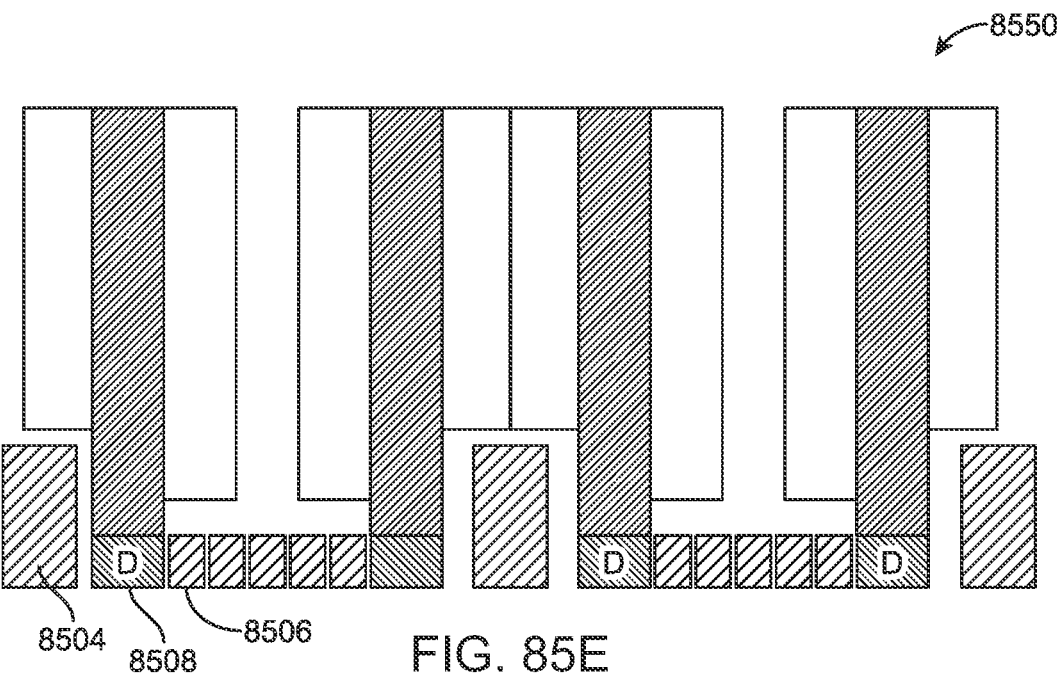

As shown in FIG. 85E, an embodiments of a product handing system 8550 could position the LFT on the opposite side of storage from the dispense station. This opens up space to accommodate an additional LFB.

Figure 85F:
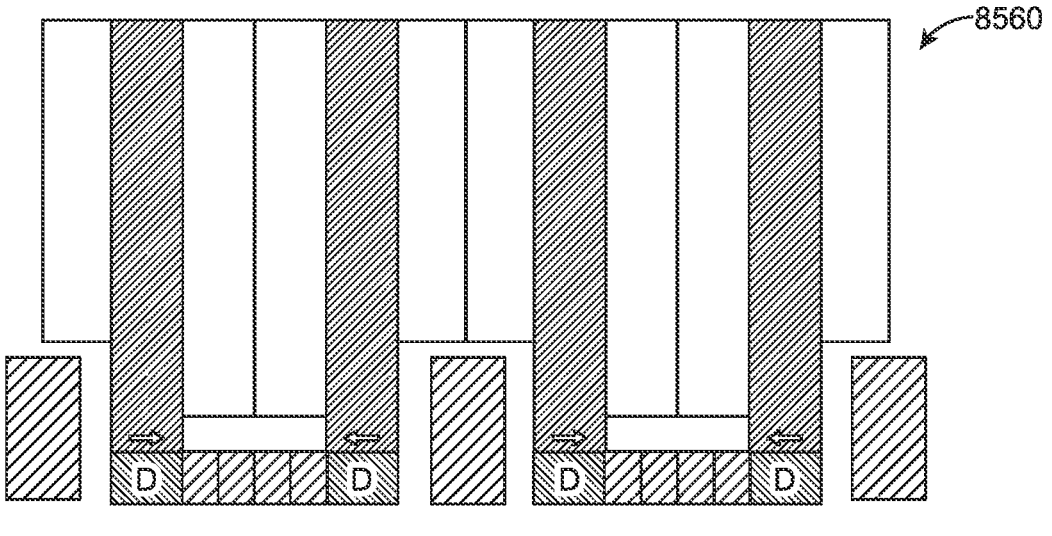

Moreover the further alternative embodiment 8560 shown in FIG. 85F reveals that this additional space could instead be condensed. This would in turn increase storage density.

While the embodiment of FIG. 85A shows as single vertical shuttle per shaft, this is not required. Alternative embodiments can employ multiple lift shuttles.

Figures 86, 87A:
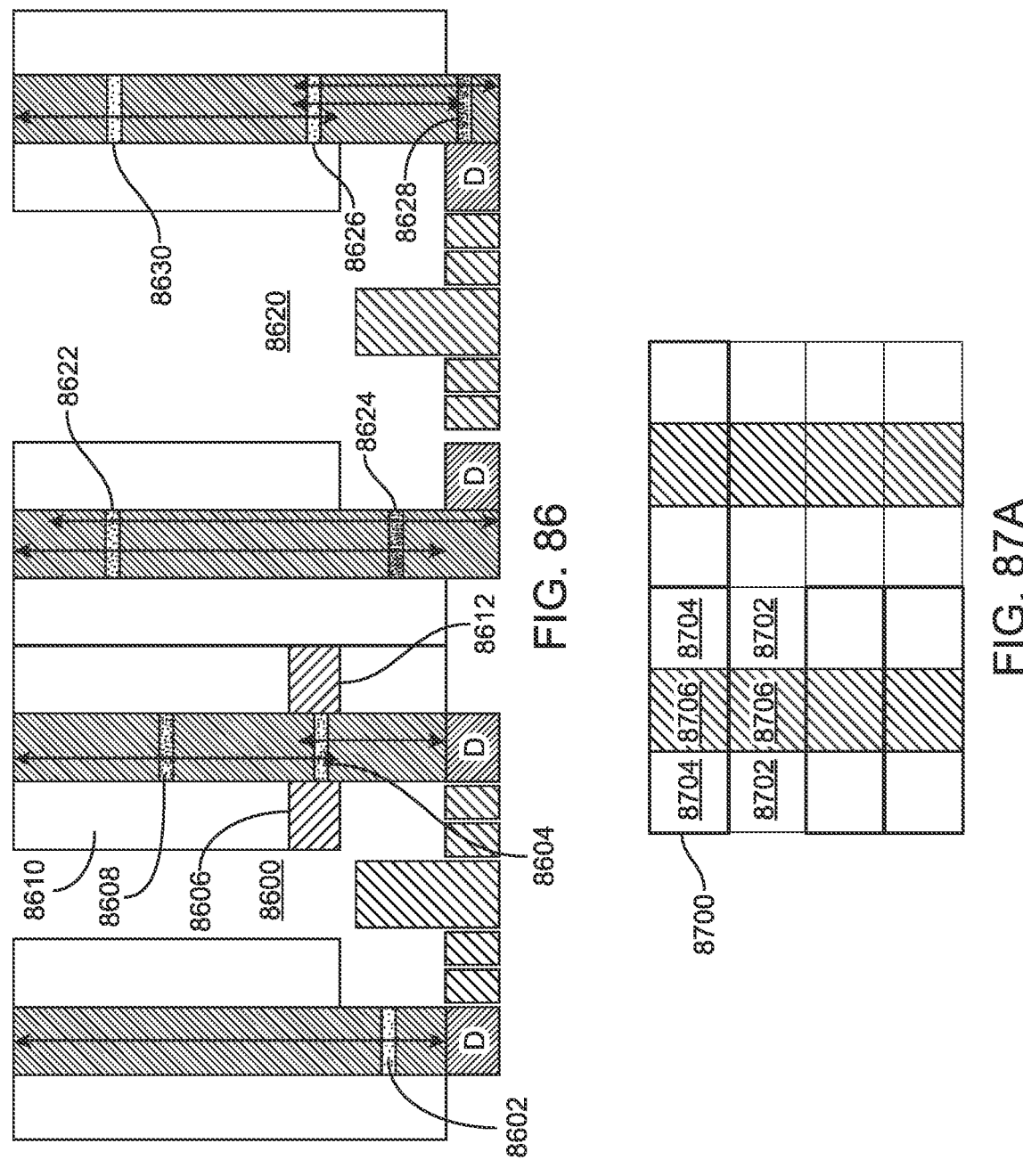
FIG. 86 shows a simplified cross-sectional view of an embodiment of a central lift system having one or more lift mechanisms in the same lift shaft.
FIG. 87A shows a top view of a repeating shelving design.

FIG. 86 shows a simplified cross-sectional view of a design having one or more lift mechanisms located in a same lift shaft. Such an approach can be utilized to increase the speed of the tray picking process. While one shuttle is at the bottom dispensing an item, another shuttle can be above picking a tray.

The left portion 8600 of FIG. 86 shows a dispense-under-lift approach. Here, one lift 8602 performs tray fetch and replaces in serial. One lift 8604 picks from area 8606 and moves to dispense. One lift 8608 dispenses from upper area 8610 and moves to area 8612.

The right portion 8620 of FIG. 86 shows a dispense-next-to-lift approach. Here, lift 8622 replaces used trays. Lift 8624 fetches new trays.

Lift 8626 replaces used trays. Lift 8628 fetches new trays. Tray 8630 brings trays from deep storage into the lower area.

To reduce cost, it may be desirable for a product handling system to maximize storage density. Environmental control (e.g., temperature, humidity, gas species and concentration control, particulate filtering) in such a product handling system allows significant shelf life extension for perishable items. However, environmental control may call for sealing and/or insulating storage, reducing density.

Accordingly, embodiments may integrate sealing, insulation, and ducting to structural members. This allows for the benefit of environmental controls with little detriment to storage density.

FIG. 87A shows a top view of a repeating shelving design 8700 comprising insulated zones 8702, non-insulated zones 8704, and elevator shafts 8706. This example layout shows the freedom to distribute environmental zones. This environmental control design is modular in form and allows for climate controlled and non-climate controlled units to reside anywhere in the grid.

Figures 87B, 87C:
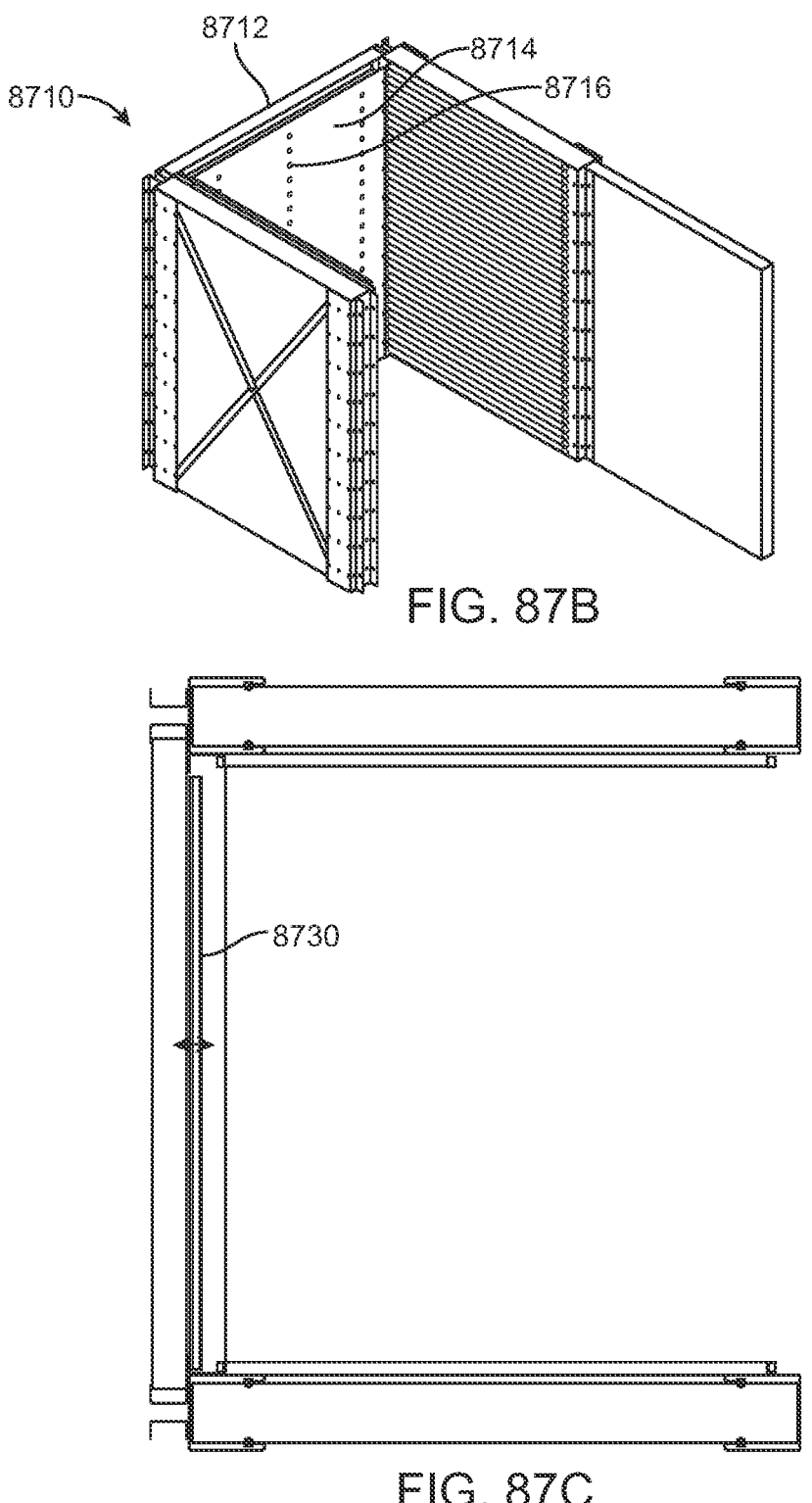
FIG. 87B shows a perspective view of one unit in a repeating shelving design.
FIG. 87C shows an enlarged top view.

FIG. 87B shows a perspective view of one unit 8710 in a repeating shelving design. Insulation panels 8712 reside in interior of structural members Perforated duct plate 8714 turns structural members into a designated refrigeration air path. The air exits holes 8716 and refrigerates items on the shelving slots FIG. 87C shows an enlarged top view. Air flows through cavity 8730 as shown by the arrow.

Under certain circumstances, a product item may need to be retrieved from a center of a tray. Such a center-tray-located item can be delivered by adding a second set of conveyors behind the dispense area. This provides a low cost way to dispense an item from any location in the tray.

FIGS. 88A-88F show simplified side elevational views of a central lift storage system configuration allowing center tray picking according to an embodiment, in operation. FIGS. 89A-89F show corresponding top views of retrieving a particular item (here a T-bone steak) from the center of a tray.

Figures 88A, 88B, 89A, 89B:
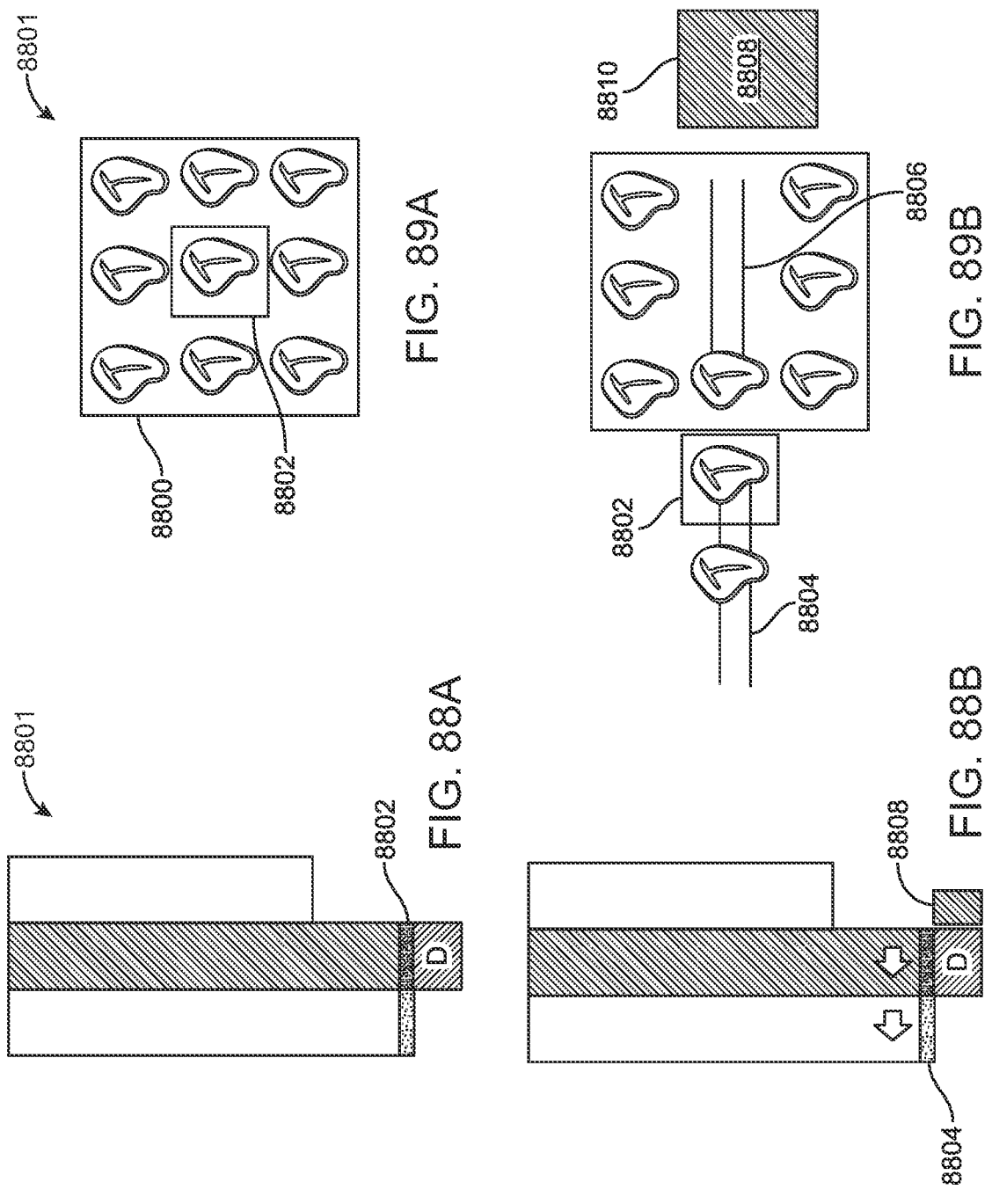
FIGS. 88A-88F show simplified side elevational views of center tray dispensing in operation.
FIGS. 89A-89F show corresponding top views of retrieving a particular item from a tray center.

FIGS. 88A and 89A show a first step. Here a full tray 8800 arrives at the dispensing area 8801, and the customer requests a specific item 8802 (here a particular cut of meat) presently located at the tray center.

FIGS. 88B and 89B show a second step. The LFB 8810 bearing the bag 8808 arrives. The back conveyor 8804 matches the row with the desired item. The dispense conveyor 8806 lifts the row of items and conveys backward. The back conveyors convey simultaneously until the item required is located on the back conveyor.

Figures 88C, 88D, 89C, 89D:
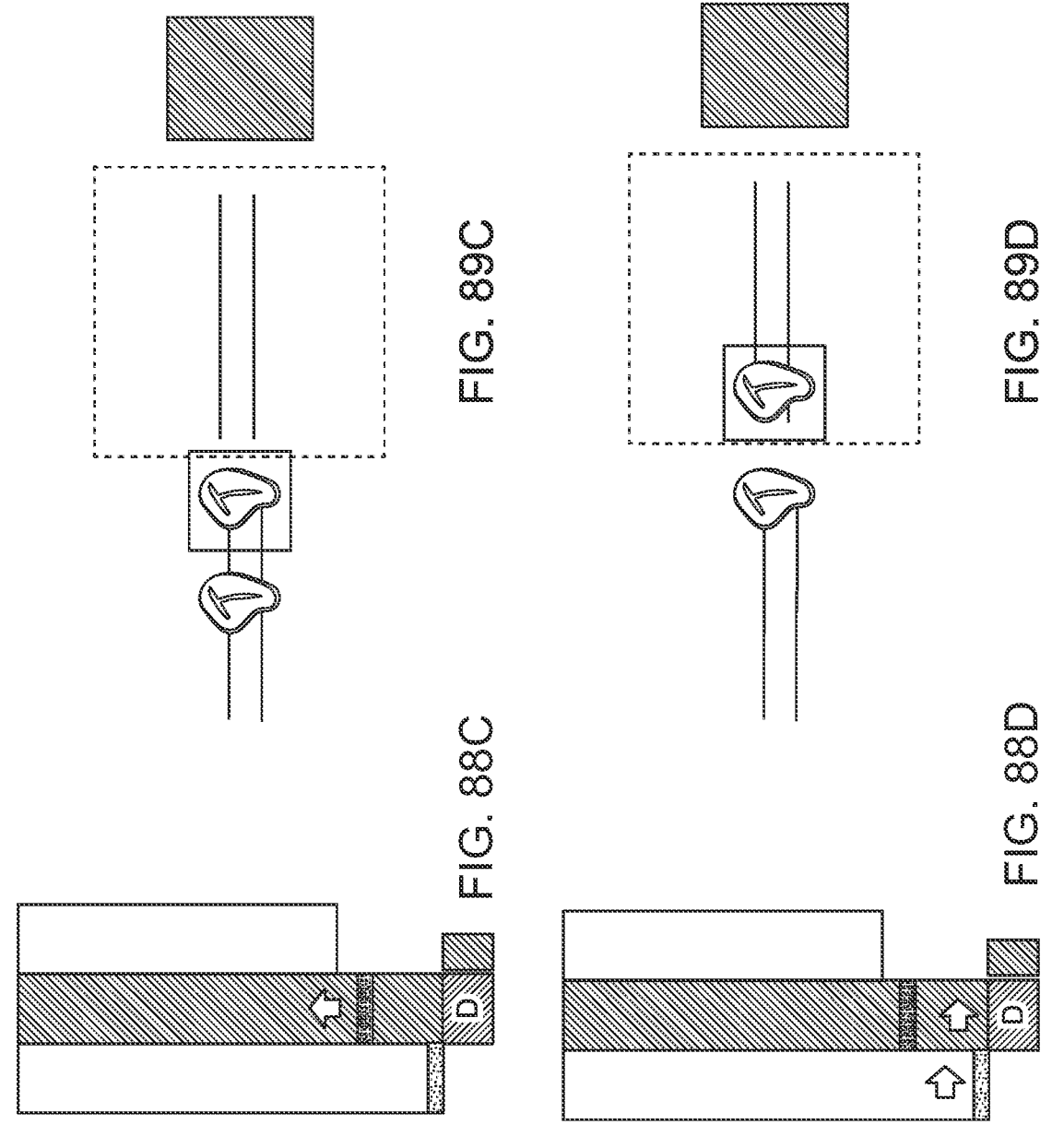

FIGS. 88C and 89C show a third step. Here, the tray lifts up from the dispense tool while the items on the back conveyor stay in place.

FIGS. 88D and 89D show a fourth step. Both conveyors 8804 and 8806 convey forward until the sought-after item is on the dispense conveyor.

Figures 88E, 88F, 89E, 89F:
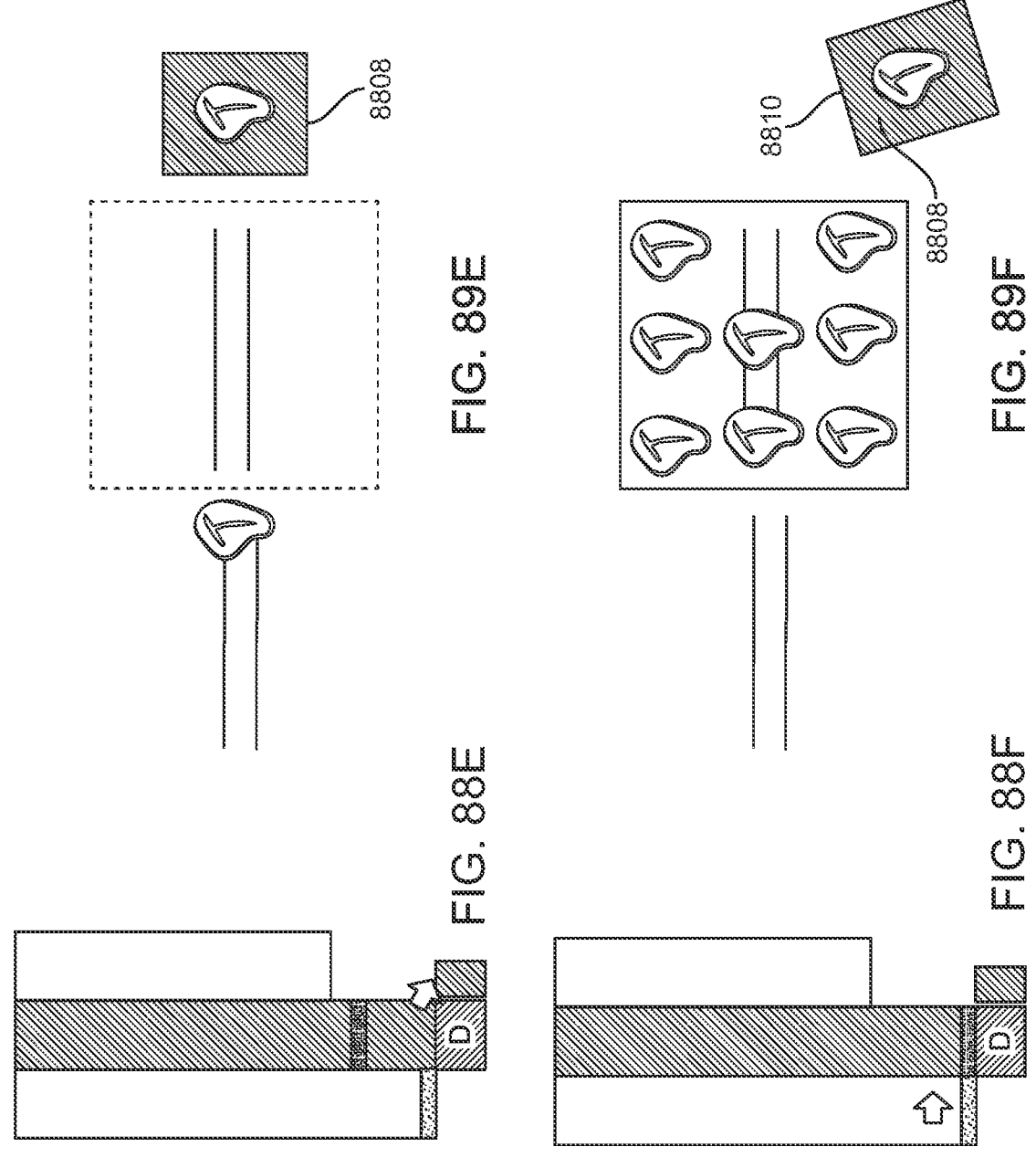

FIGS. 88E and 89E show a fifth step. Here, the back conveyor stops moving and the dispense conveyor conveys forward till it dispenses the item into the bag 8808.

FIGS. 88F and 89F show a sixth step. The tray returns to the dispense tool, and any unused items move back onto the tray. The LFB bearing the bag containing the dispensed item, moves to its next location.

While these particular figures show a specific embodiment that engages in product handling to access center tray items within the dispense area, this is not required. Alternative embodiments featuring the dispense conveyor located on the lift, could perform product handling above the dispense area somewhere in the storage area. A secondary conveyor could be in the back or front of the lift.

Embodiments as just described can be utilized when selecting specific cuts of meat, cheese, produce, etc. Such embodiments can also be employed where multiple, low sale SKUs (like bottles of wine or spices) are present in one lane of the tray. Such embodiments can be used as a method of combining inventory on less than full rows and trays.

Figure 102A:
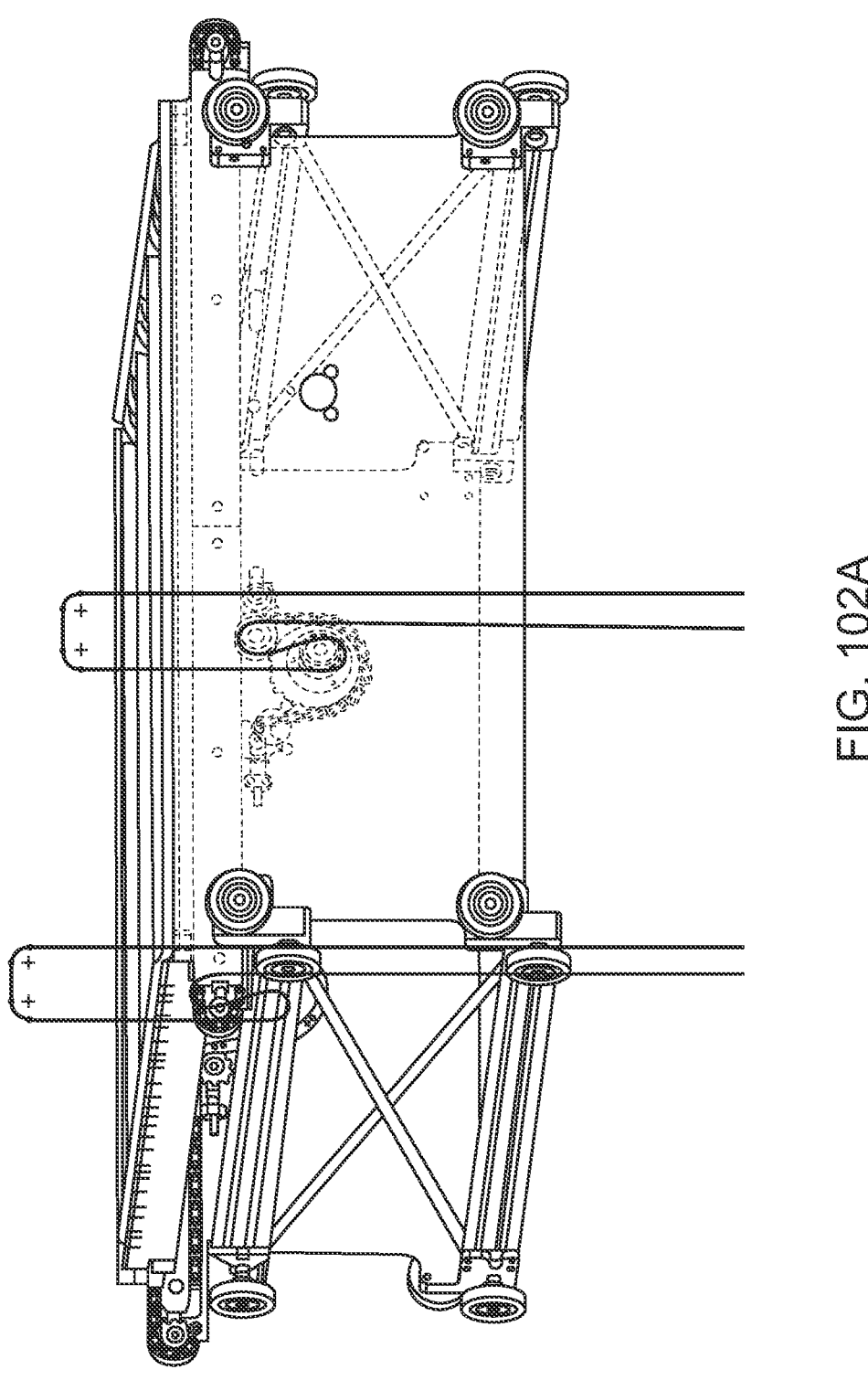
FIG. 102A shows a front perspective view of an elevator design.
Figure 102B:
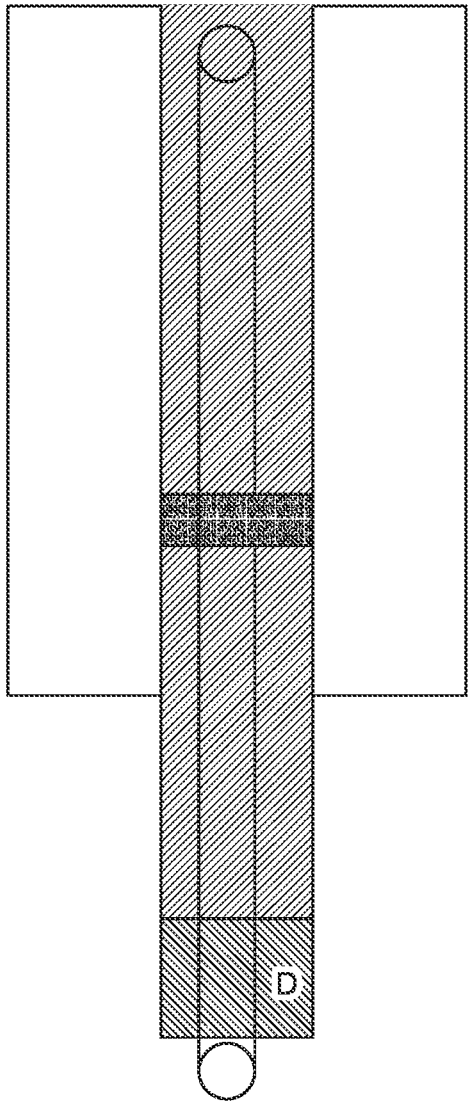
FIG. 102B shows a side view of the elevator.

FIG. 102A shows a front perspective view of an elevator design which may be used with a vertical lift configuration as has been described herein. FIG. 102B shows a side view of the elevator of FIG. 102A.

In particular, motors for the elevator and tray retrieval are located near the ground. Power is transmitted to the elevator carriage via timing belts. This configuration keeps the motors and electronics away from the potentially wet environment (e.g., condensation) of the vertical lift system.

It is noted that certain tray designs may lend themselves for beneficial use in connection with a vertical lift system. FIG. 103A shows a top view of an embodiment of such a tray design.

FIG. 103B shows an enlarged perspective view of the tray design of FIG. 103A. In particular, this tray embodiment features pulling features in the form of hooks on the front.

FIG. 103C shows an enlarged underside perspective view of the tray of FIGS. 103A-B being engaged. An extended chain pin engages that hook pulling feature as it comes around the sprocket.

Software may be utilized to implement certain features in product handling. For example, software may optimize a speed of fulfilment of an order.

In the case of inventory management considerations, the most commonly purchased items may be stored in a few adjacent carriers within each carousel, or at proximate locations within the fixed shelving. Rarer items may be stored in the remaining carriers or fixed shelving.

Most of the time, the carousel will likely be moving between these few "high runner" carriers. Ultimately, this arrangement will reduce the time it takes to fill each order.

In the high runner carriers, only a limited quantity of the high runner items may be stored. Others items are located on less frequently used carriers, accessed if the high runner carriers are empty or if the carousel happens to be closer to that carrier.

Where fixed shelving is used, high runner storage may be located at lower locations relative to the dispense mechanism. This can reduce the time required for repeated vertical movement in order to access the high runner storage locations.

There can be empty tray slots in carriers within each carousel. Accordingly, after a dispense routine, a tray can be returned to a different location than the location it was originally taken from. This imparts flexibility in optimizing fulfilment speed. A routing manager can optimize each LFB route to minimize interference with other LFBs and reduce fulfilment time.

LFBs have the ability to easily pass by other active LFBs. In this way, LFBs can pick items from carousels and bays that are not busy.

A routing manager knows the status of each carousel and bay. The manager can implement planning to minimize time that LFBs wait in line behind other LFBs.

Where possible, each SKU is distributed throughout the store in multiple locations. SKUs can be distributed in one or more of multiple:

carousels throughout the store,
bays in each carousel,
carriers in each bay, and
trays in each carrier.

This imparts flexibility in optimization by the routing manager. Larger orders can be prioritized over smaller order in order to ensure orders are fulfilled in an acceptable time.

The routing manager can signal to a carousel and/or bay to prepare a tray for dispensing before an LFB even arrives at the bay. This can further reduce wait times.

These considerations allow for faster fulfilment time estimates being offered to customers when they place an order.

It is noted that carousels can be designed with different numbers of bays. For a typical carousel with three bays, the actions of all three bays may be coordinated to the movement of one carousel motor. This can result in unwanted interference and wait times between the bays. However, carousels designed to control only a single bay avoid this problem, thus reducing interference and fulfilment times.

Idle LFBs can be stationed throughout the facility in order to reduce travel time to a first fulfilment bay. Carousels can be arranged on paths of different lengths and shapes to optimize speed of LFBs through facility. LFBs can travel in a variety of directions and paths to best navigate the facility based on the items to be retrieved from the carousels.

Once an order is finished, the LFB will travel directly to a waiting driver in the delivery area. The driver will remove the bags from each LFB and put them in their vehicle. This reduces time and labor. There is no need to stop the LFB somewhere, to remove the bag, and then to move it again out to the vehicle.

Where a vehicle has not yet arrived at the delivery area, the LFBs can drive into a temperature controlled chamber until the content of their bags is ready to be picked up.

Once an LFB is filled, it can drive to a parking lot or delivery area of the building to meet a vehicle. The bag can then be removed from the LFB and placed in the vehicle.

In certain embodiments, a human may remove the bag from the line following robot (LFR). In some embodiments, a tool may put the bag into a (self-driving) vehicle or drone.

Such delivery to a vehicle is not limited to a bag of a LFB. Alternative embodiments could have the delivered item in a box (LFBX) or sitting on a platform (LFP). Such a procedure may conserve labor as no human being is required to prepare the order.

The LFR can wait in a queue for the vehicle to arrive. If item(s) need to be refrigerated or to remain frozen, the LFR can move to a cooler or freezer while waiting for the vehicle to arrive.

Embodiments may split up individual orders amongst multiple LFBs. Each such LFB may then navigate independently throughout the store, receiving items in parallel.

Dynamic pricing and/or incentives can be used to reduce traffic during peak hours. This can more evenly distribute orders over the course of a day.

Software may also be employed to enhance a product inspection process for quality. Certain embodiments may employ software for quality inspection in connection with:

tuning a defect detection model to match expert human grading or consumer preference;
controlling a (3D) camera for defect detection; and/or
implementing a Pass/Fail alternative.

As previously disclosed, machine learning models may be trained to detect defects on visual and NIR images of produce. One approach may be based upon object detection varieties of machine learning.

However, embodiments are not limited to this or any other type of machine learning approach. Alternatives which may be used can include but are not limited to, anomaly detection (auto-encoders or GANs) or segmentation techniques.

Prediction models can be developed per individual product SKU. Alternatively, prediction models can encompass multiple types of SKUs. Accordingly a single prediction model can be used to predict quality for ten different apple varieties, or a single prediction model can be used for all stone fruits.

Three-dimensional images of produce, or three-dimensional reconstructions of produce from a series of two-dimensional images, could also be used as the basis for training predictive models and detecting defects. Such an approach can add a variety of benefits, including the ability to judge defect depth and topography.

Machine learning methods according to embodiments can reveal multiple types of information about each detected defect. Such defect information types can include:

defect type,
defect size, and/or
confidence in prediction.

According to particular embodiments, a second machine learning model can take some or all of these inputs (e.g., quantity, type, size, confidence) and infer a resulting output grade for the overall produce quality. Possible grades may be A/B/C, for example.

This machine learning model can be trained based on a human quality expert applying a grade to each item. This machine learning model can also be trained based on consumer feedback to match consumer preference.

According to embodiments, machine learning models can also be used to predict a simple pass/fail quality grade on items, without first identifying specific individual defects. In such an implementation, the machine learning model can be trained on a human quality expert applying a pass/fail grade to each item.

Alternatively, or in conjunction with human training, the machine learning model can be trained on sets of images that are individually labeled as pass/fail. Thus simple pass/fail grading could also be replaced by multiple levels of categorization (A/B/C, etc.)

Such approaches could also be extended to items in the store beyond spoilable produce. For example, embodiments could identify damaged cans, boxes, etc. utilizing machine learning prior to storage and/or delivery to a customer.

Software may also be employed to perform inspection for Quality Analysis (QA) and/or presentation to customer. Such inspection may take place at induction, with 2D or 3D rendering allowing a user to select their preferred item. Such inspection may also occur during fulfilment, for purposes of Quality Control (QC).

According to certain embodiments, inspection may occur at the time of induction of the product to the store. Inspecting (with 2D or 3D imaging) products such as produce as it enters the store, followed by tracking of items in inventory, customers can be afforded an option to select specific produce items (e.g. for a cart) based on the saved mages. A series of 2D images can ultimately be used to create a 3D reconstruction of the produce.

The results of later (after intake) inspection of produce or other product items, can be used to update the 2D or 3D representation(s) that are offered to customers during the selection process. These images could also be used to update a customer after checkout, regarding the items that have been dispensed into their grocery bags.

Software may also be employed in connection with product inspection during fulfilment. For example, cameras attached to dispense stations or the carousel, can image:

produce as it is being dispensed into the LFBs, or the bag after each dispense routine has finished.

According to some embodiments, a final image of each bag can be taken after the LFB has finished collecting all of its items, or after multiple bags from different LFBs are combined. These images can be sent to fulfil QA teams for monitoring, or to customers to provide feedback on the quality of their order during fulfilment.

As previously disclosed, embodiments may utilize software for purposes of produce ripeness prediction. This may involve predicting fruit ripeness stage including the use of tools, and optimizing inventory via storage control.

Environmentally controlled storage vessels (e.g., fixed, or moveable carousels) allow maintaining product items at different conditions (e.g., temperatures, levels of humidity and ethylene) in order to control their ripeness progression.

Fruits ripen faster when exposed to higher temperatures and ethylene. By contrast, colder temperatures generally slow down the ripening process.

LFTs can be used to shuttle ripening product items such as fruits, between different storage environments based upon conditions optimal for the fruit, in order to maintain optimal inventory for customer needs. In this manner, product handing approaches according to embodiments can provide fruits that are currently ripe, or will be ripe at a predicted future time range.

As one possible example, avocados can be kept at about 16° C. until they reach a ripe state. Then, they can be moved to 3° C. At this colder temperature, the ripe avocados can be expected to remain ripe for about seven days.

Predictive modeling (e.g., accomplished by machine learning or other methods) can be employed to predict a future progression of ripening of product items. Such models can ingest information from one or more sources including but not limited to:

harvest date, harvest conditions, cold storage history, farm source, distributor source, packaging and handling methods, seasonality, type of fruit, variety of fruit, and measurements of the current state of ripeness.

Using automated, semi-automated, or manual tools for measuring a ripeness stage of a fruit or other product can be beneficial in providing a current state fruit ripeness in a manner that is accurate, repeatable, and predictable.

A variety of measurement methods, employed alone or in combination, may allow for assessment of a current ripeness stage of a product item. Such measurements can include but are not limited to:

firmness measurements (e.g. with a durometer type tool), acoustic property measurements (e.g. with a speaker+ microphone type tool)

light reflection/interactance/absorption measurements (e.g. with a spectrometer tool).

Such measurements can replace or supplement manual human measurements, including but not limited to:

vision, smell, and a hand-score of firmness

In certain cases, periodic (e.g. once a day) measurement of product items is important for tracking the ripeness stage over time. In other cases, metadata of the product item, along with typical trends for that item, may be sufficient for predicting the future ripeness trends. There, a single measurement of ripeness during induction to the store location, or even no measurement at all, may be sufficient.

Sourcing items that are pre-conditioned (e.g., ethylene and/or temperature conditioned) can create more homogeneous batches of fruits. This can allow for sub-sampling when measuring fruit ripeness, or permit fewer periodic measurements over time.

It is noted that tools for ripeness measurement (e.g., firmness, acoustic, spectrometer, etc.) can be located in a variety of different store locations to provide periodic assessments of product ripeness.

One possible position within the store is in a temperature controlled induction or pre-storage location for manual or semi-automated measurements. Ripeness measurement could be integrated into the automated inspection equipment for measurement during induction. Or, measurement could be performed when LFTs remove the produce from controlled climate storage and return to the station for periodic measurements.

Ripeness measurement may be incorporated into the LFT itself, or may be present at measurement stations distributed throughout the store for easy and quick LFT access. Ripeness measurement may be incorporated into dispense stations, or within a storage (e.g., carousel) bay itself.

Figure 90:
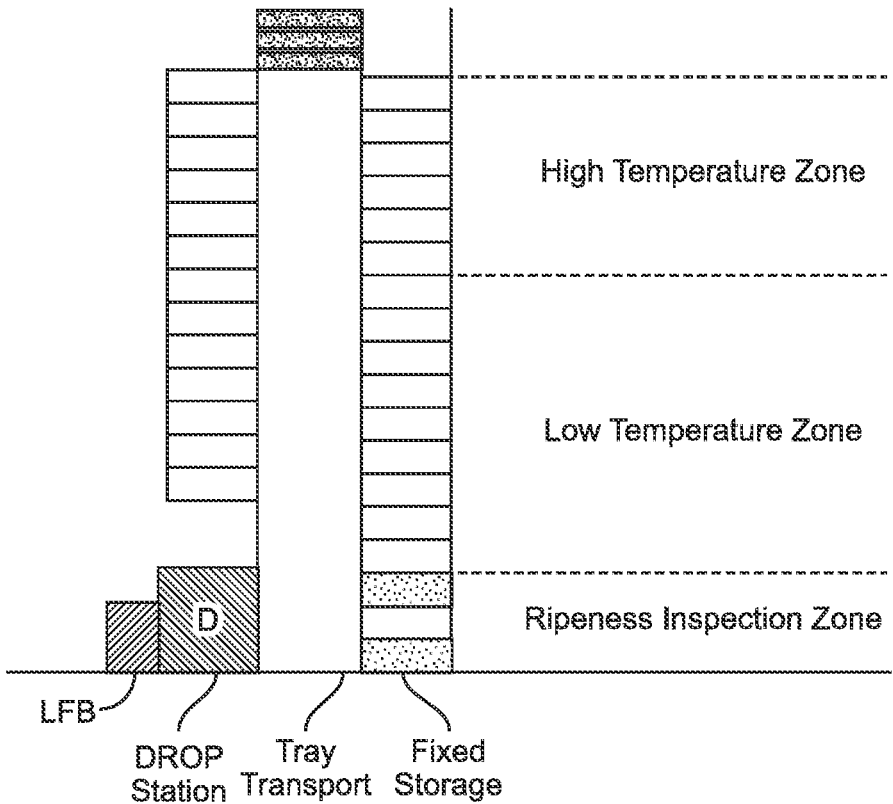
FIG. 90 shows a simplified cross-section of a configuration in which trays are removed and returned to fixed locations utilizing a tray transport mechanism.

In an alternative design to a moving carousel, product items could be stored in environmentally controlled individual vertical storage bays. Such storage does not move like a carousel. Rather, trays are removed and returned to fixed locations utilizing a tray transport mechanism. Such a configuration is shown in the simplified cross-section of FIG. 90.

The storage temperature can be modular even within a single bay. This allows for higher and lower temperatures for granular control over ripeness stage. And, such an approach allows for easy transport of ripening produce between different temperature conditions based upon ripeness stage, without the need for a LFT to move the trays.

Ripeness measurement tools can be incorporated into this same vertical bay or dispense station for easy periodic measurements of fruits over time.

Figures 91A, 91B:
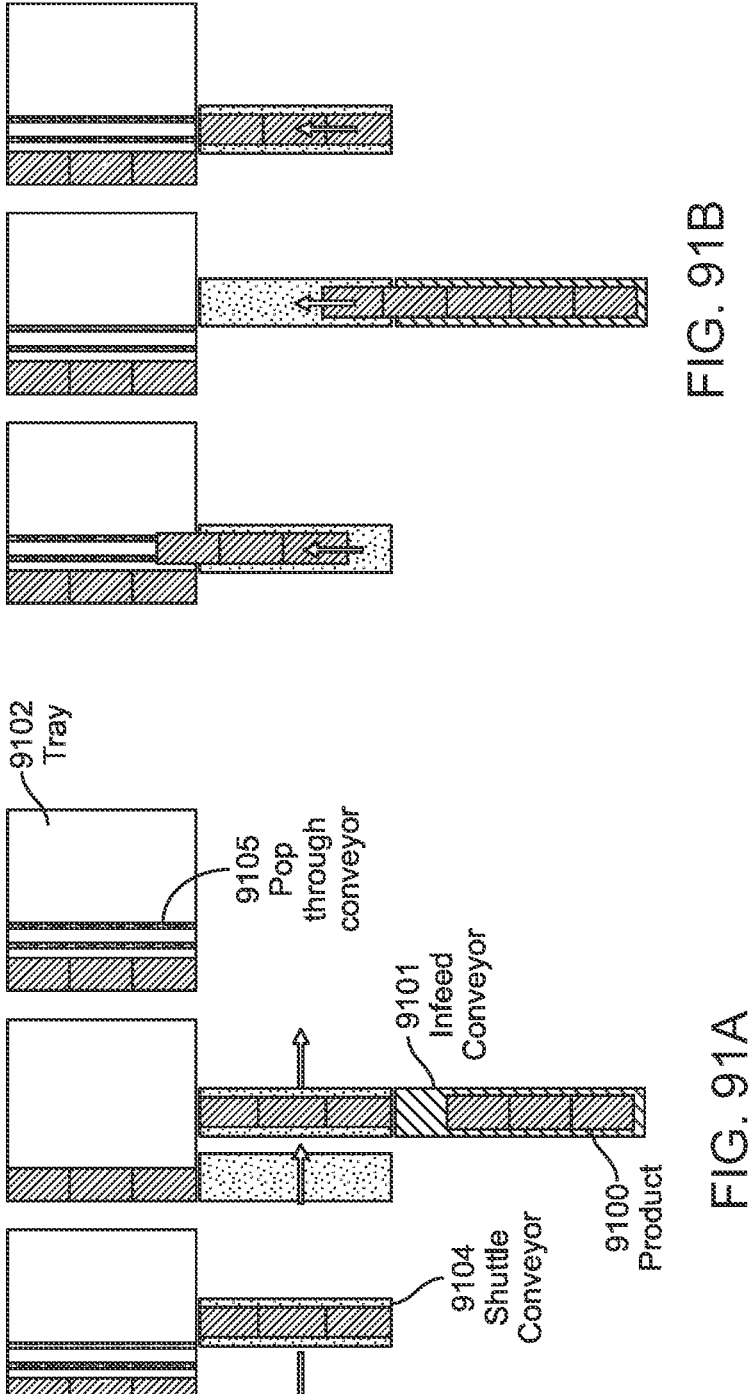
FIGS. 91A-B show views of tray loading shuttle conveyors for mechanical inspection design, in operation.

A variety of different designs of mechanical apparatuses for product handling, may be used to accomplish product inspection. Some embodiments may use tray loading shuttle conveyors for mechanical inspection design, as shown in FIGS. 91A-B.

In particular, items 9100 can be loaded from an infeed conveyor 9101 into multiple trays 9102 using multiple shuttle conveyors 9104 and pop-through conveyors 9105 to move the items to the correct tray location. There can be one or more shuttles, which can move to one or more trays.

A mechanism similar to that used for dispensing items from trays, may be used for loading of items onto trays. One example is a dual-belt conveyor mechanism.

FIG. 104A shows a perspective view of an embodiment of tray loading shuttle mechanism 10400. FIG. 104B shows an overhead view of the tray loading shuttle conveyors of FIG. 104A.

The trays do not move. Once intake inspection of an incoming item is concluded, the infeed conveyors move that item forward onto the shuttle. Then, the shuttle moves the item laterally until it is aligned with the proper row of the tray upon which the item is to be loaded.

Figure 92:
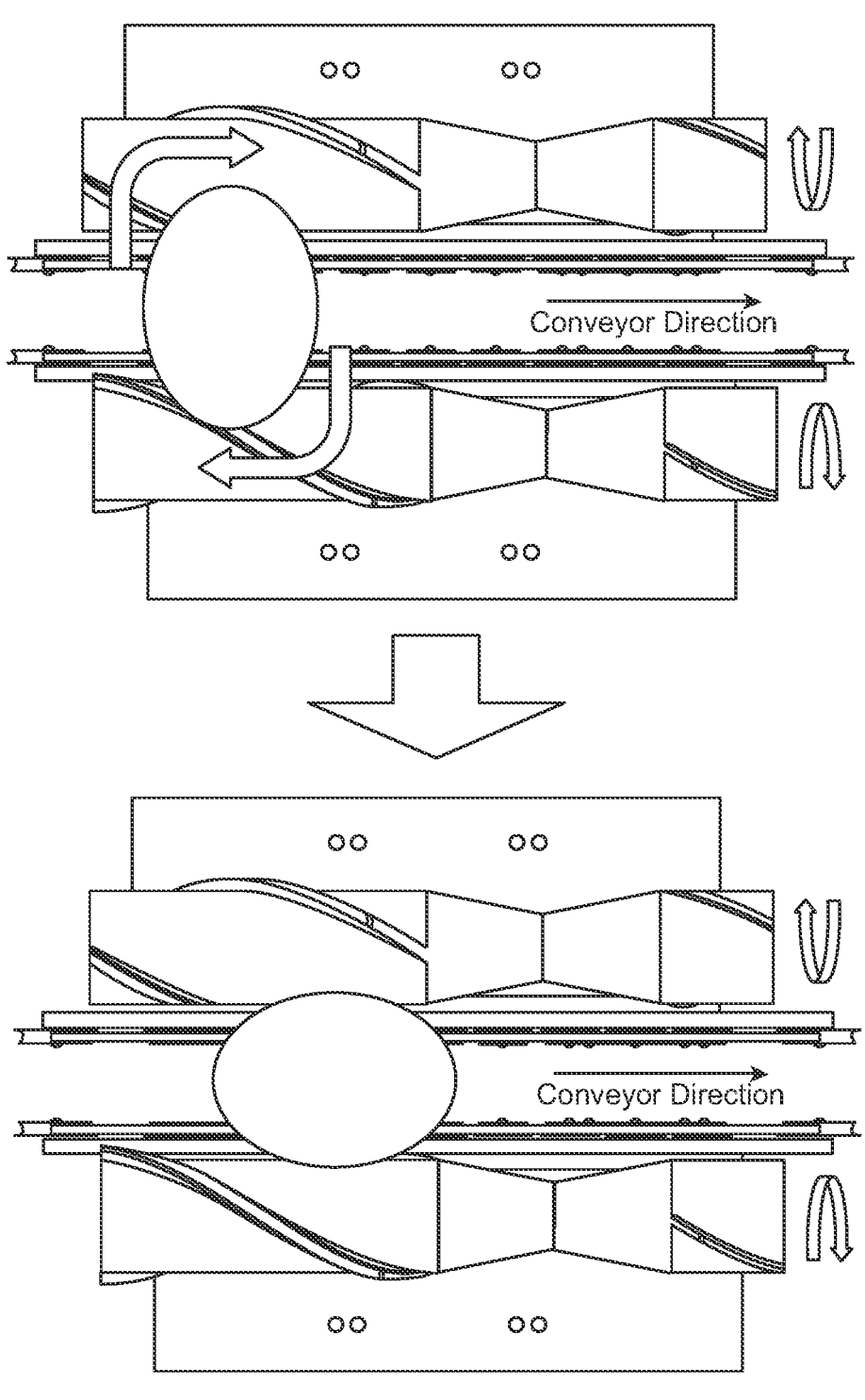
FIG. 92 shows a simplified top view of spiral rollers for mechanical inspection, in operation.

Particular embodiment of designs for mechanical inspection may employ rollers with spirals that turn an item ninety degrees. FIG. 92 shows a simplified top view of such a design for mechanical inspection in operation.

In particular, such rollers may handle both spherical and cylindrical objects. Spinning spiral roller(s) can rotate non-spherical objects to their equilibrium position. Spiral ridges on the rollers contact objects diagonally with respect to normal.

Objects can shift lengthwise along path of the conveyor. Roller-to-roller distance may be adjustable to account for different object size.

FIGS. 105A-B show overhead views of inspection size detection adjustment in operation, according to an embodiment. In particular, average SKU size may be predetermined so that rollers will adjust to a best known size position.

Size detection camera(s) can recognize outliers to determine whether rollers need to be adjusted to account for large variances in size. Asymmetric objects can also be detected and accounted for by positioning rollers relative to predicted center of gravity. The roller assembly can move along a rail in order to adjust for size.

Figure 93:
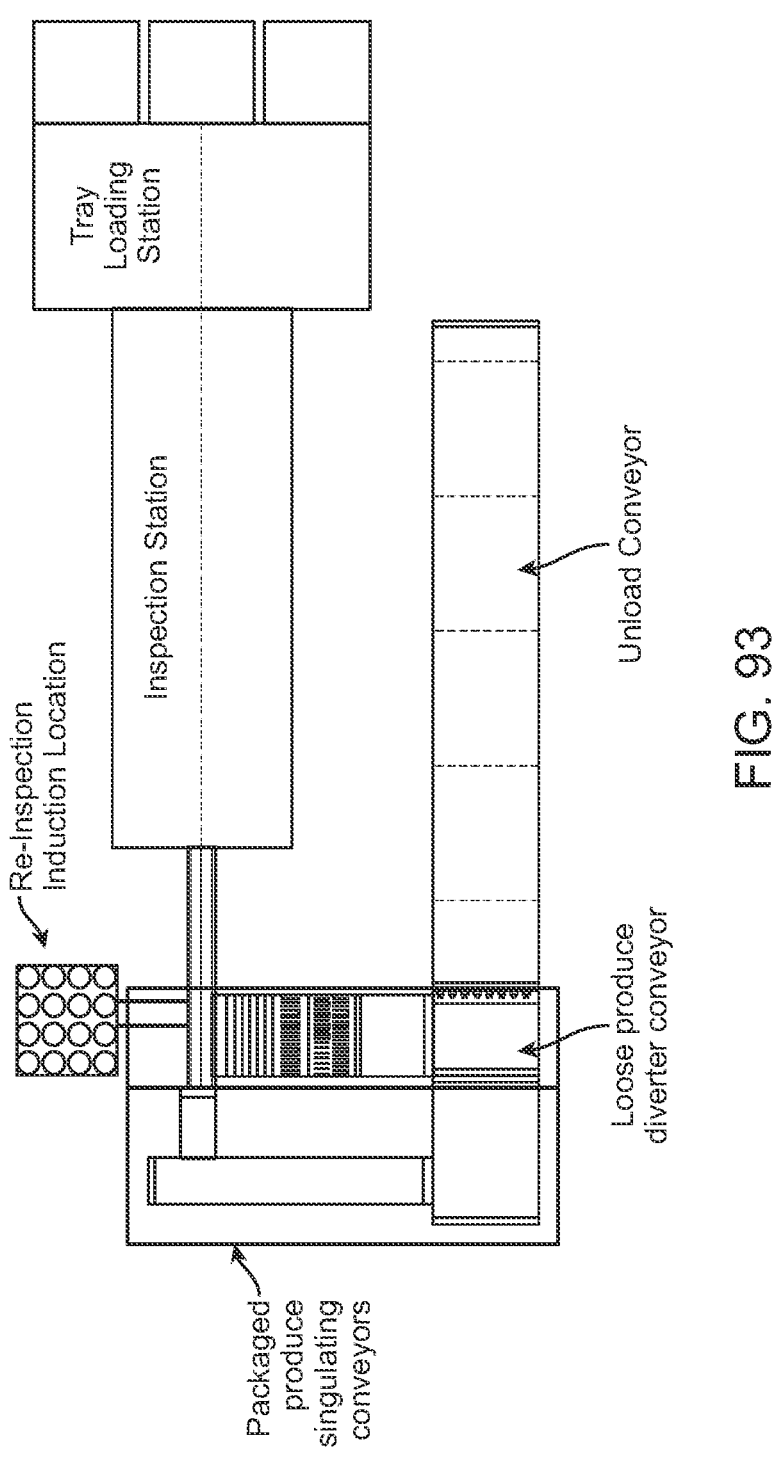
FIG. 93 shows an example of an embodiment of an inspection induction system loading stations.

One example of an embodiment of an inspection induction system is shown in FIG. 93. Various forms of produce that are to be inspected, proceed through a series of conveyors. There, the produce is automatically singulated and aligned after being placed onto an unload conveyor.

Loose produce corresponds to individual spherical and cylindrical produce. Packed produce corresponds to clamshells, boxes, and bags of multiple produce (e.g., lettuce, bags of carrots, etc.)

Figure 94A:
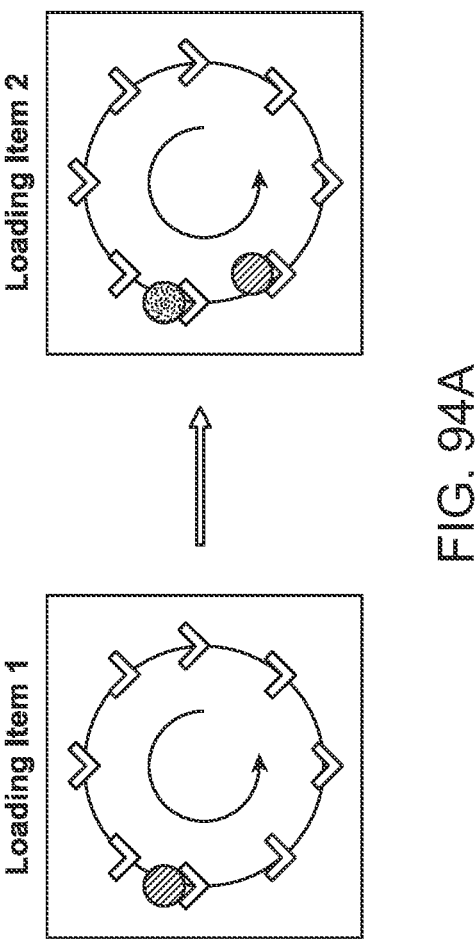
FIG. 94A shows a circular V-belt loading station in loading operation.

Some embodiments of mechanical designs may feature circular V belt loading stations. Operation of such a design for loading is shown in the simplified side view of FIG. 94.

In particular, this station is a high density loading station for both produce and dry goods. It allows a buffer to be loaded with items prior to entering either the inspection station and/or tray loading station.

One section of the conveyor belt is loaded up. Then, the station rolls, presenting a free conveyor section to an operator and a loaded section of conveyor to the conveyor leading to the next station. The conveyors can angle up to be a V for spherical and cylindrical items and flatten for packed items.

Figure 94B:
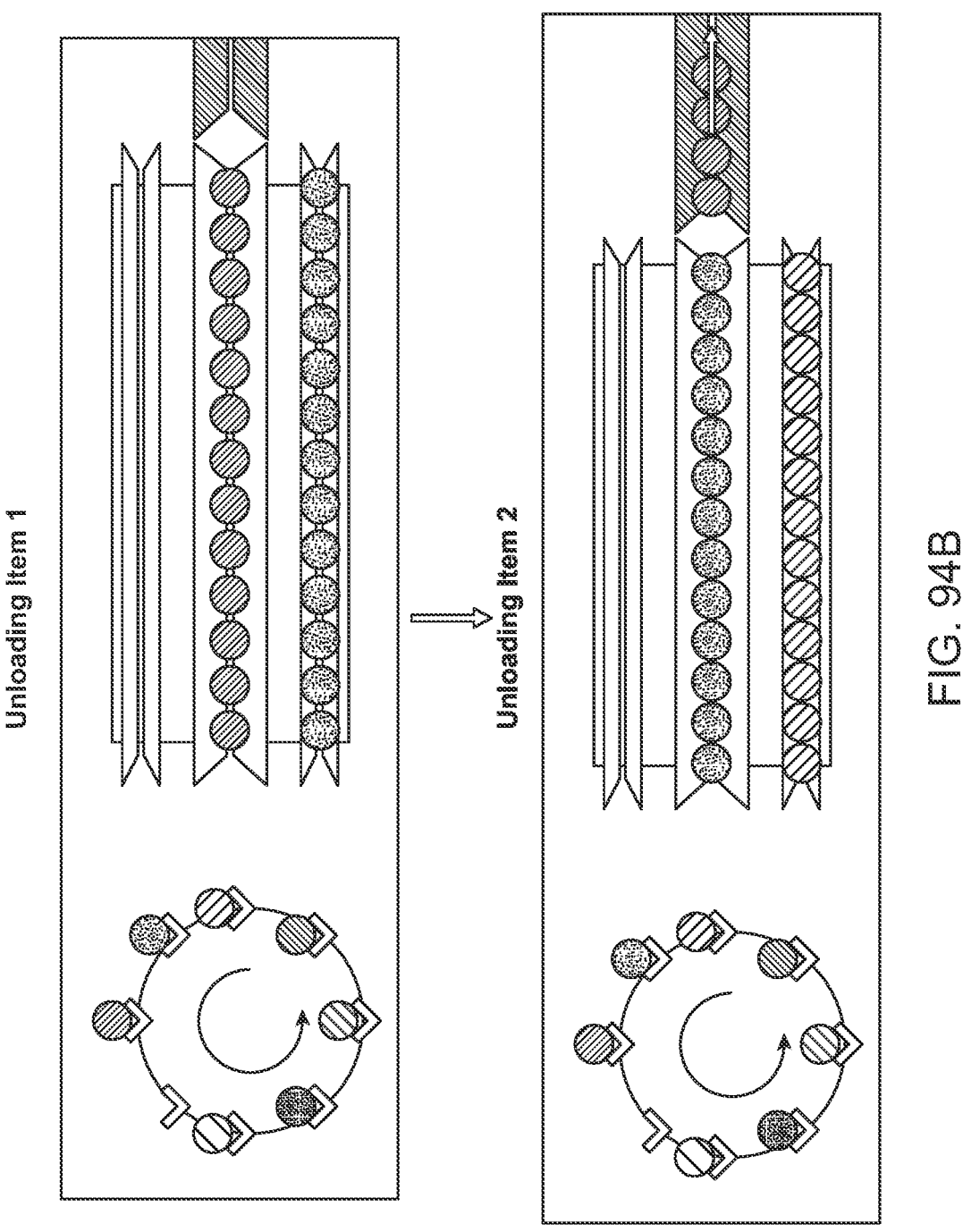
FIG. 94B shows the circular V-belt loading station in unloading operation.

This buffer allows the operator to load the station, and then leave to accomplish another task. FIG. 94B is a simplified view showing unloading.

Some embodiments of product handling mechanisms may feature a translating shuttle buffer. This offers a high density loading station for both produce and dry goods which allows a buffer to be loaded with items prior to entering either the inspection station and/or tray loading station.

Figures 95A, 95B:
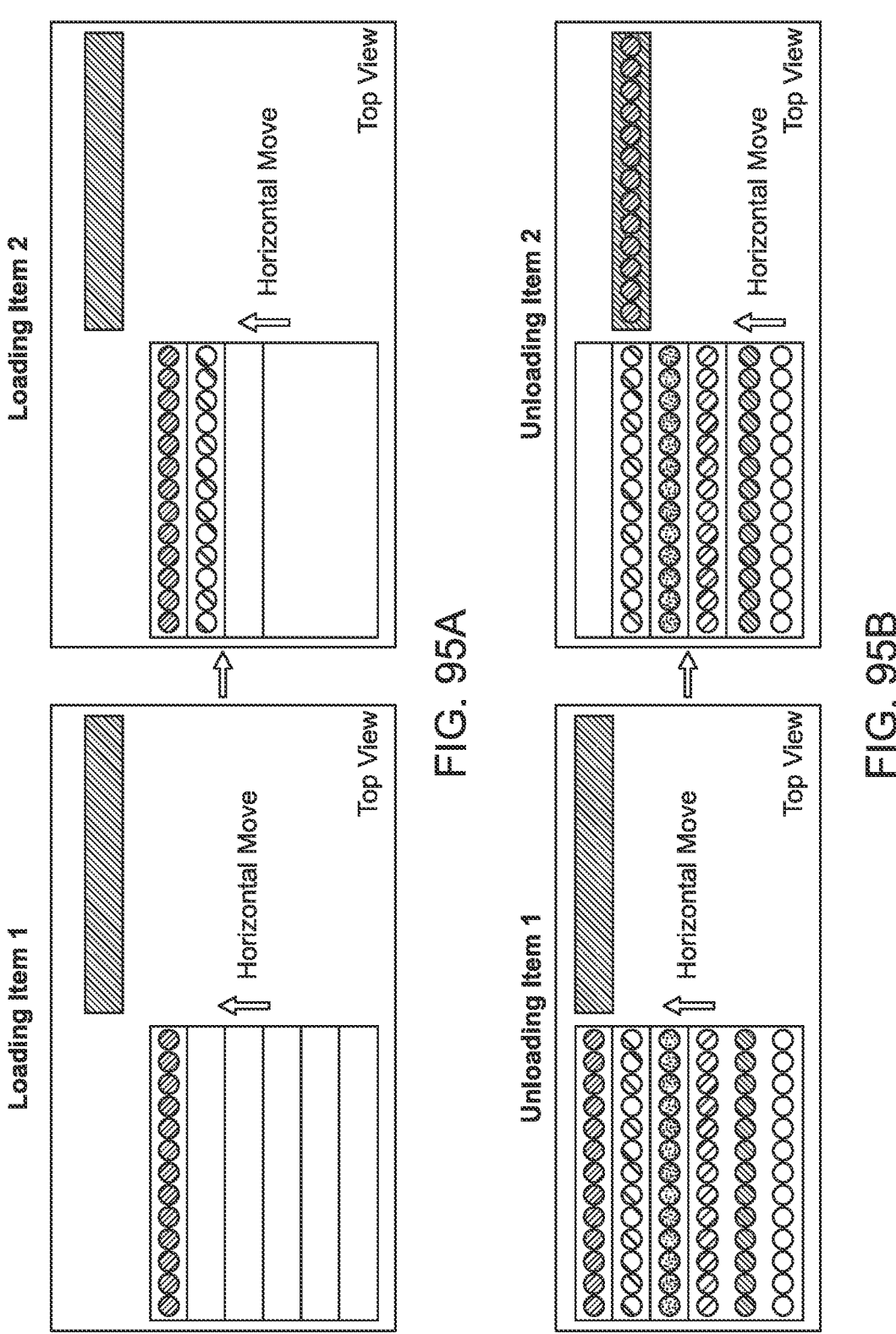
FIG. 95A shows a translating shuttle buffer in loading operation.
FIG. 95B shows the translating shuttle buffer in unloading operation.

As shown in the simplified view of FIG. 95A, one section of the conveyor belt is loaded up, and the station translates. This presents a free conveyor section to an operator, and also presents a loaded section of conveyor for unloading to the conveyor leading to the next station (shown in the simplified view of FIG. 95B).

The conveyors can angle to assume a V-shape for handling spherical and cylindrical items, or flatten to handle for packed items. This buffer mechanism allows the operator to load the station and walk away to accomplish another task in the warehouse.

Some embodiments of product handling systems may utilized a stacked shuttle buffer. This station is a high density loading station for both produce and dry goods which allows a buffer to be loaded with items prior to entering either the inspection station and/or tray loading station.

Figures 96A, 96B:
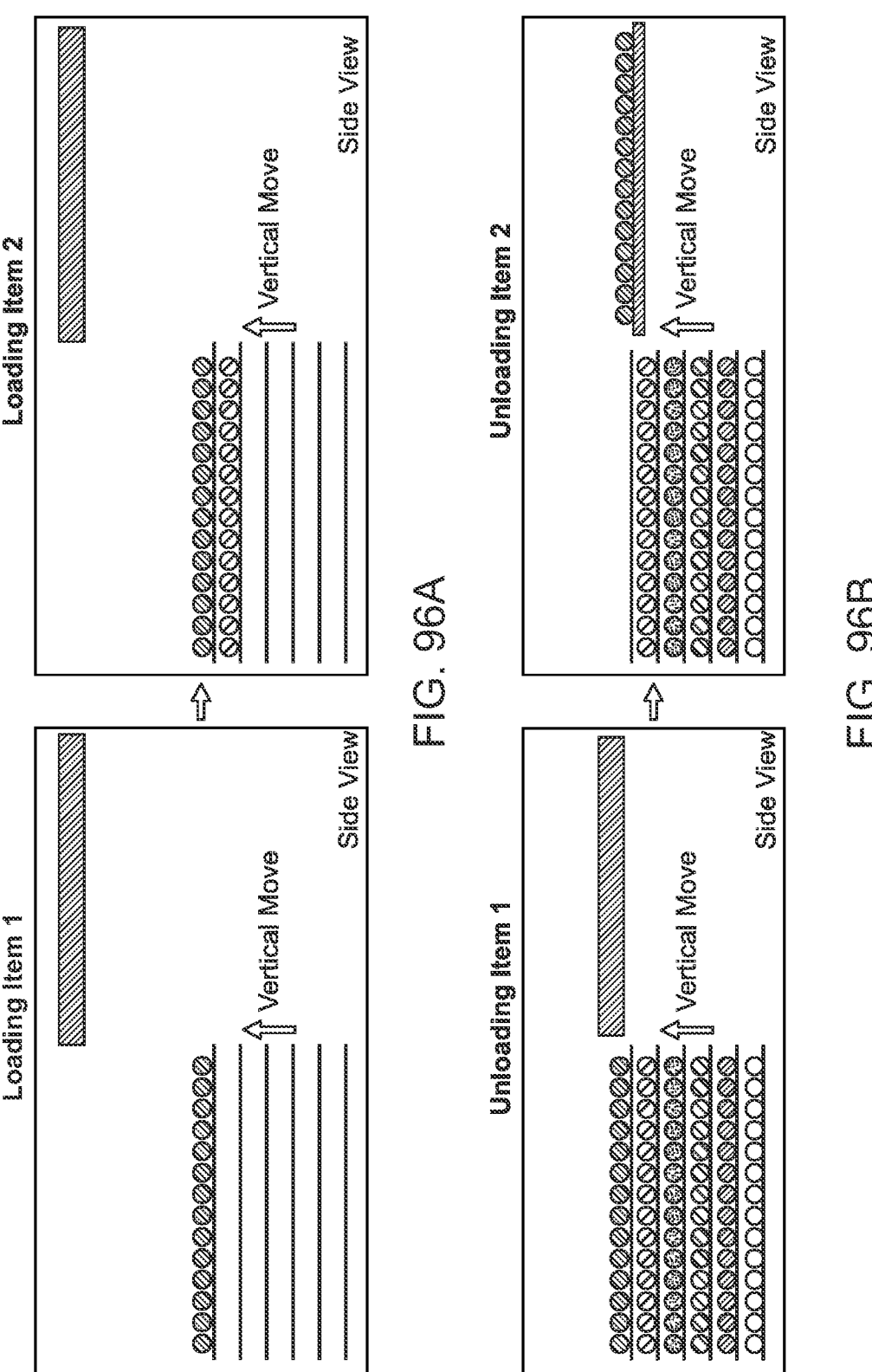
FIG. 96A shows a stacked shuttle buffer in loading operation.
FIG. 96B shows the stacked shuttle buffer in unloading operation.

As shown in the simplified side view of FIG. 96A, one section of the conveyor belt is loaded up, and then the station translates. This presents a free conveyor section to an operator, and also presents a loaded section of conveyor to the conveyor leading to the next station (shown in the simplified side view of FIG. 96B.

Again, the conveyors can angle up to be a V for spherical and cylindrical items, and flatten for packed items. This buffer allows the operator to load the station and walk away to accomplish another task in the warehouse Certain mechanical designs may allow for dynamic storage of cases of product. In particular, for a streamlined product handling system, cases of produce may be stored in a manner promoting autonomous dispensing and an ability to be brought directly to the tray loading station.

Figure 97A:
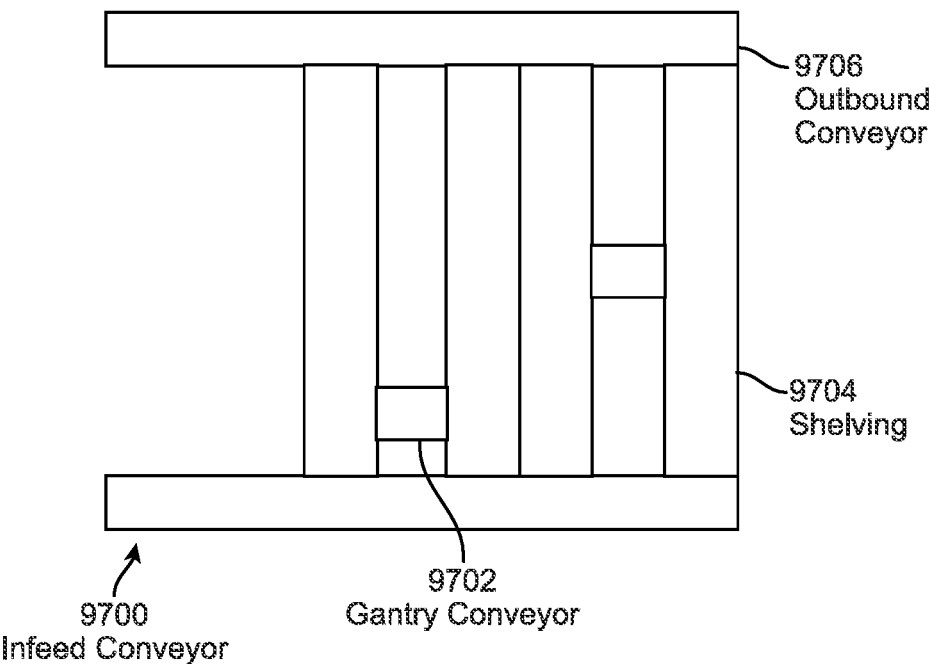
FIG. 97A is a simplified overhead view showing cases of product loaded onto an infeed conveyor and transferred to a 2D gantry conveyor.

As shown in the simplified top view of FIG. 97A, pallets are broken down and individual cases loaded onto an infeed conveyor 9700. These product cases are transferred to the 2D gantry conveyor 9702.

Figure 97B:
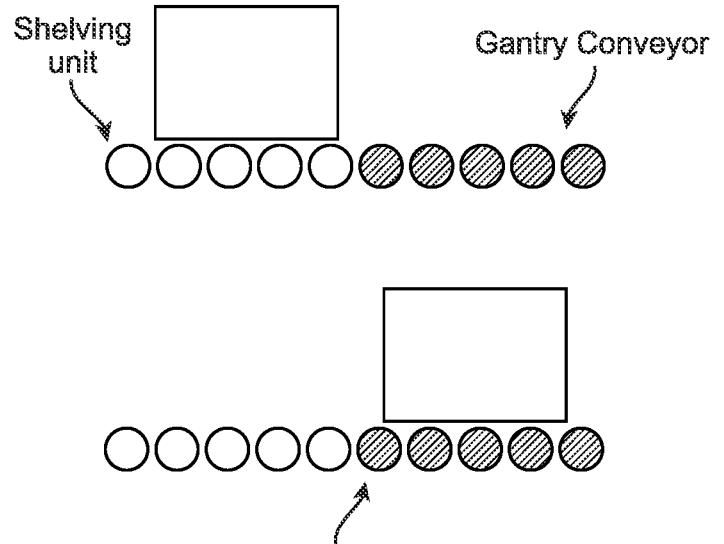
FIG. 97B is a simplified side view showing product cases transferred from a bay of shelving units back to the gantry conveyor.

The product cases are then transferred into a bay in the shelving units 9704. As shown in the simplified cross-section of FIG. 97B, when summoned the cases are transferred back onto the 2D gantry conveyor and taken to the outbound conveyor 9706.

The outbound conveyor carries the case to the tray loading station. The shelving is a conveyor that is driven by a connection to the gantry conveyor. In particular, geared connection between the motorized gantry conveyor and a non-motorized shelving unit allows transfer of cases between the two units.

Embodiments may provide the functionality of permitting automatic re-inspecting. That is some SKUs may benefit from a second or third inspection on a specific schedule. Thus a LFT can be routed to remove a tray from storage, bring the tray to the inspection station, and offload those SKUs back into the inspection process. Those re-inspected items can then be resorted onto new trays and replaced in the storage.

Alternatively, a camera above each pick station can perform inspection according to a schedule. If unacceptable items are found, they can be removed from the trays. If the ripeness or quality status has changed, the database of information can be updated accordingly.

Embodiments may offer the ability to automatically combine inventory. Specifically, throughout the fulfilment process each tray will have items dispensed from it for fulfillment to the customer.

Eventually, this repeated dispensing will result in trays being only partially filled. Such a condition may be undesirable because total inventory count is reduced.

At least two possible approaches may be used to address this issue. One approach is recombination.

Specifically at low demand times a recombination schedule may be created routing LFTs to each partially-filled tray. The trays will be removed and returned to the tray filling station. Trays will be removed from the LFT and placed on the loading station. Using the tray loading shuttle conveyors, for example, items can be removed from some trays and added to others until some trays are full and others are empty. At this point, the full trays can be replaced in the carousel.

Another approach involves addition. This proceeds similar to recombination, but rather than using the tray loading shuttle conveyors to recombine items, newly inspected items can be added to the partially filled trays.

Various features of tray designs are now described. It is noted that some product items do not interact as well with the dispense station. This can be due to one or more of:

the odd shape of the product, the presence of many leafy or delicate features, the presence of a center of mass in a non-advantageous location.

A method allows such product SKUs to be dispensed in a similar manner to other items in the store. Specifically, each items gets placed on a small raft that fits with the tray. When the item is called for, the item and the raft are dispensed together.

In one embodiment the raft is captured before moving into the LFB. In an alternative embodiment the raft moves into the LFB and is removed at the end by a worker or a tool. In still another embodiment the raft is shipped to the customer for disposal.

Figure 98A:
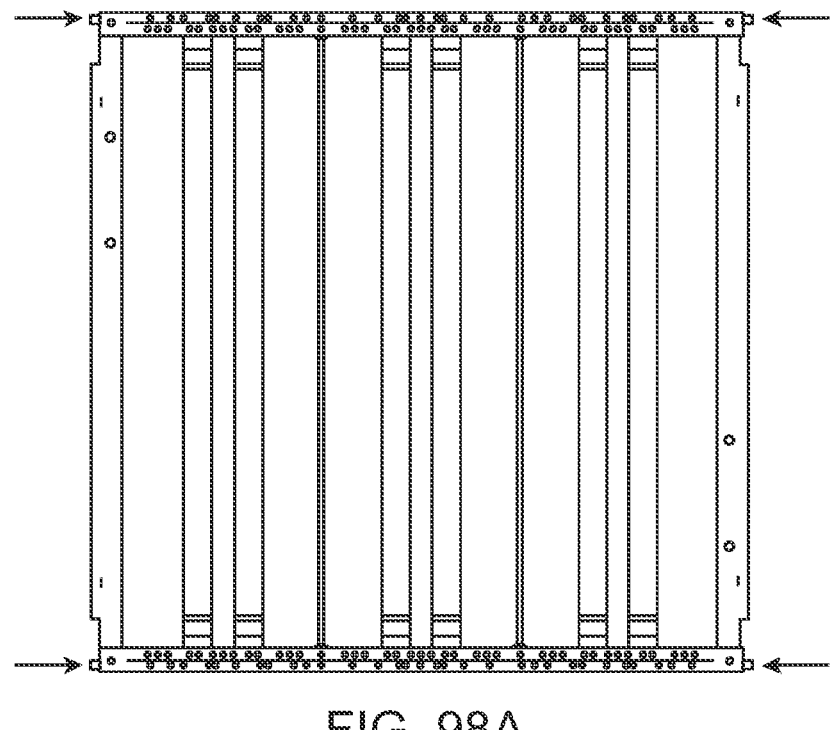
FIG. 98A is a simplified top view of a tray design that allows dual side handling.
Figure 98B:
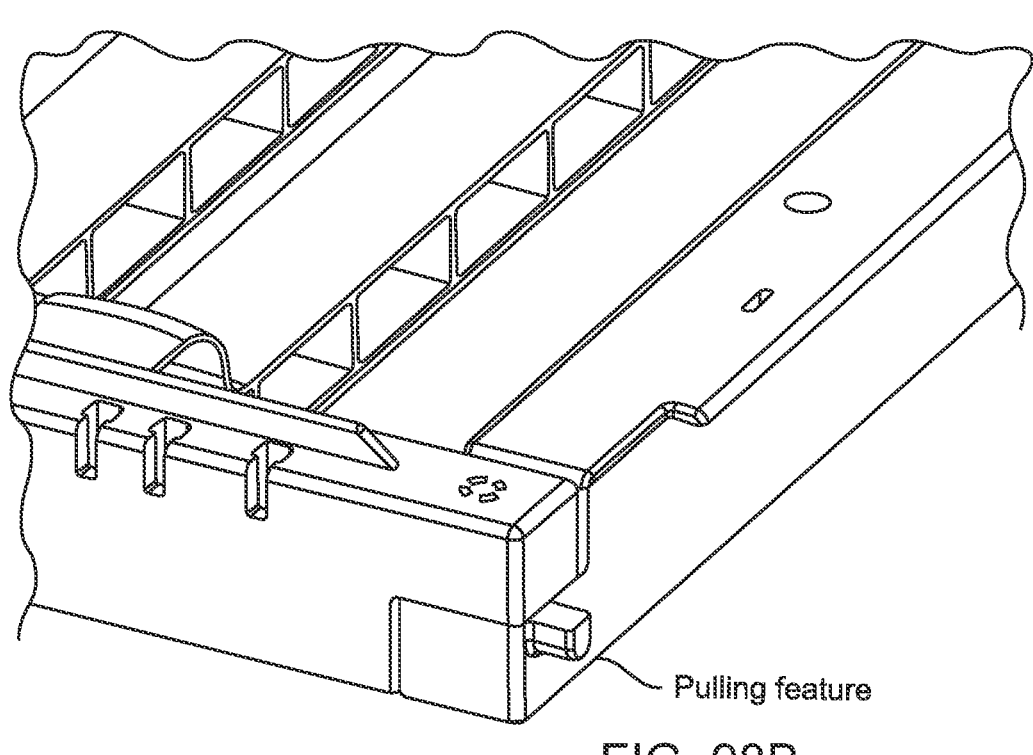
FIG. 98B is an enlarged perspective view of the tray of FIG. 98A.

Certain embodiments may utilize a tray design that allows dual side picking. This is shown in the simplified top view of FIG. 98A, and in the enlarged perspective view of FIG. 98B.

In particular, the tray includes pulling features that interface with the arms of the dispense station in order to contact and place the trays. The symmetrical design of the tray allows the tray to be used in either orientation, and allows the tray to be contacted and placed in either direction. This is discussed later below in connection with at least FIGS. 101A-F.

Certain specialized tray designs may be employed for handling of heavy, bulk items. rays for heavy, bulk items. Examples can include but are not limited to Examples to 24-packs of bottled water, toilet paper, paper towels, bales of firewood, 24 packs of beer, cases of wine, and boxes of product that have not been unpacked.

FIG. 106 shows a perspective view of an embodiment of a tray design configured to handle such items. This tray would store items that do not get dispensed into a bag. Items would sit on this special tray that can support a larger weight. The tray would have two or more slots to accommodate the pop-through conveyors contacting and picking up the item.

Items would sit on this tray platform and be lifted off, conveyed forward, and then conveyed onto a Line-Following Platform (LFP). The LFP would then transport the item to the shipping area. Details regarding LFP embodiments are discussed further below.

Returning now to product storage within a moveable carousel, embodiments thereof can include various features. One such feature is a quick install carrier attachment.

Specifically, the storage carousel operates by moving shelving units. Mounting such shelving units to the components inside the carousel during installation, may be made more difficult by factors such as:

space constriction, a need to align the carriers angularly (theta) and side-to-side (x), and high torsional strength required of the joint.

Figure 99A:
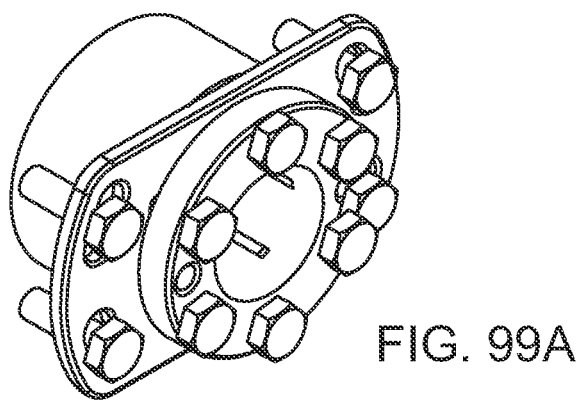
FIGS. 99A-C show perspective, side, and cross-sectional views of an attachment design according to an embodiment.
Figure 99B:
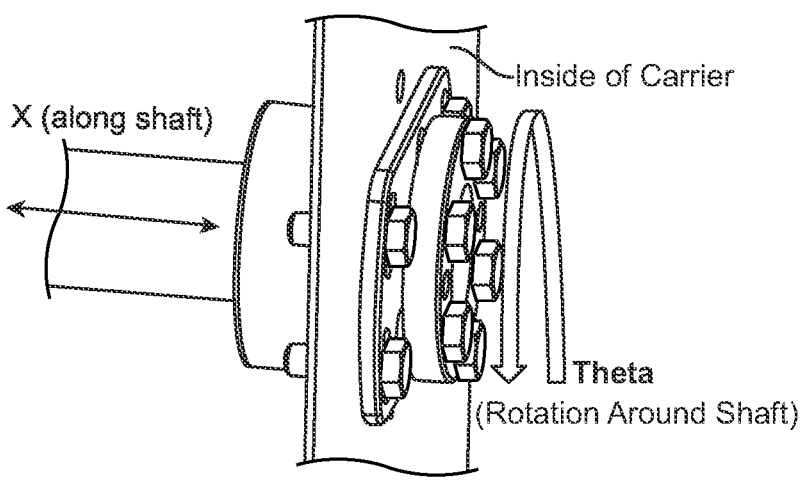
Figure 99C:
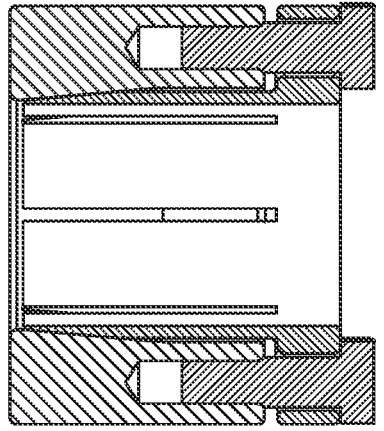

Accordingly, FIGS. 99A-C show perspective, side, and cross-sectional views of an attachment design according to an embodiment. This attachment design allows for installation with only inside access, two degrees of freedom for adjustment/alignment, and very high holding strengths due to the wedged design.

As shown in FIG. 99B, the attachment method slides in X and theta on the shaft when the circular bolt pattern is loose. Torquing the bolts results in rigid coupling of the shaft to a side sheet on a carrier.

Embodiments may use a wedge pushed into a cone by screws to generate radial clamping force on the shaft. This fixes the joint radially and axially. The large mechanical advantage from screw+wedge, allows large clamping forces to be generated.

It is noted that certain carousel designs may include a single bay. Carousels can include various numbers of bays, all controlled by a single motor. Typical options include 1, 2, 3, 4 or 5 bays.

The more bays per motor, the larger the cost savings. This is because each bay shares the mechanics required for movement.

However, the fewer bays per motor, the faster the system can operate.

Each bay may be tied to an independently operating bay on the pick station. When more than one pick station bay is linked with a multi-bay carousel, conflicts may arise slowing the system and creating bottlenecks.

Embodiments may vary the number of different sized carousels in a facility in order to improve the fulfilment process. Thus for one particular facility it might make sense to have all single bay carousels. However, another facility may best utilize a combination of different sizes. This determination can balance speed requirements with cost.

Figure 100A:
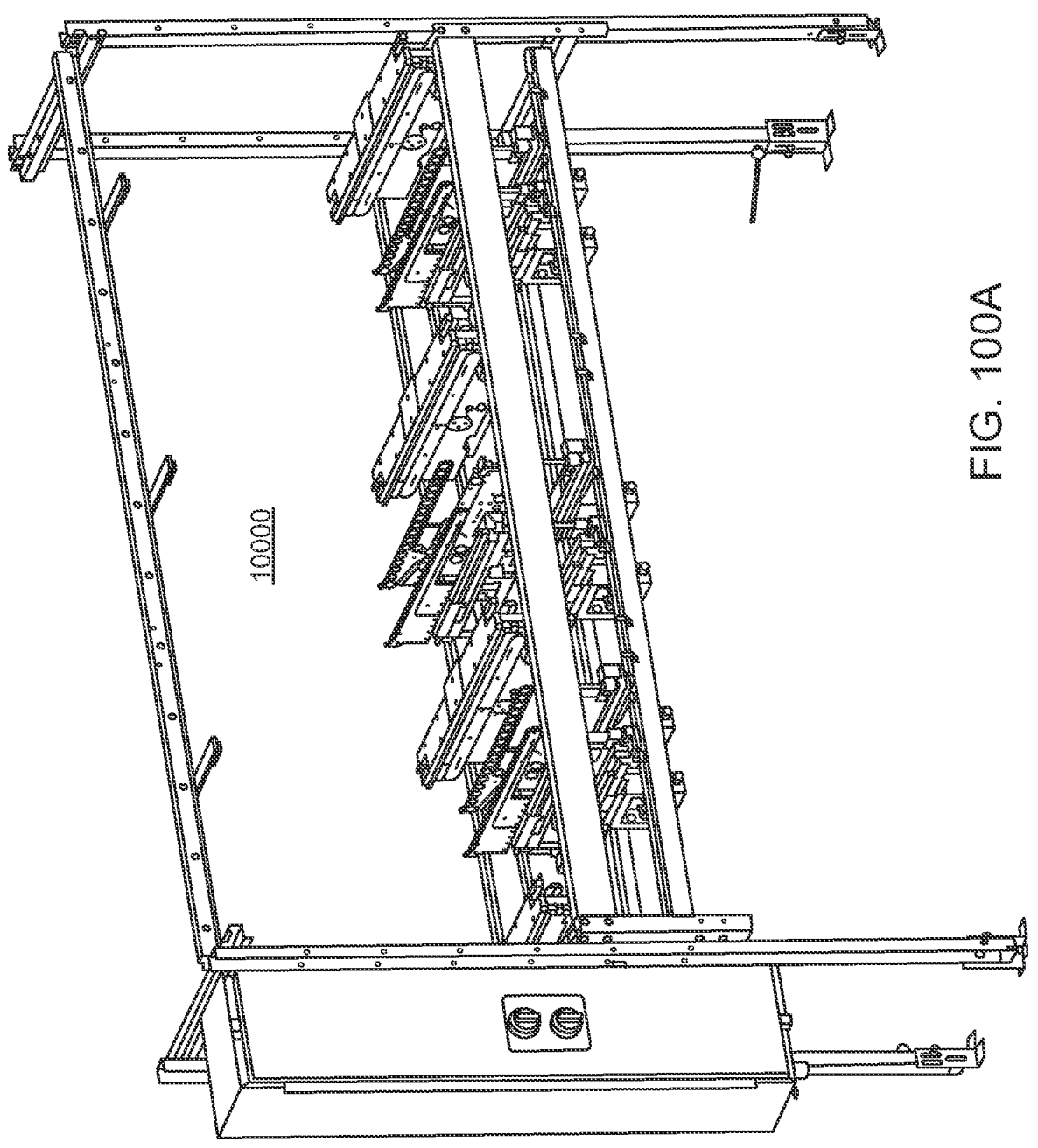
FIG. 100A shows a perspective view of a dispense station according to an embodiment.

Various features of a dispensing station according to certain embodiments, are now disclosed. In particular, FIG. 100A shows a perspective view of a dispense station 10000. In particular, this dispense station adopts a dispense-next-to-lift approach (e.g., as is shown in the right hand side of FIG. 86).

Figure 100B:
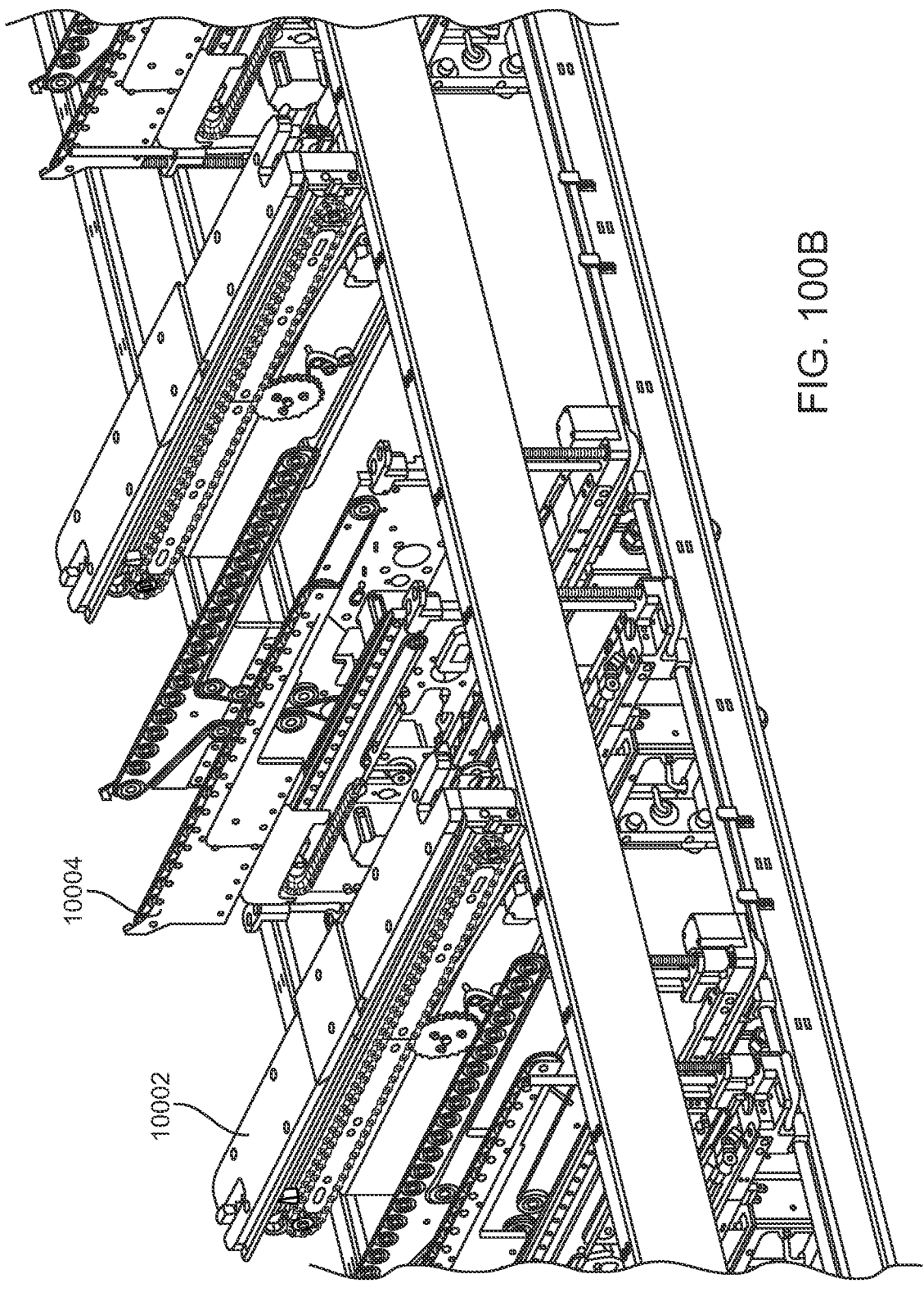
FIG. 100B shows an enlarged view of the dispense station.

FIG. 100B shows an enlarged view of the dispense station. The dispense station comprises a separate tray picking mechanism 10002 and a separate product dispensing mechanism 10004.

Figure 100C:
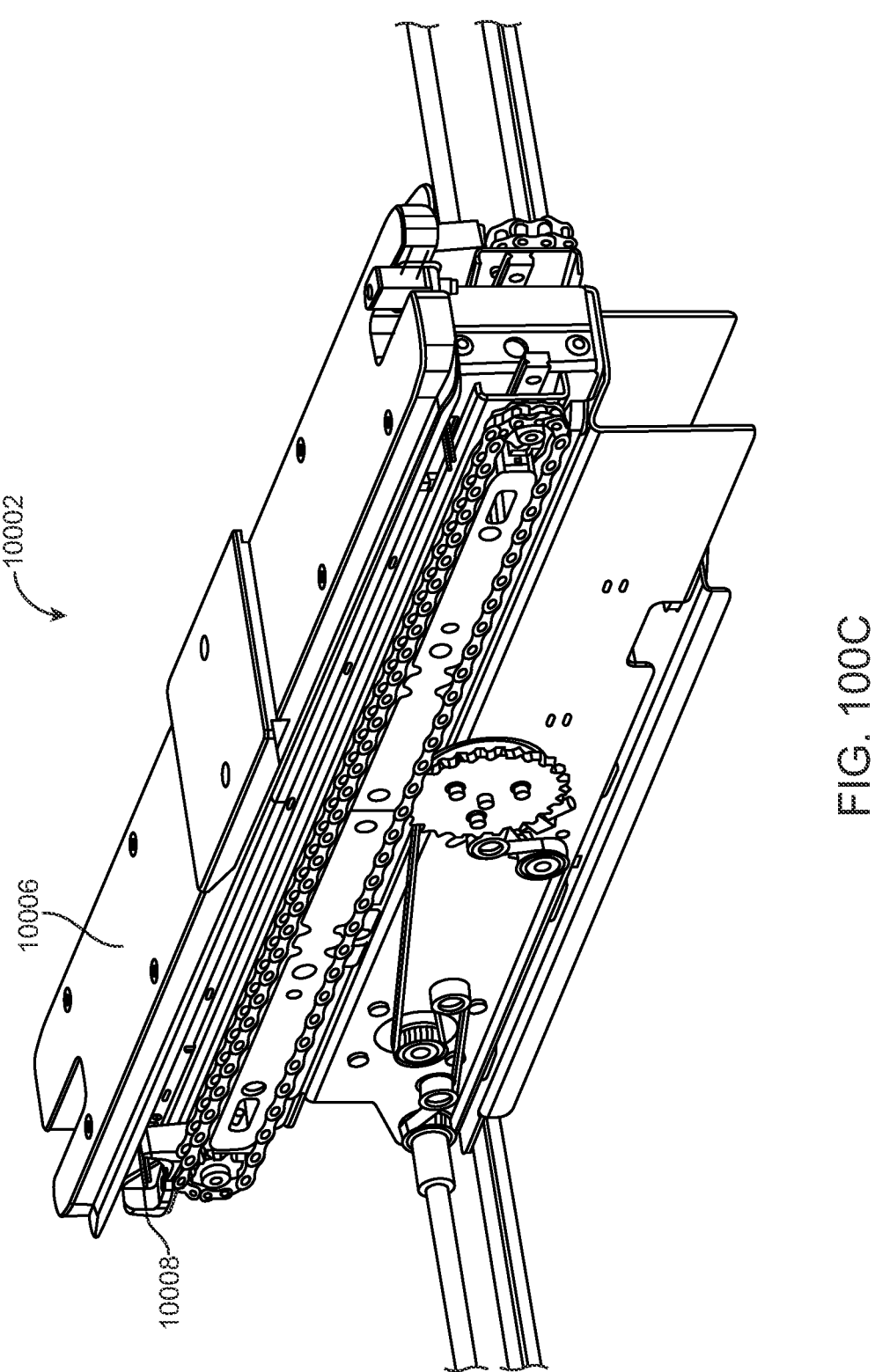
FIG. 100C shows an enlarged view of a tray picking mechanism.

FIG. 100C shows an enlarged view of the tray picking mechanism. This comprises a moveable platform 10006 for supporting the tray, and a bi-directional hook feature 10008 for engaging the tray and pulling it onto the platform. Further details regarding this tray engagement feature are discussed below in connection with FIGS. 101A-F.

As indicated above, this dispense station embodiment adopts a dispense-next-to-lift approach. That is, the lift is not also leveraged to provide the vertical movement allowing the product conveyors to project through the tray slots.

Figures 100D, 100E:
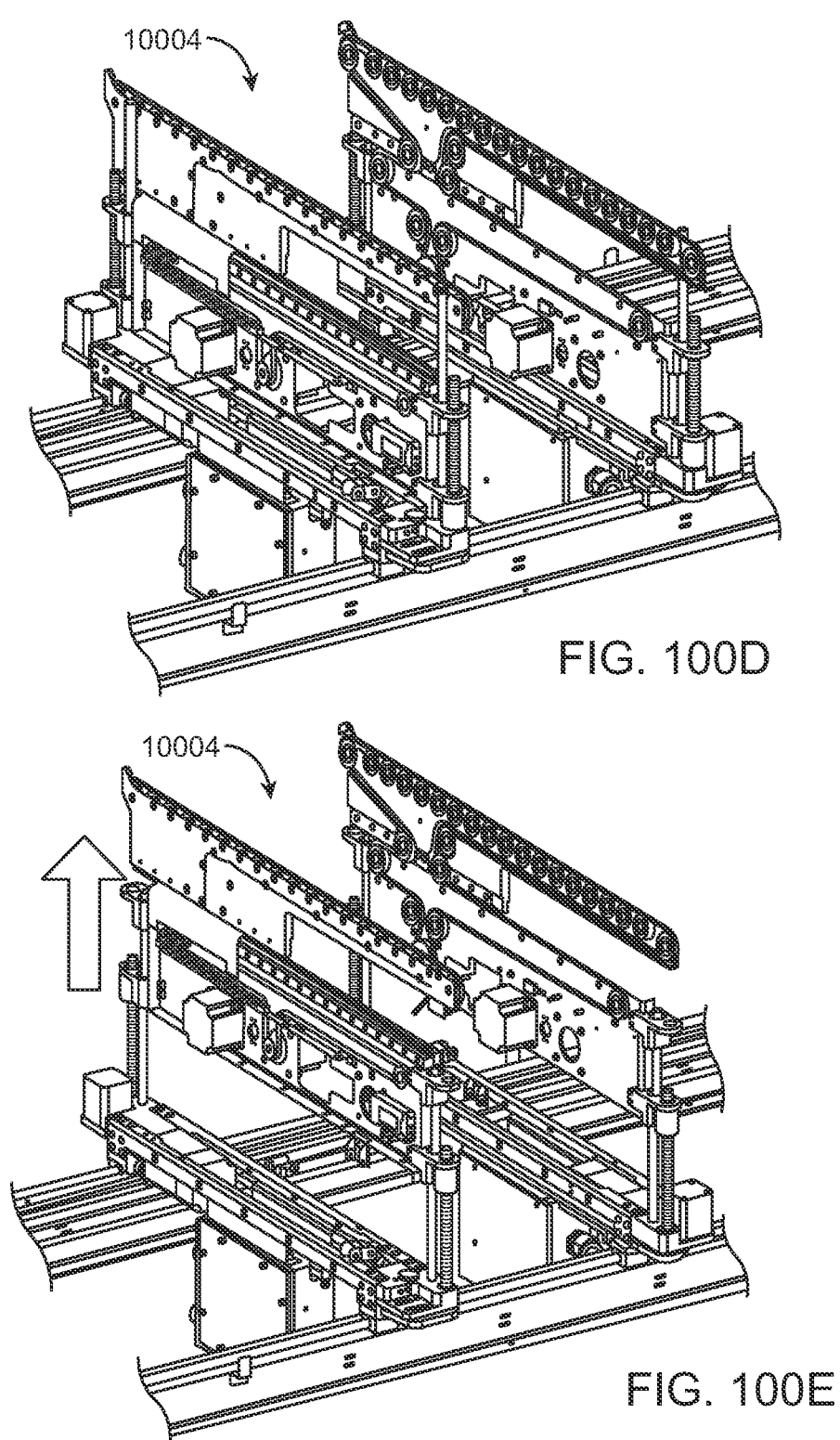
FIG. 100D shows an enlarged view of a product dispensing mechanism in a lowered position.
FIG. 100E shows an enlarged view of the product dispensing mechanism in a raised position.

Hence, the product dispensing mechanism is capable of vertical movement between a lowered and raised position. FIG. 100D shows an enlarged view of the product dispensing mechanism in a lowered position.

FIG. 100E shows an enlarged view of the product dispensing mechanism in a raised position. According to this dispense-next-to-lift approach, the lifting axis is altered from lowering the entire tray over the dispense conveyors, to instead lifting the dispense conveyors through the fixed-in-place tray.

As has been emphasized throughout, the dual conveyors of the product dispensing mechanism are independently actuable to move together or apart depending upon item size. That is, the conveyors can spread open/close depending upon item width.

Figure 100F:
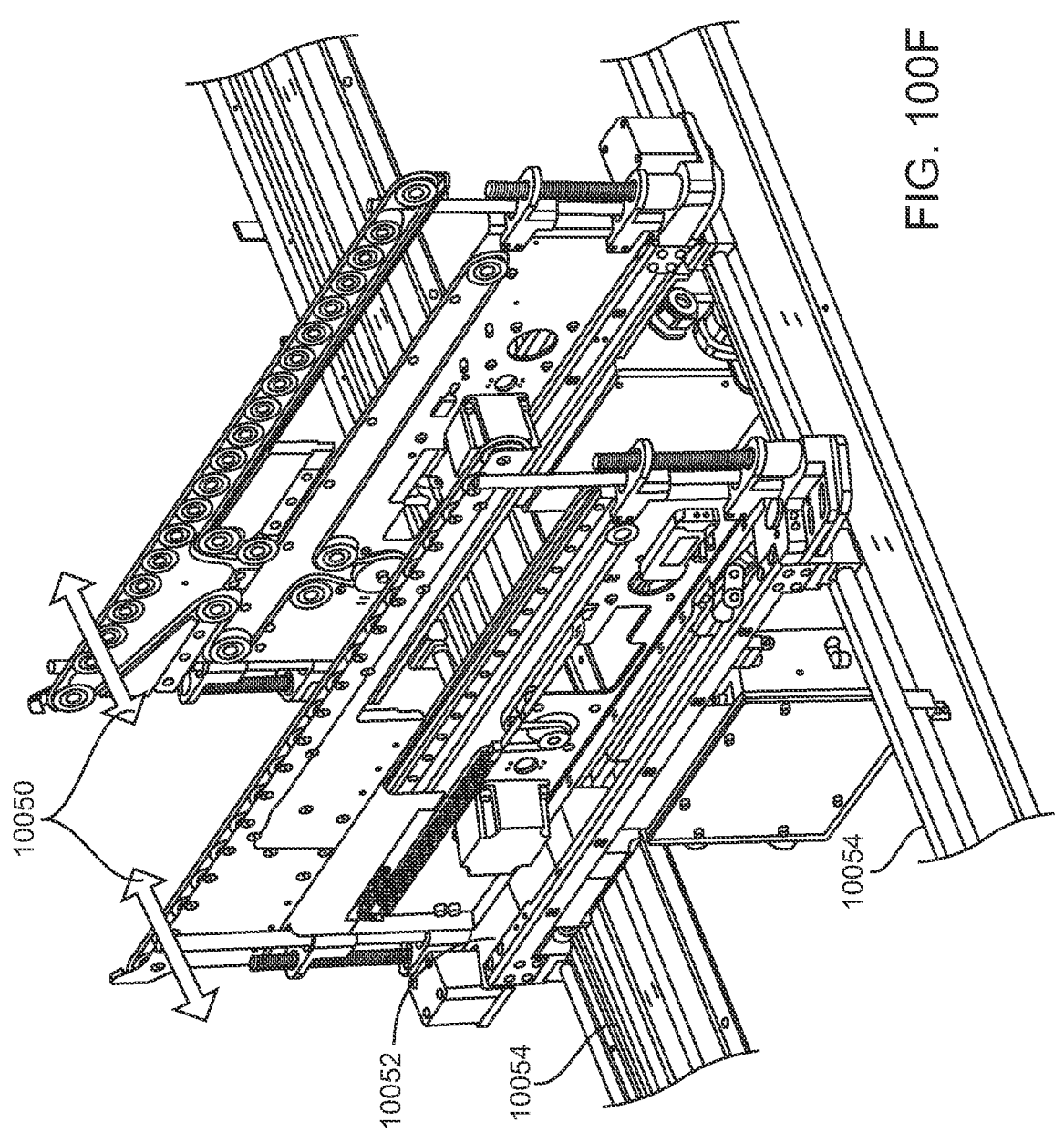
FIG. 100F shows independent carriage actuation accomplished utilizing a motor anchored to the moving carriage that includes the conveyor belt.

According to this particular embodiment, FIG. 100F shows the independent actuation 10050 as being accomplished utilizing a motor 10052 that is anchored to the moving carriage that includes the conveyor belt (the motor of the second carriage is not visible in this view). Timing belts 10054 are single length fixed in place, and the motor moves the carriage along the belt.

Figure 100G:
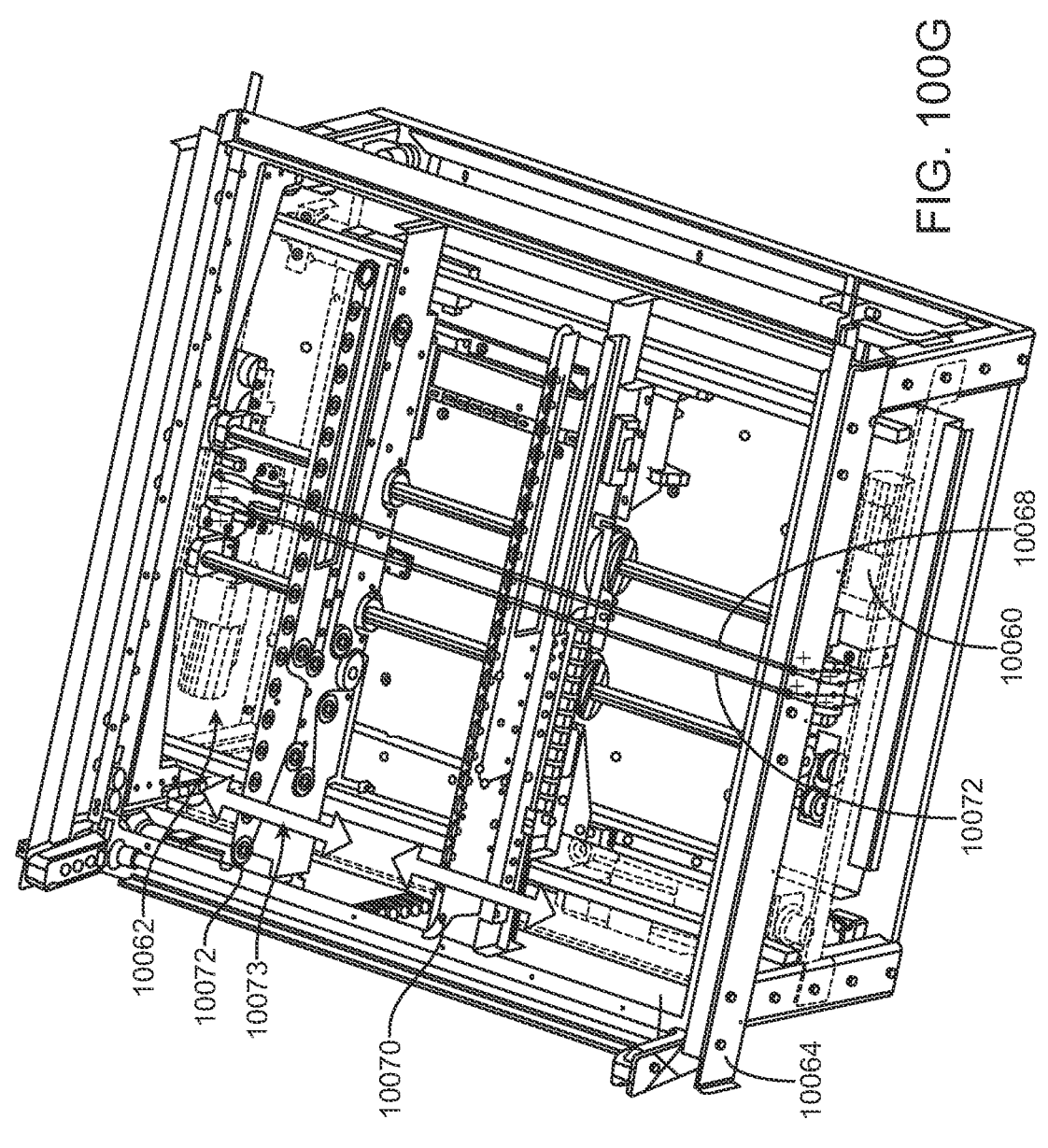
FIG. 100G shows an overhead perspective view of an alternative embodiment of a product dispensing mechanism.

This is not required however, and alternative embodiments may employ other approaches for independently actuating dual conveyors for dispensing of product items. Specifically, FIG. 100G shows an overhead perspective view of an alternative embodiment of a product dispensing mechanism.

Here, motors 10060, 10062 are instead anchored to a fixed frame 10064 rather than to the carriages themselves. The first motor 10060 drives timing belt 10068 to actuate 10069 the carriage 10070.

The second motor 10062 drives timing belt 10072 to actuate 10073 the carriage 10072. This approach featuring a moving timing belt, was previously illustrated in the side view offered by FIG. 21.

Figure 101A:
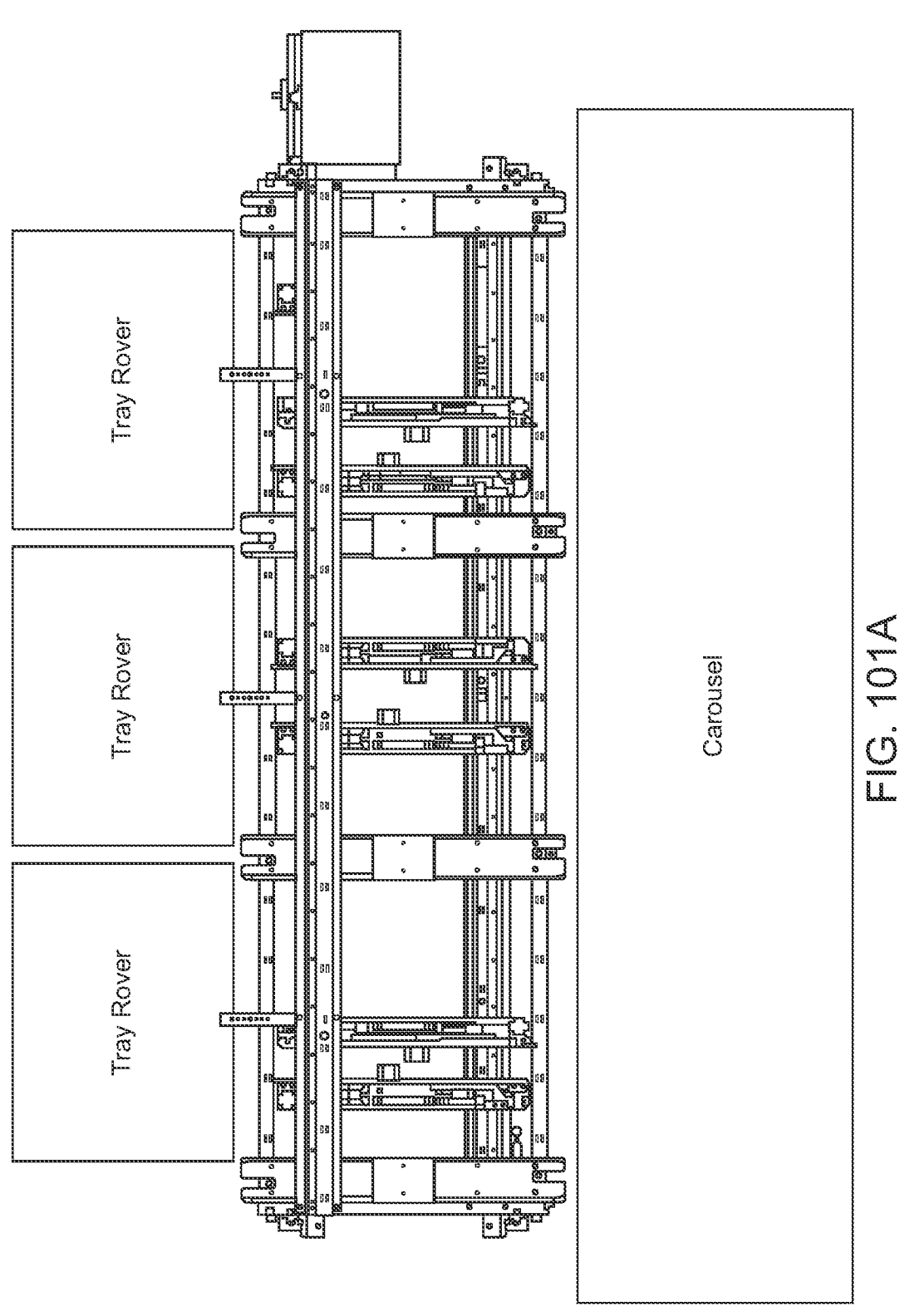
FIG. 101A shows an overhead view of a dispense mechanism located between a carousel and a plurality of tray rovers.
Figure 101B:
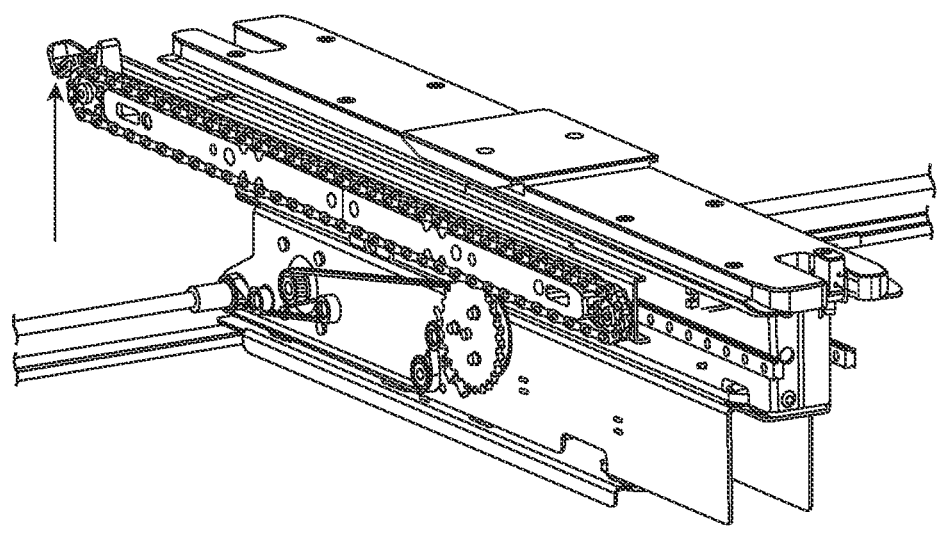
FIG. 101B shows a perspective view of movement of the dispense mechanism in a first direction.
Figure 101C:
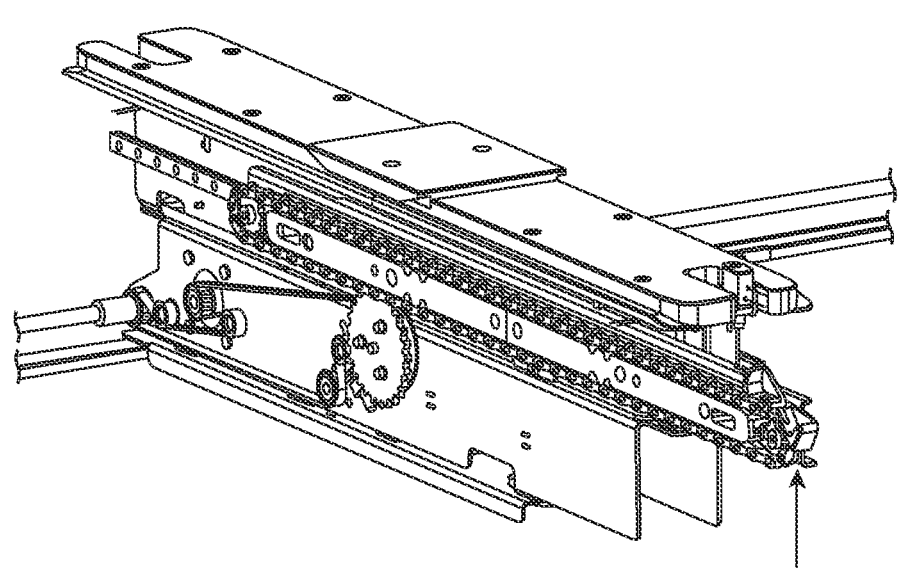
FIG. 101C shows a perspective view of the movement of the dispense mechanism in a second, opposite direction.

As mentioned earlier, a dispense mechanism may feature a hook design that allows for dual side dispensing (that is, dispensing from each of opposite sides). FIG. 101A shows an overhead view of a dispense mechanism positioned between a carousel and a plurality of tray rovers.

The carousel and tray rover may not require complicated mechanisms. Rather, they may comprise shelving to hold a stored and dispensed item, respectively.

The arm of the dispensing station can reach in two directions. A first direction contacts and places from the carousel. This is shown in the perspective view of FIG. 101B.

A second, opposite direction contacts and places from the tray rover. This is shown in the perspective view of FIG. 101C.

Figure 101D:
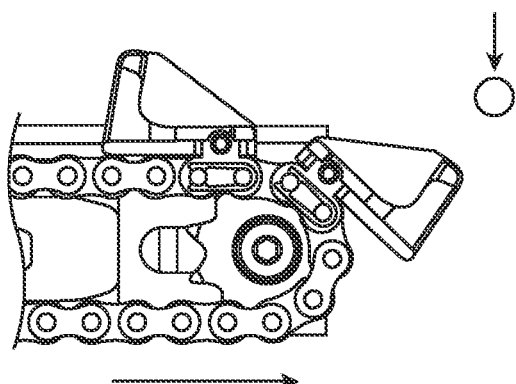
FIGS. 101D-F show enlarged views of a bidirectional arm and hook in operation.
Figure 101E:
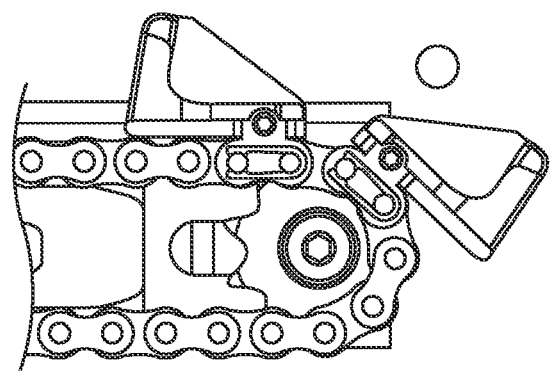
Figure 101F:
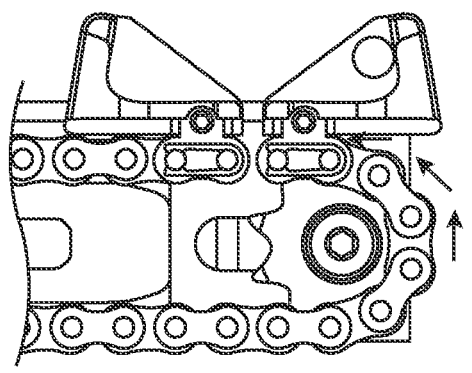

FIGS. 101D-F show enlarged views of details of the bidirectional arm and hook. The hook is split so that the end can dip under the pulling feature on the tray and then come up behind it.

While FIGS. 101D-F show this mechanism working in the direction toward the tray rover, the mechanism works from either direction. That is, the split hook could move in the opposite direction toward the carousel.

It is noted that a combination color and depth cameras, may take 3D scans of a bag or box as it is filled with items. Fiducial markers (recognized by color cameras) may be located on a line-following robot, in order to allow transformation of the bag/box coordinate frame to the dispense robot coordinate frame. Using more markers than the minimum necessary, can increase accuracy and allow transformation in the event that some markers are obscured.

According to embodiments, a program may interpret a 3D scan before each dispense. The program may comprise hardware, software (e.g., instructions present in a non-transitory computer readable storage medium), or a combination thereof, executed by a processor.

The program may then select a dispense location based upon one or more of the following factors:
  volume of vertical space available;
  drop distance until impact;
  damaging features like corners or edges;
  relative fragility of dispensed item;
  relative fragility of other items already in the bag.

The program may also adjust the platform height of the line-following robot, in order to minimize a drop distance, while still ensuring successful dispensing while retaining items already present in the bag.

After each dispensing, the program may interpret another 3D scan, logging the location of new items. A 3D map of item locations evolves, allowing the association of various regions with features such as:
  material hardness,
  sensitivity to damage,
  temperature,
  others.

This map of features allows intelligent placement of new items into the bag (e.g., to avoid dispensing soft peaches onto hard cans). The post-dispense software program may also predict a dispensing location for the next item, thereby priming the line-following robot and the next dispense robot to meet more quickly at the next dispense location.

FIGS. 107A-B show overhead images of examples of packing a bag with stereo depth vision. In particular, FIG. 107A shows a color image, and FIG. 107B shows a color+depth image of a same dispense sequence.

Fiducials located around a rim of the robot are recognized. The "droppable" area is shown as reference 10700. A dispense location 10702 is precisely selected based on a depth scan and existing data about the locations of items in the bag. The LFR moves horizontally to position the dispense location in front of the conveyor belt pair of the dispensing station.

Certain embodiments may follow specialized procedures for dispensing product items into a bag. Such approaches can be employed to pack bags with a degree of intelligence and care comparable to human effort.

According to some embodiments of procedures, packing density can be maximized, fitting more items into the same space. Damage to items may be minimized or eliminated, with items packed safely in the traveler so that they do not fall to the ground.

Some embodiments of packing procedures may rely upon physics simulation. Three-dimensional scans can be utilized in simulations that model the physical behavior of items falling off of the dispense conveyors and interacting with items already in the bag. Optimal drop impact and settling outcomes can be selected.

Particular embodiments of packing procedures may utilize reinforcement learning. A reinforcement learning model can be implemented using feedback on decisions made by the drop program. Such feedback can include but is not limited to:
  3D scans providing feedback on dispense success (items making it into the bag/box/mini-bag/platform or not);

item damage reported by delivery personnel;

item damage reported by customers.

Feedback could allow the model to improve success rate by adjusting certain numerical control parameters. Example parameters can include but are not limited to:

thresholds;

sensitivities;

function constants;

decision/priority assignments.

Certain embodiments may utilize a 3D camera for item height detection. Specifically, when a particular tray is stocked, the heights of items of that tray are known.

However in some instances items on the tray may have shifted. In other instances, the items could have variable sizes so that the maximum height is not known.

As has been discussed, a tray is loaded into storage (e.g., fixed, or moveable carousel). Each position within that storage may have a limited allowable height. Thus it may be beneficial to select a storage location accommodating the maximum height of items on a particular tray, so that storage density is optimized. Embodiments may measure the height of all items, determine the maximum height, and then select a storage location that is only slightly larger than that maximum height.

When a tray is first created, embodiments may employ a (stereoscopic) camera to create a heat map of the height of items in the tray. The maximum height can then be detected from the data. This information is used to select the location to which the tray will travel in the storage (e.g., LFT).

Once the tray is located at the picking station, a (stereoscopic) camera can be used to check the heights again, verifying that tray items did not shift during transport. This data can them be used to confirm the final location of the tray in the storage.

Each time a tray is removed from storage, there is some risk that the maximum height has changed. This can be rechecked each time, in order to ensure that the tray and the items it bears, will still fit.

If a camera or other sensed information reveals that the tray and items no longer fits into the storage, one or more of the following actions can be taken, as follows.

A new location can be selected.

The picking station conveyors can pop up and adjust the item that shifted.

A new LFB can be deployed and the shifted item can be removed from the tray.

Various embodiments may employ a 3D camera to monitor fulfilment success. In particular, certain embodiments may fix a (stereoscopic) camera above the picking station.

That camera can monitor the low of items in and out of the bag. The camera can be used to determine the location of items in the tray.

This location information can be fed back to the control software, so that the correct number of items is dispensed. Such a configuration could replace or be used in combination with a fiber optic sensor.

Such a 3D camera can be used to detect when too many or too few items were dispensed. When this happens, an error procedure can be followed to correct the issue.

A 3D camera could be used to detect if an item did not enter the LFB. When such an event occurs, an error procedure can again be followed to fix the issue.

A 3D camera can be used to detect which product item moves from one row into another, when a row is being dispensed. When this movement between tray rows occurs, error procedure can be followed to correct the problem.

A 3D camera can be used to detect when an item is missing from the tray that should otherwise be there. Again, an error procedure can be initiated to correct the issue.

FIG. 114 is a simplified block diagram showing inputs to a computer system 11400 according to an embodiment comprising a processor 11402 and a non-transitory computer readable storage medium 11404.

As indicated, the processor is configured to receive one or more inputs 11406. These inputs can include information received from a dispense station, from a traveler, from camera(s), from a tray handling apparatus, from storage, or from any other component of the product handling system.

In particular, input from the cameras can comprise images that indicate the position of the traveler, and the makeup of the goods inside. Camera input can form a basis for validation of how many items were dispensed properly.

In response to receiving such input(s), the processor is configured to reference 11407 additional information located in the non-transitory computer readable storage medium. Such additional information may be data stored in a database 11408, with any of the pieces of data discussed herein being possible candidates for storage in the database.

The computer-readable storage medium may also store instructions for performing certain specialized procedures according to various programs. Examples of such procedures can include but are not limited to one or more of:

image processing 11420;

object recognition 11422;

container packing 11424;

tray assembly 11426;

ripeness prediction 11428;

physics simulation 11434;

path finding 11430;

(machine, reinforcement) learning 11432; and others as have been described herein.

Based upon this input and referenced stored data, the processor is configured to perform a large variety of calculations to produce output 11410 of different types. That output may be communicated to control one or more of the various components of the product handling system, including but not limited to the dispense station, storage, tray handling, intake, inspection, tray handling, and the others as have been described herein.

It is emphasized that the block diagram of FIG. 114 is highly simplified for purposes of illustration. That is, not each and every procedure or piece of data may all be stored on a single non-transitory computer readable storage medium. Rather, information storage may be distributed (e.g., locally in a system component, centrally on site, and/or in the cloud) amongst a plurality of non-transitory computer readable storage media for purposes of speed of access and efficient utilization of available storage resources.

Moreover, a single processor may not be responsible for performing each and every calculation depicted. Rather processing may be distributed (in series, in parallel, or in some combination) amongst a plurality of processors for purposes of speed and efficient utilization of available computing resources.

In summary, embodiments for dispensing an item from a tray may utilize a depth camera to take a picture to find fiducials on a rim of a container (e.g., box, bag, platform) of a LFR. This image locates the LFR and container relative to the camera and the dispense conveyors.

The image may also inspect the heights of the items in the container. The image may allow locating an optimal dispense location, such that a box can be drawn around that dispense location (e.g., as shown and described above in connection with FIGS. 107A-B).

Then, the LFR moves along the floor to position the dispense location to be in line with that dispense location box. The dispense conveyors extend in and out, relative to the container of the LFR, depending upon where the dispense location box is. If the dispense location box is in the back of the bag, the conveyors may extend out further.

A height of the container borne by the LFR may also adjust depending upon the object. If fragile items have already been dispensed to the container, and/or the item to be dispensed is fragile, then the LFR may move the container to a greater height to reduce a distance that the dispensed item will drop, and hence any impact force.

Where the item to be dispensed, and/or existing items already dispensed to the container are not fragile, then the dispensing may just drop the item to the correct location in an expedited manner. Thus certain approaches may direct packing of non-fragile items first, followed by packing of fragile items.

Additional details regarding possible LFB designs according to various embodiments, are now described. Briefly, the LFB is a device that holds a compliant bag from the top opening and supports it on a moving platform from below.

FIG. 108 is a simplified perspective view of a LFB 10800 according to an embodiment. The LFB comprises a moving platform 10802 (which may include force sensors), supporting a compliant bag 10804.

The upper portion of the LFB in FIG. 108 may include a bag grab and preload Mechanism 10806. A sensor 10808 in the upper portion may be used to identify overflow of items in the bag.

The LFB of FIG. 108 may also include a moving base 10810. An embodiment of such a moving base is illustrated in FIG. 109.

The platform height adjusts responding to commands and the volume of items inside of it and the desired space for the next item. The platform can have force sensors to determine bag weight.

The LFB device can have sensors on the bag opening to determine item level in the bag. The LFB device can be either stationary, or have a motorized base.

FIG. 109 shows a simplified overhead view of a moving base according to an embodiment. The mechanics of the particular moving base of FIG. 109 include a line sensor 10811. However, this is not required and other guidance approaches can be utilized.

In particular, a motorized version of a LFB (or LFT) can guide itself around a physical space utilizing one or more of the following:

lines in the floor;

markers (e.g., RFID/barcode/other markers) positioned in the facility; and active radar/LiDAR.

According to certain embodiments, upper portions of a LFB device can feature an automated mechanism to offer bags to a human or to another automated mechanism. In some embodiments, an upper portion of a LFB device can feature an automated mechanism to grab bags from an automate feeder, and/or to preload the top of the bag in an open state.

Further details regarding a LFT design according to various particular embodiments, are now described. In particular, a LFT is a device that holds multiple trays separable from the device.

FIG. 110 shows various views of LFT 11000 including a tray stack 11002 according to an embodiment. The LFT may include a motorized base 11004, similar in many respects to a motorized based of a LFB.

The LFT further includes a lifting platform mechanism 11006 to lift the tray stack. The LFT may additionally comprise proximity and load sensors to determine a presence and a mass of a lifted object. Sensors of the LFT may be used to determine a level and a height of the tray stack.

Also included in FIG. 110 is a side view illustrating a rod 11008 with hooks that grabs on to the trays. This element may be actuated by a tray rover.

A LFT device may include a locking or retention feature that prevents trays from popping out. The LFT device may include sensors/markers that allow alignment to a specific tray level. The LFT device can stand on its own or be carried by a motorized unit.

When lifted by a motorized unit a mechanism may lock the tray stack to the motorized unit. FIG. 111 shows a simplified view of a locking feature.

The LFT device may have features in the bottom and/or side that allow kinematic alignment to a mating component. FIG. 112 is a simplified front view illustrating an alignment feature between the LFT and a platform. This embodiment features cup cones with a locking mechanism.

Further details regarding a LFP design according to various particular embodiments, are now described. In particular, some items may be too large to fit in a grocery bag. Examples can include but are not limited to 24 packs of water, 12 packs of paper towels, and firewood.

According to embodiments, such items can be stored in a bulk carousel or fixed shelving, and then dispensed using the same pick station tool. However, instead of dispensing into a bag, they could be dispensed onto a platform.

In particular, the LFP comprises a line following robot having a platform on top that can move cases or bulk goods dispensed from a carousel or fixed shelving. In some embodiments this platform would match the pick station height. However, the platform could also lower for easier packing into a delivery vehicle.

According to certain embodiments a platform could have conveyors built-in, to aid in dispensing items onto the platform. The platform could alternatively just be a smooth surface that items slide onto. According to this approach, the handling of even large product items can be automated.

Further details regarding a Line Following Mini-Bag (LFM) design according to embodiments, is now provided. In particular, the LFM is a subset of the LFB design which has some number of bags installed open, on a frame.

The LFM robot would travel around to receive dispensed specific SKUs better suited to ship in plastic bags. Examples of SKUs could include but are not limited to, wet or dirty produce, bulk goods like nuts or granola, and meats that could drip juices upon other items. The LFM robot would travel to the storage bay to collect the dispensed items, and then travel to the delivery area to be consolidated with the rest of the order.

It is noted that a LFT design may include various inspection capabilities. An alternative to inspecting trays (mid-storage life), is to pull them out of the dispensing stations and onto the LFT.

The LFT could have an inspection camera present. That camera could inspect the quality or ripeness of the items, and then a processor could decide how to handle those items.

As has been previously described, the storage and handling of product items under climate controlled conditions, can be desirable. It is noted that embodiments of either of/both the LFB and the LFT could include on-board environmental control. This would allow maintenance of controlled climate conditions throughout the fulfilment process.

Certain embodiments could provide for a cold material (e.g., an ice pack or other chemical cooler) to be incorporated into the structure. Such a LFB and/or LFT could be stored in a cold area when not in use, and then move out to fulfil orders as needed.

According to some embodiment, LFT processes could be performed in climate-controlled (e.g., cold) areas, and LFTs could have cold waiting areas as needed, before they have the opportunity to place the trays into storage (e.g., fixed, or moveable carousels). Similarly LFBs could move into a climate controlled holding area after they have finished filling an order, but prior to arrival of the transport vehicle (e.g., customer or delivery van).

Still another possible design which could be employed in connection with item handling and delivery, is the LFBX. The LFBX design may comprise a line following robot featuring a box on top. This box could be any size or shape.

The box of the LFBX is specifically designed to interact with the dispensing system. This facilitates other item packing methods that are better suited for specific product types not otherwise working with a LFB design.

Clause 1K. An apparatus comprising:
fixed storage shelving maintained under climate controlled conditions;
a tray supported by the fixed storage shelving and bearing an item having a dimension;
an elevator moveable in a vertical direction from a first height proximate to the fixed storage shelving, to a second height proximate to a dispense mechanism; and
an element configured to move the tray from the fixed storage shelving to the elevator,
wherein the dispense mechanism comprises,
a first conveyor belt configured to project through the tray to contact the item at a first point, and
a second conveyor belt moveable relative to the first conveyor belt and configured to project through the tray to contact the item at a second point.

Clause 2K. An apparatus as in clause 1K wherein the second height is overlying the dispense station, such that lowering of the elevator causes the first conveyor belt and the second conveyor belt to project through the tray.

Clause 3K. An apparatus as in clause 1K wherein the second height is adjacent to the dispense mechanism.

Clause 4K. An apparatus as in clause 3K wherein the element is further configured to move the tray from the elevator to the dispense mechanism in order to allow the first conveyor belt and the second conveyor belt to project through the tray.

Clause 5K. An apparatus as in clause 1K wherein the element comprises a first hook configured to engage the tray and move the tray in a first direction.

Clause 6K. An apparatus as in clause 5K wherein the tray further comprises a pin engaged by the first hook.

Clause 7K. An apparatus as in clause 5K wherein the element further comprises a second hook configured to engage the tray and move the tray a second direction opposite to the first direction.

Clause 8K. An apparatus as in clause 7K wherein the first hook and the second hook are connected and driven together in the first direction and in the second direction.

Clause 9K. An apparatus as in clause 1K wherein both the first conveyor belt and the second conveyor belt are configured to extend in the first direction prior to dispensing the item.

Clause 10K. An apparatus as in clause 9K further comprising a traveler configured to receive the item from the dispense mechanism and transport the item for delivery to a vehicle.

Clause 11K. An apparatus as in clause 10K further wherein a bag of the traveler receives the item.

Clause 12K. An apparatus as in clause 1K wherein the fixed storage shelving comprises an insulating panel and defines a hole through which air is flowed.

Clause 13K. An apparatus as in clause 1K wherein the tray defines a first slot through which the first conveyor belt projects, and defines a second slot through which the second conveyor belt projects.

Clause 14K. An apparatus as in clause 1K wherein the elevator is disposed within a shaft, the apparatus further comprising:
an idler located at a top of the shaft above the first height; and
a motor located at a bottom of the shaft below the second height.

Clause 15K. An apparatus as in clause 1K wherein the second conveyor belt is moveable relative to the first conveyor belt utilizing a timing belt.

Clause 16K. An apparatus as in clause 15K wherein the timing belt is fixed and a motor moves with the second conveyor belt along the timing belt.

Clause 17K. An apparatus as in clause 15K wherein the second conveyor belt moves with the timing belt.

Clause 18K. An apparatus as in clause 1K wherein the second conveyor belt is moved relative to the first conveyor belt according to the dimension stored in a non-transitory computer readable storage medium.

Clause 19K. An apparatus as in clause 1K wherein the tray comprises a plurality of injection molded parts assembled by a machine.

Clause 20K. An apparatus as in clause 19K wherein the machine references the dimension stored in a non-transitory computer readable storage medium in order to assemble the plurality of injection molded parts into the tray.

Clause 1L. An apparatus comprising:
a first conveyor belt configured to project through a tray to contact an item at a first point; and
a second conveyor belt moveable relative to the first conveyor belt and configured to project through the tray to contact the item at a second point,
wherein after a vertical position of the tray relative to the first conveyor belt and to the second conveyor belt is changed, the first conveyor belt and the second conveyor belt are configured to dispense the item from the tray in a first direction.

Clause 2L. An apparatus as in clause 1L further comprising:
a first element configured to move the first conveyor belt in a vertical direction to change the vertical position of the first conveyor belt relative to the tray; and
a second element configured to move the second carriage in the vertical direction to change the vertical position of the second conveyor belt relative to the tray.

Clause 3L. An apparatus as in clause 1L further comprising an element configured to move the tray in a vertical direction to change the vertical position of the tray relative to the first conveyor belt and to the second conveyor belt.

Clause 4L. An apparatus as in clause 3L wherein the element comprises an elevator.

Clause 5L. An apparatus as in clause 4L wherein the elevator is vertically moveable to receive the tray from controlled climate storage.

Clause 6L. An apparatus as in clause 5L wherein the controlled climate storage comprises a fixed shelf.

Clause 7L. An apparatus as in clause 1L wherein both the first conveyor belt and the second conveyor belt are configured to extend in the first direction prior to dispensing the item.

Clause 8L. An apparatus as in clause 1L wherein both the first conveyor belt and the second conveyor belt are configured to dispense the item by dropping into a bag.

Clause 9L. An apparatus as in clause 1L further comprising a third conveyor belt and a fourth conveyor belt configured to:

receive from the tray, another item conveyed by the first conveyor belt and the second conveyor belt in a second direction opposite to the first direction; and after the item is dispensed, return the another item to the tray.

Clause 10L. An apparatus as in clause 1L further comprising a motor causing the second conveyor belt to move relative to the first conveyor belt using a timing belt.

Clause 11L. An apparatus as in clause 10L wherein the motor and the second conveyor belt move along the timing belt.

Clause 12L. An apparatus as in clause 10L wherein a location of the motor is fixed and the second conveyor belt moves with the timing belt.

Clause 13L. An apparatus as in clause 1L further comprising an element configured to remove the tray from a storage shelf prior to the first conveyor belt and the second conveyor belt projecting through the tray.

Clause 14L. An apparatus as in clause 13L wherein the element comprises a hook.

Clause 15L. An apparatus as in clause 13L wherein:

the storage shelving is fixed; and the element is configured to move in a vertical direction together with another element that changes the vertical position of the tray relative to the first conveyor belt and to the second conveyor belt.

Clause 16L. An apparatus as in clause 15L wherein the another element comprises an elevator.

Clause 17L. An apparatus as in clause 13L wherein the storage shelving is part of moveable carousel.

Clause 18L. An apparatus as in clause 1L wherein:

a dimension of the item is stored in a non-transitory computer readable storage medium, and the second conveyor belt is moved relative to the first conveyor belt based upon the dimension.

Clause 19L. An apparatus as in clause 18L wherein the tray comprises a plurality of injection molded parts assembled by a machine.

Clause 20L. An apparatus as in clause 19L wherein the machine references the dimension to assemble the plurality of injection molded parts into the tray.

Clause 1M. An apparatus comprising:

a climate-controlled storage location;

a tray supporting an item in the climate-controlled storage location;

a dispense station configured to receive the tray supporting the item from the climate-controlled storage location;

a mobile robot configured to receive the item dispensed from the tray by the dispense station;

a processor configured to control operation of the dispense station; and a first camera in optical communication with the dispense station and the mobile robot to send an image of the dispense station and the mobile robot to the processor.

Clause 2M. An apparatus as in clause 1M wherein if the image indicates the item has not been successfully dispensed to the mobile robot, the processor is configured to instruct the dispense station to take corrective action.

Clause 3M. An apparatus as in clause 1M wherein the processor determines a specific location of the traveler to receive the item based upon the image.

Clause 4M. An apparatus as in clause 3M wherein the specific location is within a bag, within a box, or upon a platform.

Clause 5M. An apparatus as in clause 3M wherein the traveler already includes other items.

Clause 6M. An apparatus as in clause 3M wherein the processor is configured to determine the specific location based upon a packing procedure.

Clause 7M. An apparatus as in clause 6M wherein the packing procedure considers one or more of the following:

item packing density within the traveler;

item damage;

successful dispensing;

physics simulation; and reinforcement learning.

Clause 8M. An apparatus as in clause 1M wherein the first camera is stereoscopic.

Clause 9M. An apparatus as in clause 1M wherein the image is a heat image.

Clause 10M. An apparatus as in clause 1M wherein the processor is configured to compare the image with another image of the tray including the item, taken by a second camera prior to the tray moving to the dispense station.

Clause 11M. An apparatus as in clause 10M wherein the processor comparing the image with the another image indicates that the item has shifted position on the tray.

What is claimed is:

1. An apparatus comprising:

a tray configured to support an item, wherein the tray comprises openings formed in a bottom of the tray;

a dispense station comprising a pair of conveyor belts configured to:

project through the openings of the tray;

contact, while projecting through the tray, the item supported by the tray; and convey the item in a forward direction;

a traveler oriented adjacent to the dispense station in the forward direction, the traveler comprising:

a horizontally-moveable base supporting a vertically-moveable platform, wherein the vertically-moveable platform is configured to support a container; and the container transiently loaded into the traveler and supported on the vertically-moveable platform; and a processor configured to execute a program to:

direct the traveler to move horizontally to position the container at a first dispense location in front of the pair of conveyor belts;

direct the pair of conveyor belts to convey the item forward to the first dispense location such that the container receives the item; and direct the traveler to again move horizontally with the container and the item to a second dispense location different from the first dispense location.

2. The apparatus of claim 1, wherein the pair of conveyor belts are configured to:

maneuver to a first position aligned with a first row of the tray transiently storing the item;

vertically project through first openings, formed in the bottom of the tray below the first row, to lift the item above the first row;

laterally extend forward toward the first dispense location to locate distal ends of the pair of conveyors over the first dispense location; and convey the item in the forward direction to dispense the item into the traveler occupying the first dispense location.

3. The apparatus of claim 1, wherein the tray:

comprises a first opening formed in the bottom of the tray;

defines a first row arranged over the first opening and configured to support items; and is configured to:

in a first configuration, transiently store items of a first item type in the first row; and in a second configuration, transiently store items of a second item type, different from the first item type, in the first row.

4. The apparatus of claim 1:

wherein the tray defines a first row arranged over a first opening and configured to support the item of a first item type; and wherein the processor is configured to:

receive a customer order specifying the first item type stored in the first row of the tray; and in response to the customer order specifying a first quantity of items of the first item type:

assign the dispense station to dispense items of the first item type from the first row of the tray according to the customer order; and direct the traveler to move horizontally to position the container at the first dispense location in front of the pair of conveyor belts.

5. The apparatus of claim 1, wherein the processor is configured to:

direct the pair of conveyor belts to convey the item forward toward the first dispense location to dispense the item into the container, the item of a first item type;

direct the traveler to move horizontally to position the container at the second dispense location in front of a second pair of conveyor belts of a second dispense station; and direct the second pair of conveyor belts to convey a second item of a second item type, stored in a second tray occupying the second dispense station, forward toward the second dispense location to dispense the second item into the container.

6. The apparatus of claim 1, wherein the tray:

comprises first openings and second openings formed in the bottom of the tray; and defines:

a first row arranged over the first opening and configured to support the item, the item comprising a first item type exhibiting a first set of product characteristics; and a second row arranged over the second opening and configured to support a second item of a second item type exhibiting a second set of product characteristics different from the first set of product characteristics.

7. The apparatus of claim 6, wherein the pair of conveyor belts are configured to:

project through the first openings of the tray to contact the item supported in the first row;

convey the item in the forward direction to dispense the item into the container;

project through the second openings of the tray to contact the second item supported in the second row; and convey the second item in the forward direction to dispense the second item into the container.

8. The apparatus of claim 1, further comprising:

a population of storage carousels configured to transiently store a population of trays comprising the tray; and a tray conveyor network configured to:

retrieve trays from the population of storage carousels; and deliver trays to dispense stations.

9. The apparatus of claim 8, wherein the processor is configured to:

assign the dispense station to dispense items from the tray; and trigger the tray conveyor network to:

retrieve the tray from a storage carousel, in the population of storage carousels, transiently storing the tray; and locate the tray in the dispense station.

10. The apparatus of claim 1:

wherein the tray is configured to support items of a first item type in a first set of rows of the tray, the first item type exhibiting a first product geometry compatible with a first row geometry of the first set of rows; and further comprising a second tray configured to support items of a second item type in a second set of rows of the second tray, the second item type exhibiting a second product geometry:

different from the first product geometry; and compatible with a second lane geometry of the second set of rows.

11. The apparatus of claim 10:

wherein the tray is configured to support items of the first item type in the first set of rows of the tray, the first item type comprising produce; and wherein the second tray is configured to support items of the second item type in the second set of rows of the second tray, the second item type comprising a boxed good.

12. The apparatus of claim 1, wherein the processor is configured to direct the traveler to navigate to a delivery area for removal of the container from the traveler by a customer.

13. A method comprising:

receiving an order specifying items of a first product type;

identifying a first tray, in a population of trays, the first tray:

comprising first openings formed in a bottom of the first tray;

defining a first row arranged over the first openings; and transiently storing items of the first product type in the first row;

assigning a first dispense station to dispense items transiently stored in the first tray, the first dispense station comprising a first pair of conveyor belts;

operating a traveler to navigate to position a container, transiently loaded into the traveler, at a first dispense location in front of the first pair of conveyor belts, the traveler comprising:

a horizontally-moveable base supporting a vertically-moveable platform, wherein the vertically-moveable platform is configured to support the container; and the container transiently loaded into the traveler and supported on the vertically-moveable platform;

operating the first pair of conveyor belts to:

project through the first openings of the first tray to contact a first item transiently stored in the first row of the first tray; and convey the first item in a forward direction toward the first dispense location to dispense the first item into the container; and operating the traveler to navigate to position the container at a second dispense location different from the first dispense location.

14. The method of claim 13, wherein operating the first pair of conveyor belts comprises operating the first pair of conveyor belts to:

maneuver to a first position aligned with the first row of the first tray transiently storing the first item;

vertically project through the first openings to lift the first item above the first row;

laterally extend forward toward the first dispense location to locate distal ends of the first pair of conveyors over the first dispense location; and convey the first item in the forward direction to dispense the first item into the traveler occupying the first dispense location.

15. The method of claim 13, further comprising, in response to assignment of the first dispense station to the first tray:

operating a tray conveyor network to:

retrieve the first tray from a first storage carousel transiently storing the first tray; and locate the first tray in the first dispense station.

16. The method of claim 13:

wherein receiving the order comprises receiving the order specifying the first item of a first item type and a second item of a second item type; and further comprising:

assigning a second dispense station to dispense items of the second item type transiently stored in a second tray, the second dispense station comprising a second pair of conveyor belts; and operating the second pair of conveyor belts to:

project through second openings of the second tray to contact the second item transiently stored in a second row of the second tray; and convey the second item in the forward direction toward the second dispense location to dispense the second item into the container.

17. An apparatus comprising:

a tray:

comprising a set of openings formed in a bottom of the tray; and defining a set of rows:

arranged over the set of openings; and configured to support rows of items transiently stored in the tray;

a dispense station comprising a pair of conveyor belts configured to:

project through first openings in the set of openings of the tray;

contact an item stored in a first row, arranged over the first openings, while projecting through the tray; and convey the item in a forward direction;

a traveler:

configured to navigate to the dispense station; and comprising a horizontally-moveable base supporting a vertically-moveable platform, the vertically-moveable platform configured to support a container transiently loaded into the traveler; and a processor configured to:

direct the traveler, transiently loaded with the container, to maneuver horizontally to locate the container at a first dispense location in front of the pair of conveyor belts;

direct the pair of conveyor belts to convey the item forward to the first dispense location to dispense the item into the container; and direct the traveler, transiently loaded with the container and the item, to maneuver horizontally from the first dispense location to a second dispense location.

18. The apparatus of claim 17, wherein the pair of conveyor belts are configured to:

maneuver to a first position aligned with the first row of the tray transiently storing the item;

vertically project through the first openings, formed in the bottom of the tray below the first row, to lift the item above the first row; and horizontally convey the item in the forward direction to dispense the item into the traveler, transiently loaded with the container, occupying the first dispense location.

19. The apparatus of claim 17, wherein the tray is configured to support items of a first item type in the first row, the first item type exhibiting a first product geometry compatible with a first row geometry of the first row.

20. The apparatus of claim 17, wherein the processor is configured to:

direct the pair of conveyor belts to convey the item forward toward the first dispense location to dispense the item into the container, the item of a first item type;

direct the traveler to move horizontally to position the container at the second dispense location in front of a second pair of conveyor belts of a second dispense station; and direct the second pair of conveyor belts to convey a second item of a second item type, stored in a second tray occupying the second dispense station, forward toward the second dispense location to dispense the second item into the container.

* * * * *